US008067136B2

(12) United States Patent
Yano et al.

(10) Patent No.: US 8,067,136 B2
(45) **Date of Patent: *Nov. 29, 2011**

(54) CHARGE CONTROL AGENT, TONER, IMAGE FORMING METHOD, AND IMAGE FORMING APPARATUS

(75) Inventors: Tetsuya Yano, Tokyo (JP); Takashi Kenmoku, Fujisawa (JP); Tatsuki Fukui, Yokohama (JP); Ako Kusakari, Tokyo (JP); Chieko Mihara, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1481 days.

This patent is subject to a terminal disclaimer.

(21) Appl. No.: 10/585,642

(22) PCT Filed: Jun. 9, 2005

(86) PCT No.: PCT/JP2005/011001

§ 371 (c)(1), (2), (4) Date: Jul. 7, 2006

(87) PCT Pub. No.: WO2005/121904

PCT Pub. Date: Dec. 22, 2005

(65) Prior Publication Data

US 2009/0202927 A1 Aug. 13, 2009

(30) Foreign Application Priority Data

Jun. 11, 2004 (JP) ................................ 2004-174789

(51) Int. Cl.
*G03G 13/04* (2006.01)

(52) U.S. Cl. .................. 430/48; 430/108.2; 430/111.32; 430/111.35; 528/361; 399/130; 399/50

(58) Field of Classification Search .................... 430/48, 430/108.2, 111.32, 111.35; 528/361; 399/130, 399/50

See application file for complete search history.

(56) References Cited

FOREIGN PATENT DOCUMENTS

EP 1236755 9/2002

(Continued)

OTHER PUBLICATIONS

Cammas et al.; "Polymers of malic acid . . . hydrolyzable devices", Int'l. J. Biol. Macromolecules, 25 (1999), 273-282.

(Continued)

*Primary Examiner* — Mark F Huff
*Assistant Examiner* — Rachel Zhang
(74) *Attorney, Agent, or Firm* — Fitzpatrick, Cella, Harper & Scinto

(57) ABSTRACT

To provide: a charge control agent having negative chargeability, which contributes to environmental conservation and the like to an increased degree, has high performance (high charge amount, quick rise-up of charge, excellent stability with time, and high environmental stability), and has improved dispersibility; a toner for developing an electrostatic charge image containing the charge control agent; and an image forming method and an image forming apparatus each using the toner for developing an electrostatic charge image. A charge control agent for controlling a charged state of powder, characterized by including one or more units each represented by the following chemical formula (1) in a molecule.

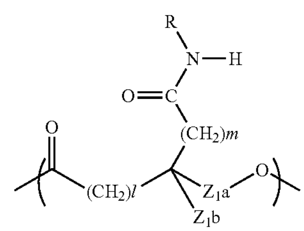

9 Claims, 5 Drawing Sheets

FOREIGN PATENT DOCUMENTS

| | | |
|---|---|---|
| EP | 1245605 | 10/2002 |
| EP | 1253161 | 10/2002 |
| EP | 1253162 | 10/2002 |
| EP | 1254918 | 11/2002 |
| EP | 1336635 | 8/2003 |
| EP | 1340777 | 9/2003 |
| WO | WO 2004/037889 | 5/2004 |
| WO | WO 2004/038512 | 5/2004 |
| WO | WO 2004/061529 | 7/2004 |
| WO | WO 2004/061530 | 7/2004 |

OTHER PUBLICATIONS

Yamaoka et al., "Synthesis . . . malic acid-containing functional polymers", Int'l. J. Biol. Macromolecules, 25 (1999), 265-271.

Trollsås, et al., Hydrophilic AlipaticPolyesters . . . Cyclic Esters, Macromolecules, A.C.S., 33 13 (2000) 4619-4627.

CHARGE CONTROL AGENT, TONER, IMAGE FORMING METHOD, AND IMAGE FORMING APPARATUS

TECHNICAL FIELD

The present invention relates to a charge control agent, a toner for developing an electrostatic charge image, an image forming method using the toner, and an image forming apparatus using the toner each of which is used for a recording method utilizing an electrophotographic method, an electrostatic recording method, a magnetic recording method, or the like.

BACKGROUND ART

In recent years, biodegradable polymer materials have been finding a wide variety of applications including medical materials, drug delivery systems, and environmentally compatible materials. In recent years, in addition to those applications, the biodegradable polymer materials have been requested to provide new functions, and hence various studies have been made.

In particular, the introduction of a chemically modifiable functional group into a molecule of a polyhydroxyalkanoate typified by polylactic acid has been examined. For example, there has been reported a compound into which a carboxyl group or a vinyl group is introduced. For example, polymalic acid has been known as a polyhydroxyalkanoate having a carboxyl group at a side chain thereof. An α-type represented by the chemical formula (14) and a β-type represented by the chemical formula (15) have been known as structures of monomer units for a polymer of polymalic acid.

(14)

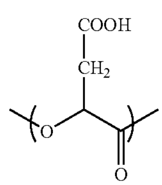

(15)

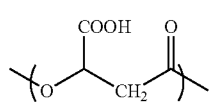

Of those, a polymer obtained by ring-opening polymerization of a benzyl ester of β-malolactone represented by the chemical formula (16) is disclosed in U.S. Pat. No. 4,265,247 as β-type polymalic acid or a copolymer thereof.

(16)

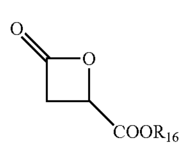

(In the formula $R_{16}$ represents a benzyl group.)

In addition, a polymer obtained by copolymerization of a six-membered ring diester monomer and a glicolide or lactide as a cyclic diester or a lactone as an intramolecular ring closure reaction ester of ω-hydroxycarboxylic acid represented by the chemical formula (17) is disclosed in Japanese Patent Application Laid-Open No. H02-3415 as a copolymer containing any one of other hydroxyalkanoic acids typified by α-type polymalic acid-glycolic acid copolymer and glycolic acid.

(17)

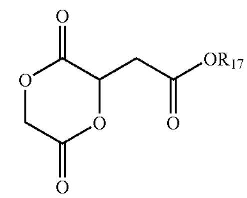

(In the formula, $R_{17}$ represents a lower alkyl group such as a methyl group, an ethyl group, an n-propyl group, an isopropyl group, or a t-butyl group, or a benzyl group.)

"Macromolecules" 2000, vol. 33, No. 13, p. 4619 discloses that 7-oxo-4-oxepancarboxylate is subjected to ring-opening polymerization to produce a polymer having an ester group at a side chain thereof, and the polymer is further subjected to hydrogenolysis to produce a polymer having a carboxylic acid at a side chain thereof as a polyhydroxyalkanoate having a carboxyl group at a side chain thereof. "Biomacromolecules" 2000, vol. 1, p. 275 discloses a polymer in which a benzyloxycarbonyl group is introduced into a methylene group at position α of a carbonyl group in the main chain of poly(ε-caprolactone), the polymer being obtained by: allowing lithium diisopropylamide to react with poly(ε-caprolactone); and allowing the resultant to react with benzyl chloroformate.

"Macromolecular Bioscience" 2004, vol. 4, p. 232 discloses a polymer in which a (benzyloxycarbonyl)methyl group is introduced into a methylene group at position α of a carbonyl group in the main chain of polylactic acid, the polymer being obtained by: allowing lithium diisopropylamide to react with polylactic acid; and allowing the resultant to react with benzyl bromoacetate.

"Polymeric Materials Science & Engineering" 2002, vol. 87, p. 254 discloses, as a polyhydroxyalkanoate having a vinyl group at a side chain thereof, a polymer obtained by ring-opening polymerization of α-allyl(δ-valerolactone).

Similarly, "Polymer Preprints" 2002, vol. 43, No. 2, p. 727 discloses, as a polyhydroxyalkanoate having a vinyl group at a side chain thereof, a polymer obtained by ring-opening polymerization of 3,6-diallyl-1,4-dioxane-2,5-dione as a six-membered ring diester monomer.

There has been reported a polymer having a new function into which a structure providing functionality for a polyhydroxyalkanoate into which a chemically modifiable functional group is introduced as described above is introduced. "International Journal of Biological Macromolecules" 1999, vol. 25, p. 265 discloses the following. A copolymer of α-type malic acid and glycolic acid is obtained by ring-opening polymerization of a cyclic dimer of α-type malic acid and glycolic acid, and the resultant polymer is deprotected to obtain a polyester having a carboxyl group at a side chain thereof. Tripeptide is chemically modified to the carboxyl group at the side chain, and the resultant polymer is evaluated for cell adhesive property. At this time, a good result is obtained.

A large number of electrophotographic methods have been known. A general method involves: utilizing a photoconductive substance to form an electrical latent image on an image-bearing member (photosensitive member) by using various means; developing the latent image with toner to form a visible image; transferring the toner image onto an image-receiving material such as paper as required; and fixing the toner image onto the image-receiving material under heating and/or pressure or the like to provide a copy. Cascade development, magnetic brush development, impression development, or the like has been known as a method of visualizing an electrical latent image. A method involving: using magnetic toner and a rotation developing sleeve having a magnetic pole at its center; and allowing the magnetic toner to fly from a place on the developing sleeve to a place on a photosensitive member in a magnetic field has also been used.

Development methods used for developing an electrostatic latent image are classified into: a two-component development method involving the use of a two-component developer composed of toner and a carrier; and a one-component development method involving the use of a one-component developer composed only of toner and using no carrier. Here, a colored fine particle generally referred to as toner contains a binder resin and a colorant as essential ingredients, and further contains a charge control agent, magnetic powder, or the like as required.

A method of applying charge to toner may involve the utilization of the charging property of a binder resin itself without the use of a charge control agent. However, in this case, stability of charge with time and humidity resistance are poor, and hence it is difficult to obtain a good image. Therefore, a charge control agent is typically added for maintaining charge of toner and for controlling the charge.

Examples of a charge control agent conventionally known in the art include: charge control agents each having negative frictional charging property such as azo dye metal complexes, metal complexes of aromatic dicarboxylic acids, and metal complexes of salicylic acid derivatives; and positive charge control agents such as nigrosin-based dyes, triphenylmethane-based dyes, various quaternary ammonium salts, and organic tin compounds such as dibutyltin oxide. However, toner containing any one of those charge control agents may not sufficiently satisfy quality properties required for the toner such as chargeability and stability with time depending on the composition of the toner.

For example, toner containing an azo dye metal complex known as a negative charge control agent has a certain level of charge amount, but may be poor in dispersibility depending on the kind of a binder resin to be combined because the azo dye metal complex is a low-molecular crystal. In this case, the negative charge control agent is not evenly distributed in the binder resin, and the charge amount distribution of the resultant toner is extremely devoid of sharpness. Accordingly, an image to be obtained has low gradation and is poor in image formation ability. Furthermore, at present, an azo dye metal complex has been used only for toner having a limited hue, which is mainly black, because the azo dye metal complex has an inherent tone. When the azo dye metal complex is used for color toner, there arises a large problem in that the visibility of a colorant necessary for obtaining an image having a tone capable of coping with a severe demand is low.

Examples of a negative charge control agent which is nearly colorless include metal complexes of aromatic dicarboxylic acids. However, dispersibility may be low because a metal complex of an aromatic dicarboxylic acid is not completely colorless and is a low-molecular crystal.

On the other hand, at present, a nigrosin-based dye or a triphenylmethane-based dye known as a positive charge control agent has been used only for toner having a limited hue, which is mainly black, because the dye itself is colored. In addition, the stability of toner with time against continuous copying may not be good. In addition, a conventional quaternary ammonium salt may provide insufficient moisture resistance when it is turned into toner. In this case, stability with time is poor, and repeated use may not provide a good image.

In recent years, a reduction in waste and an increase in safety of waste have been globally perceived as problems from the viewpoint of environmental conservation. Such problems also occur in the field of electrophotography. In other words, as imaging apparatuses have become widespread, waste amounts of printed paper, waste toner that has been already used, and copying paper have increased year by year, and the safety of such waste is an important problem in terms of protection of the global environment.

In view of such a point, polymer-based charge control agents have been examined. Compounds described in U.S. Pat. Nos. 4,480,021, 4,442,189 and 4,925,765 are examples of such charge control agents. Furthermore, a copolymer of: styrene and/or $\alpha$-methylstyrene; and an alkyl (meth)acrylate or alkyl (meth)acrylate amide having a sulfonic group is generally used as a polymer charge control agent for causing toner to exert negative chargeability. Such a material is advantageous in that it is colorless, but must be added in a large amount in order to obtain a target charge amount.

As described above, each of those compounds does not have sufficient performance as a charge control agent, and is problematic in terms of, for example, charge amount, rise-up property of charge, stability with time, and environmental safety. In addition, when not only a function but also influences on a human body and the environment are taken into consideration, a charge control agent capable of realizing: synthesis using a safer compound; a safer and more moderate synthesis process; a reduction in amount of an organic solvent to be used; and the like has been strongly demanded. However, such a charge control agent and a synthesis process for the charge control agent have not been reported yet, and a function of a charge control agent, contribution of the charge control agent to environmental conservation, and the like are susceptible to further improvement.

DISCLOSURE OF THE INVENTION

The present invention has been made with a view to solving the above problems, and an object of the present invention is to provide: a charge control agent having negative chargeability, which contains a polyhydroxyalkanoate into which a sulfonic group and a derivative thereof, or a carboxyl group and a derivative thereof as a hydrophilic group or a polar group are introduced to improve various functionalities, and which, in terms of function, contributes to, for example, environmental protection to an increased degree, has high performance (high charge amount, quick rise-up of charge, excellent stability with time, and high environmental stability), and has improved dispersibility; a toner for developing an electrostatic charge image containing the charge control agent; and an image forming method and an image forming apparatus each using the toner for developing an electrostatic charge image.

The inventors of the present invention have found that the above polyhydroxyalkanoate has very excellent property as a charge control agent and has high safety against a human body and the environment. The inventors have also found that the use of a toner for developing an electrostatic charge image containing the charge control agent in an image forming apparatus having a certain developing system provides a remarkable effect.

That is, according to one aspect of the present invention, there is provided a charge control agent for controlling a charged state of powder, characterized by including one or more units each represented by the following chemical formula (1) in a molecule.

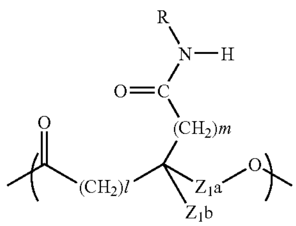

(1)

(In the formula:

R represents $-A_1-SO_2R_1$;

$R_1$ represents OH, a halogen atom, ONa, OK, or $OR_{1a}$; and $R_{1a}$ and $A_1$ each independently represent a substituted or unsubstituted aliphatic hydrocarbon structure, a substituted or unsubstituted aromatic ring structure, or a substituted or unsubstituted heterocyclic structure.

In addition, with regard to l, m, $Z_{1a}$, and $Z_{1b}$ in the formula:

when l represents an integer selected from 2 to 4, $Z_{1a}$ represents nothing or a linear alkylene chain having 1 to 4 carbon atoms, $Z_{1b}$ represents a hydrogen atom, and m represents an integer selected from 0 to 8;

when l represents 1 and $Z_{1a}$ represents a linear alkylene chain having 1 to 4 carbon atoms, $Z_{1b}$ represents a hydrogen atom and m represents an integer selected from 0 to 8;

when l represents 1 and $Z_{1a}$ represents nothing, $Z_{1b}$ represents a hydrogen atom and m represents 0;

when l represents 0 and $Z_{1a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{1b}$ represents a hydrogen atom, or a linear or branched alkyl group, aryl group, or aralkyl group which may be substituted by an aryl group, and m represents an integer selected from 0 to 8; and when l represents 0 and $Z_{1a}$ represents nothing, $Z_{1b}$ represents a hydrogen atom, or a linear or branched alkyl group, aryl group, or aralkyl group which may be substituted by an aryl group, and m represents an integer selected from 0 to 8.

In addition, when multiple units exist, R, $R_1$, $R_{1a}$, $A_1$, $Z_{1a}$, $Z_{1b}$, l, and m each independently have the above meaning for each unit.)

According to another aspect of the present invention, there is provided a charge control agent for controlling a charged state of powder, characterized by including one or more units each represented by the following chemical formula (5) in a molecule.

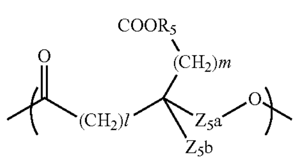

(5)

(In the formula:

$R_5$ represents hydrogen, a group for forming a salt, or $R_{5a}$, and $R_{5a}$ represents a linear or branched alkyl having 1 to 12 carbon atoms, or aralkyl group.

In addition, with regard to l, m, $Z_{5a}$, and $Z_{5b}$ in the formula:

when l represents an integer selected from 2 to 4, $Z_{5a}$ represents nothing or a linear alkylene chain having 1 to 4 carbon atoms, $Z_{5b}$ represents a hydrogen atom, and m represents an integer selected from 0 to 8;

when l represents 1 and $Z_{5a}$ represents a linear alkylene chain having 1 to 4 carbon atoms, $Z_{5b}$ represents a hydrogen atom and m represents an integer selected from 0 to 8;

when l represents 1 and $Z_{5a}$ represents nothing, $Z_{5b}$ represents a hydrogen atom and m represents 0;

when l represents 0 and $Z_{5a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{5b}$ represents a hydrogen atom, or a linear or branched alkyl group, aryl group, or aralkyl group which may be substituted by an aryl group, and m represents an integer selected from 0 to 8; and when l represents 0 and $Z_{5a}$ represents nothing, $Z_{5b}$ represents a hydrogen atom, or a linear or branched alkyl group, aryl group, or aralkyl group which may be substituted by an aryl group, and m represents an integer selected from 0 to 8.

In addition, when multiple units exist, $R_5$, $R_{5a}$, $Z_{5a}$, $Z_{5b}$, l, and m each independently have the above meaning for each unit.)

According to another aspect of the present invention, there is provided a toner for developing an electrostatic charge image, characterized by including at least: a binder resin; a colorant; and the charge control agent of the present invention.

According to another aspect of the present invention, there is provided an image forming method, including at least the steps of: applying a voltage from an outside to a charging member to charge an electrostatic latent image-bearing member; forming an electrostatic charge image on the charged electrostatic latent image-bearing member; developing the electrostatic charge image with toner for developing an electrostatic charge image to form a toner image on the electrostatic latent image-bearing member; transferring the toner image on the electrostatic latent image-bearing member onto a recording material; and fixing the toner image on the recording material under heating, characterized in that the toner for developing an electrostatic charge image of the present invention is used.

According to another aspect of the present invention, there is provided an image forming apparatus, including at least: means for applying a voltage from an outside to a charging member to charge an electrostatic latent image-bearing member; means for forming an electrostatic charge image on the charged electrostatic latent image-bearing member; means for developing the electrostatic charge image with toner for developing an electrostatic charge image to form a toner image on the electrostatic latent image-bearing member; means for transferring the toner image on the electrostatic latent image-bearing member onto a recording material; and means for fixing the toner image on the recording material under heating, characterized in that the toner for developing an electrostatic charge image of the present invention is used.

EFFECT OF THE INVENTION

According to the present invention, one or more kinds of polyhydroxyalkanoates each represented by the chemical formula (1) or (5) are added as charge control agents to the composition of a toner for developing an electrostatic charge image, whereby excellent charging property is obtained, and dispersibility of the compound into a toner resin and spent property are improved. In addition, there can be provided a toner for developing an electrostatic charge image in which the occurrence of image fogging is suppressed even at the time of output in an image forming apparatus, which is excellent in transferability, and which is highly applicable to an electrophotographic process. In addition, the charge control agent to be used in the present invention is colorless or has weak tinting, so an arbitrary colorant can be selected in accordance with a hue requested for color toner, and inhibition to an inherent hue of a dye or of a pigment can be suppressed. It should be noted that safety can be enhanced when a toner for developing an electrostatic charge image is constituted so as not to contain a heavy metal. When a biodegradable material is used, there is no need to perform combustion treatment, and hence industrially useful effects are exerted in terms of environmental conservation such as prevention of air pollution and global warming.

BEST MODE FOR CARRYING OUT THE INVENTION

Figure 1:
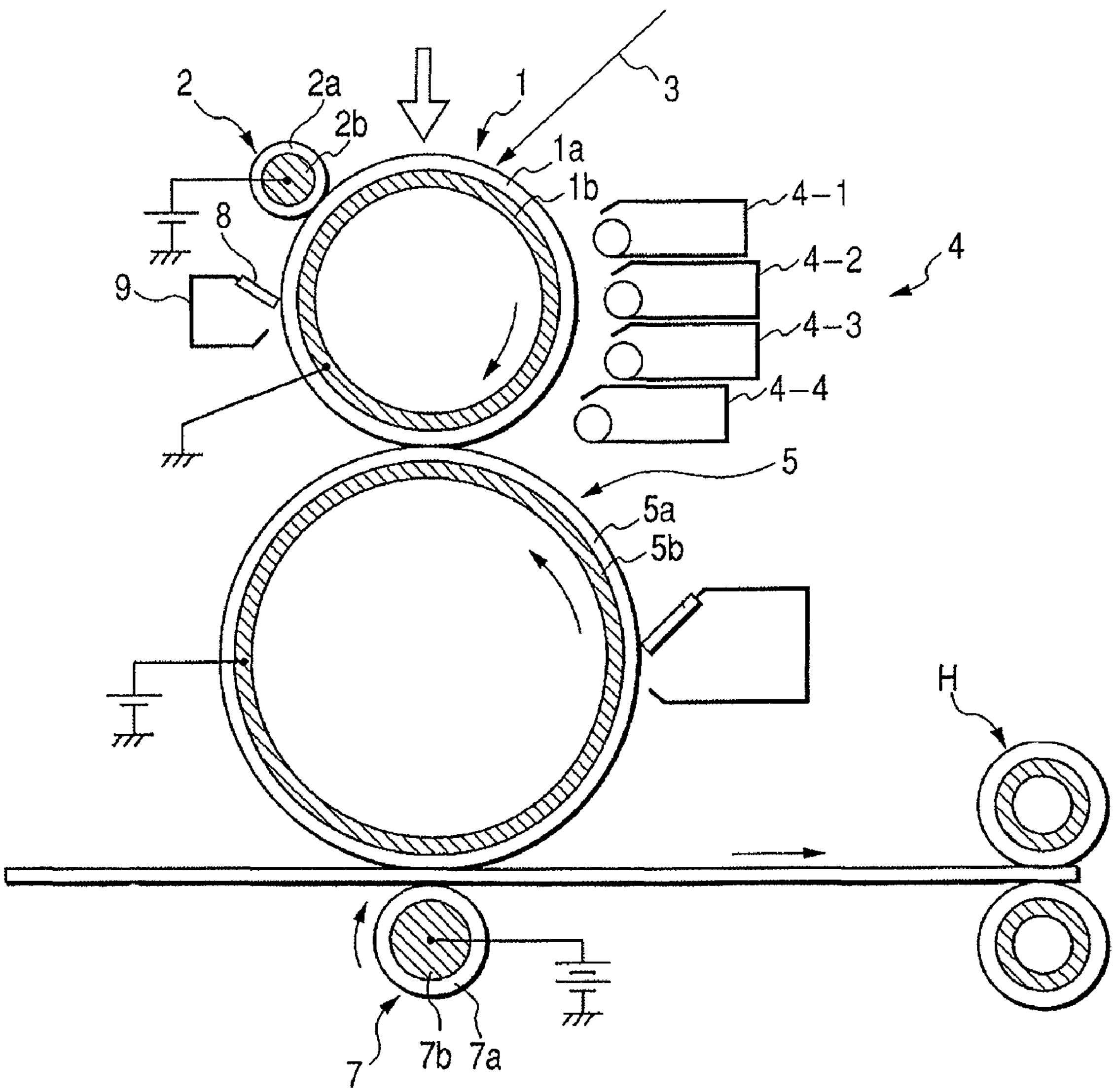
FIG. 1 is a schematic view for explaining an image forming apparatus used in each of Examples 25 to 30 and Comparative Examples 7 to 12.

Hereinafter, the present invention will be described in more detail by way of preferred embodiments.

The inventors of the present invention have made extensive studies to find that the above polyhydroxyalkanoate has very excellent property as a charge control agent and has high safety against a human body and the environment. The inventors have also found that the use of toner for developing an electrostatic charge image containing the charge control agent in an image forming apparatus having a certain developing system provides a remarkable effect. Thus, the inventors have completed the present invention.

Here, the polyhydroxyalkanoate to be used in the present invention has a basic skeleton as a biodegradable resin, and hence can be used for producing various products by way of melt processing or the like as in the case of conventional plastics. In addition, unlike synthetic polymers derived from petroleum, the polyhydroxyalkanoate has remarkable property with which it is degraded by an organism and taken into cyclical change of materials in the natural environment. Accordingly, there is no need to subject the polyhydroxyalkanoate to combustion treatment, so the polyhydroxyalkanoate is an effective material from the viewpoint of preventing air pollution and global warming. Therefore, the polyhydroxyalkanoate can be used as a plastic enabling environmental conservation.

The polyhydroxyalkanoate represented by the chemical formula (1) as a target in the present invention can be produced by a reaction between a polyhydroxyalkanoate containing a unit represented by the chemical formula (11) used as a starting material and at least one kind of aminosulfonic acid compound represented by the chemical formula (13).

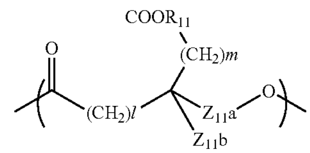

(11)

(In the formula, $R_{11}$ represents hydrogen or a group forming a salt.

In addition, with regard to l, m, $Z_{11a}$, and $Z_{11b}$ in the formula:

when l represents an integer selected from 2 to 4, $Z_{11a}$ represents nothing or a linear alkylene chain having 1 to 4 carbon atoms, $Z_{11b}$ represents a hydrogen atom, and m represents an integer selected from 0 to 8;

when l represents 1 and $Z_{11a}$ represents a linear alkylene chain having 1 to 4 carbon atoms, $Z_{11b}$ represents a hydrogen atom and m represents an integer selected from 0 to 8;

when l represents 1 and $Z_{11a}$ represents nothing, $Z_{11b}$ represents a hydrogen atom and m represents 0;

when l represents 0 and $Z_{11a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{11b}$ represents a hydrogen atom, or a linear or branched alkyl group, aryl group, or aralkyl group which may be substituted by an aryl group, and m represents an integer selected from 0 to 8; and when l represents 0 and $Z_{11a}$ represents nothing, $Z_{11b}$ represents a hydrogen atom, or a linear or branched alkyl group, aryl group, or aralkyl group which may be substituted by an aryl group, and m represents an integer selected from 0 to 8.

In addition, when multiple units exist, $R_{11}$, $Z_{11a}$, $Z_{11b}$, l, and m each independently have the above meaning for each unit.)

More specifically, in the compound represented by the chemical formula (11) to be used in the present invention, when l represents 0 and $Z_{11a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof. Specific examples thereof include a substituted or unsubstituted cyclohexyl structure, a substituted or unsubstituted phenyl structure, a substituted or unsubstituted phenoxy structure, a substituted or unsubstituted benzoyl structure, a substituted or unsubstituted phenylsulfanyl structure, a substituted or unsubstituted phenylsulfinyl structure, a substituted or unsubstituted phenylsulfonyl structure, a substituted or unsubstituted (phenylmethyl)sulfanyl structure, a (phenylmethyl)oxy structure, a 2-thienyl structure, a 2-thienylsulfanyl structure, and a 2-thienylcarbonyl structure. In addition, in the compound represented by the chemical formula (11) to be used in the present invention, when l represents 0, $Z_{11b}$ represents a hydrogen atom, or a linear or branched alkyl group, aryl group, or aralkyl group which is substituted by an aryl group. Specific examples of the linear or branched alkyl group include a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), and a heptyl group. Examples of the aryl group include a phenyl group and a methylphenyl group. Examples of the aralkyl group include a phenylmethyl group (benzyl group), a phenylethyl group, a phenylpropyl group, a phenylbutyl group, a phenylpentyl group, and a methylbenzyl group. In the present invention, in synthesizing a polymer, $Z_{11b}$ preferably represents a methyl group, an ethyl group, a propyl group, an isopropyl group, a pentyl group, a hexyl group, a phenyl group, or a phenylmethyl group in consideration of productivity.

$$H_2N\text{-}A_3\text{-}SO_2R_{13} \quad (13)$$

(In the formula:

$R_{13}$ represents OH, a halogen atom, ONa, OK, or $OR_{13a}$; and $R_{13a}$ and $A_3$ each independently represent a substituted or unsubstituted aliphatic hydrocarbon structure, a substituted or unsubstituted aromatic ring structure, or a substituted or unsubstituted heterocyclic structure. In addition, when multiple units exist, $R_{13}$, $R_{13a}$, and $A_3$ each independently have the above meaning for each unit.)

More specifically, $R_{13}$ represents OH, a halogen atom, ONa, OK, or $OR_{13a}$. $R_{13a}$ represents a linear or branched alkyl group having 1 to 8 carbon atoms, or a substituted or unsubstituted phenyl group.

$A_3$ represents a liner or branched and substituted or unsubstituted alkylene group having 1 to 8 carbon atoms, a substituted or unsubstituted phenylene group, a substituted or unsubstituted naphthalene group, or a substituted or unsubstituted heterocyclic structure containing one or more of N, S, and O. When $A_3$ represents a ring structure, an unsubstituted ring may be further condensed. In addition, when multiple units exist, $R_{13}$, $R_{13a}$, and $A_3$ each independently have the above meaning for each unit.

When $A_3$ represents a linear and substituted or unsubstituted alkylene group, an example of the compound represented by the chemical formula (13) includes a compound represented by the following chemical formula (18).

$$H_2N\text{-}A_4\text{-}SO_2R_{18} \quad (18)$$

(In the formula, $R_{18}$ represents OH, a halogen atom, ONa, OK, or $OR_{18a}$. $R_{18a}$ represents a linear or branched alkyl group having 1 to 8 carbon atoms, or a substituted or unsubstituted phenyl group. $A_4$ represents a liner or branched and substituted or unsubstituted alkylene group having 1 to 8 carbon atoms, which may be substituted by an alkyl group, an alkoxy group, or the like having 1 to 20 carbon atoms.)

Examples of the compound represented by the chemical formula (18) include 2-aminoethanesulfonic acid (taurine), 3-aminopropanesulfonic acid, 4-aminobutanesulfonic acid, 2-amino-2-methylpropanesulfonic acid, and alkali metal salts and esterified products of them.

When $A_3$ represents a substituted or unsubstituted phenylene group, an example of the compound represented by the chemical formula (13) includes a compound represented by the following chemical formula (19).

(19)

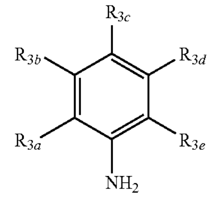

(In the formula, at least one of $R_{3a}$, $R_{3b}$, $R_{3c}$, $R_{3d}$, and $R_{3e}$ represents $SO_2R_{3f}$ ($R_{3f}$ represents OH, a halogen atom, ONa, OK, or $OR_{3f1}$. $R_{3f1}$ represents a linear or branched alkyl group having 1 to 8 carbon atoms, or a substituted or unsubstituted phenyl group), and the others each independently represent a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ represents an H atom, an Na atom, or a K atom), an acetamide group, an OPh group, an NHPh group, a $CF_3$ group, a $C_2F_5$ group, or a $C_3F_7$ group. In addition, when multiple units exist, $R_{3a}$, $R_{3b}$, $R_{3c}$, $R_{3d}$, $R_{3e}$, $R_{3f}$, $R_{3f1}$, and $R_{3g}$ each independently have the above meaning for each unit.)

Examples of the compound represented by the chemical formula (19) include p-aminobenzenesulfonic acid (sulfanilic acid), m-aminobenzenesulfonic acid, o-aminobenzenesulfonic acid, m-toluidine-4-sulfonic acid, sodium o-toluidine-4-sulfonate, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, sodium 2-nitroaniline-4-sulfonate, sodium 4-nitroaniline-2-sulfonate, 1,5-dinitroaniline-4-sulfonic acid, 2-aminophenol-4-hydroxy-5-nitrobenzenesulfonic acid, sodium 2,4-dimethylaniline-5-sulfonate, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, and alkali metal salts and esterified products of them.

When $A_3$ represents a substituted or unsubstituted naphthalene group, an example of the compound represented by the chemical formula (13) includes a compound represented by the following chemical formula (20A) or (20B).

(20A)

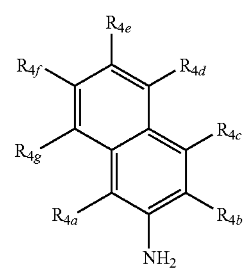

(20B)

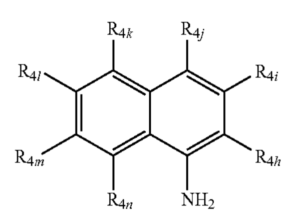

(At least one of $R_{4a}$, $R_{4b}$, $R_{4c}$, $R_{4d}$, $R_{4e}$, $R_{4f}$, and $R_{4g}$ in the formula (20A) or at least one of $R_{4h}$, $R_{4i}$, $R_{4j}$, $R_{4k}$, $R_{4l}$, $R_{4m}$, and $R_{4n}$, in the formula (20B) represents $SO_2R_{4o}$ ($R_{4o}$ represents OH, a halogen atom, ONa, OK, or $OR_{4o1}$. $R_{4o1}$ represents a linear or branched alkyl group having 1 to 8 carbon atoms, or a substituted or unsubstituted phenyl group.), and the others each independently represent a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom.), an acetamide group, an OPh group, an NHPh group, a $CF_3$ group, a $C_2F_5$ group, or a $C_3F_7$ group. In addition, when multiple units exist, $R_{4a}$, $R_{4b}$, $R_{4c}$, $R_{4d}$, $R_{4e}$, $R_{4f}$, $R_{4g}$, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, and m each independently have the above meaning for each unit.)

Examples of the compound represented by the chemical formula (20A) or (20B) include: sulfonic acids such as 1-naphthylamine-5-sulfonic acid, 1-naphthylamine-4-sulfonic acid, 1-naphthylamine-8-sulfonic acid, 2-naphthylamine-5-sulfonic acid, 1-naphthyalmine-6-sulfonic acid, 1-naphthyalmine-7-sulfonic acid, 1-naphthylamine-2-ethoxy-6-sulfonic acid, 1-amino-2-naphthol-4-sulfonic acid, 6-amino-1-naphthol-3-sulfonic acid, sodium 1-amino-8-naphthol-2,4-sulfonate, sodium 1-amino-8-naphthol-3,6-sulfonate; and alkali metal salts and esterified products of the sulfonic acids.

When $A_3$ represents a substituted or unsubstituted heterocyclic structure containing one or more of N, S, and O, the heterocyclic ring may be any one of a pyridine ring, a piperazine ring, a furan ring, and a thiol ring. Examples of the compound represented by the chemical formula (13) include: sulfonic acids such as 2-aminopyridine-6-sulfonic acid, 2-aminopiperazine-6-sulfonic acid; and alkali metal salts and esterified products of the sulfonic acids.

Examples of sulfonate esters include a substituted or unsubstituted aliphatic hydrocarbon structure, a substituted or unsubstituted aromatic ring structure, and a substituted or unsubstituted heterocyclic structure. In particular, a linear or branched alkyl group having 1 to 8 carbon atoms, a substituted or unsubstituted phenyl group, or the like is preferable. From the viewpoint of, for example, ease of esterification, one having a group such as $OCH_3$, $OC_2H_5$, $OC_6H_5$, $OC_3H_7$, $OC_4H_9$, $OCH(CH_3)_2$, $OCH_2C(CH_3)_3$, or $OC(CH_3)_3$ is more preferable.

(Method of Producing Polyhydroxyalkanoate Represented by Chemical Formula (1))

A reaction between a polyhydroxyalkanoate containing a unit represented by the chemical formula (11) and an aminosulfonic acid compound represented by the chemical formula (13) in the present invention will be described in detail.

The amount of the compound represented by the chemical formula (13) to be used in the present invention is in the range of 0.1 to 50.0 times mole, or preferably 1.0 to 20.0 times mole with respect to the unit represented by the chemical formula (11) to be used as a starting material.

An example of a method of producing an amide bond from a carboxylic acid and an amine in the present invention includes a condensation reaction by virtue of heat dehydration. In particular, from the viewpoint of achieving a mild reaction condition under which an ester bond of a polymer main chain is not cleaved, a method is effective, which involves: activating a carboxylic acid portion with an activator to produce an active acyl intermediate; and allowing the intermediate to react with an amine. Examples of the active acyl intermediate include an acid halide, an acid anhydride, and an active ester. In particular, a method of forming an amide bond in an identical reaction field by using a condensation agent is preferable from the viewpoint of simplifying a production process. If required, the active acyl intermediate may be isolated as an acid halide before being subjected to a condensation reaction with an amine.

A phosphoric acid-based condensation agent used for polycondensation of an aromatic polyamide, a carbodiimide-based condensation agent used for synthesizing a peptide, an acid chloride-based condensation agent, or the like can be appropriately selected as a condensation agent to be used depending on the combination of compounds represented by the chemical formulae (13) and (11).

Examples of the phosphoric acid-based condensation agent include a phosphite ester-based condensation agent, a phosphorus chloride-based condensation agent, a phosphoric anhydride-based condensation agent, a phosphate ester-based condensation agent, and a phosphoric amide-based condensation agent.

A phosphite ester-based condensation agent or the like can be used in the reaction of the present invention. Examples of a phosphite ester used at this time include triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, and triethyl phosphite. Of those, triphenyl phosphite is preferably used. A metal salt such as lithium chloride or calcium chloride may be added for improving the solubility, reactivity, and the like of a polymer.

Examples of the carbodiimide-based condensation agent include dicyclohexyl carbodiimide (which may be referred to as DCC), N-ethyl-N'-3-dimethylaminopropyl carbodiimide (which may be referred to as EDC=WSCI), and diisopropyl carbodiimide (which may be referred to as DIPC). DCC or WSCI may be used in combination with N-hydroxysuccineimide (which may be referred to as HONSu), 1-hydroxybenzotriazole (which may be referred to as HOBt), 3-hydroxy-4-oxo-3,4-dihydro-1,2,3-benzotriazine (which may be referred to as HOObt), or the like.

The amount of the condensation agent to be used is in the range of 0.1 to 50 times mole, or preferably 1 to 20 times mole with respect to the compound represented by the chemical formula (11).

A solvent may be used as required in the reaction. Examples of an available solvent include: hydrocarbons such as hexane, cyclohexane, and heptane; ketones such as acetone and methyl ethyl ketone; ethers such as dimethyl ether, diethyl ether, and tetrahydrofuran; halogenated hydrocarbons such as dichloromethane, chloroform, carbon tetrachloride, dichloroethane, and trichloroethane; aromatic hydrocarbons such as benzene and toluene; aprotic polar solvents such as N,N-dimethylformamide, dimethyl sulfoxide, dimethyl acetamide, and hexamethylphosphoramide; pyridine and pyridine derivatives such as picoline; and N-methylpyrrolidone. Pyridine, N-methylpyrrolidone, or the like is particularly preferably used. The amount of the solvent to be used can be appropriately determined in accordance with kinds of a starting material and a base, a reaction condition, and the like. A reaction temperature is not particularly limited in the method of the present invention, but is generally in the range of −20° C. to the boiling point of a solvent. However, it is preferable to perform the reaction at an optimum temperature suited for a condensation agent to be used. In the method of the present invention, a reaction time is generally in the range of 1 to 48 hours. The reaction time is particularly preferably in the range of 1 to 10 hours.

A thus produced reaction solution containing a polyhydroxyalkanoate represented by the chemical formula (1) in the present invention can be purified by, for example, distillation as an ordinary method. Alternatively, the reaction solution can be collected by: mixing a solvent which does not dissolve the polyhydroxyalkanoate represented by the chemical formula (1) (for example, water, an alcohol such as methanol or ethanol, or an ether such as dimethyl ether, diethyl ether, or tetrahydrofuran) evenly with the reaction solution; and reprecipitating a target polyhydroxyalkanoate represented by the chemical formula (1). The resultant polyhydroxyalkanoate represented by the chemical formula (1) can be subjected to isolation purification as required. A method for the isolation purification is not particularly limited, and a method involving reprecipitation using a solvent that does not dissolve the polyhydroxyalkanoate represented by the chemical formula (1), a method according to column chromatography, dialysis, or the like can be used.

When an R portion in the chemical formula (1) is $-A_1-SO_3CH_3$, a method can be adopted as another production method of the present invention, which involves methyl esterifying the R portion in the chemical formula (1) into $-A_1-SO_3CH_3$ using a methyl-esterifying agent after a condensation reaction with an amine. Examples of an available methyl-esterifying agent include a methyl esterification method for an aliphatic acid in gas chromatography.

Examples of an acid catalyst method include a hydrochloric acid-methanol method, a boron trifluoride-methanol method, and a sulfuric acid-methanol method. Examples of a base catalyst method include a sodium methoxide method, a tetramethylguanidine method, and a trimethylsilyldiazomethane method. Of those, a trimethylsilyldiazomethane method is preferable because methylation can be performed under a moderate condition.

Examples of a solvent to be used in the reaction include: hydrocarbons such as hexane, cyclohexane, and heptane; alcohols such as methanol and ethanol; halogenated hydrocarbons such as dichloromethane, chloroform, carbon tetrachloride, dichloroethane, and trichloroethane; and aromatic hydrocarbons such as benzene and toluene. Halogenated hydrocarbons and the like are particularly preferably used. The amount of the solvent to be used can be appropriately determined in accordance with a starting material, a reaction condition, and the like. A reaction temperature is not particularly limited in the method of the present invention, but is generally in the range of −20° C. to 30° C. However, it is preferable to perform the reaction at an optimum temperature suited for a condensation agent and a reagent to be used.

In addition, in the present invention, a polyhydroxyalkanoate containing a unit represented by the chemical formula (H) can be produced through the steps of: allowing a polyhydroxyalkanoate having a unit represented by the chemical formula (G) to react with a base; and allowing the compound obtained in the foregoing step to react with a compound represented by the chemical formula (E).

(G)

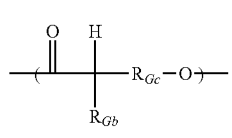

(In the formula, $R_{Gc}$ represents a linear alkylene chain having 0 to 4 carbon atoms. When the linear alkylene chain is a linear alkylene chain having 1 to 4 carbon atoms, the linear alkylene chain may be arbitrarily substituted by a linear or branched alkyl group, or an alkyl group containing a residue having any one of a phenyl structure, a thienyl structure, and a cyclohexyl structure at a terminal thereof. In addition, $R_{Gb}$ represents a hydrogen atom, or a linear or branched alkyl group, aryl group, or aralkyl group which may be substituted by an aryl group. When multiple units exist, $R_{Gb}$ and $R_{Gc}$ each independently have the above meaning for each unit.)

More specifically, in the polyhydroxyalkanoate composed of a unit of a substituted hydroxylic acid represented by the chemical formula (G) to be used in the present invention, when $R_{Gc}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof. Specific examples thereof include a substituted or unsubstituted cyclohexyl structure, a substituted or unsubstituted phenyl structure, a substituted or unsubstituted phenoxy structure, a substituted or unsubstituted benzoyl structure, a substituted or unsubstituted phenylsulfanyl structure, a substituted or unsubstituted phenylsulfinyl structure, a substituted or unsubstituted phenylsulfonyl structure, a substituted or unsubstituted (phenylmethyl)sulfanyl structure, a (phenylmethyl)oxy structure, a 2-thienyl structure, a 2-thienylsulfanyl structure, and a 2-thienylcarbonyl structure. In addition, $R_{Gb}$ represents a hydrogen atom, or a linear or branched alkyl group, aryl group, or aralkyl group which is substituted by an aryl group. Specific examples of the linear or branched alkyl group include a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), and a heptyl group. Examples of the aryl group include a phenyl group and a methylphenyl group. Examples of the aralkyl group include a phenylmethyl group (benzyl group), a phenylethyl group, a phenylpropyl group, a phenylbutyl group, a phenylpentyl group, and a methylbenzyl group. In the present invention, in synthesizing a polymer, $R_{Gb}$ preferably represents a methyl group, an ethyl group, a propyl group, an isopropyl group, a pentyl group, a hexyl group, a phenyl group, or a phenylmethyl group in consideration of productivity.

(E)

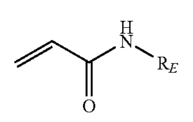

(In the formula, $R_E$ represents $-A_E-SO_2R_{E1}$. $R_{E1}$ represents OH, a halogen atom, ONa, OK, or $OR_{Ea}$. In addition, $R_{Ea}$ and $A_E$ each independently represent a substituted or unsubstituted aliphatic hydrocarbon structure, a substituted or unsubstituted aromatic ring structure, or a substituted or unsubstituted heterocyclic structure. When multiple units exist, $R_E$, $R_{E1}$, $R_{Ea}$, and $A_E$ each independently have the above meaning for each unit.)

(H)

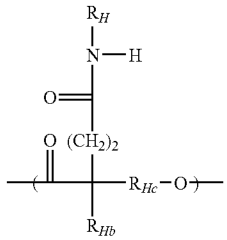

(In the formula, $R_H$ represents $-A_H-SO_2R_{H1}$. $R_{H1}$ represents OH, a halogen atom, ONa, OK, or $OR_{Ha}$. $R_{Ha}$ and $A_H$ each independently represent a substituted or unsubstituted aliphatic hydrocarbon structure, a substituted or unsubstituted aromatic ring structure, or a substituted or unsubstituted heterocyclic structure. $R_{Hc}$ represents a linear alkylene chain having 0 to 4 carbon atoms. When the linear alkylene chain is a linear alkylene chain having 1 to 4 carbon atoms, the linear alkylene chain may be arbitrarily substituted by a linear or branched alkyl group, or an alkyl group containing a residue having any one of a phenyl structure, a thienyl structure, and a cyclohexyl structure at a terminal thereof. In addition, $R_{Hb}$ represents a hydrogen atom, or a linear or branched alkyl group, aryl group, or aralkyl group which may be substituted by an aryl group. When multiple units exist, $R_H$, $R_{H1}$, $R_{Ha}$, $R_{Hb}$, $R_{Hc}$, and $A_H$ each independently have the above meaning for each unit.)

For example, a polyhydroxyalkanoate containing a unit represented by the chemical formula (F) corresponding to the chemical formula (H) in which the linear alkylene chain represented by $R_{Hc}$ is not substituted and $R_{Hb}$ represents a hydrogen atom can be produced through the steps of: allowing a polyhydroxyalkanoate having a unit represented by the chemical formula (A) as a staring material to react with a base; and allowing the compound obtained in the foregoing step to react with a compound represented by the chemical formula (E).

(F)

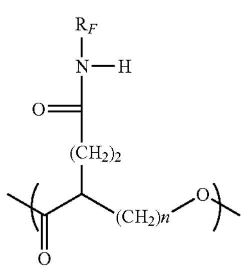

(In the formula, n represents an integer selected from 0 to 4. $R_F$ represents $-A_F-SO_2R_{F1}$. $R_{F1}$ represents OH, a halogen atom, ONa, OK, or $OR_{Fa}$. $R_{Fa}$ and $A_F$ each independently represent a substituted or unsubstituted aliphatic hydrocarbon structure, a substituted or unsubstituted aromatic ring structure, or a substituted or unsubstituted heterocyclic structure. When multiple units exist, $R_F$, $R_{F1}$, $R_{Fa}$, $A_F$, and n each independently have the above meaning for each unit.)

(A)

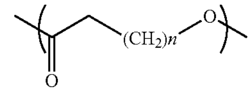

(In the formula, n represents an integer selected from 0 to 4. When multiple units exist, n's each independently have the above meaning for each unit.)

(E)

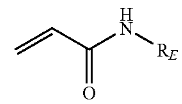

(In the formula, $R_E$ represents $-A_E-SO_2R_{E1}$. $R_{E1}$ represents OH, a halogen atom, ONa, OK, or $OR_{Ea}$. In addition, $R_{Ea}$ and $A_E$ each independently represent a substituted or unsubstituted aliphatic hydrocarbon structure, a substituted or unsubstituted aromatic ring structure, or a substituted or unsubstituted heterocyclic structure. When multiple units exist, $R_E$, $R_{E1}$, $R_{Ea}$, $A_E$, and n each independently have the above meaning for each unit.)

Examples of the compound represented by the chemical formula (E) include 2-acrylamide-2-methylpropanesulfonic acid, and alkali metal salts and esterified products thereof.

A reaction between the polyhydroxyalkanoate containing a unit represented by the chemical formula (A) and the compound represented by the chemical formula (E) will be described in detail.

The present invention can be achieved by subjecting an α-methylene group adjacent to a carbonyl group in a polymer main chain to a Michael addition reaction with the compound represented by the chemical formula (E). To be specific, the present invention can be achieved by: allowing the polyhydroxyalkanoate containing a unit represented by the chemical formula (A) to react with a base capable of forming an α-methylene group, which is adjacent to a carbonyl group in the polymer main chain of the polyhydroxyalkanoate containing a unit represented by the chemical formula (A), into an anion under a Michael addition reaction condition; and allowing the resultant to react with the compound represented by the chemical formula (E). In the present invention, the amount of the compound represented by the chemical formula (E) to be used is 0.001 to 100 times mole, or preferably 0.01 to 10 times mole with respect to the unit represented by the chemical formula (A).

A solvent to be used in the reaction is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphorotriamide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used is 0.001 to 100 times mole, or preferably 0.01 to 10 times mole with respect to the unit represented by the chemical formula (A).

A reaction temperature is generally in the range of −78° C. to 40° C., or preferably in the range of −78° C., to 30° C. A reaction time is generally in the range of 10 minutes to 24 hours. The reaction time is particularly preferably in the range of 10 minutes to 4 hours.

In the polyhydroxyalkanoate represented by the chemical formula (5) of the present invention, the polyhydroxyalkanoate represented by the chemical formula (21) can be produced by oxidizing a side chain double bond portion of a polyhydroxyalkanoate represented by the chemical formula (6) as a starting material.

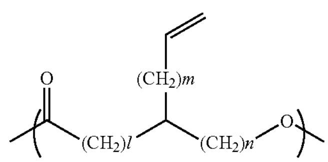

(6)

(With regard to l, m, and n in the formula:

when l represents an integer selected from 0 and 2 to 4 and n represents an integer selected from 0 to 4, m represents an integer selected from 0 to 8;

when l represents 1 and n represents an integer selected from 1 to 4, m represents an integer selected from 0 to 8;

when l represents 1 and n represents 0, m represents 0; and when multiple units exist, l, m, and n each independently have the above meaning for each unit.)

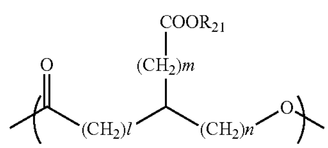

(21)

(In the formula, $R_{21}$ represents hydrogen, or a group for forming a salt;

with regard to l, m, and n in the formula:

when l represents an integer selected from 0 and 2 to 4 and n represents an integer selected from 0 to 4, m represents an integer selected from 0 to 8;

when l represents 1 and n represents an integer selected from 1 to 4, m represents an integer selected from 0 to 8; and when l represents 1 and n represents 0, m represents 0.

In addition, when multiple units exist, $R_{21}$, l, m, and n each independently have the above meaning for each unit.)

Known examples of a method of obtaining a carboxylic acid by subjecting such a carbon-carbon double bond as described above to oxidation cleavage by means of an oxidizing agent include a method involving the use of a permanganate (J. Chem. Soc., Perkin. Trans. 1, 806 (1973)), a method involving the use of a dichromate (Org. Synth., 4, 698 (1963)), a method involving the use of a periodate (J. Org. Chem., 46, 19 (1981)), a method involving the use of nitric acid (Japanese Patent Application Laid-Open No. S59-190945), and a method involving the use of ozone (J. Am. Chem. Soc., 81, 4273 (1959)). In addition, Macromolecular chemistry, 4, 289-293 (2001) has reported a method of obtaining a carboxylic acid involving subjecting a carbon-carbon double bond of a side chain terminal of a polyhydroxyalkanoate produced by using a microorganism to a reaction under an acid condition by means of potassium permanganate as an oxidizing agent. A similar method can be used in the present invention.

Potassium permanganate is generally used as a permanganate to be used as an oxidizing agent. The amount of the permanganate to be used is generally 1 mole equivalent or more, or preferably 2 to 10 mole equivalents with respect to 1 mole of the unit represented by the chemical formula (6) because an oxidation cleavage reaction is a stoichiometric reaction.

Various inorganic acids such as sulfuric acid, hydrochloric acid, acetic acid, and nitric acid, and organic acids are used to place a reaction system under an acid condition. However, the use of an acid such as sulfuric acid, nitric acid, or hydrochloric acid may cause a molecular weight to reduce because an ester bond of a main chain is cleaved. Therefore, acetic acid is preferably used. The amount of an acid to be used is generally in the range of 0.2 to 2,000 mole equivalents, or preferably in the range of 0.4 to 1,000 mole equivalents with respect to 1 mole of the unit represented by the chemical formula (6). An amount of 0.2 mole equivalent or more is preferable because a high yield is achieved. An amount of 2,000 mole equivalents or less is preferable because the amount of a decomposed product due to the acid produced as a by-product can be reduced. In addition, a crown-ether can be used for the purpose of accelerating the reaction. In this case, the crown-ether and the permanganate form a complex, thereby providing an enhancing effect on reaction activity. Dibenzo-18-crown-6-ether, dicyclo-18-crown-6-ether, or 18-crown-6-ether is generally used as the crown-ether. The amount of the crown-ether to be used is generally in the range of 0.005 to 2.0 mole equivalents, or preferably in the range of 0.01 to 1.5 mole equivalents with respect to 1 mole of the permanganate.

A solvent to be used in an oxidation reaction is not particularly limited as long as it is inactive to the reaction. Examples of such a solvent include: water; acetone; ethers such tetrahydrofuran and dioxane; aromatic hydrocarbons such as benzene; aliphatic hydrocarbons such as hexane and heptane; and halogenated hydrocarbons such as methyl chloride, dichloromethane, and chloroform. Of those solvents, halogenated hydrocarbons such as methyl chloride, dichloromethane, and chloroform, and acetone are preferable in consideration of the solubility of the polyhydroxyalkanoate.

In the oxidation reaction, the polyhydroxyalkanoate containing a unit represented by the chemical formula (6), the permanganate, and the acid may be collectively charged together with a solvent at the first stage to carry out a reaction, or each of them may be continuously or intermittently added to a system to carry out a reaction. Alternatively, only the permanganate may be dissolved or suspended into the solvent in advance, and subsequently the polyhydroxyalkanoate and the acid may be continuously or intermittently added to the system to carry out a reaction. Alternatively, only the polyhydroxyalkanoate may be dissolved or suspended into the solvent in advance, and subsequently the permanganate and the acid may be continuously or intermittently added to the system to carry out a reaction. Furthermore, the polyhydroxyalkanoate and the acid may be charged in advance, and subsequently the permanganate may be continuously or intermittently added to the system to carry out a reaction. Alternatively, the permanganate and the acid may be charged in advance, and subsequently the polyhydroxyalkanoate may be continuously or intermittently added to the system to carry out a reaction. Alternatively, the polyhydroxyalkanoate and the permanganate may be charged in advance, and subsequently the acid may be continuously or intermittently added to the system to carry out a reaction. A reaction temperature is generally in the range of −40° C. to 40° C., or preferably in the range of −10° C. to 30° C. A reaction time, which depends on the stoichiometric mixture ratio between the unit represented by the chemical formula (6) and the permanganate, is generally in the range of 2 to 48 hours.

In addition, in the polyhydroxyalkanoate represented by the chemical formula (5), the polyhydroxyalkanoate represented by the chemical formula (11) is produced by hydrolyzing a side chain ester portion of a polyhydroxyalkanoate represented by the chemical formula (23) as a starting material in the presence of an acid or an alkali, or by subjecting the polyhydroxyalkanoate to hydrogenolysis including catalytic reduction.

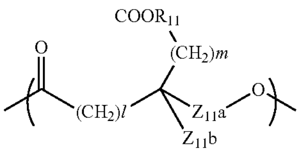

(11)

(In the formula, $R_{11}$ represents hydrogen or a group forming a salt.

In addition, with regard to l, m, $Z_{11a}$, and $Z_{11b}$ in the formula:

when l represents an integer selected from 0 and 2 to 4, $Z_{11a}$ represents nothing or a linear alkylene chain having 1 to 4 carbon atoms, $Z_{11b}$ represents a hydrogen atom, and m represents an integer selected from 0 to 8;

when l represents 1 and $Z_{11a}$ represents a linear alkylene chain having 1 to 4 carbon atoms, $Z_{11b}$ represents a hydrogen atom and m represents an integer selected from 0 to 8;

when l represents 1 and $Z_{11a}$ represents nothing, $Z_{11b}$ represents a hydrogen atom and m represents 0;

when l represents 0 and $Z_{11a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{11b}$ represents a hydrogen atom, or a linear or branched alkyl group, aryl group, or aralkyl group which may be substituted by an aryl group, and m represents an integer selected from 0 to 8; and when l represents 0 and $Z_{11a}$ represents nothing, $Z_{11b}$ represents a hydrogen atom, or a linear or branched alkyl group, aryl group, or aralkyl group which may be substituted by an aryl group, and m represents an integer selected from 0 to 8.

In addition, when multiple units exist, $R_{11}$, $Z_{11a}$, $Z_{11b}$, l, and m each independently have the above meaning for each unit.)

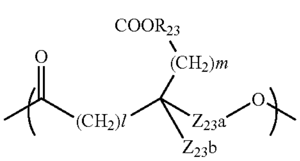

(23)

(In the formula, $R_{23}$ represents a linear or branched alkyl group having 1 to 12 carbon atoms, or aralkyl group.

In addition, with regard to l, m, $nZ_{23a}$, and $Z_{23b}$ in the formula:

when l represents an integer selected from 0 and 2 to 4, n represents an integer selected from 0 to 4, $Z_{23a}$ represents nothing or a linear alkylene chain having 1 to 4 carbon atoms, $Z_{23b}$ represents a hydrogen atom, and m represents an integer selected from 0 to 8;

when l represents 1 and $Z_{23a}$ represents a linear alkylene chain having 1 to 4 carbon atoms, $Z_{23b}$ represents a hydrogen atom and m represents an integer selected from 0 to 8;

when l represents 1 and $Z_{23a}$ represents nothing, $Z_{23b}$ represents a hydrogen atom and m represents 0;

when l represents 0 and $Z_{23a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{23b}$ represents a hydrogen atom, or a linear or branched alkyl group, aryl group, or aralkyl group which may be substituted by an aryl group, and m represents an integer selected from 0 to 8; and when l represents 0 and $Z_{23a}$ represents nothing, $Z_{23b}$ represents a hydrogen atom, or a linear or branched alkyl group, aryl group, or aralkyl group which may be substituted by an aryl group, and m represents an integer selected from 0 to 8.

In addition, when multiple units exist, $R_{23}$, $Z_{23a}$, $Z_{23b}$, l, and m each independently have the above meaning for each unit.)

More specifically, in the compound represented by the chemical formula (23) to be used in the present invention, when l represents 0 and $Z_{23a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof. Specific examples thereof include a substituted or unsubstituted cyclohexyl structure, a substituted or unsubstituted phenyl structure, a substituted or unsubstituted phenoxy structure, a substituted or unsubstituted benzoyl structure, a substituted or unsubstituted phenylsulfanyl structure, a substituted or unsubstituted phenylsulfinyl structure, a substituted or unsubstituted phenylsulfonyl structure, a substituted or unsubstituted (phenylmethyl)sulfanyl structure, a (phenylmethyl)oxy structure, a 2-thienyl structure, a 2-thienylsulfanyl structure, and a 2-thienylcarbonyl structure. In addition, in the compound represented by the chemical formula (23) to be used in the present invention, when l represents 0, $Z_{23b}$ represents a hydrogen atom, or a linear or branched alkyl group, aryl group, or aralkyl group which is substituted by an aryl group. Specific examples of the linear or branched alkyl group include a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), and a heptyl group. Examples of the aryl group include a phenyl group and a methylphenyl group. Examples of the aralkyl group include a phenylmethyl group (benzyl group), a phenylethyl group, a phenylpropyl group, a phenylbutyl group, a phenylpentyl group, and a methylbenzyl group. In the present invention, in synthesizing a polymer, $Z_{23b}$ preferably represents a methyl group, an ethyl group, a propyl group, an isopropyl group, a pentyl group, a hexyl group, a phenyl group, or a phenylmethyl group in consideration of productivity.

In the case where hydrolysis in the presence of an acid or an alkali is employed, the hydrolysis can be performed by using, in an aqueous solution or a hydrophilic organic solvent such as methanol, ethanol, tetrahydrofuran, dioxane, dimethylformamide, or dimethyl sulfoxide as a solvent, an aqueous solution of an inorganic acid such as hydrochloric acid, sulfuric acid, nitric acid, or phosphoric acid, an organic acid such as trifluoroacetic acid, trichloroacetic acid, p-toluenesulfonic acid, or methanesulfonic acid, an aqueous caustic alkali such as sodium hydroxide or potassium hydroxide, an aqueous solution of an alkali carbonate such as sodium carbonate or potassium carbonate, or an alcohol solution of a metal alkoxide such as sodium methoxide or sodium ethoxide. A reaction temperature is generally in the range of 0° C. to 40° C., or preferably in the range of 0° C. to 30° C. A reaction time is generally in the range of 0.5 to 48 hours. When hydrolysis is performed in the presence of an acid or an alkali, in each case, an ester bond of a main chain is cleaved, and a reduction in molecular weight is observed in some cases.

A method of obtaining a carboxylic acid by way of hydrogenolysis including catalytic reduction is performed as follows. That is, in an appropriate solvent, in the temperature range of −20° C. to the boiling point of the solvent used, or preferably 0 to 50° C., in the presence of a reduction catalyst, hydrogen is allowed to act under normal or increased pressure to perform catalytic reduction. Examples of the solvent used include water, methanol, ethanol, propanol, hexafluoroisopropanol, ethyl acetate, diethyl ether, tetrahydrofuran, dioxane, benzene, toluene, dimethylformamide, pyridine, and N-methylpyrrolidone. A mixed solvent of the above solvents may also be used. A catalyst such as palladium, platinum, or rhodium which is used singly or used while being carried by a carrier, Raney nickel, or the like is used as the reduction catalyst. A reaction time is generally in the range of 0.5 to 72 hours. A thus produced reaction solution containing a polyhydroxyalkanoate represented by the chemical formula (11) is collected as a crude polymer by: removing the catalyst through filtration or the like; and removing the solvent through distillation or the like. The resultant polyhydroxyalkanoate represented by the chemical formula (11) can be subjected to isolation purification as required. A method for the isolation purification is not particularly limited, and a method involving reprecipitation using a solvent which does not dissolve the polyhydroxyalkanoate represented by the chemical formula (11), a method according to column chromatography, dialysis, or the like can be used. Provided, however, that even in the case where catalytic reduction is employed, an ester bond of a main chain is cleaved, and a reduction in molecular weight is observed in some cases.

In addition, in the polyhydroxyalkanoate represented by the chemical formula (5) of the present invention, the polyhydroxyalkanoate represented by the chemical formula (23) is produced by esterifying the polyhydroxyalkanoate represented by the chemical formula (11) as a staring material by means of an esterifying agent.

(23)

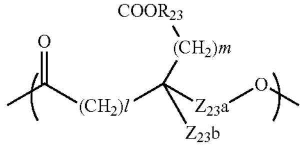

(In the formula, $R_{23}$ represents a linear or branched alkyl group having 1 to 12 carbon atoms, or aralkyl group.

In addition, with regard to l, m, $Z_{23a}$, and $Z_{23b}$ in the formula:

when l represents an integer selected from 2 to 4, $Z_{23a}$ represents nothing or a linear alkylene chain having 1 to 4 carbon atoms, $Z_{23b}$ represents a hydrogen atom, and m represents an integer selected from 0 to 8;

when l represents 1 and $Z_{23a}$ represents a linear alkylene chain having 1 to 4 carbon atoms, $Z_{23b}$ represents a hydrogen atom and m represents an integer selected from 0 to 8;

when l represents 1 and $Z_{23a}$ represents nothing, $Z_{23b}$ represents a hydrogen atom and m represents 0;

when l represents 0 and $Z_{23a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{23b}$ represents a hydrogen atom, or a linear or branched alkyl group, aryl group, or aralkyl group which may be substituted by an aryl group, and m represents an integer selected from 0 to 8; and when l represents 0 and $Z_{23a}$ represents nothing, $Z_{23b}$ represents a hydrogen atom, or a linear or branched alkyl group, aryl group, or aralkyl group which may be substituted by an aryl group, and m represents an integer selected from 0 to 8.

In addition, when multiple units exist, $R_{23}$, $Z_{23a}$, $Z_{23b}$, l, and m each independently have the above meaning for each unit.)

(11)

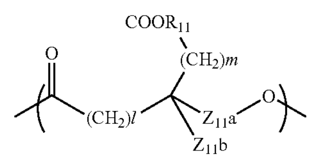

(In the formula, $R_{11}$ represents hydrogen or a group forming a salt.

In addition, with regard to l, m, $Z_{11a}$, and $Z_{11b}$ in the formula:

when l represents an integer selected from 2 to 4, $Z_{11a}$ represents nothing or a linear alkylene chain having 1 to 4 carbon atoms, $Z_{11b}$ represents a hydrogen atom, and m represents an integer selected from 0 to 8;

when l represents 1 and $Z_{11a}$ represents a linear alkylene chain having 1 to 4 carbon atoms, $Z_{11b}$ represents a hydrogen atom and m represents an integer selected from 0 to 8;

when l represents 1 and $Z_{11a}$ represents nothing, $Z_{11b}$ represents a hydrogen atom and m represents 0;

when l represents 0 and $Z_{11a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{11b}$ represents a hydrogen atom, or a linear or branched alkyl group, aryl group, or aralkyl group which may be substituted by an aryl group, and m represents an integer selected from 0 to 8; and when l represents 0 and $Z_{11a}$ represents nothing, $Z_{11b}$ represents a hydrogen atom, or a linear or branched alkyl group, aryl group, or aralkyl group which may be substituted by an aryl group, and m represents an integer selected from 0 to 8.

In addition, when multiple units exist, $R_{11}$, $Z_{11a}$, $Z_{11b}$, l, and m each independently have the above meaning for each unit.)

More specifically, in the compound represented by the chemical formula (11) to be used in the present invention, when l represents 0 and $Z_{11a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof. Specific examples thereof include a substituted or unsubstituted cyclohexyl structure, a substituted or unsubstituted phenyl structure, a substituted or unsubstituted phenoxy structure, a substituted or unsubstituted benzoyl structure, a substituted or unsubstituted phenylsulfanyl structure, a substituted or unsubstituted phenylsulfinyl structure, a substituted or unsubstituted phenylsulfonyl structure, a substituted or unsubstituted (phenylmethyl)sulfanyl structure, a (phenylmethyl)oxy structure, a 2-thienyl structure, a 2-thienylsulfanyl structure, and a 2-thienylcarbonyl structure. In addition, in the compound represented by the chemical formula (11) to be used in the present invention, when l represents 0, $Z_{11b}$ represents a hydrogen atom, or a linear or branched alkyl group, aryl group, or aralkyl group which is substituted by an aryl group. Specific examples of the linear or branched alkyl group include a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), and a heptyl group. Examples of the aryl group include a phenyl group and a methylphenyl group. Examples of the aralkyl group include a phenylmethyl group (benzyl group), a phenylethyl group, a phenylpropyl group, a phenylbutyl group, a phenylpentyl group, and a methylbenzyl group. In the present invention, in synthesizing a polymer, $Z_{11b}$ preferably represents a methyl group, an ethyl group, a propyl group, an isopropyl group, a pentyl group, a hexyl group, a phenyl group, or a phenylmethyl group in consideration of productivity.

Examples of the esterifying agent to be used include diazomethane and DMF dimethylacetals. For example, the polyhydroxyalkanoate easily reacts with trimethylsilyldiazomethane, DMF dimethylacetal, DMF diethylacetal, DMF dipropylacetal, DMF diisopropylacetal, DMF-n-butylacetal, DMF-tert-butylacetal, DMF dineopentylacetal, or the like to produce a corresponding ester. Furthermore, the polyhydroxyalkanoate is allowed to react with any one of alcohols such as methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol, and lauryl alcohol, or any one of saccharides such as D-glucose, D-fructose, and otherwise by using an acid catalyst or a condensation agent such as DCC to produce an esterified polyhydroxyalkanoate.

In addition, in the present invention, a polyhydroxyalkanoate containing a unit represented by the chemical formula (J) can be produced through the steps of: allowing a polyhydroxyalkanoate having a unit represented by the chemical formula (G) to react with a base; and allowing the compound obtained in the foregoing step to react with a compound represented by the chemical formula (K).

(G)

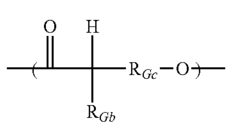

(In the formula, $R_{Gc}$ represents a linear alkylene chain having 0 to 4 carbon atoms. When the linear alkylene chain is a linear alkylene chain having 1 to 4 carbon atoms, the linear alkylene chain may be arbitrarily substituted by a linear or branched alkyl group, or an alkyl group containing a residue having any one of a phenyl structure, a thienyl structure, and a cyclohexyl structure at a terminal thereof. In addition, $R_{Gb}$ represents a hydrogen atom, or a linear or branched alkyl group, aryl group, or aralkyl group which may be substituted by an aryl group. When multiple units exist, $R_{Gb}$ and $R_{Gc}$ each independently have the above meaning for each unit.)

$$X(CH_2)mCOOR_K \quad (K)$$

(In the formula, m represents an integer selected from 0 to 8. X represents a halogen atom. $R_K$ represents a linear or branched alkyl group having 1 to 12 carbon atoms, or aralkyl group.)

(J)

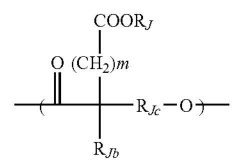

(In the formula, m represents an integer selected from 0 to 8. $R_J$ represents a linear or branched alkyl group having 1 to 12 carbon atoms, or aralkyl group. $R_{Jc}$ represents a linear alkylene chain having 0 to 4 carbon atoms. When the linear alkylene chain is a linear alkylene chain having 1 to 4 carbon atoms, the linear alkylene chain may be arbitrarily substituted by a linear or branched alkyl group, or an alkyl group containing a residue having any one of a phenyl structure, a thienyl structure, and a cyclohexyl structure at a terminal thereof. In addition, $R_{Jb}$ represents a hydrogen atom, or a linear or branched alkyl group, aryl group, or aralkyl group which may be substituted by an aryl group. When multiple units exist, $R_J$, $R_{Jb}$, $R_{Jc}$ and m each independently have the above meaning for each unit.)

More specifically, in the compound represented by the chemical formula (G) to be used in the present invention, when $R_{Gc}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof. Specific examples thereof include a substituted or unsubstituted cyclohexyl structure, a substituted or unsubstituted phenyl structure, a substituted or unsubstituted phenoxy structure, a substituted or unsubstituted benzoyl structure, a substituted or unsubstituted phenylsulfanyl structure, a substituted or unsubstituted phenylsulfinyl structure, a substituted or unsubstituted phenylsulfonyl structure, a substituted or unsubstituted (phenylmethyl)sulfanyl structure, a (phenylmethyl)oxy structure, a 2-thienyl structure, a 2-thienylsulfanyl structure, and a 2-thienylcarbonyl structure.

In addition, in the compound represented by the chemical formula (G) to be used in the present invention, $R_{Gb}$ represents a hydrogen atom, or a linear or branched alkyl group, aryl group, or aralkyl group which is substituted by an aryl group. Specific examples of the linear or branched alkyl group include a methyl group, an ethyl group, a propyl group, an isopropyl group (2-methylpropyl group), a butyl group, a 1-methylpropyl group, a pentyl group, an isopropyl group (3-methylbutyl group), a hexyl group, an isohexyl group (4-methylpentyl group), and a heptyl group. Examples of the aryl group include a phenyl group and a methylphenyl group. Examples of the aralkyl group include a phenylmethyl group (benzyl group), a phenylethyl group, a phenylpropyl group, a phenylbutyl group, a phenylpentyl group, and a methylbenzyl group. In the present invention, in synthesizing a polymer, $R_{Gb}$ preferably represents a methyl group, an ethyl group, a propyl group, an isopropyl group, a pentyl group, a hexyl group, a phenyl group, or a phenylmethyl group in consideration of productivity.

For example, a polyhydroxyalkanoate having a unit represented by the chemical formula (C) corresponding to the chemical formula (J) in which the alkylene chain is not substituted and $R_{Jc}$ represents a hydrogen atom can be produced through the steps of: allowing a polyhydroxyalkanoate having a unit represented by the chemical formula (A) as a staring material to react with a base; and allowing the compound obtained in the foregoing step to react with a compound represented by the chemical formula (B).

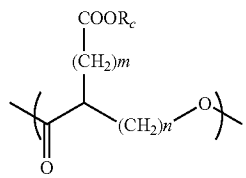

(C)

(In the formula, n represents an integer selected from 0 to 4, and m represents an integer selected from 0 to 8. $R_C$ represents a linear or branched alkyl group having 1 to 12 carbon atoms, or aralkyl group. When multiple units exist, $R_C$, n and m each independently have the above meaning for each unit.)

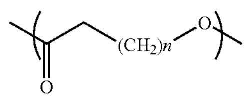

(A)

(In the formula, n represents an integer selected from 0 to 4. When multiple units exist, n's each independently have the above meaning for each unit.)

$$X(CH_2)mCOOR_B \quad (B)$$

(In the formula, m represents an integer selected from 0 to 8. X represents a halogen atom. $R_B$ represents a linear or branched alkyl group having 1 to 12 carbon atoms, or aralkyl group.)

Examples of the compound represented by the chemical formula (B) include methyl chloroformate, ethyl chloroformate, propyl chloroformate, isopropyl chloroformate, butyl chloroformate, cyclohexyl chloroformate, benzyl chloroformate, methyl bromoformate, ethyl bromoformate, propyl bromoformate, isopropyl bromoformate, butyl bromoformate, cyclohexyl bromoformate, benzyl bromoformate, methyl chloroacetate, ethyl chloroacetate, propyl chloroacetate, isopropyl chloroacetate, butyl chloroacetate, cyclohexyl chloroacetate, benzyl chloroacetate, methyl bromoacetate, ethyl bromoacetate, propyl bromoacetate, isopropyl bromoacetate, butyl bromoacetate, cyclohexyl bromoacetate, benzyl bromoacetate, methyl 3-chloropropionate, ethyl 3-chloropropionate, propyl 3-chloropropionate, isopropyl 3-chloropropionate, butyl 3-chloropropionate, cyclohexyl 3-chloropropionate, benzyl 3-chloropropionate, methyl 3-bromopropionate, ethyl 3-bromopropionate, propyl 3-bromopropionate, isopropyl 3-bromopropionate, butyl 3-bromopropionate, cyclohexyl 3-bromopropionate, benzyl 3-bromopropionate, methyl 4-chlorobutyrate, ethyl 4-chlorobutyrate, propyl 4-chlorobutyrate, isopropyl 4-chlorobutyrate, butyl 4-chlorobutyrate, cyclohexyl 4-chlorobutyrate, benzyl 4-chlorobutyrate, methyl 4-bromobutyrate, ethyl 4-bromobutyrate, propyl 4-bromobutyrate, isopropyl 4-bromobutyrate, butyl 4-bromobutyrate, cyclohexyl 4-bromobutyrate, benzyl 4-bromobutyrate, methyl 5-chlorovalerate, ethyl 5-chlorovalerate, propyl 5-chlorovalerate, isopropyl 5-chlorovalerate, butyl 5-chlorovalerate, cyclohexyl 5-chlorovalerate, benzyl 5-chlorovalerate, methyl 5-bromovalerate, ethyl 5-bromovalerate, propyl 5-bromovalerate, isopropyl 5-bromovalerate, butyl 5-bromovalerate, cyclohexyl 5-bromovalerate, benzyl 5-bromovalerate, methyl 6-chlorohexanoate, ethyl 6-chlorohexanoate, propyl 6-chlorohexanoate, isopropyl 6-chlorohexanoate, butyl 6-chlorohexanoate, cyclohexyl 6-chlorohexanoate, benzyl 6-chlorohexanoate, methyl 6-bromohexanoate, ethyl 6-bromohexanoate, propyl 6-bromohexanoate, isopropyl 6-bromohexanoate, butyl 6-bromohexanoate, cyclohexyl 6-bromohexanoate, benzyl 6-bromohexanoate, methyl 7-chloroheptanoate, ethyl 7-chloroheptanoate, propyl 7-chloroheptanoate, isopropyl 7-chloroheptanoate, butyl 7-chloroheptanoate, cyclohexyl 7-chloroheptanoate, benzyl 7-chloroheptanoate, methyl 7-bromoheptanoate, ethyl 7-bromoheptanoate, propyl 7-bromoheptanotate, isopropyl 7-bromoheptanoate, butyl 7-bromoheptanoate, cyclohexyl 7-bromoheptanoate, benzyl 7-bromooctanoate, methyl 8-chlorooctanoate, ethyl 8-chlorooctanoate, propyl 8-chlorooctanoate, isopropyl 8-chlorooctanoate, butyl 8-chlorooctanotate, cyclohexyl 8-chlorooctanoate, benzyl 8-chlorooctanoate, methyl 8-bromooctanoate, ethyl 8-bromooctanoate, propyl 8-bromooctanoate, isopropyl 8-bromooctanoate, butyl 8-bromooctanoate, cyclohexyl 8-bromooctanoate, benzyl 8-bromooctanoate, methyl 9-chlorononanoate, ethyl 9-chlorononanoate, propyl 9-chlorononanoate, isopropyl 9-chlorononanoate, butyl 9-chloronanoate, cyclohexyl 9-chlorononanoate, benzyl 9-chlorononanoate, methyl 9-bromononanoate, ethyl 9-bromononanoate, propyl 9-bromononanoate, isopropyl 9-bromononanoate, butyl 9-bromononanoate, cyclohexyl 9-bromononanoate, and benzyl 9-bromononanoate.

A reaction between the polyhydroxyalkanoate containing a unit represented by the chemical formula (A) and the compound represented by the chemical formula (B) will be described in detail.

The present invention can be achieved by subjecting an α-methylene group adjacent to a carbonyl group in a polymer main chain to an addition reaction with the compound represented by the chemical formula (B). To be specific, the present invention can be achieved by: allowing the polyhydroxyalkanoate containing a unit represented by the chemical formula (A) to react with a base capable of forming an α-methylene group, which is adjacent to a carbonyl group in the polymer main chain of the polyhydroxyalkanoate containing a unit represented by the chemical formula (A), into an anion under an addition reaction condition; and allowing the resultant to react with the compound represented by the chemical formula (B). In the present invention, the amount of the compound represented by the chemical formula (B) to be used is 0.001 to 100 times mole, or preferably 0.01 to 10 times mole with respect to the unit represented by the chemical formula (A).

A solvent to be used in the reaction is not particularly limited as long as it is inactive to the reaction and dissolves the staring material to some extent. Examples of such a solvent include: aliphatic hydrocarbons such as hexane, cyclohexane, heptane, ligroin, and petroleum ether; aromatic hydrocarbons such as benzene, toluene, and xylene; ethers such as diethyl ether, diisopropyl ether, tetrahydrofuran, dioxane, dimethoxyethane, and diethyleneglycoldimethylether; and amides such as formamide, N,N-dimethylformamide, N,N-dimethylacetamide, N-methyl-2-pyrrolidone, N-methylpyrrolidinone, and hexamethylphosphorotriamide. Of those, tetrahydrofuran is preferable.

The reaction is performed in the presence of a base. Examples of a base to be used include: lithium alkyls such as methyl lithium and butyl lithium; alkali metal disilazides such as lithium hexamethyl disilazide, sodium hexamethyl disilazide, and potassium hexamethyl disilazide; and lithium amides such as lithium diisopropylamide and lithium dicyclohexylamide. Of those, lithium diisopropylamide is preferable. In addition, the amount of the base to be used in the present invention is 0.001 to 100 times mole, or preferably 0.01 to 10 times mole with respect to the unit represented by the chemical formula (A).

A reaction temperature is generally in the range of −78° C. to 40° C., or preferably in the range of −78° C. to 30° C. A reaction time is generally in the range of 10 minutes to 24 hours. The reaction time is particularly preferably in the range of 10 minutes to 4 hours.

The polyhydroxyalkanoate having a unit represented by the chemical formula (C) can be produced according to the above production method.

In addition, a polymer produced by means of a conventionally known method can be arbitrarily used as the polyhydroxyalkanoate containing a unit represented by the chemical formula (G) to be used in the present invention. Examples thereof include organism-produced polyhydroxyalkanoates typified by poly-3-hydroxybutyric acid, poly-3-hydroxyvaleric acid, and the like. For example, Japanese Patent Publication No. H07-14352 and Japanese Patent Publication No. H08-19227 each disclose a method of producing a copolymer of 3-hydroxybutyric acid and 3-hydroxyvaleric acid. In addition, Japanese Patent Application Laid-Open No. H05-93049 and Japanese Patent Application Laid-Open No. H07-265065 each disclose a method of producing a copolymer of 3-hydroxybutyric acid and 3-hydroxyhexanoic acid. In addition, Japanese Patent No. 2642937 discloses a method of producing a copolymer containing a 3-hydroxyalkanoate having 6 to 12 carbon atoms (that is, from 3-hydroxyhexanoic acid to 3-hydroxyundecylic acid). Japanese Patent Application Laid-Open No. 2002-306190 discloses a method of producing a homopolymer of poly-3-hydroxybutyric acid. A polyhydroxyalkanoate can be produced in the present invention by means of a similar method. In addition, other organism-produced polyhydroxyalkanoates can be produced by means of methods disclosed in International Journal of Biological Macromolecules 12 (1990) 92, Japanese Patent Application Laid-Open No. 2001-288256, Japanese Patent Application Laid-Open No. 2003-319792, and the like.

A polyhydroxyalkanoate composed of a unit of a substituted α-hydroxylic acid represented by the chemical formula (G) in which $R_{Gc}$ represents a linear alkylene chain having 0 carbon atoms ($R_{Gc}$ represents nothing) can also be synthesized by means of a conventionally known method. For example, a polyester can be directly synthesized from a substituted α-hydroxylic acid. Alternatively, prior to a polymerization step, a substituted α-hydroxylic acid may be transformed into a derivative having high polymerization activity, and the derivative may be subjected to ring-opening polymerization to produce a polyhydroxyalkanoate.

(Method of Producing Polyhydroxyalkanoate Composed of Unit of Substituted α-hydroxylic acid from Substituted αhHydroxylic acid)

Condensation polymerization of a polyhydroxyalkanoate composed of a unit of a substituted α-hydroxylic acid can be advanced by: refluxing a substituted α-hydroxylic acid and a polymerization catalyst in an organic solvent; and removing water produced in a polymerization step to the outside of a reaction system.

(I) Polymerization Catalyst

Examples of a polymerization catalyst that can be used in the condensation polymerization of a substituted α-hydroxylic acid include: metals such as tin powder and zinc powder; metal oxides such as tin oxide, zinc oxide, magnesium oxide, titanium oxide, and aluminum oxide; metal halides such as stannous chloride, stannic chloride, stannous bromide, stannic bromide, zinc chloride, magnesium chloride, and aluminum chloride; tetraphenyltin; tin octylate; and p-toluenesulfonic acid. The amount of the polymerization catalyst to be used is 0.001 to 10% by weight, or preferably 0.01 to 5% by weight with respect to the substituted α-hydroxylic acid.

(II) Polymerization Solvent

A polymerization solvent to be used in the condensation polymerization of a substituted α-hydroxylic acid is preferably one that can be easily separated from water. Examples of an available solvent include: toluene; xylene; mesitylene; 1,2,3,5-tetramethylbenzene; chlorobenzene; 1,2-dichlorobenzene; 1,3-dichlorobenzene; bromobenzene; 1,2-dibromobenzene; 1,3-dibromobenzene; iodobenzene; 1,2-diiodobenzene; diphenyl ether; and dibenzyl ether. Those solvents may be mixed before use. The amount of the polymerization solvent to be used is preferably such that the concentration of the substituted α-hydroxylic acid becomes 5 to 50% by weight.

(III) Polymerization Condition

A polymerization temperature in the condensation polymerization of a substituted α-hydroxylic acid is in the range of 50 to 200° C., or preferably 110 to 180° C. in consideration of the generation rate of a polymer and the thermal decomposition rate of the produced polymer. A condensation polymerization reaction is generally performed at the distillation temperature of an organic solvent to be used under normal pressure. When an organic solvent having a high boiling point is used, the reaction may be performed under reduced pressure. The condensation polymerization of the substituted α-hydroxylic acid is preferably performed under an inert gas atmosphere. The polycondensation may be performed while a reaction apparatus is replaced or bubbled by an inert gas. In addition, water produced in the course of a polymerization reaction is appropriately removed from the reaction apparatus. The number average molecular weight of a polyester to be produced by polymerization can vary widely by changing conditions including the kind of the polymerization solvent, the kind and amount of the polymerization catalyst, the polymerization temperature, and the polymerization time. However, the number average molecular weight is preferably in the range of 1,000 to 1,000,000 in terms of polystyrene in consideration of a reaction in a subsequent step.

(Method of Producing Polyhydroxyalkanoate Composed of Unit of Substituted α-hydroxylic acid from Cyclic Dimer of Substituted α-hydroxylic acid)

A polyester can be produced by: performing cyclic diesterification by subjecting a substituted α-hydroxylic acid to bimolecular dehydration to prepare a cyclic dimer lactide as a derivative of the substituted α-hydroxylic acid; and subjecting the cyclic dimer lactide to ring-opening polymerization. Ring-opening polymerization allows a polyester having a high degree of polymerization to be produced because the polymerization velocity of the ring-opening polymerization is generally high. An example of a method of performing cyclic diesterification by subjecting a substituted α-hydroxylic acid to bimolecular dehydration is as follows. A substituted α-hydroxylic acid and a condensation catalyst such as p-toluenesulfonic acid are subjected to azeotropic dehydration in toluene under a nitrogen atmosphere for 30 hours by means of a reaction apparatus equipped with a Dean Stark trap. Water accumulated in the Dean Stark trap is appropriately removed, so a cyclic dimer lactide can be obtained in a high yield. The polyester of interest can also be obtained by: adding a polymerization catalyst to a cyclic dimer lactide; and subjecting the mixture to ring-opening polymerization under an inert gas atmosphere.

(I) Polymerization Catalyst

Examples of a polymerization catalyst that can be used in the ring-opening polymerization of a cyclic dimer lactide include: metals such as tin powder and zinc powder; metal oxides such as tin oxide, zinc oxide, magnesium oxide, titanium oxide, and aluminum oxide; metal halides such as stannous chloride, stannic chloride, stannous bromide, stannic bromide, zinc chloride, magnesium chloride, and aluminum chloride; tetraphenyltin; and tin octylate. Of those, tin or a tin compound is particularly preferable because of its excellent catalytic activity. The amount of the polymerization catalyst to be used is 0.001 to 10' by weight, or preferably 0.01 to 5% by weight with respect to the cyclic dimer lactide.

(II) Polymerization Condition

A polymerization temperature in the ring-opening polymerization of a cyclic dimer lactide is in the range of 100 to 200° C., or preferably 120 to 180° C. in consideration of the generation rate of a polymer and the thermal decomposition rate of the produced polymer. The ring-opening polymerization of the cyclic dimer lactide is preferably performed under an inert gas atmosphere. Examples of an available inert gas include a nitrogen gas and an argon gas. The number average molecular weight of a polyester to be produced by polymerization can vary widely by changing conditions including the kind and amount of the polymerization catalyst, the polymerization temperature, and the polymerization time. However, the number average molecular weight is preferably in the range of 1,000 to 1,000,000 in terms of polystyrene in consideration of a reaction of a polyhydroxyalkanoate composed of a unit of a substituted α-hydroxylic acid to be used in the present invention in a subsequent step.

A polyhydroxyalkanoate represented by the chemical formula (6) serving as a raw material of a polyhydroxyalkanoate represented by the chemical formula (1) or (5) can be produced by polymerizing an intramolecular ring-closure compound of ω-hydroxycarboxylic acid represented by the chemical formula (8) in the presence of a catalyst.

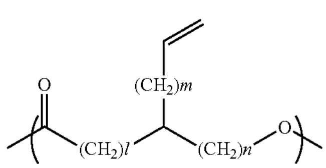

(6)

(With regard to l, m, and n in the formula:

when l represents an integer selected from 0 and 2 to 4 and n represents an integer selected from 0 to 4, m represents an integer selected from 0 to 8; and when l represents 1 and n represents an integer selected from 1 to 4, m represents an integer selected from 0 to 8.

In addition, when multiple units exist, l, m, and n each independently have the above meaning for each unit.)

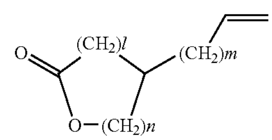

(8)

(With regard to l, m, and n in the formula:

when l represents an integer selected from 0 and 2 to 4 and n represents an integer selected from 0 to 4, m represents an integer selected from 0 to 8; and when l represents 1 and n represents an integer selected from 1 to 4, m represents an integer selected from 0 to 8.)

In the production of a polyhydroxyalkanoate containing a unit represented by the chemical formula (6) using an intramolecular ring-closure compound of ω-hydroxycarboxylic acid represented by the chemical formula (8), a polymerization method is not particularly limited, and solution polymerization, slurry polymerization, bulk polymerization, or the like can be adopted. In the case where a polymerization solvent is used, the solvent to be used is not particularly limited, and an inert solvent such as an aliphatic hydrocarbon or cyclic hydrocarbon having 5 to 18 carbon atoms or an aromatic hydrocarbon having 6 to 20 carbon atoms, tetrahydrofuran, chloroform, o-dichlorobenzene, dioxane, or the like can be used.

Any one of conventionally known ring-opening polymerization catalysts can be used as a catalyst to be used for polymerization. Examples thereof include stannous chloride, stanninc chloride, stannous fluoride, stannous acetate, stannous stearate, stannous octanoate, stannous oxide, stannic oxide, and other tin salts. The examples further include triethoxyaluminum, tri-n-propoxy-aluminum, tri-iso-propoxyaluminum, tri-n-butoxyaluminum, tri-iso-butoxyaluminum, aluminum chloride, di-iso-propylzinc, dimethylzinc, diethylzinc, zinc chloride, tetra-n-propoxytitanium, tetra-n-butoxytitanium, antimony trifluoride, lead oxide, lead stearate, titanium tetrachloride, boron trifluoride, a boron trifluoride ether complex, triethylamine, and tributylamine.

The amount of any one of those catalysts to be used is in the range of 0.0001 to 100 by weight, or preferably 0.001 to 5% by weight with respect to the total amount of a monomer compound.

At the time of ring-opening polymerization, any one of conventionally known polymerization initiators can be used as a polymerization initiator. To be specific, an aliphatic alcohol is used, which may be a monoalcohol, a dialcohol, or a polyhydric alcohol, and may be saturated or unsaturated. Specific examples thereof include: monoalcohols such as methanol, ethanol, propanol, butanol, pentanol, hexanol, heptanol, nonanol, decanol, lauryl alcohol, 1-tetradecanol, cetyl alcohol, stearyl alcohol, and p-tert-butylbenzyl alcohol; dialcohols such as ethylene glycol, butanediol, hexanediol, nonanendiol, and tetramethylene glycol; polyhydric alcohols such as glycerol, sorbitol, xylitol, ribitol, and erythritol; methyl lactate; and ethyl lactate. Any one of those aliphatic alcohols is generally used in an amount of 0.01 to 10% by weight with respect to the total amount of a monomer, although the amount slightly varies depending on conditions such as the kind of an alcohol to be used.

A ring-opening polymerization reaction temperature is in the range of 25 to 200° C., preferably 50 to 200° C., or more preferably 100 to 180° C. A ring-opening polymerization reaction may be performed under an inert gas (such as nitrogen or argon) atmosphere, or may be performed under reduced or increased pressure. At that time, a catalyst and an alcohol may be added sequentially.

A second component or the like may be copolymerized in order to change physical properties such as mechanical properties and decomposition properties in a wide range. To be specific, a cyclic diester of α-hydroxycarboxylic acid, or a lactone as an intramolecular ring-closure compound of ω-hydroxycarboxylic acid can be copolymerized. Furthermore, specific examples of the cyclic diester of α-hydroxycarboxylic acid include intramolecular cyclic diesters such as glycolic acid, lactic acid, α-hydroxybutyric acid, α-hydroxyisobutyric acid, α-hydroxyvaleric acid, α-hydroxyisovaleric acid, α-hydroxy-α-methylbutyric acid, α-hydroxycaproic acid, α-hydroxyisocaproic acid, α-hydroxy-β-methylvaleric acid, α-hydroxyheptanoic acid, mandelic acid, and β-phenylacetic acid. One having asymmetric carbon may be of any one of an L body, a D body, a racemic body, and a meso body. In addition, no problem arises even when the cyclic diester is formed of different α-hydroxy acids. Specific examples thereof include cyclic diesters of glycolic acid and lactic acid such as 3-methyl-2,5-diketo-1,4-dioxane. Examples of the lactone as an intramolecular ring-closure compound of ω-hydroxycarboxylic acid include, but not limited to, intramolecular ring-closure compounds such as β-propiolactone, β-butyrolactone, β-isovalerolactone, β-caprolactone, β-isocaprolactone, β-methyl-β-valerolactone, γ-butyrolactone, γ-valerolactone, δ-valerolactone, ϵ-caprolactone, lactone 11-oxydecanoate, p-dioxanone, and 1,5-dioxepane-2-one.

The number average molecular weight of a polyester to be produced by polymerization can vary widely by changing conditions including the kind and amount of the polymerization catalyst, the polymerization temperature, and the polymerization time. However, the number average molecular weight is preferably in the range of 1,000 to 1,000,000.

In addition, a polyhydroxyalkanoate represented by the chemical formula (10) is produced by polymerizing an intramolecular ring-closure compound of ω-hydroxycarboxylic acid represented by the chemical formula (9) in the presence of a catalyst.

(9)

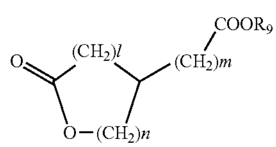

(In the formula, $R_9$ represents a linear or branched alkyl group having 1 to 12 carbon atoms, or aralkyl group.

In addition, with regard to l, m, and n in the formula:

when l represents an integer selected from 0 and 2 to 4 and n represents an integer selected from 0 to 4, m represents an integer selected from 0 to 8;

when l represents 1 and n represents an integer selected from 1 to 4, m represents an integer selected from 0 to 8; and when l represents 1 and n represents 0, m represents 0.)

(10)

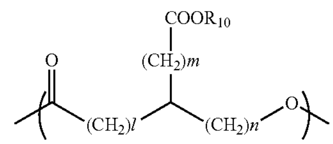

(In the formula, $R_{10}$ represents a linear or branched alkyl group having 1 to 12 carbon atoms, or aralkyl group.

In addition, with regard to l, m, and n in the formula:

when l represents an integer selected from 0 and 2 to 4 and n represents an integer selected from 0 to 4, m represents an integer selected from 0 to 8;

when l represents 1 and n represents an integer selected from 1 to 4, m represents an integer selected from 0 to 8; and when l represents 1 and n represents 0, m represents 0.

In addition, when multiple units exist, l, m, n, and $R_{10}$ each independently have the above meaning for each unit.)

In the production of a polyhydroxyalkanoate containing a unit represented by the chemical formula (10) using an intramolecular ring-closure compound of ω-hydroxycarboxylic acid represented by the chemical formula (9), a polymerization method is not particularly limited, and solution polymerization, slurry polymerization, bulk polymerization, or the like can be adopted. In the case where a polymerization solvent is used, the solvent to be used is not particularly limited, and an inert solvent such as an aliphatic hydrocarbon or cyclic hydrocarbon having 5 to 18 carbon atoms or an aromatic hydrocarbon having 6 to 20 carbon atoms, tetrahydrofuran, chloroform, o-dichlorobenzene, dioxane, or the like can be used.

Any one of conventionally known ring-opening polymerization catalysts can be used as a catalyst to be used for polymerization. Examples thereof include stannous chloride, stannic chloride, stannous fluoride, stannous acetate, stannous stearate, stannous octanoate, stannous oxide, stannic oxide, and other tin salts. The examples further include triethoxyaluminum, tri-n-propoxy-aluminum, tri-iso-propoxyaluminum, tri-n-butoxyaluminum, tri-iso-butoxyaluminum, aluminum chloride, di-iso-propylzinc, dimethylzinc, diethylzinc, zinc chloride, tetra-n-propoxytitanium, tetra-n-butoxytitanium, tetra-t-butoxytitanium, antimony trifluoride, lead oxide, lead stearate, titanium tetrachloride, boron trifluoride, a boron trifluoride ether complex, triethylamine, and tributylamine.

The amount of any one of those catalysts to be used is in the range of 0.0001 to 10% by weight, or preferably 0.001 to 5% by weight with respect to the total amount of a monomer compound.

At the time of ring-opening polymerization, any one of conventionally known polymerization initiators can be used as a polymerization initiator. To be specific, an aliphatic alcohol is used, which may be a monoalcohol, a dialcohol, or a polyhydric alcohol, and may be saturated or unsaturated. Specific examples thereof include: monoalcohols such as methanol, ethanol, propanol, butanol, pentanol, hexanol, heptanol, nonanol, decanol, lauryl alcohol, 1-tetradecanol, cetyl alcohol, stearyl alcohol, and p-tert-butylbenzyl alcohol; dialcohols such as ethylene glycol, butanediol, hexanediol, nonanendiol, and tetramethylene glycol; polyhydric alcohols such as glycerol, sorbitol, xylitol, ribitol, and erythritol;

methyl lactate; and ethyl lactate. Any one of those aliphatic alcohols is generally used in an amount of 0.01 to 10% by weight with respect to the total amount of a monomer, although the amount slightly varies depending on conditions such as the kind of an alcohol to be used.

A ring-opening polymerization reaction temperature is in the range of 25 to 200° C., preferably 50 to 200° C., or more preferably 100 to 180° C. A ring-opening polymerization reaction may be performed under an inert gas (such as nitrogen or argon) atmosphere, or may be performed under reduced or increased pressure. At that time, a catalyst and an alcohol may be added sequentially.

A second component or the like may be copolymerized in order to change physical properties such as mechanical properties and decomposition properties in a wide range. To be specific, a cyclic diester of α-hydroxycarboxylic acid, or a lactone as an intramolecular closed-circular compound of ω-hydroxycarboxylic acid can be copolymerized. Furthermore, specific examples of the cyclic diester of α-hydroxycarboxylic acid include intramolecular cyclic diesters such as glycolic acid, lactic acid, α-hydroxybutyric acid, α-hydroxyisobutyric acid, α-hydroxyvaleric acid, α-hydroxyisovaleric acid, α-hydroxy-α-methylbutyric acid, α-hydroxycaproic acid, α-hydroxyisocaproic acid, α-hydroxy-β-methylvaleric acid, α-hydroxyheptanoic acid, mandelic acid, and β-phenyllacetic acid. One having asymmetric carbon may be of any one of an L body, a D body, a racemic body, and a meso body. In addition, no problem arises even when the cyclic diester is formed of different α-hydroxy acids. Specific examples thereof include cyclic diesters of glycolic acid and lactic acid such as 3-methyl-2,5-diketo-1,4-dioxane. Examples of the lactone as an intramolecular ring-closure compound of ω-hydroxycarboxylic acid include, but not limited to, intramolecular closed-circular compounds such as β-propiolactone, β-butyrolactone, β-isovalerolactone, β-caprolactone, β-isocaprolactone, β-methyl-β-valerolactone, γ-butyrolactone, γ-valerolactone, δ-valerolactone, ε-caprolactone, lactone 11-oxydecanoate, p-dioxanone, and 1,5-dioxepane-2-one.

The number average molecular weight of a polyhydroxyalkanoate to be produced by polymerization can vary widely by changing conditions including the kind and amount of the polymerization catalyst, the polymerization temperature, and the polymerization time. However, the number average molecular weight is preferably in the range of 1,000 to 1,000,000.

The molecular weight of the polyhydroxyalkanoate of the present invention can be measured as a relative molecular weight or an absolute molecular weight. The molecular weight can be simply measured by means of, for example, gel permeation chromatography (which may be referred to as GPC). A specific measurement method by means of GPC is as follows. The polyhydroxyalkanote is dissolved in advance into a solvent into which the polyhydroxyalkanoate is soluble, and the molecular weight is measured in an identical phase. A refractive index (RI) detector or an ultraviolet (UV) detector can be used as a detector depending on the polyhydroxyalkanoate to be measured. The molecular weight is determined as a result of relative comparison with a standard sample (such as polystyrene or polymethyl methacrylate). The solvent can be selected from solvents into each of which a polymer is soluble such as dimethylformamide (which may be referred to as DMF), dimethyl sulfoxide (which may be referred to as DMSO), chloroform, tetrahydrofuran (which may be referred to as THF), toluene, and hexafluoroisopropanol (which may be referred to as HFIP). In the case of a polar solvent, the molecular weight can be measured through addition of a salt.

In addition, out of the above polyhydroxyalkanoates, a polyhydroxyalkanoate having a ratio (Mw/Mn) between a weight average molecular weight (Mw) and a number average molecular weight (Mn) measured as described above in the range of 1 to 10 is preferably used in the present invention.

[Application to Toner]

Applications of the polyhydroxyalkanoate according to the present invention include applications to toner for developing an electrostatic charge image and an image forming process using the same. To be specific, the polyhydroxyalkanoate can be used as a charge control agent to be internally or externally added to toner.

That is, the charge control agent of the present invention is the polyhydroxyalkanoate described above. Furthermore, the present invention relates to a toner for developing an electrostatic charge image containing at least a binder resin, a colorant, and the charge control agent.

The present invention also relates to an image forming method, including at least the steps of: applying a voltage from an outside to a charging member to charge an electrostatic latent image-bearing member; forming an electrostatic charge image on the charged electrostatic latent image-bearing member; developing the electrostatic charge image with toner for developing an electrostatic charge image to form a toner image on the electrostatic latent image-bearing member; transferring the toner image on the electrostatic latent image-bearing member onto a recording material; and fixing the toner image on the recording material under heating, in which the toner for developing an electrostatic charge image described above is used. The present invention also relates to an image forming apparatus, including at least: means for applying a voltage from an outside to a charging member to charge an electrostatic latent image-bearing member; means for forming an electrostatic charge image on the charged electrostatic latent image-bearing member; means for developing the electrostatic charge image with toner for developing an electrostatic charge image to form a toner image on the electrostatic latent image-bearing member; means for transferring the toner image on the electrostatic latent image-bearing member onto a recording material; and means for fixing the toner image on the recording material under heating, in which the toner for developing an electrostatic charge image described above is used.

<Use as Charge Control Agent>

When the polyhydroxyalkanoate of the present invention is used as a charge control agent, it is important that the polyhydroxyalkanoate have a structure containing a sulfonic group or a derivative of the sulfonic group, or a carboxyl group or a derivative of the carboxyl group at a side chain like the monomer unit represented by the chemical formula (1) or (5). A unit having any one of those anionic or electron-withdrawing functional groups is preferable for further improving negative chargeability, and the charge control agent of the present invention actually exhibits excellent negative chargeability.

The polyhydroxyalkanoate of the present invention to be used as a charge control agent has good compatibility with a binder resin. In particular, the polyhydroxyalkanoate has very good compatibility with a polyester-based binder resin. Toner for developing an electrostatic charge image containing the polyhydroxyalkanoate of the present invention has a high charge amount and good stability with time. Therefore, a vivid image can be stably obtained in electrostatic image formation even if the toner for developing an electrostatic charge image is stored for a long period of time. In addition, the polyhydroxyalkanoate is colorless or has extremely weak tint, and has good negative chargeability. Therefore, each of black negatively charged toner and color toner can be produced.

Furthermore, compatibility can be widely controlled by appropriately selecting the kinds/composition ratios of monomer units constituting the polyhydroxyalkanoate of the present invention as a charge control agent. Here, when a resin composition is selected in such a manner that a charge control agent has a microphase-separated structure in a toner binder, charge can be stably maintained because no electrical continuity of toner occurs. In addition, the polyhydroxyalkanoate of the present invention as a charge control agent contains no heavy metal. Therefore, toner can be stably produced because no polymerization inhibition action due to a heavy metal which may be observed in a metal-containing charge control agent occurs when toner is produced by means of suspension polymerization or emulsion polymerization.

(Addition of Polyhydroxyalkanoate to Toner)

In the present invention, a method involving internal addition to toner or a method involving external addition to toner may be used as a method of incorporating any one of the compounds described above into toner. The addition amount of a charge control agent in the case of internal addition is generally in the range of 0.1 to 50% by weight, or preferably 0.2 to 20% by weight with respect to a weight ratio between a binder resin and the charge control agent. An addition amount of 0.1% by weight or more is preferable because the degree of improvement in chargeability of toner becomes remarkable. On the other hand, an addition amount of 50% by weight or less is preferable from the viewpoint of economy. A weight ratio between a binder resin and the charge control agent in the case of external addition is preferably in the range of 0.01 to 5% by weight. It is particularly preferable to allow the charge control agent to mechanochemically adhere to the toner surface. The polyhydroxyalkanoate of the present invention as a charge control agent may also be used in combination with a conventionally known charge control agent.

The polyhydroxyalkanoate of the present invention when used as a charge control agent has a number average molecular weight of generally 1,000 to 1,000,000, or preferably 1,000 to 300,000. A number average molecular weight of 1,000 or more provides a sufficient charge amount and exerts an good effect on the fluidity of toner because the polymer is not completely compatible with a binder resin and a discontinuous domain is formed. In addition, a number average molecular weight of 1,000,000 or less makes it easy to disperse the polyhydroxyalkanoate into toner.

The molecular weight of the polyhydroxyalkanoate can be measured by means of gel permeation chromatography (GPC). A specific measurement method by means of GPC involved: dissolving the above polyhydroxyalkanoate into a 0.1% by weight LiBr-containing dimethylformamide (DMF), chloroform, or the like in advance; measuring many samples in an identical mobile phase; and determining a molecular weight distribution from a calibration curve of a standard polystyrene resin.

In addition, in the present invention, out of the above polyhydroxyalkanoates, a polyhydroxyalkanoate having a ratio (Mw/Mn) between a weight average molecular weight (Mw) and a number average molecular weight (Mn) measured as described above in the range of 1 to 10 is preferably used as a charge control agent.

It is preferable that a polyhydroxyalkanoate to be used as a charge control agent in the present invention has a melting point in the range of 20 to 150° C., or particularly 40 to 150° C., or have no melting point but have a glass transition point in the range of 10 to 150° C., or particularly 20 to 150° C. It is preferable that the polymer has a melting point of 20° C. or higher, or has no melting point and has a glass transition point of 10° C. or higher because good effects are exerted on the fluidity and storage stability of the toner. It is also preferable that the polymer has a melting point of 150° C. or lower, or has no melting point and has a glass transition point of 150° C. or lower because it becomes easy to knead the charge control agent in the toner, and a charge amount distribution becomes even. In this case, the melting point Tm and the glass transition point Tg may be measured by using a differential scanning calorimeter of a high-precision inner heat input compensation type such as a DSC-7 manufactured by PerkinElmer.

In the toner for developing an electrostatic charge image of the present invention, a weight ratio between the binder resin and the charge control agent is generally 0.1 to 50% by weight, or preferably generally 0.2 to 20% by weight. The composition of the toner for developing an electrostatic charge image of the present invention is generally 0.1 to 50% by weight of a charge control agent, 20 to 95% by weight of a binder resin, and 0 to 15% by weight of a coloring material based on the toner weight. The toner may contain 60% by weight or less of magnetic powder (for example, powder of a ferromagnetic metal such as iron, cobalt, or nickel, or a compound such as magnetite, hematite, or ferrite) serving also as a coloring material as required. The toner may further contain various additives (such as a lubricant (for example, polytetrafluoroethylene, low-molecular-weight polyolefin, an aliphatic acid, or a metal salt or amide thereof) and other charge control agents (for example, a metal-containing azo dye and a salicylic acid metal salt)). Hydrophobic colloidal silica fine powder or the like may also be used for improving the fluidity of the toner. A total amount of those additives is generally 10% by weight or less based on the toner weight.

In the toner of the present invention, at least part of a binder resin preferably forms a continuous phase and at least part of a charge control agent preferably forms a discontinuous domain. As compared to the case where a charge control agent is completely compatible with a toner binder without the formation of a discontinuous domain, the added charge control agent is easily exposed to the toner surface, and a small addition amount can exert an effect. The domain has a dispersed particle size in the range of preferably 0.01 to 4 μm, or more preferably 0.05 to 2 μm. A dispersed particle size of 4 μm or less is preferable because dispersibility becomes good, so a charge amount distribution becomes even and transparency of toner becomes good. In addition, a dispersed particle size of 0.01 μm or more is preferable because a discontinuous domain is easily formed and a small addition amount of a charge control agent exerts an effect. The fact that at least part of the charge control agent forms a discontinuous domain and the dispersed particle size of the domain can be confirmed by observing a section of toner by means of a transmission electron microscope or the like. For clearly observing an interface, a toner section may be observed by means of an electron microscope after the section has been stained with ruthenium tetroxide, osmium tetroxide, or the like.

For the purpose of reducing the particle size of a discontinuous domain formed by the polyhydroxyalkanoate of the present invention as a charge control agent, a polymer that is compatible with the polyhydroxyalkanoate and is also compatible with a binder resin may also be incorporated as a compatibilizer. An example of the compatibilizer includes a polymer in which a polymer chain containing 50 mol % or more of a monomer having substantially the same structure as that of a constituent monomer of the polyhydroxyalkanoate and a polymer chain containing 50 mol % or more of a monomer having substantially the same structure as that of a constituent monomer of the binder resin are bound in a graft manner or block manner. The usage amount of the compatibilizer is generally 30% by weight or less, or preferably 1 to 10% by weight with respect to the polyhydroxyalkanoate.

<Other Components>

Hereinafter, other components constituting the toner for developing an electrostatic charge image of the present invention will be described. The toner for developing an electrostatic charge image according to the present invention may contain a binder resin, a colorant, and other additives to be added as required as well as the above charge control agent.

(Binder Resin)

First, a general thermoplastic resin can be used as the binder resin. Examples of an available thermoplastic resin include polystyrene, polyacrylate, a styrene-acrylate copolymer, polyvinyl chloride, polyvinyl acetate, polyvinylidene chloride, a phenol resin, an epoxy resin, and a polyester resin. Any one of the resins that are generally used for producing toner can be used, and the resin to be used is not particularly limited.

In addition, the charge control agent of the present invention can be mixed with a binder resin before being turned into toner, and the mixture can be used as a toner binder composition of the present invention having a charge controlling ability. Examples of the binder resin include a styrene-based polymer, a polyester-based polymer, an epoxy-based polymer, a polyolefin-based polymer, and a polyurethane-based polymer. Each of them may be used alone, or two or more of them may be used in combination.

(Specific Examples of Binder Resin)

Examples of the styrene-based polymer include: a copolymer of styrene and (meth)acrylate and copolymers of other monomers copolymerizable with them; and a copolymer of styrene and a diene-based monomer (such as butadiene or isoprene) and copolymers of other monomers copolymerizable with them. An example of the polyester-based polymer includes a polycondensate of an aromatic dicarboxylic acid and an alkylene oxide adduct of an aromatic diol. Examples of the epoxy-based polymer include a product of a reaction between an aromatic diol and epichlorohydrin and a denatured product thereof. Examples of the polyolefin-based polymer include copolymers of polyethylene, polypropylene, and other monomers copolymerizable with them. An example of the polyurethane-based polymer includes a polyadduct of an aromatic diisocyanate and an alkylene oxide adduct of an aromatic diol.

Specific examples of the binder resin used in combination with the charge control agent of the present invention include: a polymer of any one of the polymerizable monomers described below; and a copolymerization product obtained by using a mixture of the polymerizable monomers or two or more kinds of the polymerizable monomers. Specific examples of such a binder resin preferably used include: a styrene-based polymer such as a styrene-acrylic acid copolymer or a styrene-methacrylic acid-based copolymer; a polyester-based polymer; an epoxy-based polymer; a polyolefin-based polymer; and a polyurethane-based polymer.

Specific examples of a polymerizable monomer include: styrene and derivatives thereof such as, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; ethylene-based unsaturated monoolefins such as ethylene, propylene, butylene, and isobutylene; unsaturated polyenes such as butadiene; halogenated vinyls such as vinyl chloride, vinylidene chloride, vinyl bromide, and vinyl fluoride; vinyl esters such as vinyl acetate, vinyl propionate, and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylates such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole, and N-vinylpyrrolidone; vinyl naphthalenes; acrylic/methacrylic acid derivatives such as acrylonitrile, methacrylonitrile, and acrylamide; diesters of esters and dibasic acids of the above α,β-unsaturated acids; dicarboxylic acids such as maleic acid, methyl maleate, butyl maleate, dimethyl maleate, phthalic acid, succinic acid, and terephthalic acid; polyol compounds such as ethylene glycol, diethylene glycol, triethylene glycol, 1,2-propylene glycol, 1,3-propylene glycol, 1,4-butanediol, 1,6-hexanediol, bisphenol A, hydrogenated bisphenol A, and polyoxyethylenated bisphenol A; isocyanates such as p-phenylene diisocyanate, p-xylylene diioscyante, and 1,4-tetramethylene diisocynate; amines such as ethyl amine, butyl amine, ethylenediamine, 1,4-diaminobenzene, 1,4-diaminobutane, and monoethanol amine; and epoxy compounds such as diglycidyl ether, ethylene glycol diglycidyl ether, bisphenol A glycidyl ether, and hydroquinone diglycidyl ether.

(Cross-Linking Agent)

In forming a binder resin to be used in combination with the charge control agent of the present invention, any one of such cross-linking agents as described below may be used as required. Examples of a bifunctional cross-linking agent include divinylbenzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester-type diacrylate (MANDA, Nippon Kayaku Co., Ltd.; trade name), and compounds obtained by changing the term "acrylate" in each of the above compounds to the term "methacrylate".

Examples of a polyfunctional cross-linking agent that is bifunctional or more include: pentaerythritol triacrylate, trimethylol ethane triacrylate, trimethylol propane triacrylate, tetramethylol methane tetraacrylate, and oligoester acrylate, and methacrylates thereof; 2,2-bis(4-methacryloxy, polyethoxyphenyl)propane; diallyl phthalate; triallyl cyanurate; triallyl isocyanurate; triallyl isocyanurate; and diaryl chlorendate.

(Polymerization Initiator)

In addition, in forming a binder resin to be used in combination with the charge control agent of the present invention, any one of such polymerization initiators as described below may be used as required. Examples of the polymerization initiator include t-butylperoxy-2-ethylhexanoate, cumine perpivarate, t-butylperoxylaurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(t-butylperoxy)3,3,5-trimethylcyclohexane, 1,1-bis(t-butylperoxy)cyclohexane, 1,4-bis(t-butylperoxycarbonyl)cyclohexane, 2,2-bis(t-butylperoxy)octane, n-butyl 4,4-bis(t-butylperoxy)valerate, 2,2-bis(t-butylperoxy)butane, 1,3-bis(t-butylperoxy-isopropyl)benzene, 2,5-dimethyl-2,5-di(t-butylperoxy)hexane, 2,5-dimethyl-2,5-di(t-butylperoxy)hexane, 2,5-dimethyl-2,5-di (benzoylperoxy)hexane, di-t-butyldiperoxyisophthalate, 2,2-bis(4,4-di-t-butylperoxycyclohexyl)propane, di-t-butylperoxy α-methylsuccinate, di-t-butylperoxydimethylglutarate, di-t-butylperoxyhexahydroterephthalate, di-t-butylperoxyazelate, 2,5-dimethyl-2,5-di(t-butylperoxy) hexane, diethylene glycol-bis(t-butylperoxycarbonate), di-t-butylperoxytrimethyladipate, tris(t-butylperoxy)triazine, and vinyl tris(t-butylperoxy)silane. Each of them may be used alone, or two or more of them may be used in combination. The polymerization initiator is used at a concentration of generally 0.05 part by weight or more (preferably 0.1 to 15 parts by weight) with respect to 100 parts by weight of the monomer.

(Other Biodegradable Plastics)

A biodegradable plastic is also preferably used in the present invention. Examples of the biodegradable plastic include: "Ecostar" and "Ecostar Plus" (each of which is manufactured by Hagiwara Industries Inc.; trade name); "Biopole" (manufacutured by Monsant; trade name); "Ajicoat" (manufactured by Ajinomoto Co., Inc.; trade name); "Cellugren" (manufactured by Daicel Chemical Industries, Ltd.); "Bionolle" (manufactured by Showa Highpolymer Co., Ltd.; trade name); "Ecoplastic" (manufactured by Toyota Motor Corporation; trade name); "Lacea" (manufactured by Mitsui Chemicals, Inc.); "Biogreen" (manufactured by Mitsubishi Gas Chemical Company, Inc.; trade name); "NatureWorks" (manufactured by Cargill Dow; trade name); and "Biomax" (manufactured by Du Pont; trade name).

Of those, polycaprolactone (that is, a polymer of ϵ-caprolactone) or polylactic acid is particularly preferable because it is completely decomposed by lipase, esterase, or the like with ease and because alteration of physical properties can be easily performed by, for example, blending or copolymerizing it with another resin.

A combination of any one of those binder resins and the charge control agent of the present invention is preferably such that the polymer structure of the binder resin is similar to that of a polymer chain of the charge control agent as much as possible. Dispersion of the charge control agent into the binder resin is apt to be insufficient when the polymer structure of the binder resin is considerably different from that of the polymer chain of the charge control agent.

The weight ratio of the charge control agent of the present invention to be internally added to a binder resin is generally 0.1 to 50% by weight by weight, or preferably 0.2 to 20% by weight by weight. A weight ratio of the charge control agent to be internally added of 0.1% by weight by weight or more is preferable because a charge amount is high. A weight ratio of 50% by weight or less is preferable because charging stability of toner becomes satisfactory.

<Other Charge Control Agents>

A conventionally used charge control agent other than the charge control agent of the present invention may be used in combination with the charge control agent of the present invention. Specific examples thereof include a nigrosin-based dye, a quaternary ammonium salt, and a monoazo-based metal complex salt dye. The addition amount of the charge control agent, which can be determined in consideration of conditions such as chargeability of a binder resin, a production method including the addition amount and dispersion method of a colorant, and chargeability of any one of the other additives, is 0.1 to 20 parts by weight, or preferably 0.5 to 10 parts by weight with respect to 100 parts by weight of the binder resin. In addition to the above, an inorganic particle of a metal oxide or the like, or an inorganic substance the surface of which is treated with any one of the above organic substances may be used. Any one of those charge control agents may be used while being mixed with and added to a binder resin, or may be used while being allowed to adhere to a toner particle surface.

<Colorant>

Any one of the colorants that are generally used for producing toner can be used as a colorant constituting the toner for developing an electrostatic charge image of the present invention without particular limitation. Examples of an available colorant include pigments and/or dyes such as carbon black, titanium white, a monoazo-based red pigment, a disazo-based yellow pigment, a quinacridone-based magenta pigment, and an anthraquinone dye.

More specifically, when the toner for developing an electrostatic charge image of the present invention is used as magnetic color toner, examples of a colorant to be used include C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, and C.I. Basic Green 6.

Examples of a pigment to be used include chrome yellow, cadmium yellow, mineral fast yellow, navel yellow, naphthol yellow S, Hansa yellow G, permanent yellow NCG, tartrazine lake, chrome orange, molybdenum orange, permanent orange GTR, pyrazolone orange, benzidine orange G, cadmium red, permanent red 4R, watching red calcium salt, eosin lake, brilliant carmine 3B, manganese violet, fast violet B, methyl violet lake, prussian blue, cobalt blue, alkali blue lake, Victoria blue lake, phthalocyanine blue, fast sky blue, indanthrene blue BC, chrome green, chromium oxide, pigment green B, malachite green lake, and final yellow green G.

In addition, when the toner for developing an electrostatic charge image of the present invention is used as two-component full-color toner, any one of such colorants as described below may be used. Examples of a coloring pigment for magenta toner include: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, and 209; C.I. Pigment Violet 19; and C.I. Vat Red 1, 2, 10, 13, 15, 23, 29, and 35.

In the present invention, each of the above pigments may be used alone, but it is preferable to use a dye and a pigment in combination to improve the visibility in terms of image quality of a full-color image. Examples of a magenta dye to be used in that case include: oil-soluble dyes such as C.I. Solvent Red 1, 3, 8, 23, 24, 25, 27, 30, 49, 81, 82, 83, 84, 100, 109, and 121, C.I. Disperse Red 9, C.I. Solvent Violet 8, 13, 14, 21, and 27, and C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39, and 40, and C.I. Basic Violet 1, 3, 7, 10, 14, 15, 21, 25, 26, 27, and 28.

Examples of other coloring pigments include cyan coloring pigments such as C.I. Pigment Blue 2, 3, 15, 16, and 17, C.I. Vat Blue 6, C.I. Acid Blue 45, and copper phthalocyanine pigments each having a phthalocyanine skeleton substituted by 1 to 5 phthalimide methyl groups.

The examples of other coloring pigments further include yellow coloring pigments such as C.I. Pigment Yellow 1, 2, 3, 4, 5, 6, 7, 10, 11, 12, 13, 14, 15, 16, 17, 23, 65, 73, and 83, and C.I. Vat Yellow 1, 3, and 20.

Each of the dyes and pigments described above may be used alone, or two or more of them may be arbitrarily mixed for obtaining a desired toner hue.

In consideration of environmental protection and safety against a human body, food pigments such as various food lakes can be suitably used. Examples thereof include Food Red No. 40 Aluminum Lake, Food Red No. 2 Aluminum Lake, Food Red No. 3 Aluminum Lake, Food Red No. 106 Aluminum Lake, Food Yellow No. 5 Aluminum Lake, Food Yellow No. 4 Aluminum Lake, Food Blue No. 1 Aluminum Lake, and Food Blue No. 2 Aluminum Lake.

Any one of the above water-insoluble food pigments can also function as a charge control agent. In that case, any one of the aluminum lakes can be used for negative charging. A water-insoluble food pigment capable of functioning as a charge control agent as described above not only improves the environmental safety of toner but also contributes to a reduction in cost of toner.

The content of any one of such colorants as described above in toner may be widely changed in accordance with a desired coloring effect and the like. For obtaining best toner properties, that is, in consideration of coloring power of a printed letter, form stability of toner, scattering of toner, and the like, any one of those colorants is used in an amount of generally about 0.1 to 60 parts by weight, or preferably about 0.5 to 20 parts by weight with respect to 100 parts by weight of a binder resin.

<Other Components of Toner>

The toner for developing an electrostatic charge image of the present invention may contain any one of the following compounds as well as the binder resin and colorant components described above to such an extent that an effect of the present invention is not adversely affected. Examples of the compounds include: a silicone resin; polyester; polyurethane; polyamide; an epoxy resin; polyvinyl butyral; rosin; denatured rosin; a terpene resin; a phenol resin; an aliphatic or alicyclic hydrocarbon resin such as low-molecular-weight polyethylene or low-molecular-weight polypropylene; an aromatic petroleum resin; chlorinated paraffin; and a paraffin wax. Of those, examples of a wax preferably used include low-molecular-weight polypropylene and a by-product thereof, low-molecular-weight polyester and an ester-based wax, and an aliphatic derivative. Waxes obtained by differentiating those waxes depending on a molecular weight are also preferably used in the present invention. Oxidation, block copolymerization, or graft denaturation may also be performed after the differentiation.

In particular, the toner for developing an electrostatic charge image of the present invention becomes toner having excellent properties when the toner contains such wax components as described above and these wax components are dispersed into the binder resin in a substantially spherical and/or spindle island fashion in the case where a toner section is observed by means of a transmission electron microscope (which may be referred to as TEM hereinafter).

<Method of Producing Toner>

Any one of the conventionally known methods can be used as a specific method of producing the toner for developing an electrostatic charge image of the present invention having such a structure as described above. The toner for developing an electrostatic charge image of the present invention can be produced by means of, for example, a so-called pulverization method for obtaining toner by using the following steps. That is, to be specific, the toner for developing an electrostatic charge image of the present invention having a desired particle size can be obtained by: sufficiently mixing resins such as a binder resin, and a charge control agent and a wax to be added as required in a mixer such as a Henschel mixer or a ball mill; melting and kneading the mixture by using a heat kneader such as a heat roll, a kneader, or an extruder to make the resins compatible with each other; dispersing or dissolving, into the kneaded product, a pigment or a dye as a colorant, or a magnetic substance, and an additive such as a metal compound to be added as required; cooling the resultant for solidification; pulverizing the solidified product by means of a pulverizer such as a jet mill or a ball mill; and classifying the pulverized product. A multi-division classifier is preferably used in the classification step in terms of production efficiency.

The toner for developing an electrostatic charge image of the present invention having a desired particle size can also be obtained by: dissolving a binder resin and a charge control agent and the like into a solvent (for example, an aromatic hydrocarbon such as toluene or xylene, a halogenated compound such as chloroform or ethylene dichloride, a ketone such as acetone or methyl ethyl ketone, or an amide such as dimethylformamide); mixing the solution; subjecting the solution to stirring treatment; placing the resultant in water for reprecipitation; filtering and drying the precipitate; pulverizing the solidified product by means of a pulverizer such as a jet mill or a ball mill; and classifying the pulverized product. A multi-division classifier is preferably used in the classification step in terms of production efficiency.

The toner for developing an electrostatic charge image of the present invention can also be produced by means of a so-called polymerization method described below. That is, in this case, the toner for developing an electrostatic charge image of the present invention can be obtained by: mixing and dispersing a polymerizable monomer of a binder resin, a charge control agent, a pigment or a dye as a colorant, or a magnetic substance, and, as required, materials such as a cross-linking agent, a polymerization initiator, a wax, another binder resin, and other additives; subjecting the resultant to suspension polymerization in an aqueous dispersion medium in the presence of a surfactant or the like to synthesize polymerizable colored resin particles; subjecting the resultant particles to solid-liquid separation; drying the resultant; and classifying the resultant as required. Furthermore, a colored fine particle containing no charge control agent may be prepared according to the above method, and the above polyhydroxyalkanoate may be fixed and added to particle surface by means of a mechanochemical method or the like alone or together with an external additive such as colloidal silica.

(Silica External Additive)

In the present invention, silica fine powder is preferably externally added to toner produced by means of such a method as described above for improving charging stability, developability, fluidity, and durability. One having a specific surface area by nitrogen adsorption measured by means of a BET method of 20 $m^2/g$ or more (particularly 30 to 400 $m^2/g$) is used at this time as the silica fine powder to provide good results. The amount of the silica fine powder to be used in this case is about 0.01 to 8 parts by weight, or preferably about 0.1 to 5 parts by weight with respect to 100 parts by weight of toner particles. The silica fine powder to be used at this time is preferably treated with any one of the treatments such as silicone varnish, various denatured silicone varnishes, silicone oil, various denatured silicone oils, silane coupling agents, silane coupling agents each having a functional group, and other organic silicon compounds. Those treatments may be mixed before use.

(Inorganic Powder)

Any one of the inorganic powders described below is also preferably added for improving the developability and durability of the toner. Examples of the inorganic fine powders include: oxides of metals such as magnesium, zinc, aluminum, cerium, cobalt, iron, zirconium, chromium, manganese, strontium, tin, and antimony; composite metal oxides such as calcium titanate, magnesium titanate, and strontium titanate; metal salts such as calcium carbonate, magnesium carbonate, and aluminum carbonate; clay minerals such as kaolin; phosphoric acid compounds such as apatite; silicon compounds such as silicon carbide and silicon nitride; and carbon powders such as carbon black and graphite. Of those, fine powder of zinc oxide, aluminum oxide, cobalt oxide, manganese dioxide, strontium titanate, or magnesium titanate is preferably used.

(Lubricant)

Any one of the lubricant powders described below may be further added to the toner. Examples of the lubricant powders include: fluorine resins such as Teflon (registered trademark) and polyvinylidene fluoride; fluorine compounds such as carbon fluoride; aliphatic metal salts such as zinc stearate; aliphatic acid derivatives such as an aliphatic acid and an aliphatic ester; and molybdenum sulfide.

<With Regard to Carrier>

The toner for developing an electrostatic charge image of the present invention having such a constitution as described above can be singly used as a nonmagnetic one-component developer, or can be applied to any one of the conventionally known various toners such as a nonmagnetic toner constituting a magnetic two-component developer together with a magnetic carrier and a magnetic toner to be singly used as a magnetic one-component toner. Any one of conventionally known carriers can be used as a carrier to be used for a two-component development method. To be specific, particles having an average particle size of 20 to 300 μm and formed of metals such as surface-oxidized or unoxidized iron, nickel, cobalt, manganese, chromium, and a rare earth, and alloys or oxides of them can be used as carrier particles. In the carrier to be used in the present invention, the surfaces of the carrier particles are preferably attached or coated with substances such as a styrene-based resin, an acrylic resin, a silicone-based resin, a fluorine-based resin, and a polyester resin.

<Magnetic Toner>

The toner for developing an electrostatic charge image of the present invention may contain a magnetic material in its toner particles to serve as magnetic toner. In this case, the magnetic material can also function as a colorant. Examples of the magnetic material to be used at this time include: iron oxides such as magnetite, hematite, and ferrite; and metals such as iron, cobalt, and nickel, and alloys and mixtures of these metals with metals such as aluminum, cobalt, copper, lead, magnesium, tin, zinc, antimony, beryllium, bismuth, cadmium, calcium, manganese, selenium, titanium, tungsten, and vanadium. The magnetic material that can be used in the present invention has an average particle size of preferably 2 μm or less, or more preferably about 0.1 to 0.5 μm. The amount of the magnetic material in the toner is preferably 20 to 200 parts by weight, or particularly preferably 40 to 150 parts by weight with respect to 100 parts by weight of the binder resin.

It is necessary to make it possible to faithfully develop a finer latent image dot for achieving additionally improved image quality. To this end, the weight average particle size of the toner particles for developing an electrostatic charge image of the present invention is preferably adjusted to fall within the range of 4 μm to 9 μm. That is, toner particles having a weight average particle size of less than 4 μm are not preferable because transfer efficiency reduces and a large amount of transfer residual toner is apt to remain on a photosensitive member, which tends to be responsible for image unevenness based on fogging and insufficient transfer. Toner particles having a weight average particle size in excess of 9 μm are apt to cause scattering of a letter or a line image.

In the present invention, the average particle size and particle size distribution of the toner were measured by using a Coulter Counter TA-II or a Coulter Multisizer (each manufactured by Beckman Coulter; trade name), or the like connected with an interface (manufactured by Nikkaki-Bios) and a personal computer for outputting a number distribution and a volume distribution. A 1% aqueous solution of NaCl is prepared as an electrolyte to be used at this time by using extra-pure sodium chloride. For example, a commercially available ISOTON R-II (manufactured by Coulter Scientific Japan Ltd.; trade name) can also be used as an electrolyte. A specific measurement method is as follows. 100 to 150 ml of the electrolyte are added with 0.1 to 5 ml of a surfactant (preferably an alkylbenzene sulfonate) as a dispersant. Furthermore, 2 to 20 mg of a sample to be measured are added to prepare a sample for measurement. At the time of measurement, the electrolyte into which the sample to be measured was suspended was subjected to dispersion treatment for about 1 to 3 minutes by using an ultrasonic dispersing unit, and the volume and number of toner having a particle size of 2 μm or more were measured by means of a 100-μm aperture as an aperture using the Coulter counter TA-II to calculate a volume distribution and a number distribution. Subsequently, a weight average particle size (D4) on a volume basis and a length average particle size (D1) on a number basis were determined from the volume distribution according to the present invention and the number distribution according to the present invention, respectively.

<Charge Amount>

The toner for developing an electrostatic charge image of the present invention has a charge amount per unit mass (two-component method) of preferably −10 to −80 μC/g, or more preferably −15 to −70 μC/g for improving transfer efficiency in a transfer method involving the use of a transfer member to which a voltage is applied.

Figure 5:
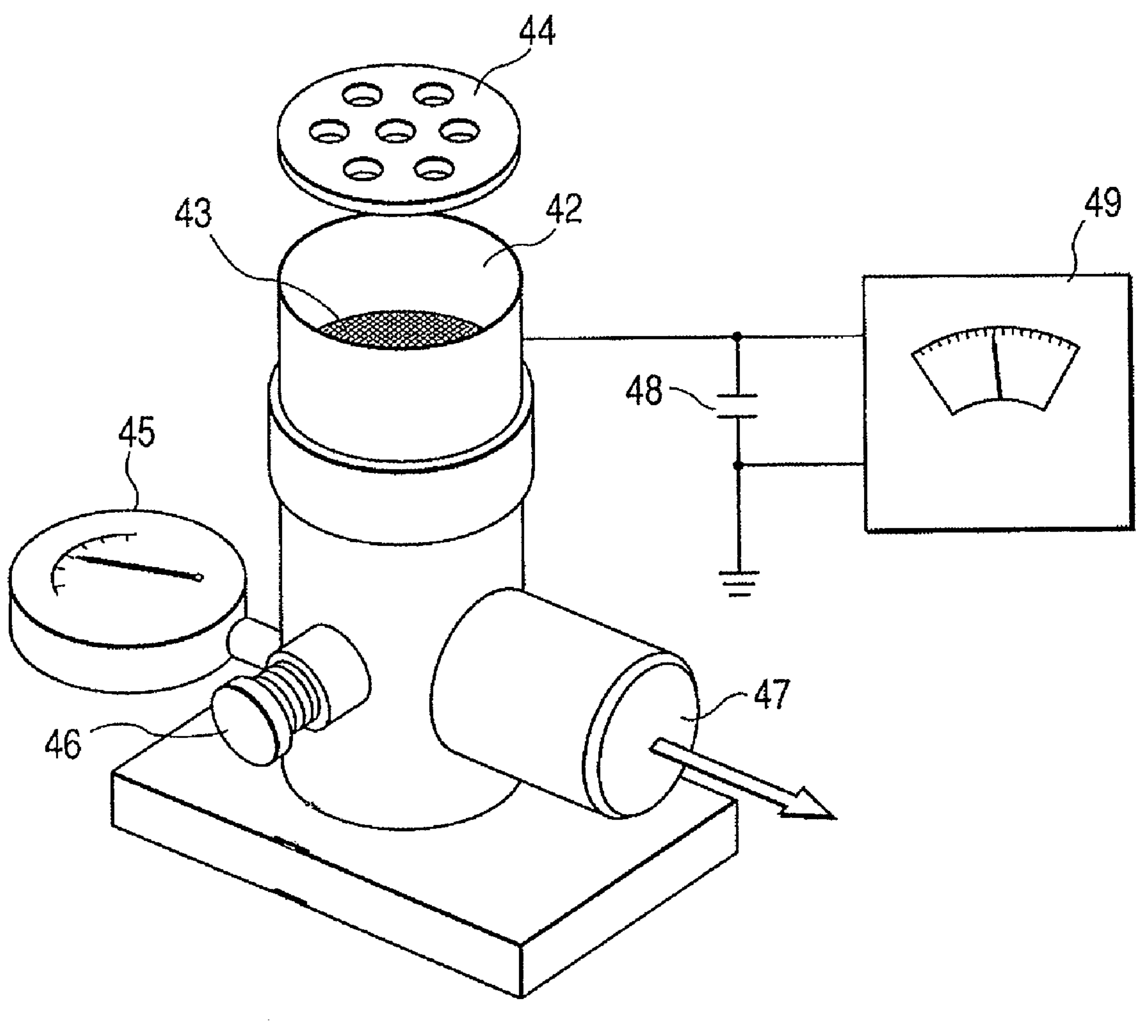
FIG. 5 is a schematic view showing a blow-off charge amount measuring device for measuring a charge amount of toner.

A method of measuring a charge amount (two-component triboelectrification) according to a two-component method used in the present invention will be described below. A charge amount measuring device shown in FIG. 5 was used for the measurement. First, in a constant environment, an EFV 200/300 (manufactured by Powder Tech; trade name) is used as a carrier, and a mixture obtained by adding 0.5 g of toner to be measured to 9.5 g of the carrier is placed in a polyethylene bottle having a volume of 50 to 100 ml. The bottle is set in a shaker with a constant amplitude, and is shaken for a predetermined period of time under shaking conditions of: an amplitude of 100 mm; and a shaking speed of 100 reciprocations/min. Next, 1.0 to 1.2 g of the mixture are placed in a metallic measurement container 42, which has a 500-mesh screen 43 at its bottom, of the charge amount measuring device shown in FIG. 5, and the container is capped with a metallic cap 44. The weight of the entire measurement container 42 at this time is measured and designated by W1 (g). Next, the toner in the container is sucked through a suction port 47 by means of a sucker (not shown) (at least part of the sucker in contact with the measurement container 22 is made of an insulator), and an air quantity regulating valve 46 is adjusted in such a manner that a vacuum gage 45 indicates a pressure of 2,450 Pa (250 mmAq). Suction is performed for 1 minute in this state to suck and remove the toner. The potential of a potentiometer 49 at this time is designated by V (volt). Here, reference numeral 48 denotes a capacitor having a capacity of C (F). In addition, the weight of the entire measuring device after the suction is measured and designated by W2 (g). The frictional charge amount of the toner (C/g) is calculated from those measured values according to the following equation.

$$\text{Frictional charge amount } (C/g)=C\times V/(W1-W2)$$

<Method of Measuring Molecular Weight of Binder Resin and Molecular Weight Distribution of the Resin>

In addition, a binder resin to be used as a constituent of the toner for developing an electrostatic charge image of the present invention preferably has a peak in a low-molecular-weight region in the range of 3,000 to 15,000 in a molecular weight distribution by means of GPC particularly when produced by means of the pulverization method. That is, when a GPC peak in a low-molecular-weight region is 15,000 or less, an improvement in transfer efficiency may be readily sufficient. It is preferable to use a binder resin having a GPC peak in a low-molecular-weight region of 3,000 or more because fusion hardly occurs at the time of surface treatment.

In the present invention, the molecular weight of the binder resin can be measured by means of gel permeation chromatography (GPC). A specific measurement method according to GPC involves: using for measurement a sample obtained by extracting toner with a tetrahydrofuran (THF) solvent for 20 hours by using a Soxhlet extractor; connecting A-801, 802, 803, 804, 805, 806, and 807 manufactured by Showa Denko K. K. to constitute a column; and measuring a molecular weight distribution using a calibration curve of a standard polystyrene resin. In addition, in the present invention, a binder resin having a ratio (Mw/Mn) between a weight average molecular weight (Mw) and a number average molecular weight (Mn) measured as described above in the range of 2 to 100 is preferably used.

<Glass Transition Point of Toner>

The toner of the present invention is prepared by using an appropriate material to have a glass transition point Tg in the range of preferably 40° C. to 75° C., or more preferably 52° C. to 70° C. from the viewpoints of fixability and storage stability. In this case, the glass transition point Tg may be measured by using a differential scanning calorimeter of a high-precision inner heat input compensation type such as a DSC-7 (trade name) manufactured by PerkinElmer. A measurement method is performed in accordance with ASTM D 3418-82. In the present invention, it is recommended that, in measuring the glass transition point Tg, a DSC curve be used, which is measured by: increasing the temperature of a sample to be measured once to take entire hysteresis; quenching the sample; and increasing the temperature again at a rate of temperature increase of 10° C./min in the temperature range of 0 to 200° C.

<Image Forming Method and Apparatus>

The toner for developing an electrostatic charge image of the present invention having such a constitution as described above is particularly preferably applied to an image forming method including at least the steps of: applying a voltage from an outside to a charging member to charge an electrostatic latent image-bearing member; forming an electrostatic charge image on the charged electrostatic latent image-bearing member; developing the electrostatic charge image with toner for developing an electrostatic charge image to form a toner image on the electrostatic latent image-bearing member; transferring the toner image on the electrostatic latent image-bearing member onto a recording material; and fixing the toner image on the recording material under heating, and to an image forming apparatus, including at least: means for applying a voltage from an outside to a charging member to charge an electrostatic latent image-bearing member; means for forming an electrostatic charge image on the charged electrostatic latent image-bearing member; means for developing the electrostatic charge image with toner for developing an electrostatic charge image to form a toner image on the electrostatic latent image-bearing member; means for transferring the toner image on the electrostatic latent image-bearing member onto a recording material; and means for fixing the toner image on the recording material under heating. Furthermore, the toner is particularly preferably applied to an image forming method in which the transferring step is composed of: a first transferring step of transferring the toner image on the electrostatic latent image-bearing member onto an intermediate transfer member; and a second transferring step of transferring the toner image on the intermediate transfer member onto the recording material, and to an image forming apparatus in which the transferring means includes: first transferring means for transferring the toner image on the electrostatic latent image-bearing member onto an intermediate transfer member; and second transferring means for transferring the toner image on the intermediate transfer member onto the recording material.

A reaction solvent, a reaction temperature, a reaction time, a purification method, and the like in a chemical reaction of the polyhydroxyalkanoate of the present invention are not limited to those described above. A method of preparing toner is not limited to that described above.

EXAMPLES

Hereinafter, the present invention will be described in more detail by way of examples. However, the present invention is not limited to these examples.

First, a polyhydroxyalkanoate used in the present invention was prepared.

Preparation Example A-1

Synthesis of Polyester Using 3,6-di(3-butenyl)-1,4-dioxane-2,5-dione and L-lactide 0.11 g (0.5 mmol) of 3,6-di(3-butenyl)-1,4-dioxane-2,5-dione, 0.65 g (4.5 mmol) of L-lactide, 2 ml of a solution of 0.01 M of tin octylate(tin 2-ethylhexanoate) in toluene, and 2 ml of a solution of 0.01 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 150° C. to perform ring-opening polymerization. 1 hour after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 0.63 g of a polymer.

NMR analysis was performed under the following conditions to determine the structure of the resultant polymer.

<Measuring equipment> FT-NMR: Bruker DPX 400
Resonance frequency: $^{1}H$=400 MHz
<Measurement conditions> Measured nuclear species: $^{1}H$
Solvent used: TMS/$CDCl_3$
Measurement temperature: room temperature The analysis confirmed that the polymer was a polyhydroxyalkanoate copolymer containing a unit represented by the following chemical formula (24) as a monomer unit. The analysis also confirmed that an A unit accounted for 9 mol % of the monomer unit and a B unit accounted for 91 mol % thereof.

(24)

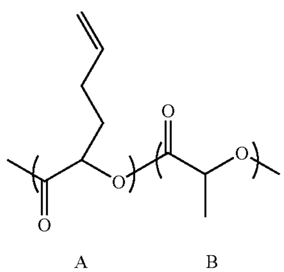

The resultant polyhydroxyalkanoate was evaluated for average molecular weight by means of gel permeation chromatography (GPC; HLC-8220 (trade name) manufactured by Tosoh Corporation, column; TSK-GEL Super HM-H (trade name) manufactured by Tosoh Corporation, solvent; chloroform, in terms of polystyrene). As a result, the resultant polyhydroxyalkanoate was found to have a number average molecular weight Mn of 18,200 and a weight average molecular weight Mw of 24,000.

Preparation Example A-2

Oxidation reaction of polyhydroxyalkanoate composed of unit represented by chemical formula (24) synthesized in Preparation Example A-1

(24)

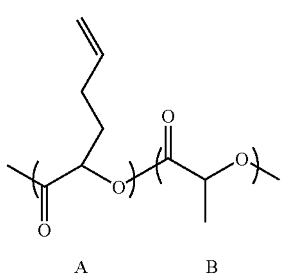

0.50 g of the polyhydroxyalkanoate copolymer composed of the unit represented by the chemical formula (24) synthesized in Preparation Example A-1 (A: 9 mol %, B: 91 mol %) was placed in a round-bottomed flask, and 30 ml of acetone were added to dissolve this. The flask was placed in an ice bath, 5 ml of acetic acid and 0.47 g of 18-crown-6-ether were added, and the whole was stirred. Next, 0.38 g of potassium permanganate was gradually added to the flask in the ice bath, and the whole was stirred in the ice bath for 2 hours and stirred at room temperature for an additional 18 hours. After the completion of the reaction, 60 ml of ethyl acetate were added, and 45 ml of water were further added. Next, sodium hydrogen sulfite was added until peracid was removed. After that, liquid property was adjusted with 1.0N hydrochloric acid to have a pH of 1. The organic layer was extracted and washed with 1.0N hydrochloric acid 3 times. After the organic layer had been collected, the solvent was distilled off to collect a crude polymer. Next, the polymer was washed with 50 ml of water and 50 ml of methanol, and was further washed with 50 ml of water 3 times, followed by collection of a polymer. Next, the polymer was dissolved into 3 ml of THF, and reprecipitated in methanol in an amount 50 times that of THF necessary for the dissolution. The precipitate was collected and dried under reduced pressure to prepare 0.44 g of a polymer.

NMR analysis was performed under the same conditions as those of Preparation Example A-1 to determine the structure of the resultant polymer. The analysis confirmed that the polymer was a polyhydroxyalkanoate containing a unit represented by the following chemical formula (25) as a monomer unit.

(25)

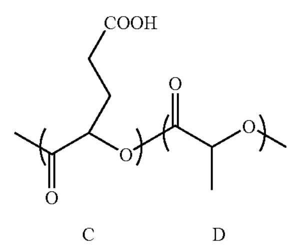

The resultant polyhydroxyalkanoate was evaluated for average molecular weight in the same manner as in Preparation Example A-1. As a result, the resultant polyhydroxyalkanoate was found to have a number average molecular weight Mn of 13,200 and a weight average molecular weight Mw of 18,200.

A carboxyl group at the terminal of a side chain of the resultant polyhydroxyalkanoate was methyl esterified with trimethylsilyldiazomethane to calculate the unit of the polyhydroxyalkanoate.

30 mg of the polyhydroxyalkanoate as a target product were placed in a 100-ml round-bottomed flask, and 2.1 ml of chloroform and 0.7 ml of methanol were added to dissolve this. 0.5 ml of a 2-mol/L trimethylsilyldiazomethane-hexane solution was added to the solution, and the whole was stirred at room temperature for 1 hour. After the completion of the reaction, the solvent was distilled off to collect a polymer. The polymer was washed with 50 ml of methanol to collect a polymer. The polymer was dried under reduced pressure to prepare 31 mg of a polyhydroxyalkanoate.

NMR analysis was performed in the same manner as in Preparation Example A-1. The analysis confirmed that the polyhydroxyalkanoate was a copolymer in which a C unit accounted for 8 mol % of the unit of the polyhydroxyalkanoate represented by the chemical formula (25) and a D unit accounted for 92 mol % thereof.

Preparation Example A-3

Condensation reaction between polyhydroxyalkanoate composed of unit represented by chemical formula (25) synthesized in Preparation Example A-2 and 2-aminobenzenesulfonic acid (25)

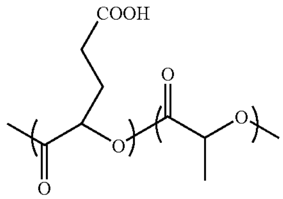

C D

Under a nitrogen atmosphere, 0.40 g of the polyhydroxyalkanoate copolymer composed of the unit represented by the chemical formula (25) synthesized in Preparation Example A-2 (C: 8 mol %, D: 92 mol %) and 0.36 g of 2-aminobenzenesulfonic acid were placed in a 100-ml three-necked flask. 15.0 ml of pyridine were added to the flask, and the mixture was stirred. After that, 1.09 ml of triphenyl phosphite were added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.32 g of a polymer.

The structure of the resultant polymer was determined through analysis according to $^{1}$H-NMR (FT-NMR: Bruker DPX 400; resonance frequency: 400 MHz; measured nuclear species: $^{1}$H; solvent used: heavy DMSO; measurement temperature: room temperature) or Fourier transformation-infrared absorption (FT-IR) spectrum (Nicolet AVATAR 360FT-IR). As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (26) as a monomer unit because a peak derived from an aromatic ring of the 2-aminobenzenesulfonic acid structure shifted.

(26)

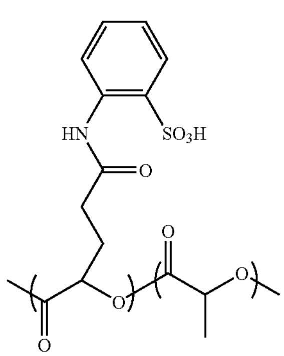

E F

It was also confirmed that the polyhydroxyalkanoate was a copolymer in which an E unit accounted for 8 mol % of the unit of the polyhydroxyalkanoate represented by the chemical formula (26) and an F unit accounted for 92 mol % thereof.

The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), in terms of polystyrene). As a result, the resultant polymer was found to have a number average molecular weight Mn of 11,300 and a weight average molecular weight Mw of 16,000.

Preparation Example A-4

Esterification reaction of polyhydroxyalkanoate composed of unit represented by chemical formula (26) synthesized in Preparation Example A-3

(26)

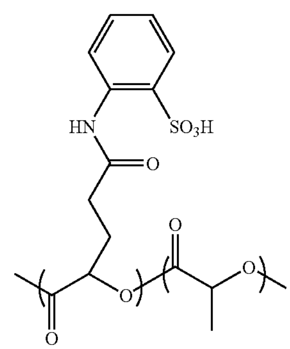

E F 0.30 g of the polyhydroxyalkanoate copolymer composed of the unit represented by the chemical formula (26) synthesized in Preparation Example A-3 (E: 8 mol %, F: 92 mol %) was added to a round-bottomed flask. Then, 21.0 ml of chloroform and 7.0 ml of methanol were added to dissolve the polymer, and the solution was cooled to 0° C. 1.35 ml of a 2-mol/L trimethylsilyldiazomethane-hexane solution (manufactured by Aldrich) were added to the solution, and the whole was stirred for 4 hours. After the completion of the reaction, the solvent was distilled off by using an evaporator, and then the polymer was collected. Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer.

The structure of the resultant polymer was determined through analysis according to $^{1}$H-NMR (FT-NMR: Bruker DPX 400; resonance frequency: 400 MHz; measured nuclear species: $^{1}$H; solvent used: heavy DMSO; measurement temperature: room temperature). $^{1}$H-NMR confirmed that the resultant polymer was a polyhydroxyalkanoate containing a unit represented by the following chemical formula (27) as a monomer unit because a peak derived from methyl sulfonate was observed at 3 to 4 ppm.

(27)

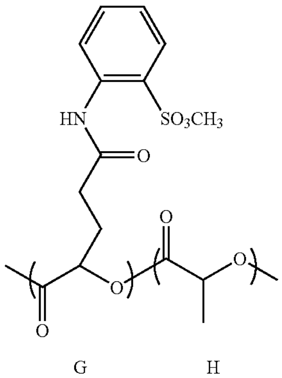

It was also confirmed that the polyhydroxyalkanoate was a copolymer in which a G unit accounted for 8 mol % of the unit of the polyhydroxyalkanoate represented by the chemical formula (27) and an H unit accounted for 92 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 10,900 and a weight average molecular weight Mw of 15,600. The series of preparation method was upscaled to produce the polyhydroxyalkanoate represented by the chemical formula (27) in a large amount. The compound was provided as Exemplified Compound A.

Preparation Example B-1

Synthesis of Polyester Using 3,6-di(6-heptenyl)-1,4-dioxane-2,5-dione and L-lactide 0.15 g (0.5 mmol) of 3,6-di(6-heptenyl)-1,4-dioxane-2,5-dione, 0.65 g (4.5 mmol) of L-lactide, 2 ml of a solution of 0.01 M of tin octylate(tin 2-ethylhexanoate) in toluene, and 2 ml of a solution of 0.01 M of p-tert-butylbenzyl alcohol in toluene were placed in a polymerization ampule. After that, 0.64 g of a polymer was prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (28) as a monomer unit. The analysis also confirmed that an A unit accounted for 7 mol % of the monomer unit and a B unit accounted for 93 mol % thereof.

(28)

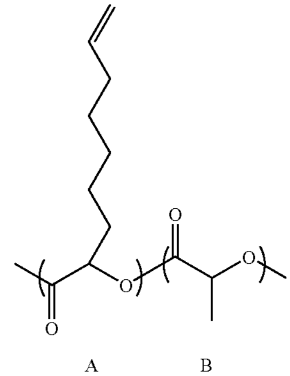

The resultant polyhydroxyalkanoate was evaluated for average molecular weight in the same manner as in Preparation Example A-1. As a result, the resultant polyhydroxyalkanoate was found to have a number average molecular weight Mn of 15,700 and a weight average molecular weight Mw of 21,800.

Preparation Example B-2

Oxidation reaction of polyhydroxyalkanoate composed of unit represented by chemical formula (28) synthesized in Preparation Example B-1

(28)

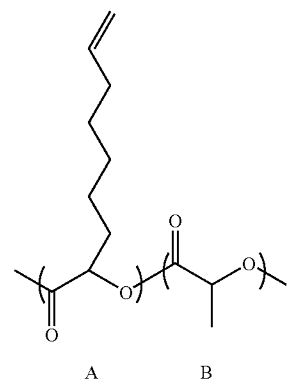

0.50 g of the polyhydroxyalkanoate copolymer composed of the unit represented by the chemical formula (28) synthesized in Preparation Example B-1 (A: 7 mol %, B: 93 mol %) was placed in a round-bottomed flask, and 30 ml of acetone were added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.42 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (29) as a monomer unit.

(29)

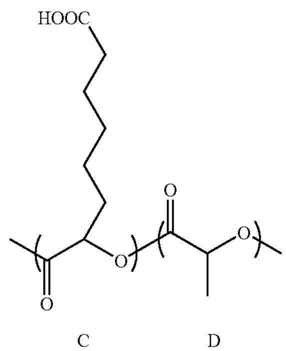

The resultant polyhydroxyalkanoate was evaluated for average molecular weight in the same manner as in Preparation Example A-1. As a result, the resultant polyhydroxyalkanoate was found to have a number average molecular weight Mn of 11,400 and a weight average molecular weight Mw of 16,300.

Furthermore, in order to calculate the unit of the resultant polyhydroxyalkanoate, 30 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 7 mol % of the unit of the polyhydroxyalkanoate represented by the chemical formula (29) and a D unit accounted for 93 mol % thereof.

Preparation Example B-3

Condensation reaction between polyhydroxyalkanoate composed of unit represented by chemical formula (29) synthesized in Preparation Example B-2 and 2-aminobenzenesulfonic acid (29)

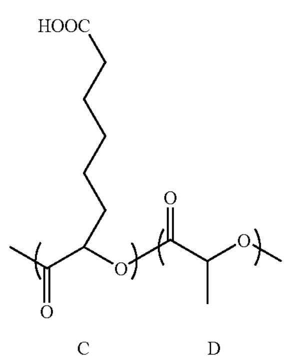

Under a nitrogen atmosphere, 0.40 g of the polyhydroxyalkanoate copolymer composed of the unit represented by the chemical formula (29) synthesized in Preparation Example B-2 (C: 7 mol %, D: 93 mol %) and 0.31 g of 2-aminobenzenesulfonic acid were placed in a 100-ml three-necked flask. 15.0 ml of pyridine were added to the flask, and the mixture was stirred. After that, 0.92 ml of triphenyl phosphite was added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (30) as a monomer unit because a peak derived from an aromatic ring of the 2-aminobenzenesulfonic acid structure shifted.

(30)

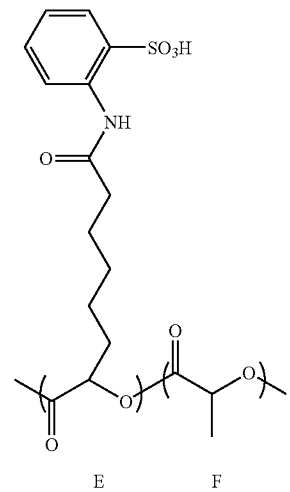

It was also confirmed that the polyhydroxyalkanoate was a copolymer in which an E unit accounted for 7 mol % of the unit of the polyhydroxyalkanoate represented by the chemical formula (30) and an F unit accounted for 93 mol % thereof.

The resultant polymer was evaluated for average molecular weight in the same manner as in Preparation Example A-3. As a result, the resultant polymer was found to have a number average molecular weight Mn of 9,900 and a weight average molecular weight Mw of 14,400. The series of preparation method was upscaled to produce the polyhydroxyalkanoate represented by the chemical formula (30) in a large amount. The compound was provided as Exemplified Compound B.

Preparation Example C-1

Synthesis of Polyester Using 3,6-di(2-propenyl)-1,4-dioxane-2,5-dione and L-lactide 0.98 g (5.0 mmol) of 3,6-di(2-propenyl)-1,4-dioxane-2,5-dione, 6.49 g (45.0 mmol) of L-lactide, 20 ml of a solution of 0.01 M of tin octylate(tin 2-ethylhexanoate) in toluene, and 20 ml of a solution of 0.01 M of p-tert-butylbenzyl alcohol in toluene were placed in a polymerization ampule. After that, 6.55 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (31) as a monomer unit. The analysis also confirmed that an A unit accounted for 9 mol % of the monomer unit and a B unit accounted for 91 mol % thereof.

(31)

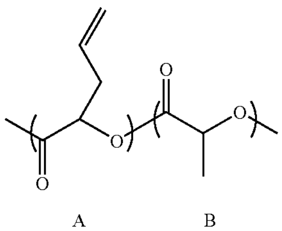

The resultant polyhydroxyalkanoate was evaluated for average molecular weight in the same manner as in Preparation Example A-1. As a result, the resultant polyhydroxyalkanoate was found to have a number average molecular weight Mn of 17,400 and a weight average molecular weight Mw of 23,300.

Preparation Example C-2

Oxidation reaction of polyhydroxyalkanoate composed of unit represented by chemical formula (31) synthesized in Preparation Example C-1

(31)

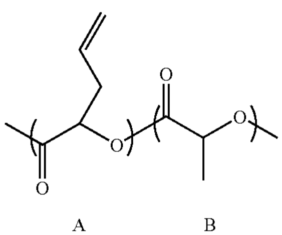

6.00 g of the polyhydroxyalkanoate copolymer composed of the unit represented by the chemical formula (31) synthesized in Preparation Example C-1 (A: 9 mol %, B: 91 mol %) were placed in a round-bottomed flask, and 360 ml of acetone were added to dissolve this. The flask was placed in an ice bath, 60 ml of acetic acid and 5.75 g of 18-crown-6-ether were added, and the whole was stirred. Next, 4.59 g of potassium permanganate were gradually added to the flask in the ice bath, and the whole was stirred in the ice bath for 2 hours and stirred at room temperature for an additional 18 hours. After the completion of the reaction, 5.30 g of a polymer were prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (32) as a monomer unit.

(32)

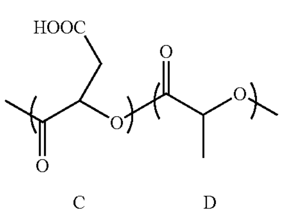

The resultant polyhydroxyalkanoate was evaluated for average molecular weight in the same manner as in Preparation Example A-1. As a result, the resultant polyhydroxyalkanoate was found to have a number average molecular weight Mn of 13,200 and a weight average molecular weight Mw of 18,300.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 8 mol % of the unit of the polyhydroxyalkanoate represented by the chemical formula (32) and a D unit accounted for 92 mol % thereof.

Preparation Example C-3

Condensation reaction between polyhydroxyalkanoate composed of unit represented by chemical formula (32) synthesized in Preparation Example C-2 and p-toluidine-2-sulfonic acid (32)

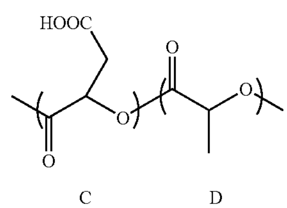

Under a nitrogen atmosphere, 0.40 g of the polyhydroxyalkanoate copolymer composed of the unit represented by the chemical formula (32) synthesized in Preparation Example C-2 (C: 8 mol %, D: 92 mol %) and 0.39 g of p-toluidine-2-sulfonic acid were placed in a 100-ml three-necked flask. 15.0 ml of pyridine were added to the flask, and the mixture was stirred. After that, 1.10 ml of triphenyl phosphite were added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (33) as a monomer unit because a peak derived from an aromatic ring of the p-toluidine-2-sulfonic acid structure shifted.

(33)

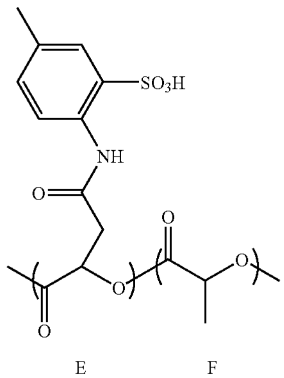

It was also confirmed that the polyhydroxyalkanoate was a copolymer in which an E unit accounted for 8 mol % of the unit of the polyhydroxyalkanoate represented by the chemical formula (33) and an F unit accounted for 92 mol % thereof.

The resultant polymer was evaluated for average molecular weight in the same manner as in Preparation Example A-3. As a result, the resultant polymer was found to have a number average molecular weight Mn of 11,000 and a weight average molecular weight Mw of 15,700.

Preparation Example C-4

Condensation reaction between polyhydroxyalkanoate composed of unit represented by chemical formula (32) synthesized in Preparation Example C-2 and 4-aminobenzenesulfonic acid (32)

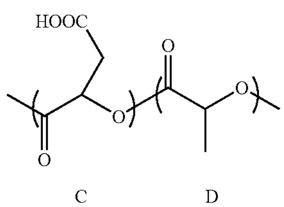

Under a nitrogen atmosphere, 0.40 g of the polyhydroxyalkanoate copolymer composed of the unit represented by the chemical formula (32) synthesized in Preparation Example C-2 (C: 8 mol %, D: 92 mol %) and 0.37 g of 4-aminobenzenesulfonic acid were placed in a 100-ml three-necked flask. 15.0 ml of pyridine were added to the flask, and the mixture was stirred. After that, 1.10 ml of triphenyl phosphite were added, and the whole was heated at 120° C. for 6 hours. After the completion of the reaction, 0.31 g of a polymer was prepared in the same manner as in Preparation Example A-3.

The structure of the resultant polymer was determined through analysis in the same manner as in Preparation Example A-3. As a result of IR measurement, a peak at 1,695 cm$^{1}$ derived from a carboxylic acid reduced, and a peak derived from an amide group was newly observed at 1,658 cm$^{-1}$.

$^{1}$H-NMR confirmed that the resultant polymer was a polyhydroxyalkanoate containing a unit represented by the following chemical formula (34) as a monomer unit because a peak derived from an aromatic ring of the 4-aminobenzenesulfonic acid structure shifted.

(34)

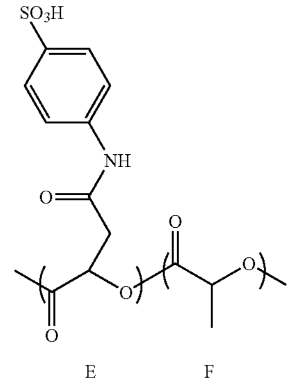

It was also confirmed that the polyhydroxyalkanoate was a copolymer in which an E unit accounted for 8 mol % of the unit of the polyhydroxyalkanoate represented by the chemical formula (34) and an F unit accounted for 92 mol % thereof.

The resultant polymer was evaluated for average molecular weight in the same manner as in Preparation Example A-3. As a result, the resultant polymer was found to have a number average molecular weight Mn of 10,700 and a weight average molecular weight Mw of 15,700. The series of preparation method was upscaled to produce the polyhydroxyalkanoate represented by the chemical formula (34) in a large amount. The compound was provided as Exemplified Compound C-4.

Preparation Example C-5

Condensation reaction between polyhydroxyalkanoate composed of unit represented by chemical formula (32) synthesized in Preparation Example C-2 and phenyl 4-aminobenzene sulfonate (32)

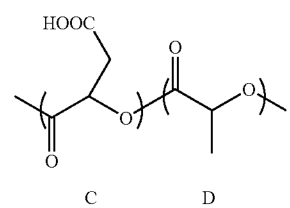

Under a nitrogen atmosphere, 0.40 g of the polyhydroxyalkanoate copolymer composed of the unit represented by the chemical formula (32) synthesized in Preparation Example C-2 (C: 8 mol %, D: 92 mol %) and 0.53 g of phenyl 4-aminobenzene sulfonate were placed in a 100-ml three-necked flask. 15.0 ml of pyridine were added to the flask, and the mixture was stirred. After that, 1.10 ml of triphenyl phosphite were added, and the whole was heated at 120° C. for 6 hours. After the completion of the reaction, 0.35 g of a polymer was prepared in the same manner as in Preparation Example A-3.

The structure of the resultant polymer was determined through analysis in the same manner as in Preparation Example A-3. As a result of IR measurement, a peak at 1,695 cm$^{-1}$ derived from a carboxylic acid reduced, and a peak derived from an amide group was newly observed at 1,658 cm$^{-1}$.

$^{1}$H-NMR confirmed that the resultant polymer was a polyhydroxyalkanoate containing a unit represented by the following chemical formula (35) as a monomer unit because a peak derived from an aromatic ring of the phenyl 4-aminobenzene sulfonate structure shifted.

(35)

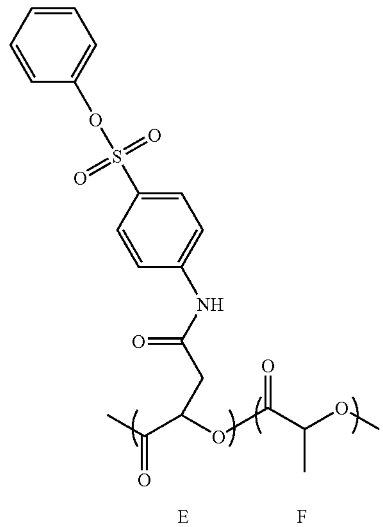

It was also confirmed that the polyhydroxyalkanoate was a copolymer in which an E unit accounted for 8 mol % of the unit of the polyhydroxyalkanoate represented by the chemical formula (35) and an F unit accounted for 92 mol % thereof.

The resultant polymer was evaluated for average molecular weight in the same manner as in Preparation Example A-3. As a result, the resultant polymer was found to have a number average molecular weight Mn of 11,500 and a weight average molecular weight Mw of 17,100. The series of preparation method was upscaled to produce the polyhydroxyalkanoate represented by the chemical formula (35) in a large amount. The compound was provided as Exemplified Compound C-5.

Preparation Example C-6

Condensation reaction between polyhydroxyalkanoate composed of unit represented by chemical formula (32) synthesized in Preparation Example C-2 and 2-amino-1-naphthalenesulfonic acid (32)

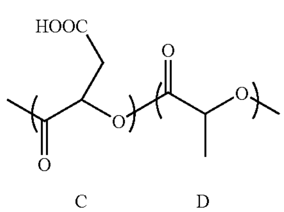

Under a nitrogen atmosphere, 0.40 g of the polyhydroxyalkanoate copolymer composed of the unit represented by the chemical formula (32) synthesized in Preparation Example C-2 (C: 8 mol %, D: 92 mol %) and 0.47 g of 2-amino-1-naphthalenesulfonic acid were placed in a 100-ml three-necked flask. 15.0 ml of pyridine were added to the flask, and the mixture was stirred. After that, 1.10 ml of triphenyl phosphite were added, and the whole was heated at 120° C. for 6 hours. After the completion of the reaction, 0.37 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (36) as a monomer unit because a peak derived from an aromatic ring of the 2-amino-1-naphthalenesulfonic acid structure shifted.

(36)

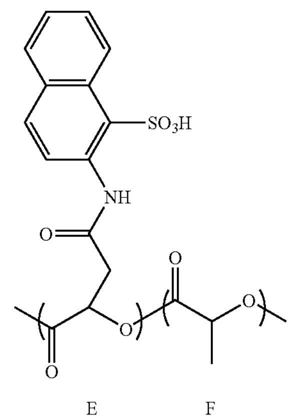

It was also confirmed that the polyhydroxyalkanoate was a copolymer in which an E unit accounted for 8 mol % of the unit of the polyhydroxyalkanoate represented by the chemical formula (36) and an F unit accounted for 92 mol % thereof.

The resultant polymer was evaluated for average molecular weight in the same manner as in Preparation Example A-3. As a result, the resultant polymer was found to have a number average molecular weight Mn of 11,000 and a weight average molecular weight Mw of 16,600.

Preparation Example C-7

Condensation reaction between polyhydroxyalkanoate composed of unit represented by chemical formula (32) synthesized in Preparation Example C-2 and 2-amino-2-methylpropanesulfonic acid (32)

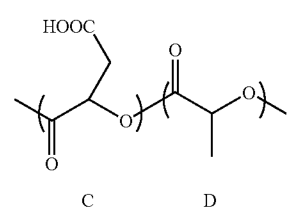

Under a nitrogen atmosphere, 0.40 g of the polyhydroxyalkanoate copolymer composed of the unit represented by the chemical formula (32) synthesized in Preparation Example C-2 (C: 8 mol %, D: 92 mol %) and 0.32 g of 2-amino-2-methylpropanesulfonic acid were placed in a 100-ml three-necked flask. 15.0 ml of pyridine were added to the flask, and the mixture was stirred. After that, 1.10 ml of triphenyl phosphite were added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,668 $cm^{-1}$.

$^{1}$H-NMR confirmed that the resultant polymer was a polyhydroxyalkanoate containing a unit represented by the following chemical formula (37) as a monomer unit because a peak derived from methylene of the 2-amino-2-methylpropanesulfonic acid structure shifted.

(37)

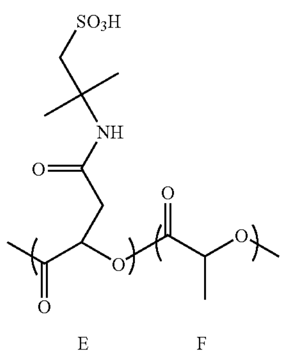

It was also confirmed that the polyhydroxyalkanoate was a copolymer in which an E unit accounted for 8 mol % of the unit of the polyhydroxyalkanoate represented by the chemical formula (37) and an F unit accounted for 92 mol % thereof.

The resultant polymer was evaluated for average molecular weight in the same manner as in Preparation Example A-3. As a result, the resultant polymer was found to have a number average molecular weight Mn of 10,300 and a weight average molecular weight Mw of 14,700.

Preparation Example C-8

Esterification reaction of polyhydroxyalkanoate composed of unit represented by chemical formula (33) synthesized in Preparation Example C-3

(33)

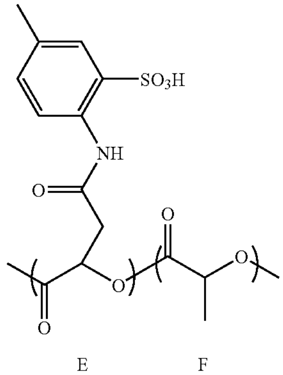

0.30 g of the polyhydroxyalkanoate copolymer composed of the unit represented by the chemical formula (33) synthesized in Preparation Example C-3 (E: 8 mol %, F: 92 mol %) was added to a round-bottomed flask. Then, 21.0 ml of chloroform and 7.0 ml of methanol were added to dissolve the polymer, and the solution was cooled to 0° C. 1.35 ml of a 2-mol/L trimethylsilyldiazomethane-hexane solution (manufactured by Aldrich) were added to the solution, and the whole was stirred for 4 hours. After the completion of the reaction, 0.30 g of a polymer was prepared in the same manner as in Preparation Example A-4.

The structure of the resultant polymer was determined through analysis in the same manner as in Preparation Example A-4. $^{1}$H-NMR confirmed that the resultant polymer was a polyhydroxyalkanoate containing a unit represented by the following chemical formula (38) as a monomer unit because a peak derived from methyl sulfonate was observed at 3 to 4 ppm.

(38)

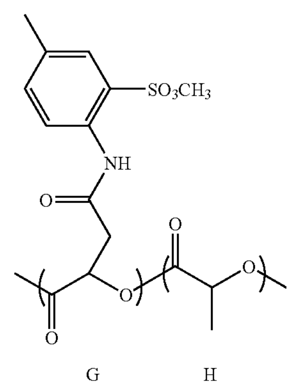

It was also confirmed that the polyhydroxyalkanoate was a copolymer in which a G unit accounted for 8 mol % of the unit of the polyhydroxyalkanoate represented by the chemical formula (38) and an H unit accounted for 92 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 10,500 and a weight average molecular weight Mw of 15,500. The series of preparation method was upscaled to produce the polyhydroxyalkanoate represented by the chemical formula (38) in a large amount. The compound was provided as Exemplified Compound C-8.

Preparation Example C-9

Esterification reaction of polyhydroxyalkanoate composed of unit represented by chemical formula (36) synthesized in Preparation Example C-6

(36)

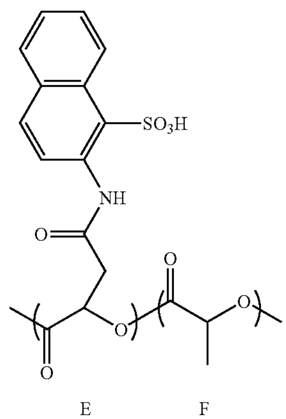

0.30 g of the polyhydroxyalkanoate copolymer composed of the unit represented by the chemical formula (36) synthesized in Preparation Example C-6 (E: 8 mol %, F: 92 mol %) was added to a round-bottomed flask. Then, 21.0 ml of chloroform and 7.0 ml of methanol were added to dissolve the polymer, and the solution was cooled to 0° C. 1.30 ml of a 2-mol/L trimethylsilyldiazomethane-hexane solution (manufactured by Aldrich) were added to the solution, and the whole was stirred for 4 hours. After the completion of the reaction, 0.30 g of a polymer was prepared in the same manner as in Preparation Example A-4.

The structure of the resultant polymer was determined through analysis in the same manner as in Preparation Example A-4. $^1$H-NMR confirmed that the resultant polymer was a polyhydroxyalkanoate containing a unit represented by the following chemical formula (39) as a monomer unit because a peak derived from methyl sulfonate was observed at 3 to 4 ppm.

(39)

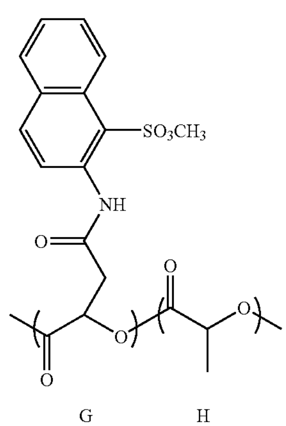

It was also confirmed that the polyhydroxyalkanoate was a copolymer in which a G unit accounted for 8 mol % of the unit of the polyhydroxyalkanoate represented by the chemical formula (39) and an H unit accounted for 92 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 10,900 and a weight average molecular weight Mw of 17,200. The series of preparation method was upscaled to produce the polyhydroxyalkanoate represented by the chemical formula (39) in a large amount. The compound was provided as Exemplified Compound C-9.

Preparation Example C-10

Esterification reaction of polyhydroxyalkanoate composed of unit represented by chemical formula (37) synthesized in Preparation Example C-7

(37)

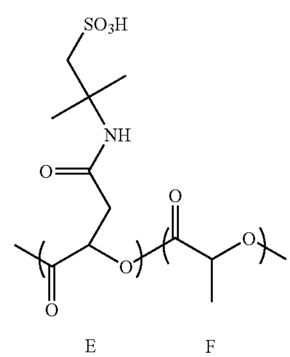

0.30 g of the polyhydroxyalkanoate copolymer composed of the unit represented by the chemical formula (37) synthesized in Preparation Example C-7 (E: 8 mol %, F: 92 mol %) was added to a round-bottomed flask. Then, 21.0 ml of chloroform and 7.0 ml of methanol were added to dissolve the polymer, and the solution was cooled to 0° C. 1.39 ml of a 2-mol/L trimethylsilyldiazomethane-hexane solution (manufactured by Aldrich) were added to the solution, and the whole was stirred for 4 hours. After the completion of the reaction, 0.31 g of a polymer was prepared in the same manner as in Preparation Example A-4.

The structure of the resultant polymer was determined through analysis in the same manner as in Preparation Example A-4. $^1$H-NMR confirmed that the resultant polymer was a polyhydroxyalkanoate containing a unit represented by the following chemical formula (40) as a monomer unit because a peak derived from methyl sulfonate was observed at 3 to 4 ppm.

(40)

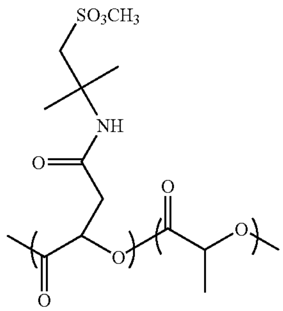

G H

It was also confirmed that the polyhydroxyalkanoate was a copolymer in which a G unit accounted for 8 mol % of the unit of the polyhydroxyalkanoate represented by the chemical formula (40) and an H unit accounted for 92 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 9,900 and a weight average molecular weight Mw of 14,500. The series of preparation method was upscaled to produce the polyhydroxyalkanoate represented by the chemical formula (40) in a large amount. The compound was provided as Exemplified Compound C-10.

Preparation Example D-1

Synthesis of Polyester Using 3,6-di(2-propenyl)-1,4-dioxane-2,5-dione and mandelide(3,6-diphenyl-1,4-dioxane-2,5-dione)

0.10 g (0.5 mmol) of 3,6-di(2-propenyl)-1,4-dioxane-2,5-dione, 1.21 g (4.5 mmol) of mandelide, 2 ml of a solution of 0.01 M of tin octylate(tin 2-ethylhexanoate) in toluene, and 2 ml of a solution of 0.01 M of p-tert-butylbenzyl alcohol in toluene were placed in a polymerization ampule. After that, 1.05 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (41) as a monomer unit. The analysis also confirmed that an A unit accounted for 8 mol % of the monomer unit and a B unit accounted for 92 mol % thereof.

(41)

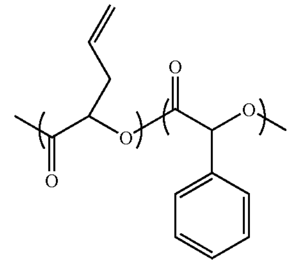

A B

The resultant polyhydroxyalkanoate was evaluated for average molecular weight in the same manner as in Preparation Example A-1. As a result, the resultant polyhydroxyalkanoate was found to have a number average molecular weight Mn of 17,000 and a weight average molecular weight Mw of 31,500.

Preparation Example D-2

Oxidation reaction of polyhydroxyalkanoate composed of unit represented by chemical formula (41) synthesized in Preparation Example D-1

(41)

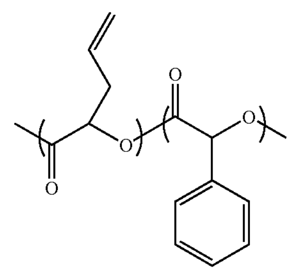

A B 0.50 g of the polyhydroxyalkanoate copolymer composed of the unit represented by the chemical formula (41) synthesized in Preparation Example D-1 (A: 8 mol %, B: 92 mol %) was placed in a round-bottomed flask, and 30 ml of acetone were added to dissolve this. The flask was placed in an ice bath, 5 ml of acetic acid and 0.24 g of 18-crown-6-ether were added, and the whole was stirred. Next, 0.19 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (42) as a monomer unit.

(42)

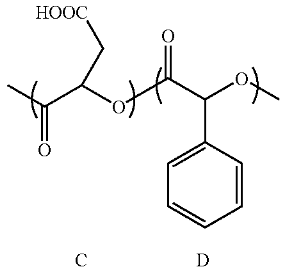

The resultant polyhydroxyalkanoate was evaluated for average molecular weight in the same manner as in Preparation Example A-1. As a result, the resultant polyhydroxyalkanoate was found to have a number average molecular weight Mn of 12,500 and a weight average molecular weight Mw of 24,300.

Furthermore, in order to calculate the unit of the resultant polyhydroxyalkanoate, 29 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 7 mol % of the unit of the polyhydroxyalkanoate represented by the chemical formula (42) and a D unit accounted for 93 mol % thereof.

Preparation Example D-3

Condensation reaction between polyhydroxyalkanoate composed of unit represented by chemical formula (42) synthesized in Preparation Example D-2 and 2-aminobenzenesulfonic acid (42)

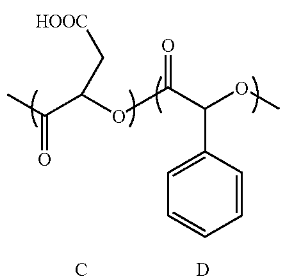

Under a nitrogen atmosphere, 0.40 g of the polyhydroxyalkanoate copolymer composed of the unit represented by the chemical formula (42) synthesized in Preparation Example D-2 (C: 7 mol %, D: 93 mol %) and 0.18 g of 2-aminobenzenesulfonic acid were placed in a 100-ml three-necked flask. 15.0 ml of pyridine were added to the flask, and the mixture was stirred. After that, 0.55 ml of triphenyl phosphite was added, and the whole was heated at 120° C. for 6 hours. After the completion of the reaction, 0.34 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (43) as a monomer unit because a peak derived from an aromatic ring of the 2-aminobenzenesulfonic acid structure shifted.

(43)

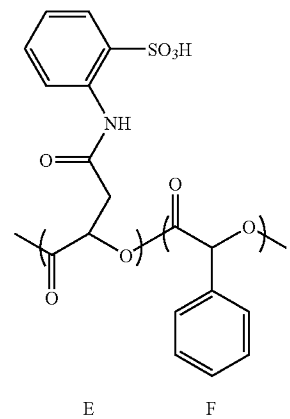

It was also confirmed that the polyhydroxyalkanoate was a copolymer in which an E unit accounted for 7 mol % of the unit of the polyhydroxyalkanoate represented by the chemical formula (43) and an F unit accounted for 93 mol % thereof.

The resultant polymer was evaluated for average molecular weight in the same manner as in Preparation Example A-3. As a result, the resultant polymer was found to have a number average molecular weight Mn of 11,400 and a weight average molecular weight Mw of 23,100.

Preparation Example D-4

Esterification reaction of polyhydroxyalkanoate composed of unit represented by chemical formula (43) synthesized in Preparation Example D-3

(43)

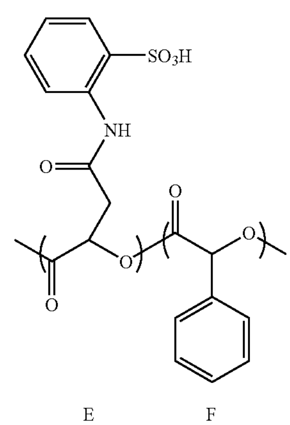

0.30 g of the polyhydroxyalkanoate copolymer composed of the unit represented by the chemical formula (43) synthesized in Preparation Example D-3 (E: 7 mol %, F: 93 mol %) was added to a round-bottomed flask. Then, 21.0 ml of chloroform and 7.0 ml of methanol were added to dissolve the polymer, and the solution was cooled to 0° C. 0.73 ml of a 2-mol/L trimethylsilyldiazomethane-hexane solution (manufactured by Aldrich) was added to the solution, and the whole was stirred for 4 hours. After the completion of the reaction, 0.30 g of a polymer was prepared in the same manner as in Preparation Example A-4.

The structure of the resultant polymer was determined through analysis in the same manner as in Preparation Example A-4. $^1$H-NMR confirmed that the resultant polymer was a polyhydroxyalkanoate containing a unit represented by the following chemical formula (44) as a monomer unit because a peak derived from methyl sulfonate was observed at 3 to 4 ppm.

(44)

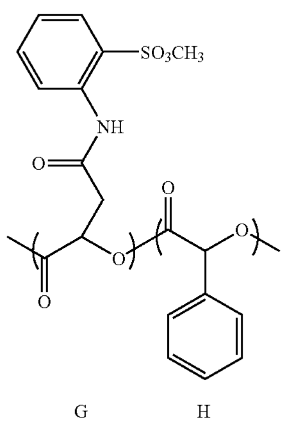

It was also confirmed that the polyhydroxyalkanoate was a copolymer in which a G unit accounted for 7 mol % of the unit of the polyhydroxyalkanoate represented by the chemical formula (44) and an H unit accounted for 93 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 11,200 and a weight average molecular weight Mw of 23,000. The series of preparation method was upscaled to produce the polyhydroxyalkanoate represented by the chemical formula (44) in a large amount. The compound was provided as Exemplified Compound D.

Preparation Example E-1

Synthesis of Polyester Using tetrahydro-6-(2-propenyl)-2H-pyrane-2-one and L-lactide 0.28 g (2.0 mmol) of tetrahydro-6-(2-propenyl)-2H-pyrane-2-one, 1.15 g (8.0 mmol) of L-lactide, 20 µl of a solution of 2 M of di-iso-propyl zinc in toluene, and 8 ml of a solution of 0.01 M of p-tert-butylbenzyl alcohol in toluene were placed in a polymerization ampule. After that, 1.06 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (45) as a monomer unit. The analysis also confirmed that an A unit accounted for 11 mol % of the monomer unit and a B unit accounted for 89 mol % thereof.

(45)

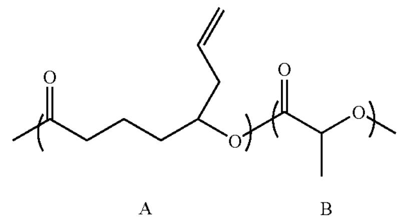

The resultant polyhydroxyalkanoate was evaluated for average molecular weight in the same manner as in Preparation Example A-1. As a result, the resultant polyhydroxyalkanoate was found to have a number average molecular weight Mn of 142,500 and a weight average molecular weight Mw of 233,700.

Preparation Example E-2

Oxidation reaction of polyhydroxyalkanoate composed of unit represented by chemical formula (45) synthesized in Preparation Example E-1

(45)

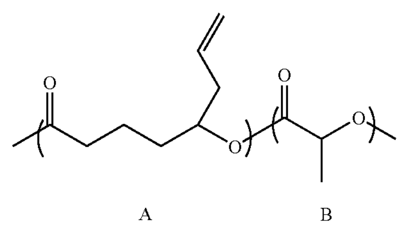

0.50 g of the polyhydroxyalkanoate copolymer composed of the unit represented by the chemical formula (45) synthesized in Preparation Example E-1 (A: 11 mol %, B: 89 mol %) was placed in a round-bottomed flask, and 30 ml of acetone were added to dissolve this. The flask was placed in an ice bath, 5 ml of acetic acid and 0.55 g of 18-crown-6-ether were added, and the whole was stirred. Next, 0.44 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (46) as a monomer unit.

(46)

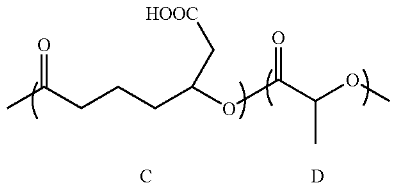

The resultant polyhydroxyalkanoate was evaluated for average molecular weight in the same manner as in Preparation Example A-1. As a result, the resultant polyhydroxyalkanoate was found to have a number average molecular weight Mn of 98,500 and a weight average molecular weight Mw of 166,400.

Furthermore, in order to calculate the unit of the resultant polyhydroxyalkanoate, 29 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 10 mol % of the unit of the polyhydroxyalkanoate represented by the chemical formula (46) and a D unit accounted for 90 mol % thereof. The series of preparation method was upscaled to produce the polyhydroxyalkanoate represented by the chemical formula (46) in a large amount. The compound was provided as Exemplified Compound E.

Preparation Example F-1

Synthesis of Polyester Using tetrahydro-6-(2-propenyl)-2H-pyrane-2-one and mandelide 0.28 g (2.0 mmol) of tetrahydro-6-(2-propenyl)-2H-pyrane-2-one, 2.15 g (8.0 mmol) of mandelide, 20 μl of a solution of 2 M of di-iso-propyl zinc in toluene, and 8 ml of a solution of 0.01 M of p-tert-butylbenzyl alcohol in toluene were placed in a polymerization ampule. After that, 1.59 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (47) as a monomer unit. The analysis also confirmed that an A unit accounted for 12 mol % of the monomer unit and a B unit accounted for 88 mol % thereof.

(47)

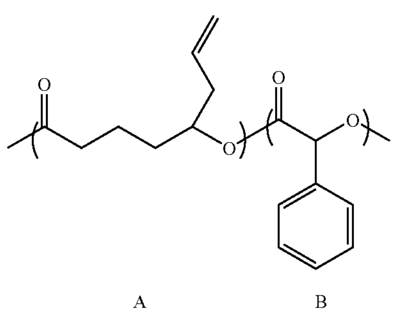

The resultant polyhydroxyalkanoate was evaluated for average molecular weight in the same manner as in Preparation Example A-1. As a result, the resultant polyhydroxyalkanoate was found to have a number average molecular weight Mn of 12,000 and a weight average molecular weight Mw of 24,200.

Preparation Example F-2

Oxidation reaction of polyhydroxyalkanoate composed of unit represented by chemical formula (47) synthesized in Preparation Example F-1

(47)

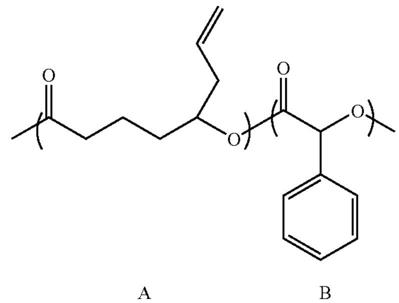

0.50 g of the polyhydroxyalkanoate copolymer composed of the unit represented by the chemical formula (47) synthesized in Preparation Example F-1 (A: 12 mol %, B: 88 mol %) was placed in a round-bottomed flask, and 30 ml of acetone were added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (48) as a monomer unit.

(48)

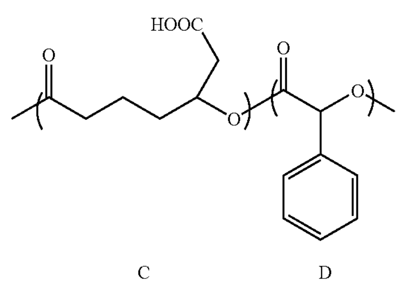

The resultant polyhydroxyalkanoate was evaluated for average molecular weight in the same manner as in Preparation Example A-1. As a result, the resultant polyhydroxyalkanoate was found to have a number average molecular weight Mn of 8,400 and a weight average molecular weight Mw of 16,300.

Furthermore, in order to calculate the unit of the resultant polyhydroxyalkanoate, 30 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 11 mol % of the unit of the polyhydroxyalkanoate represented by the chemical formula (48) and a D unit accounted for 89 mol % thereof. The series of preparation method was upscaled to produce the polyhydroxyalkanoate represented by the chemical formula (48) in a large amount. The compound was provided as Exemplified Compound F.

Preparation Example G-1

Synthesis of Polyester Using β-malolactone benzyl ester and L-mandelide 0.82 g (4.0 mmol) of β-malolactone benzyl ester, 2.68 g (10.0 mmol) of mandelide, 28 μl of a solution of 2 M of diethylzinc in toluene, and 11.2 ml of a solution of 0.01 M of p-tert-butylbenzyl alcohol in toluene were placed in a polymerization ampule. After that, 1.27 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (49) as a monomer unit. The analysis also confirmed that an A unit accounted for 8 mol % of the monomer unit and a B unit accounted for 92 mol % thereof.

(49)

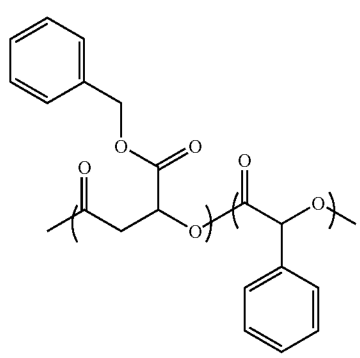

A B

The resultant polyhydroxyalkanoate was evaluated for average molecular weight in the same manner as in Preparation Example A-1. As a result, the resultant polyhydroxyalkanoate was found to have a number average molecular weight Mn of 6,500 and a weight average molecular weight Mw of 11,200.

Preparation Example G-2

1.00 g of the polyhydroxyalkanoate copolymer represented by the chemical formula (49) synthesized in Preparation Example G-1 was dissolved into 100 ml of a mixed solvent of dioxane-ethanol (75:25), and 0.22 g of a 5% palladium/carbon catalyst was added to the solution. The inside of the reaction system was filled with hydrogen, and the whole was stirred at room temperature for 1 day. After the completion of the reaction, 0.81 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (50) as a monomer unit. The analysis also confirmed that a C unit accounted for 8 mol % of the monomer unit and a D unit accounted for 92 mol % thereof.

(50)

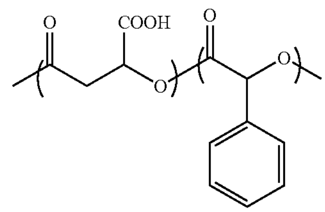

C D

The resultant polyhydroxyalkanoate was evaluated for average molecular weight in the same manner as in Preparation Example A-1. As a result, the resultant polyhydroxyalkanoate was found to have a number average molecular weight Mn of 6,400 and a weight average molecular weight Mw of 10,900.

The series of preparation method was upscaled to produce the polyhydroxyalkanoate represented by the chemical formula (50) in a large amount. The compound was provided as Exemplified Compound G.

Preparation Example H-1

(51)

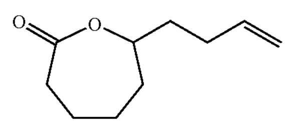

Synthesis of Polyester Using 7-(3-butenyl)-2-oxepanone Represented by Chemical Formula (51) and L-lactide 0.34 g (2.0 mmol) of 7-(3-butenyl)-2-oxepanone, 1.15 g (8.0 mmol) of L-lactide, 20 μl of a solution of 2 M of di-isopropyl zinc in toluene, and 8 ml of a solution of 0.01 M of p-tert-butylbenzyl alcohol in toluene were placed in a polymerization ampule. After that, 1.05 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (52) as a monomer unit. The analysis also confirmed that an A unit accounted for 8 mol % of the monomer unit and a B unit accounted for 92 mol % thereof.

(52)

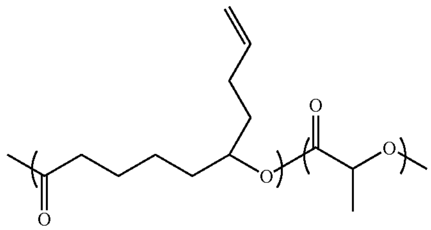

A B

The resultant polyhydroxyalkanoate was evaluated for average molecular weight in the same manner as in Preparation Example A-1. As a result, the resultant polyhydroxyalkanoate was found to have a number average molecular weight Mn of 43,500 and a weight average molecular weight Mw of 67,400.

Preparation Example H-2

Oxidation reaction of polyhydroxyalkanoate composed of unit represented by chemical formula (52) synthesized in Preparation Example H-1

(52)

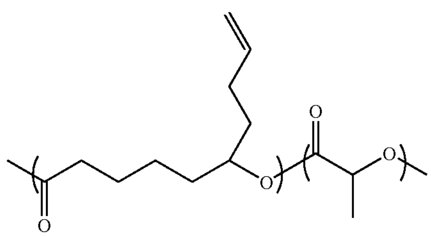

A B 0.50 g of the polyhydroxyalkanoate copolymer composed of the unit represented by the chemical formula (52) synthesized in Preparation Example H-1 (A: 8 mol %, B: 92 mol %) was placed in a round-bottomed flask, and 30 ml of acetone were added to dissolve this. The flask was placed in an ice bath, 5 ml of acetic acid and 0.40 g of 18-crown-6-ether were added, and the whole was stirred. Next, 0.32 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (53) as a monomer unit.

(53)

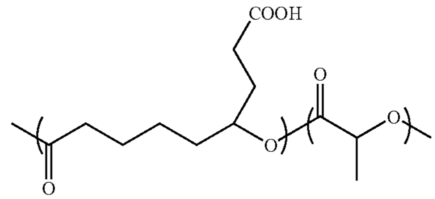

C D

The resultant polyhydroxyalkanoate was evaluated for average molecular weight in the same manner as in Preparation Example A-1. As a result, the resultant polyhydroxyalkanoate was found to have a number average molecular weight Mn of 37,500 and a weight average molecular weight Mw of 59,600.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 8 mol % of the unit of the polyhydroxyalkanoate represented by the chemical formula (53) and a D unit accounted for 92 mol % thereof.

Preparation Example H-3

Condensation reaction between polyhydroxyalkanoate composed of unit represented by chemical formula (53) synthesized in Preparation Example H-2 and 2-amino-2-methylpropanesulfonic acid (53)

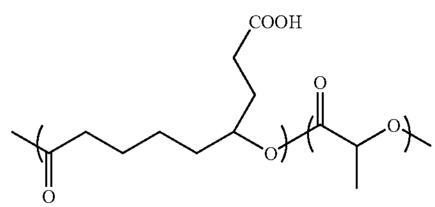

C D

Under a nitrogen atmosphere, 0.40 g of the polyhydroxyalkanoate copolymer composed of the unit represented by the chemical formula (53) synthesized in Preparation Example H-2 (C: 8 mol %, D: 92 mol %) and 0.30 g of 2-amino-2-methylpropanesulfonic acid were placed in a 100-ml three-necked flask. 15.0 ml of pyridine were added to the flask, and the mixture was stirred. After that, 1.03 ml of triphenyl phosphite were added, and the whole was heated at 120° C. for 6 hours. After the completion of the reaction, 0.32 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,668 $cm^{-1}$.

$^{1}$H-NMR confirmed that the resultant polymer was a polyhydroxyalkanoate containing a unit represented by the following chemical formula (54) as a monomer unit because a peak derived from methylene of the 2-amino-2-methylpropanesulfonic acid structure shifted.

(54)

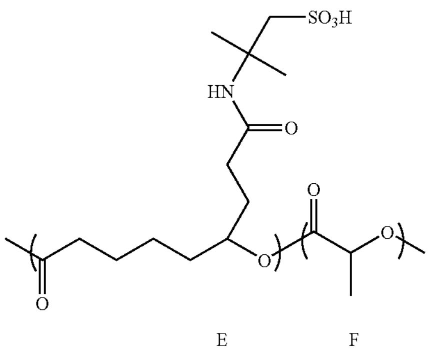

It was also confirmed that the polyhydroxyalkanoate was a copolymer in which an E unit accounted for 8 mol % of the unit of the polyhydroxyalkanoate represented by the chemical formula (54) and an F unit accounted for 92 mol % thereof.

The resultant polymer was evaluated for average molecular weight in the same manner as in Preparation Example A-3. As a result, the resultant polymer was found to have a number average molecular weight Mn of 37,500 and a weight average molecular weight Mw of 59,600. The series of preparation method was upscaled to produce the polyhydroxyalkanoate represented by the chemical formula (54) in a large amount. The compound was provided as Exemplified Compound H.

Preparation Example I-1

Synthesis of Polyester Using 3-(2-propenyl)-2-oxetanone and L-lactide 0.22 g (2.0 mmol) of 3-(2-propenyl)-2-oxetanone, 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.20 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (55) as a monomer unit. The analysis also confirmed that an A unit accounted for 9 mol % of the monomer unit and a B unit accounted for 91 mol % thereof.

(55)

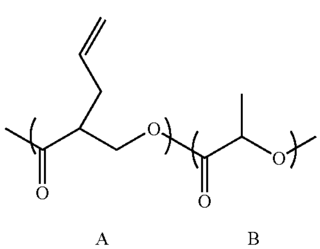

The resultant polyhydroxyalkanoate was evaluated for average molecular weight in the same manner as in Preparation Example A-1. As a result, the resultant polyhydroxyalkanoate was found to have a number average molecular weight Mn of 28,500 and a weight average molecular weight Mw of 38,500.

Preparation Example I-2

Oxidation reaction of polyhydroxyalkanoate composed of unit represented by chemical formula (55) synthesized in Preparation Example I-1

(55)

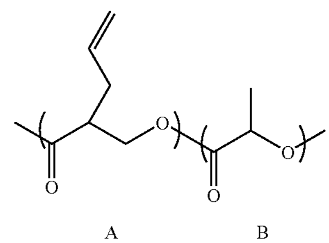

0.50 g of the polyhydroxyalkanoate copolymer composed of the unit represented by the chemical formula (55) synthesized in Preparation Example I-1 (A: 9 mol %, B: 91 mol %) was placed in a round-bottomed flask, and 30 ml of acetone were added to dissolve this. The flask was placed in an ice bath, 5 ml of acetic acid and 0.47 g of 18-crown-6-ether were added, and the whole was stirred. Next, 0.38 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (56) as a monomer unit.

(56)

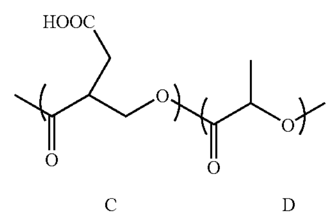

The resultant polyhydroxyalkanoate was evaluated for average molecular weight in the same manner as in Preparation Example A-1. As a result, the resultant polyhydroxyalkanoate was found to have a number average molecular weight Mn of 22,300 and a weight average molecular weight Mw of 30,600.

Furthermore, in order to calculate the unit of the resultant polyhydroxyalkanoate, 29 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 9 mol % of the unit of the polyhydroxyalkanoate represented by the chemical formula (56) and a D unit accounted for 91 mol % thereof.

Preparation Example I-3

Condensation reaction between polyhydroxyalkanoate composed of unit represented by chemical formula (56) synthesized in Preparation Example I-2 and 2-aminobenzenesulfonic acid (56)

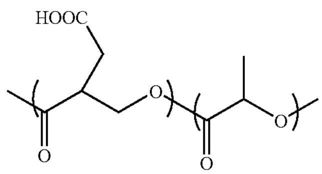

C D

Under a nitrogen atmosphere, 0.40 g of the polyhydroxyalkanoate copolymer composed of the unit represented by the chemical formula (56) synthesized in Preparation Example I-2 (C: 9 mol %, D: 91 mol %) and 0.40 g of 2-aminobenzenesulfonic acid were placed in a 100-ml three-necked flask. 15.0 ml of pyridine were added to the flask, and the mixture was stirred. After that, 1.21 ml of triphenyl phosphite were added, and the whole was heated at 120° C. for 6 hours. After the completion of the reaction, 0.34 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (57) as a monomer unit because a peak derived from an aromatic ring of the 2-aminobenzenesulfonic acid structure shifted.

(57)

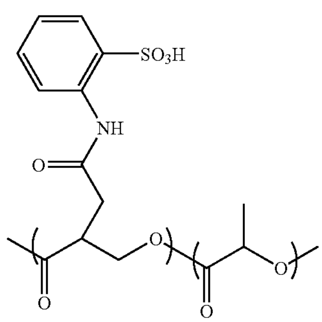

E F

It was also confirmed that the polyhydroxyalkanoate was a copolymer in which an E unit accounted for 9 mol % of the unit of the polyhydroxyalkanoate represented by the chemical formula (57) and an F unit accounted for 91 mol % thereof.

The resultant polymer was evaluated for average molecular weight in the same manner as in Preparation Example A-3. As a result, the resultant polymer was found to have a number average molecular weight Mn of 19,800 and a weight average molecular weight Mw of 28,100.

Preparation Example I-4

Esterification reaction of polyhydroxyalkanoate composed of unit represented by chemical formula (57) synthesized in Preparation Example I-3

(57)

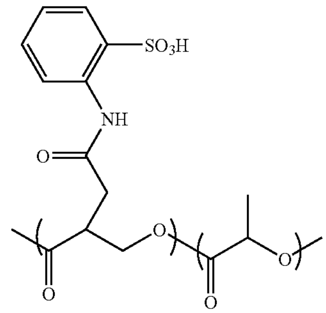

E F 0.30 g of the polyhydroxyalkanoate copolymer composed of the unit represented by the chemical formula (57) synthesized in Preparation Example I-3 (E: 9 mol %, F: 91 mol %) was added to a round-bottomed flask. Then, 21.0 ml of chloroform and 7.0 ml of methanol were added to dissolve the polymer, and the solution was cooled to 0° C. 1.48 ml of a 2-mol/L trimethylsilyldiazomethane-hexane solution (manufactured by Aldrich) were added to the solution, and the whole was stirred for 4 hours. After the completion of the reaction, 0.30 g of a polymer was prepared in the same manner as in Preparation Example A-4.

The structure of the resultant polymer was determined through analysis in the same manner as in Preparation Example A-4. $^{1}$H-NMR confirmed that the resultant polymer was a polyhydroxyalkanoate containing a unit represented by the following chemical formula (58) as a monomer unit because a peak derived from methyl sulfonate was observed at 3 to 4 ppm.

(58)

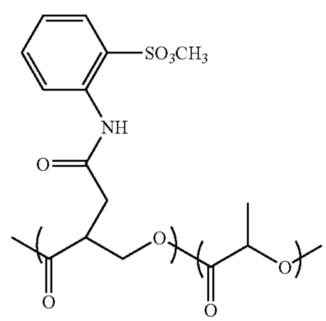

G H

It was also confirmed that the polyhydroxyalkanoate was a copolymer in which a G unit accounted for 9 mol % of the unit of the polyhydroxyalkanoate represented by the chemical formula (58) and an H unit accounted for 91 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 18,600 and a weight average molecular weight Mw of 27,000. The series of preparation method was upscaled to produce the polyhydroxyalkanoate represented by the chemical formula (58) in a large amount. The compound was provided as Exemplified Compound I.

Preparation Example J-1

Synthesis of Polyester Using 3-(2-propenyl)-2-oxetanone and mandelide(3,6-diphenyl-1,4-dioxane-2,5-dione)

0.22 g (2.0 mmol) of 3-(2-propenyl)-2-oxetanone, 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.88 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (59) as a monomer unit. The analysis also confirmed that an A unit accounted for 10 mol % of the monomer unit and a B unit accounted for 90 mol % thereof.

(59)

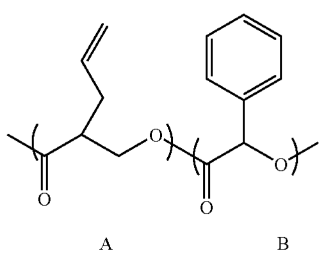

The resultant polyhydroxyalkanoate was evaluated for average molecular weight in the same manner as in Preparation Example A-1. As a result, the resultant polyhydroxyalkanoate was found to have a number average molecular weight Mn of 23,500 and a weight average molecular weight Mw of 35,000.

Preparation Example J-2

Oxidation reaction of polyhydroxyalkanoate composed of unit represented by chemical formula (59) synthesized in Preparation Example J-1

(59)

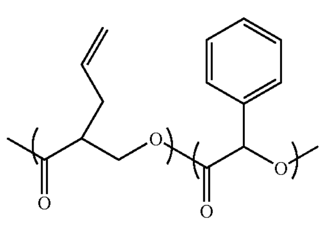

0.50 g of the polyhydroxyalkanoate copolymer composed of the unit represented by the chemical formula (59) synthesized in Preparation Example J-1 (A: 10 mol %, B: 90 mol %) was placed in a round-bottomed flask, and 30 ml of acetone were added to dissolve this. The flask was placed in an ice bath, 5 ml of acetic acid and 0.30 g of 18-crown-6-ether were added, and the whole was stirred. Next, 0.24 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (60) as a monomer unit.

(60)

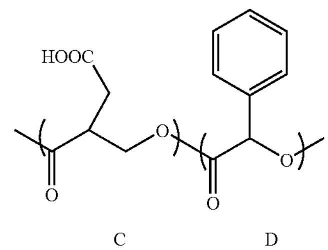

The resultant polyhydroxyalkanoate was evaluated for average molecular weight in the same manner as in Preparation Example A-1. As a result, the resultant polyhydroxyalkanoate was found to have a number average molecular weight Mn of 20,100 and a weight average molecular weight Mw of 30,400.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 10 mol % of the unit of the polyhydroxyalkanoate represented by the chemical formula (60) and a D unit accounted for 90 mol % thereof.

Preparation Example J-3

Condensation reaction between polyhydroxyalkanoate composed of unit represented by chemical formula (60) synthesized in Preparation Example J-2 and 2-amino-2-methylpropanesulfonic acid

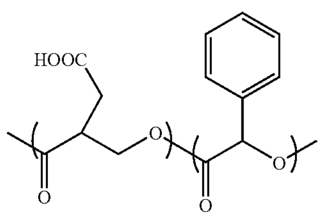

(60)

C D

Under a nitrogen atmosphere, 0.40 g of the polyhydroxyalkanoate copolymer composed of the unit represented by the chemical formula (60) synthesized in Preparation Example J-2 (C: 10 mol %, D: 90 mol %) and 0.23 g of 2-amino-2-methylpropanesulfonic acid were placed in a 100-ml three-necked flask. 15.0 ml of pyridine were added to the flask, and the mixture was stirred. After that, 0.78 ml of triphenyl phosphite was added, and the whole was heated at 120° C. for 6 hours. After the completion of the reaction, 0.32 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,668 $cm^{-1}$.

$^{1}$H-NMR confirmed that the resultant polymer was a polyhydroxyalkanoate containing a unit represented by the following chemical formula (61) as a monomer unit because a peak derived from methylene of the 2-amino-2-methylpropanesulfonic acid structure shifted.

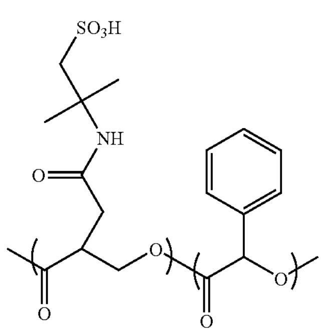

(61)

E F

It was also confirmed that the polyhydroxyalkanoate was a copolymer in which an E unit accounted for 10 mol % of the unit of the polyhydroxyalkanoate represented by the chemical formula (61) and an F unit accounted for 90 mol % thereof.

The resultant polymer was evaluated for average molecular weight in the same manner as in Preparation Example A-3. As a result, the resultant polymer was found to have a number average molecular weight Mn of 17,600 and a weight average molecular weight Mw of 27,100. The series of preparation method was upscaled to produce the polyhydroxyalkanoate represented by the chemical formula (61) in a large amount. The compound was provided as Exemplified Compound J.

Preparation Example K-1

Synthesis of Polyester Using 3-(2-propenyl)-2-oxetanone and δ-valerolactone 0.22 g (2.0 mmol) of 3-(2-propenyl)-2-oxetanone, 1.00 g (10.0 mmol) of δ-valerolactone, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.80 g of a polymer was prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (62) as a monomer unit. The analysis also confirmed that an A unit accounted for 16 mol % of the monomer unit and a B unit accounted for 84 mol % thereof.

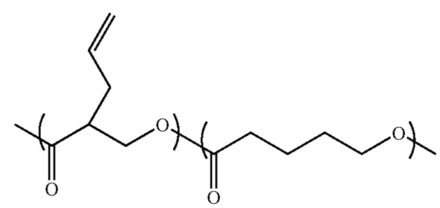

(62)

A B

The resultant polyhydroxyalkanoate was evaluated for average molecular weight in the same manner as in Preparation Example A-1. As a result, the resultant polyhydroxyalkanoate was found to have a number average molecular weight Mn of 19,800 and a weight average molecular weight Mw of 28,900.

Preparation Example K-2

Oxidation reaction of polyhydroxyalkanoate composed of unit represented by chemical formula (62) synthesized in Preparation Example K-1

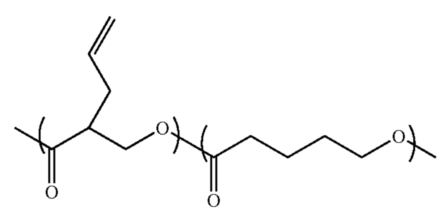

(62)

A B 0.50 g of the polyhydroxyalkanoate copolymer composed of the unit represented by the chemical formula (62) synthesized in Preparation Example K-1 (A: 16 mol %, B: 84 mol %) was placed in a round-bottomed flask, and 30 ml of acetone were added to dissolve this. The flask was placed in an ice bath, 5 ml of acetic acid and 0.62 g of 18-crown-6-ether were added, and the whole was stirred. Next, 0.50 g of potassium permanganate was gradually added to the flask in the ice bath, and the whole was stirred in the ice bath for 2 hours and stirred at room temperature for an additional 18 hours. After the completion of the reaction, 0.42 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (63) as a monomer unit.

(63)

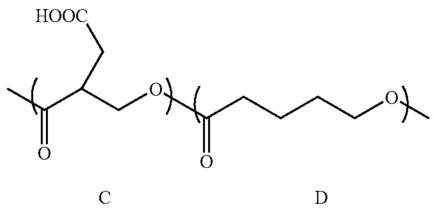

The resultant polyhydroxyalkanoate was evaluated for average molecular weight in the same manner as in Preparation Example A-1. As a result, the resultant polyhydroxyalkanoate was found to have a number average molecular weight Mn of 15,700 and a weight average molecular weight Mw of 23,700.

Furthermore, in order to calculate the unit of the resultant polyhydroxyalkanoate, 27 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 15 mol % of the unit of the polyhydroxyalkanoate represented by the chemical formula (63) and a D unit accounted for 85 mol % thereof.

Preparation Example K-3

Condensation reaction between polyhydroxyalkanoate composed of unit represented by chemical formula (63) synthesized in Preparation Example K-2 and 2-aminobenzene phenyl sulfonate (63)

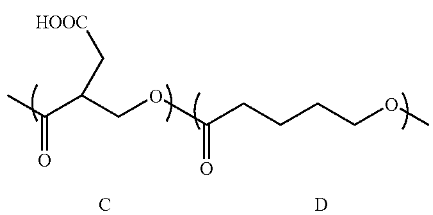

Under a nitrogen atmosphere, 0.40 g of the polyhydroxyalkanoate copolymer composed of the unit represented by the chemical formula (63) synthesized in Preparation Example K-2 (C: 15 mol %, D: 85 mol %) and 0.71 g of 2-aminobenzene phenyl sulfonate were placed in a 100-ml three-necked flask. 15.0 ml of pyridine were added to the flask, and the mixture was stirred. After that, 1.50 ml of triphenyl phosphite were added, and the whole was heated at 120° C. for 6 hours. After the completion of the reaction, 0.37 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (64) as a monomer unit because a peak derived from an aromatic ring of the 2-aminobenzene phenyl sulfonate structure shifted.

(64)

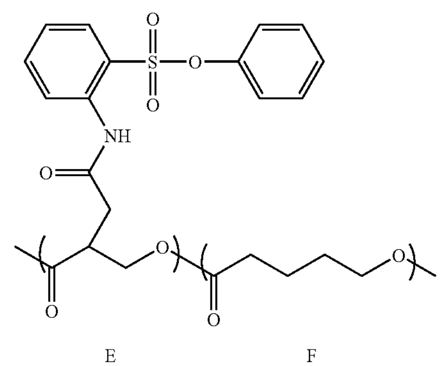

It was also confirmed that the polyhydroxyalkanoate was a copolymer in which an E unit accounted for 15 mol % of the unit of the polyhydroxyalkanoate represented by the chemical formula (64) and an F unit accounted for 85 mol % thereof.

The resultant polymer was evaluated for average molecular weight in the same manner as in Preparation Example A-3. As a result, the resultant polymer was found to have a number average molecular weight Mn of 14,000 and a weight average molecular weight Mw of 22,000. The series of preparation method was upscaled to produce the polyhydroxyalkanoate represented by the chemical formula (64) in a large amount. The compound was provided as Exemplified Compound K.

Preparation Example L-1

Synthesis of Polyester Using 3-(9-decenyl)-2-oxetanone Represented by Chemical Formula (65) and L-lactide (65)

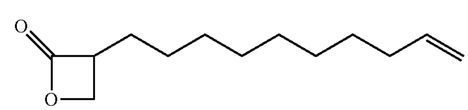

0.36 g (2.0 mmol) of 3-(9-decenyl)-2-oxetanone represented by the chemical formula (65), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 0.75 g of a polymer was prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (66) as a monomer unit. The analysis also confirmed that an A unit accounted for 4 mol % of the monomer unit and a B unit accounted for 96 mol % thereof.

(66)

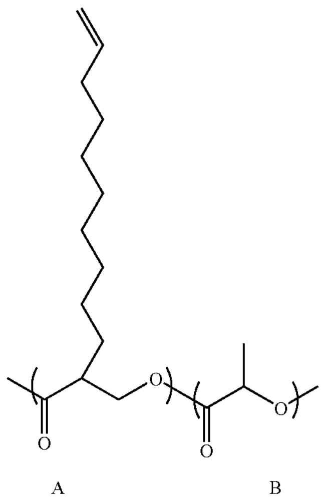

Preparation Example L-2

Oxidation reaction of polyhydroxyalkanoate composed of unit represented by chemical formula (66) synthesized in Preparation Example L-1

(66)

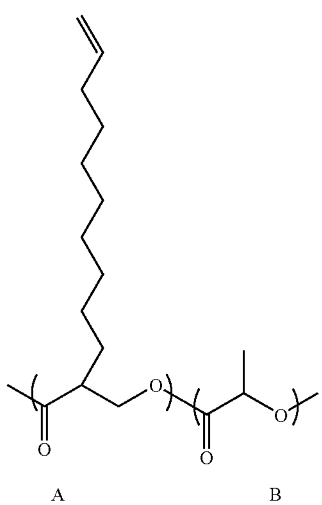

0.50 g of the polyhydroxyalkanoate copolymer composed of the unit represented by the chemical formula (66) synthesized in Preparation Example L-1 (A: 4 mol %, B: 96 mol %) was placed in a round-bottomed flask, and 30 ml of acetone were added to dissolve this. The flask was placed in an ice bath, 5 ml of acetic acid and 0.21 g of 18-crown-6-ether were added, and the whole was stirred. Next, 0.17 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (67) as a monomer unit.

(67)

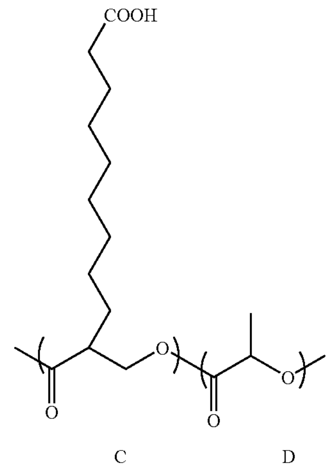

The resultant polyhydroxyalkanoate was evaluated for average molecular weight in the same manner as in Preparation Example A-1. As a result, the resultant polyhydroxyalkanoate was found to have a number average molecular weight Mn of 13,100 and a weight average molecular weight Mw of 19,100.

Furthermore, in order to calculate the unit of the resultant polyhydroxyalkanoate, 29 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 4 mol % of the unit of the polyhydroxyalkanoate represented by the chemical formula (67) and a D unit accounted for 96 mol % thereof.

Preparation Example L-3

Condensation reaction between polyhydroxyalkanoate composed of unit represented by chemical formula (67) synthesized in Preparation Example L-2 and 4-methoxyaniline-2-sulfonic acid (67)

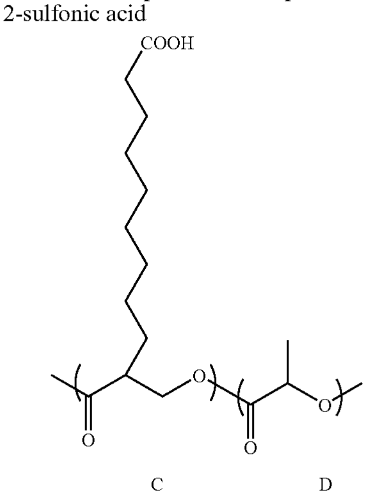

Under a nitrogen atmosphere, 0.40 g of the polyhydroxyalkanoate copolymer composed of the unit represented by the chemical formula (67) synthesized in Preparation Example L-2 (C: 4 mol %, D: 96 mol %) and 0.21 g of 4-methoxyaniline-2-sulfonic acid were placed in a 100-ml three-necked flask. 15.0 ml of pyridine were added to the flask, and the mixture was stirred. After that, 0.53 ml of triphenyl phosphite was added, and the whole was heated at 120° C. for 6 hours. After the completion of the reaction, 0.34 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (68) as a monomer unit because a peak derived from an aromatic ring of the 4-methoxyaniline-2-sulfonic acid structure shifted.

(68)

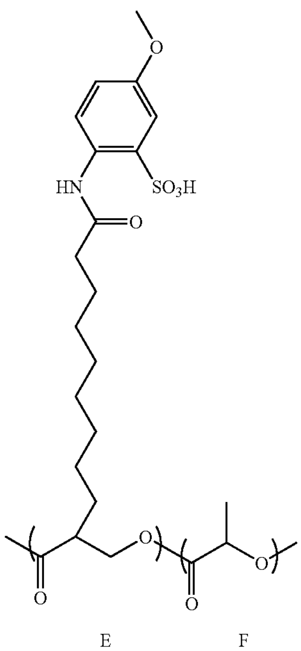

It was also confirmed that the polyhydroxyalkanoate was a copolymer in which an E unit accounted for 4 mol % of the unit of the polyhydroxyalkanoate represented by the chemical formula (68) and an F unit accounted for 96 mol % thereof.

The resultant polymer was evaluated for average molecular weight in the same manner as in Preparation Example A-3. As a result, the resultant polymer was found to have a number average molecular weight Mn of 11,900 and a weight average molecular weight Mw of 18,800. The series of preparation method was upscaled to produce the polyhydroxyalkanoate represented by the chemical formula (68) in a large amount. The compound was provided as Exemplified Compound L.

Preparation Example M-1

Synthesis of Polyester Using 3-(2-propenyl)dihydro-2(3H)-furanone and mandelide 0.25 g (2.0 mmol) of 3-(2-propenyl)dihydro-2(3H)-furanone, 2.68 g (10.0 mmol) of mandelide, 24 μl of a solution of 2 M of diethylzinc in toluene, and 9.6 ml of a solution of 0.01 M of p-tert-butylbenzyl alcohol in toluene were placed in a polymerization ampule. After that, 1.59 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (69) as a monomer unit. The analysis also confirmed that an A unit accounted for 6 mol % of the monomer unit and a B unit accounted for 94 mol % thereof.

(69)

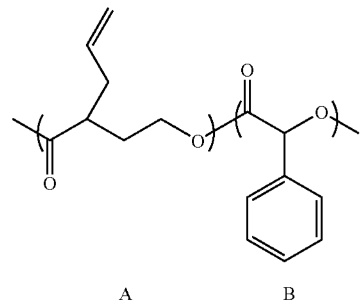

The resultant polyhydroxyalkanoate was evaluated for average molecular weight in the same manner as in Preparation Example A-1. As a result, the resultant polyhydroxyalkanoate was found to have a number average molecular weight Mn of 7,500 and a weight average molecular weight Mw of 11,000.

Preparation Example M-2

Oxidation reaction of polyhydroxyalkanoate composed of unit represented by chemical formula (69) synthesized in Preparation Example M-1

(69)

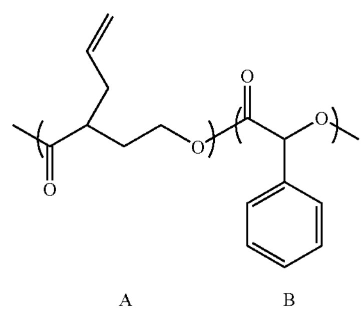

0.50 g of the polyhydroxyalkanoate copolymer composed of the unit represented by the chemical formula (69) synthesized in Preparation Example M-1 (A: 6 mol %, B: 94 mol %) was placed in a round-bottomed flask, and 30 ml of acetone were added to dissolve this. The flask was placed in an ice bath, 5 ml of acetic acid and 0.18 g of 18-crown-6-ether were added, and the whole was stirred. Next, 0.14 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (70) as a monomer unit.

(70)

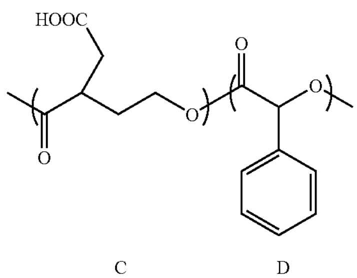

The resultant polyhydroxyalkanoate was evaluated for average molecular weight in the same manner as in Preparation Example A-1. As a result, the resultant polyhydroxyalkanoate was found to have a number average molecular weight Mn of 7,300 and a weight average molecular weight Mw of 11,100.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 6 mol % of the unit of the polyhydroxyalkanoate represented by the chemical formula (70) and a D unit accounted for 94 mol % thereof.

Preparation Example M-3

Condensation reaction between polyhydroxyalkanoate composed of unit represented by chemical formula (70) synthesized in Preparation Example M-2 and taurine (70)

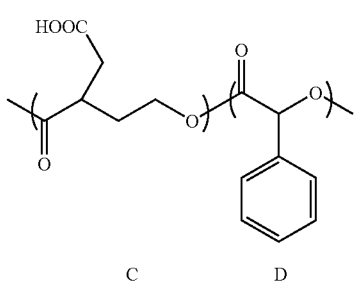

Under a nitrogen atmosphere, 0.40 g of the polyhydroxyalkanoate copolymer composed of the unit represented by the chemical formula (70) synthesized in Preparation Example M-2 (C: 6 mol %, D: 94 mol %) and 0.11 g of taurine were placed in a 100-ml three-necked flask. 15.0 ml of pyridine were added to the flask, and the mixture was stirred. After that, 0.46 ml of triphenyl phosphite was added, and the whole was heated at 120° C. for 6 hours. After the completion of the reaction, 0.30 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,668 $cm^{-1}$.

$^1$H-NMR confirmed that the resultant polymer was a polyhydroxyalkanoate containing a unit represented by the following chemical formula (71) as a monomer unit because a peak derived from methylene of the taurine structure shifted.

(71)

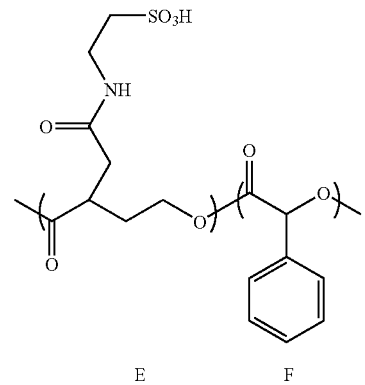

It was also confirmed that the polyhydroxyalkanoate was a copolymer in which an E unit accounted for 6 mol % of the unit of the polyhydroxyalkanoate represented by the chemical formula (71) and an F unit accounted for 94 mol % thereof.

The resultant polymer was evaluated for average molecular weight in the same manner as in Preparation Example A-3. As a result, the resultant polymer was found to have a number average molecular weight Mn of 6,800 and a weight average molecular weight Mw of 10,900.

Preparation Example M-4

Esterification reaction of polyhydroxyalkanoate composed of unit represented by chemical formula (71) synthesized in Preparation Example M-3

(71)

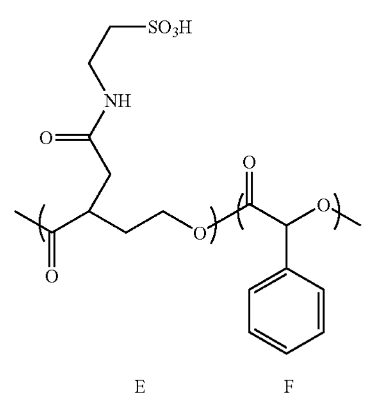

0.30 g of the polyhydroxyalkanoate copolymer composed of the unit represented by the chemical formula (71) synthesized in Preparation Example M-3 (E: 6 mol %, F: 94 mol %) was added to a round-bottomed flask. Then, 21.0 ml of chloroform and 7.0 ml of methanol were added to dissolve the polymer, and the solution was cooled to 0° C. 0.64 ml of a 2-mol/L trimethylsilyldiazomethane-hexane solution (manufactured by Aldrich) was added to the solution, and the whole was stirred for 4 hours. After the completion of the reaction, 0.29 g of a polymer was prepared in the same manner as in Preparation Example A-4.

The structure of the resultant polymer was determined through analysis in the same manner as in Preparation Example A-4. $^{1}$H-NMR confirmed that the resultant polymer was a polyhydroxyalkanoate containing a unit represented by the following chemical formula (72) as a monomer unit because a peak derived from methyl sulfonate was observed at 3 to 4 ppm.

(72)

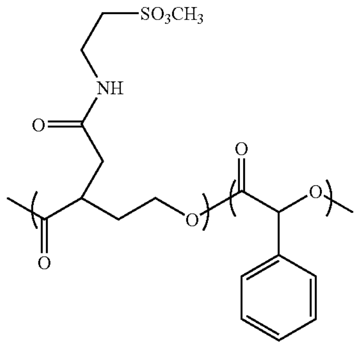

It was also confirmed that the polyhydroxyalkanoate was a copolymer in which a G unit accounted for 6 mol % of the unit of the polyhydroxyalkanoate represented by the chemical formula (72) and an H unit accounted for 94 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 6,800 and a weight average molecular weight Mw of 10,900. The series of preparation method was upscaled to produce the polyhydroxyalkanoate represented by the chemical formula (72) in a large amount. The compound was provided as Exemplified Compound M.

Preparation Example N-1

Synthesis of Polyester Using tetrahydro-3-(2-propenyl)-2H-pyrane-2-one and mandelide 0.28 g (2.0 mmol) of tetrahydro-3-(2-propenyl)-2H-pyrane-2-one, 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 2.06 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (73) as a monomer unit. The analysis also confirmed that an A unit accounted for 12 mol % of the monomer unit and a B unit accounted for 88 mol % thereof.

(73)

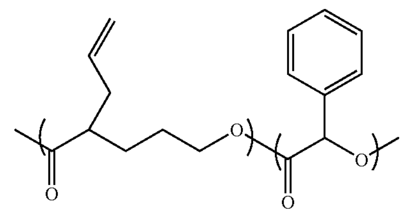

The resultant polyhydroxyalkanoate was evaluated for average molecular weight in the same manner as in Preparation Example A-1. As a result, the resultant polyhydroxyalkanoate was found to have a number average molecular weight Mn of 48,000 and a weight average molecular weight Mw of 97,200.

Preparation Example N-2

Oxidation reaction of polyhydroxyalkanoate composed of unit represented by chemical formula (73) synthesized in Preparation Example N-1

(73)

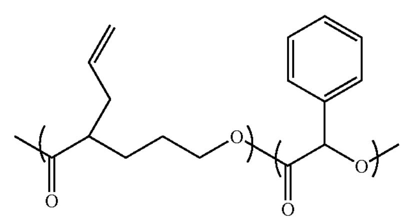

0.50 g of the polyhydroxyalkanoate copolymer composed of the unit represented by the chemical formula (73) synthesized in Preparation Example N-1 (A: 12 mol %, B: 88 mol %) was placed in a round-bottomed flask, and 30 ml of acetone were added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (74) as a monomer unit.

(74)

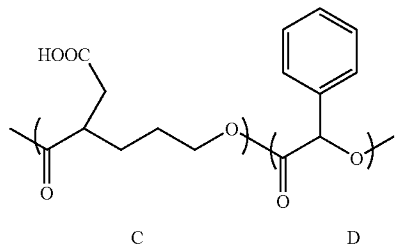

The resultant polyhydroxyalkanoate was evaluated for average molecular weight in the same manner as in Preparation Example A-1. As a result, the resultant polyhydroxyalkanoate was found to have a number average molecular weight Mn of 38,600 and a weight average molecular weight Mw of 69,100.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 11 mol % of the unit of the polyhydroxyalkanoate represented by the chemical formula (74) and a D unit accounted for 89 mol % thereof.

Preparation Example N-3

Condensation reaction between polyhydroxyalkanoate composed of unit represented by chemical formula (74) synthesized in Preparation Example N-2 and 3-aminobenzenesulfonic acid (74)

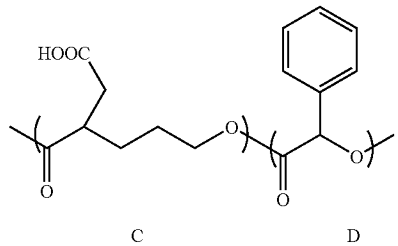

Under a nitrogen atmosphere, 0.40 g of the polyhydroxyalkanoate copolymer composed of the unit represented by the chemical formula (74) synthesized in Preparation Example N-2 (C: 11 mol %, D: 89 mol %) and 0.28 g of 3-aminobenzenesulfonic acid were placed in a 100-ml three-necked flask. 15.0 ml of pyridine were added to the flask, and the mixture was stirred. After that, 0.84 ml of triphenyl phosphite was added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (75) as a monomer unit because a peak derived from an aromatic ring of the 3-aminobenzenesulfonic acid structure shifted.

(75)

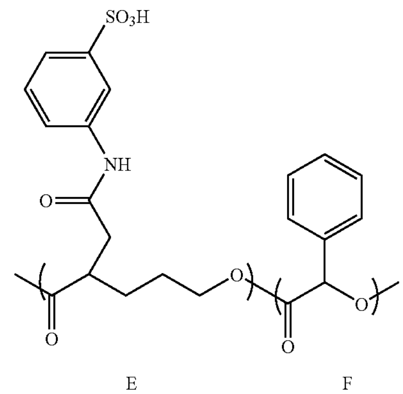

It was also confirmed that the polyhydroxyalkanoate was a copolymer in which an E unit accounted for 11 mol % of the unit of the polyhydroxyalkanoate represented by the chemical formula (75) and an F unit accounted for 89 mol % thereof.

The resultant polymer was evaluated for average molecular weight in the same manner as in Preparation Example A-3. As a result, the resultant polymer was found to have a number average molecular weight Mn of 32,600 and a weight average molecular weight Mw of 59,000. The series of preparation method was upscaled to produce the polyhydroxyalkanoate represented by the chemical formula (75) in a large amount. The compound was provided as Exemplified Compound N.

Preparation Example O-1

Synthesis of Polyester Using 3-(2-propenyl)-2-oxepanone Represented by Chemical Formula (76) and L-lactide (76)

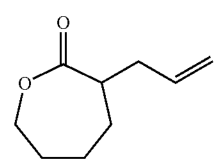

0.31 g (2.0 mmol) of 3-(2-propenyl)-2-oxepanone represented by chemical formula (76), 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.32 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (77) as a monomer unit. The analysis also confirmed that an A unit accounted for 10 mol % of the monomer unit and a B unit accounted for 90 mol % thereof.

(77)

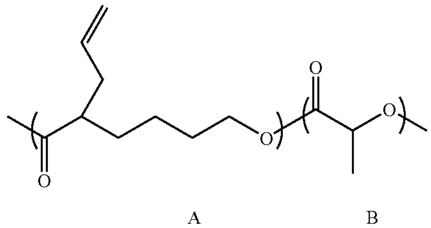

The resultant polyhydroxyalkanoate was evaluated for average molecular weight in the same manner as in Preparation Example A-1. As a result, the resultant polyhydroxyalkanoate was found to have a number average molecular weight Mn of 132,000 and a weight average molecular weight Mw of 220,400.

Preparation Example O-2

Oxidation reaction of polyhydroxyalkanoate composed of unit represented by chemical formula (77) synthesized in Preparation Example O-1

(77)

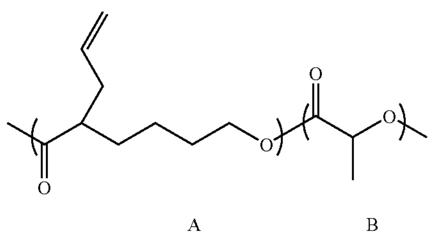

0.50 g of the polyhydroxyalkanoate copolymer composed of the unit represented by the chemical formula (77) synthesized in Preparation Example O-1 (A: 10 mol %, B: 90 mol %) was placed in a round-bottomed flask, and 30 ml of acetone were added to dissolve this. The flask was placed in an ice bath, 5 ml of acetic acid and 0.45 g of 18-crown-6-ether were added, and the whole was stirred. Next, 0.36 g of potassium permanganate was gradually added to the flask in the ice bath, and the whole was stirred in the ice bath for 2 hours and stirred at room temperature for an additional 18 hours. After the completion of the reaction, 0.44 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (78) as a monomer unit.

(78)

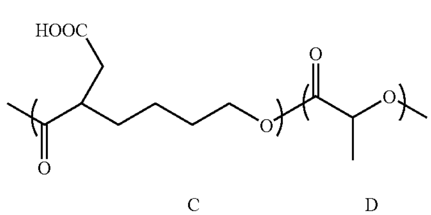

The resultant polyhydroxyalkanoate was evaluated for average molecular weight in the same manner as in Preparation Example A-1. As a result, the resultant polyhydroxyalkanoate was found to have a number average molecular weight Mn of 115,400 and a weight average molecular weight Mw of 202,000.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 9 mol % of the unit of the polyhydroxyalkanoate represented by the chemical formula (78) and a D unit accounted for 91 mol % thereof.

Preparation Example O-3

Condensation reaction between polyhydroxyalkanoate composed of unit represented by chemical formula (78) synthesized in Preparation Example O-2 and p-toluidine-2-sulfonic acid (78)

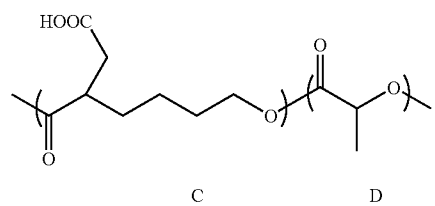

Under a nitrogen atmosphere, 0.40 g of the polyhydroxyalkanoate copolymer composed of the unit represented by the chemical formula (78) synthesized in Preparation Example O-2 (C: 9 mol %, D: 91 mol %) and 0.41 g of p-toluidine-2-sulfonic acid were placed in a 100-ml three-necked flask. 15.0 ml of pyridine were added to the flask, and the mixture was stirred. After that, 1.16 ml of triphenyl phosphite were added, and the whole was heated at 120° C. for 6 hours. After the completion of the reaction, 0.36 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (79) as a monomer unit because a peak derived from an aromatic ring of the p-toluidine-2-sulfonic acid structure shifted.

(79)

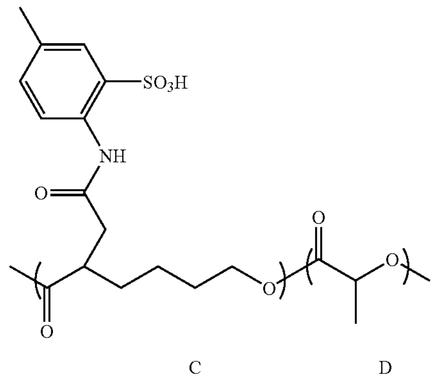

It was also confirmed that the polyhydroxyalkanoate was a copolymer in which an E unit accounted for 9 mol % of the unit of the polyhydroxyalkanoate represented by the chemical formula (79) and an F unit accounted for 91 mol % thereof.

The resultant polymer was evaluated for average molecular weight in the same manner as in Preparation Example A-3. As a result, the resultant polymer was found to have a number average molecular weight Mn of 98,500 and a weight average molecular weight Mw of 176,300. The series of preparation method was upscaled to produce the polyhydroxyalkanoate represented by the chemical formula (79) in a large amount. The compound was provided as Exemplified Compound O.

Preparation Example P-1

Synthesis of Polyester Using tetrahydro-4-(2-propenyl)-2H-pyrane-2-one and L-lactide 0.28 g (2.0 mmol) of tetrahydro-4-(2-propenyl)-2H-pyrane-2-one, 1.44 g (10.0 mmol) of L-lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.19 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (80) as a monomer unit. The analysis also confirmed that an A unit accounted for 7 mol % of the monomer unit and a B unit accounted for 93 mol % thereof.

(80)

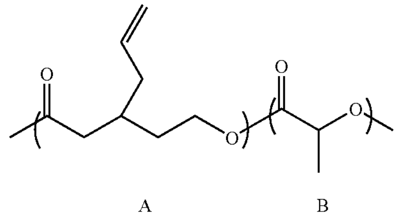

The resultant polyhydroxyalkanoate was evaluated for average molecular weight in the same manner as in Preparation Example A-1. As a result, the resultant polyhydroxyalkanoate was found to have a number average molecular weight Mn of 21,500 and a weight average molecular weight Mw of 29,900.

Preparation Example P-2

Oxidation reaction of polyhydroxyalkanoate composed of unit represented by chemical formula (80) synthesized in Preparation Example P-1

(80)

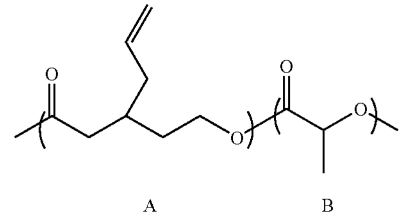

0.50 g of the polyhydroxyalkanoate copolymer composed of the unit represented by the chemical formula (80) synthesized in Preparation Example P-1 (A: 7 mol %, B: 93 mol %) was placed in a round-bottomed flask, and 30 ml of acetone were added to dissolve this. The flask was placed in an ice bath, 5 ml of acetic acid and 0.36 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.43 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (81) as a monomer unit.

(81)

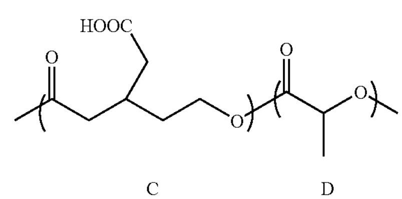

The resultant polyhydroxyalkanoate was evaluated for average molecular weight in the same manner as in Preparation Example A-1. As a result, the resultant polyhydroxyalkanoate was found to have a number average molecular weight Mn of 17,400 and a weight average molecular weight Mw of 23,800.

Furthermore, in order to calculate the unit of the resultant polyhydroxyalkanoate, 30 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 7 mol % of the unit of the polyhydroxyalkanoate represented by the chemical formula (81) and a D unit accounted for 93 mol % thereof. The series of preparation method was upscaled to produce the polyhydroxyalkanoate represented by the chemical formula (81) in a large amount. The compound was provided as Exemplified Compound P.

Preparation Example Q-1

Synthesis of Polyester Using tetrahydro-4-(2-propenyl)-2H-pyrane-2-one and mandelide(3,6-diphenyl-1,4-dioxane-2,5-dione)

0.28 g (2.0 mmol) of tetrahydro-4-(2-propenyl)-2H-pyrane-2-one, 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.79 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (82) as a monomer unit. The analysis also confirmed that an A unit accounted for 10 mol % of the monomer unit and a B unit accounted for 90 mol % thereof.

(82)

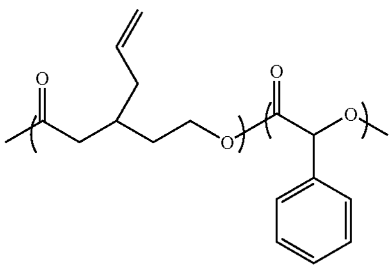

A B

The resultant polyhydroxyalkanoate was evaluated for average molecular weight in the same manner as in Preparation Example A-1. As a result, the resultant polyhydroxyalkanoate was found to have a number average molecular weight Mn of 18,700 and a weight average molecular weight Mw of 28,800.

Preparation Example Q-2

Oxidation reaction of polyhydroxyalkanoate composed of unit represented by chemical formula (82) synthesized in Preparation Example Q-1

(82)

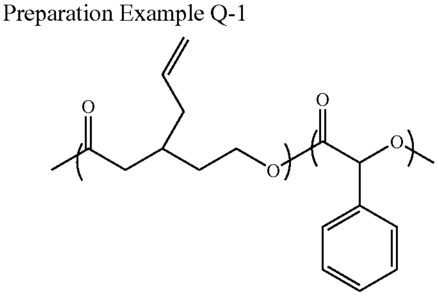

A B 0.50 g of the polyhydroxyalkanoate copolymer composed of the unit represented by the chemical formula (82) synthesized in Preparation Example Q-1 (A: 10 mol %, B: 90 mol %) was placed in a round-bottomed flask, and 30 ml of acetone were added to dissolve this. The flask was placed in an ice bath, 5 ml of acetic acid and 0.29 g of 18-crown-6-ether were added, and the whole was stirred. Next, 0.23 g of potassium permanganate was gradually added to the flask in the ice bath, and the whole was stirred in the ice bath for 2 hours and stirred at room temperature for an additional 18 hours. After the completion of the reaction, 0.41 g of a polymer was prepared in the same manner as in Preparation Example A-2.

NMR analysis was performed under the same conditions as those of Preparation Example A-1 to determine the structure of the resultant polymer. The analysis confirmed that the polymer was a polyhydroxyalkanoate containing a unit represented by the following chemical formula (83) as a monomer unit.

(83)

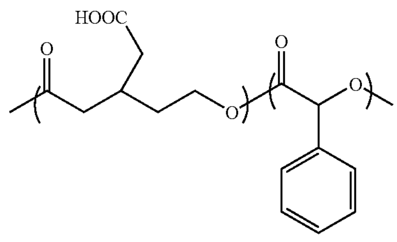

C D

The resultant polyhydroxyalkanoate was evaluated for average molecular weight in the same manner as in Preparation Example A-1. As a result, the resultant polyhydroxyalkanoate was found to have a number average molecular weight Mn of 15,500 and a weight average molecular weight Mw of 20,300.

Furthermore, in order to calculate the unit of the resultant polyhydroxyalkanoate, 28 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 10 mol % of the unit of the polyhydroxyalkanoate represented by the chemical formula (83) and a D unit accounted for 90 mol % thereof.

Preparation Example Q-3

Condensation reaction between polyhydroxyalkanoate composed of unit represented by chemical formula (83) synthesized in Preparation Example Q-2 and 3-aminobenzenesulfonic acid (83)

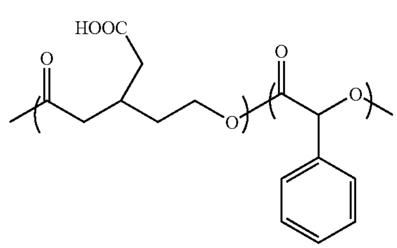

C D

Under a nitrogen atmosphere, 0.40 g of the polyhydroxyalkanoate copolymer composed of the unit represented by the chemical formula (83) synthesized in Preparation Example Q-2 (C: 10 mol %, D: 90 mol %) and 0.25 g of 3-aminobenzenesulfonic acid were placed in a 100-ml three-necked flask. 15.0 ml of pyridine were added to the flask, and the mixture was stirred. After that, 0.76 ml of triphenyl phosphite was added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (84) as a monomer unit because a peak derived from an aromatic ring of the 3-aminobenzenesulfonic acid structure shifted.

(84)

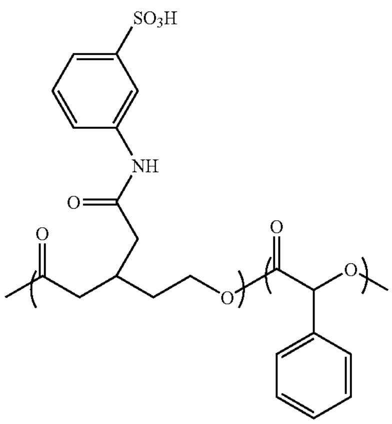

It was also confirmed that the polyhydroxyalkanoate was a copolymer in which an E unit accounted for 10 mol % of the unit of the polyhydroxyalkanoate represented by the chemical formula (84) and an F unit accounted for 90 mol % thereof.

The resultant polymer was evaluated for average molecular weight in the same manner as in Preparation Example A-3. As a result, the resultant polymer was found to have a number average molecular weight Mn of 13,100 and a weight average molecular weight Mw of 17,700. The series of preparation method was upscaled to produce the polyhydroxyalkanoate represented by the chemical formula (84) in a large amount. The compound was provided as Exemplified Compound Q.

Preparation Example R-1

Synthesis of Polyester Using phenylmethyl 7-oxo-3-oxepane carboxylate Represented by Chemical Formula (85) and ϵ-caprolactone (85)

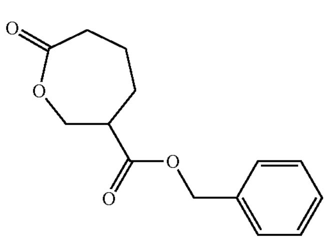

0.50 g (2.0 mmol) of phenylmethyl 7-oxo-3-oxepane carboxylate represented by the chemical formula (85), 1.14 g (10.0 mmol) of ϵ-caprolactone, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 1.23 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (86) as a monomer unit. The analysis also confirmed that an A unit accounted for 14 mol % of the monomer unit and a B unit accounted for 86 mol % thereof.

(86)

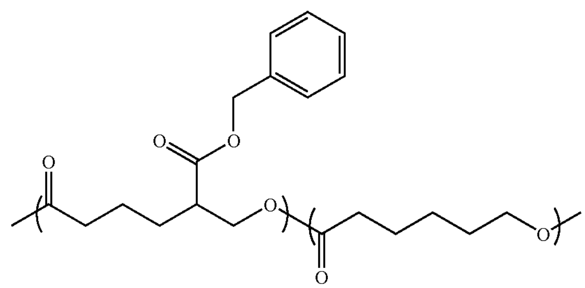

The resultant polyhydroxyalkanoate was evaluated for average molecular weight in the same manner as in Preparation Example A-1. As a result, the resultant polyhydroxyalkanoate was found to have a number average molecular weight Mn of 12,000 and a weight average molecular weight Mw of 16,000.

Preparation Example R-2

1.00 g of the polyhydroxyalkanoate copolymer represented by the chemical formula (86) synthesized in Preparation Example R-1 was dissolved into 100 ml of a mixed solvent of dioxane-ethanol (75:25), and 0.22 g of a 5% palladium/carbon catalyst was added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 0.75 g of a polymer.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (87) as a monomer unit. The analysis also confirmed that a C unit accounted for 14 mol % of the monomer unit and a D unit accounted for 86 mol % thereof.

(87)

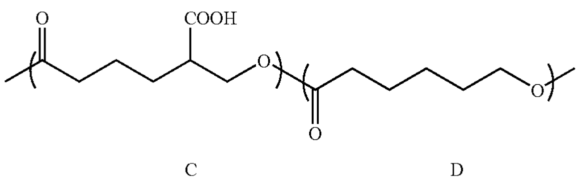

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 10,600 and a weight average molecular weight Mw of 14,700.

Preparation Example R-3

Condensation reaction between polyhydroxyalkanoate composed of unit represented by chemical formula (87) synthesized in Preparation Example R-2 and 2-aminobenzenesulfonic acid (87)

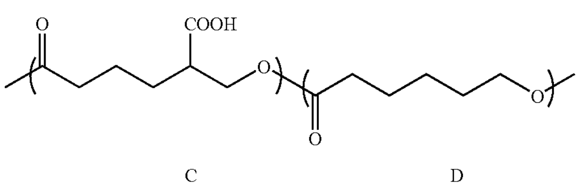

Under a nitrogen atmosphere, 0.40 g of the polyhydroxyalkanoate copolymer composed of the unit represented by the chemical formula (87) synthesized in Preparation Example R-2 (C: 14 mol %, D: 86 mol %) and 0.40 g of 2-aminobenzenesulfonic acid were placed in a 100-ml three-necked flask. 15.0 ml of pyridine were added to the flask, and the mixture was stirred. After that, 1.21 ml of triphenyl phosphite were added, and the whole was heated at 120° C. for 6 hours. After the completion of the reaction, 0.36 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (88) as a monomer unit because a peak derived from an aromatic ring of the 2-aminobenzenesulfonic acid structure shifted.

(88)

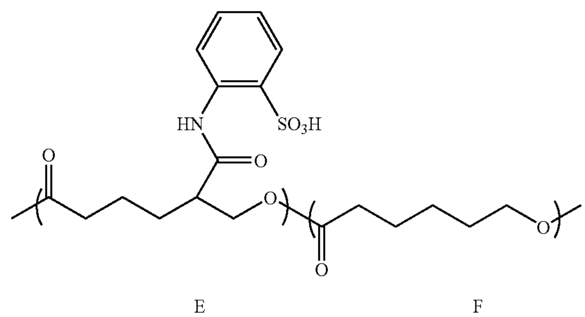

It was also confirmed that the polyhydroxyalkanoate was a copolymer in which an E unit accounted for 14 mol % of the unit of the polyhydroxyalkanoate represented by the chemical formula (88) and an F unit accounted for 86 mol % thereof.

The resultant polymer was evaluated for average molecular weight in the same manner as in Preparation Example A-3. As a result, the resultant polymer was found to have a number average molecular weight Mn of 9,400 and a weight average molecular weight Mw of 13,400. The series of preparation method was upscaled to produce the polyhydroxyalkanoate represented by the chemical formula (88) in a large amount. The compound was provided as Exemplified Compound R.

Preparation Example S-1

Synthesis of Polyester Using 7-oxo-4-oxepane phenyl methyl carboxylate Represented by Chemical Formula (89) and ϵ-caprolactone (89)

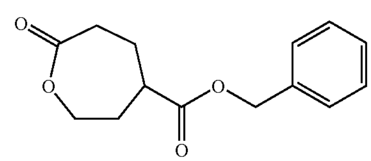

2.48 g (10.0 mmol) of 7-oxo-4-oxepane phenyl methyl carboxylate represented by the chemical formula (89), 7.21 g (50.0 mmol) of L-lactide, 2.4 ml of a solution of 0.1 M of tin octylate (tin 2-ethylhexanoate) in toluene, and 2.4 ml of a solution of 0.1 M of p-tert-butylbenzyl alcohol in toluene were placed in a polymerization ampule. After that, 7.08 g of a polymer were prepared in the same manner as in Preparation Example A-1. NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (90) as a monomer unit. The analysis also confirmed that an A unit accounted for 8 mol % of the monomer unit and a B unit accounted for 92 mol % thereof.

(90)

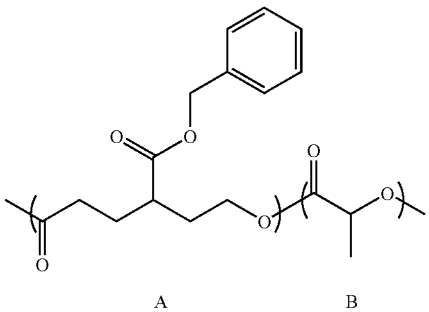

The resultant polyhydroxyalkanoate was evaluated for average molecular weight in the same manner as in Preparation Example A-1. As a result, the resultant polyhydroxyalkanoate was found to have a number average molecular weight Mn of 10,300 and a weight average molecular weight Mw of 14,800.

Preparation Example S-2

5.00 g of the polyhydroxyalkanoate copolymer represented by the chemical formula (90) synthesized in Preparation Example S-1 were dissolved into 500 ml of a mixed solvent of dioxane-ethanol (75:25), and 1.10 g of a 5% palladium/carbon catalyst were added to the solution. The inside of the reaction system was filled with hydrogen, and the whole was stirred at room temperature for 1 day. After the completion of the reaction, 3.70 g of a polymer were prepared in the same manner as in Preparation Example R-2.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (91) as a monomer unit. The analysis also confirmed that a C unit accounted for 8 mol % of the monomer unit and a D unit accounted for 92 mol % thereof.

(91)

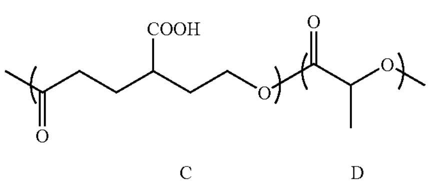

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 9,500 and a weight average molecular weight Mw of 12,900.

Preparation Example S-3

Condensation reaction between polyhydroxyalkanoate composed of unit represented by chemical formula (91) synthesized in Preparation Example S-2 and 1-naphthylamine-8-sulfonic acid (91)

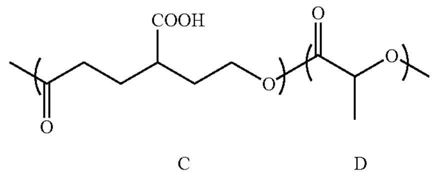

Under a nitrogen atmosphere, 0.40 g of the polyhydroxyalkanoate copolymer composed of the unit represented by the chemical formula (91) synthesized in Preparation Example S-2 (C: 8 mol %, D: 92 mol %) and 0.45 g of 1-naphthylamine-8-sulfonic acid were placed in a 100-ml three-necked flask. 15.0 ml of pyridine were added to the flask, and the mixture was stirred. After that, 1.06 ml of triphenyl phosphite were added, and the whole was heated at 120° C. for 6 hours. After the completion of the reaction, 0.33 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^{1}$H-NMR confirmed that the resultant polymer was a polyhydroxyalkanoate containing a unit represented by the following chemical formula (92) as a monomer unit because a peak derived from an aromatic ring of the 1-naphthylamine-8-sulfonic acid structure shifted.

(92)

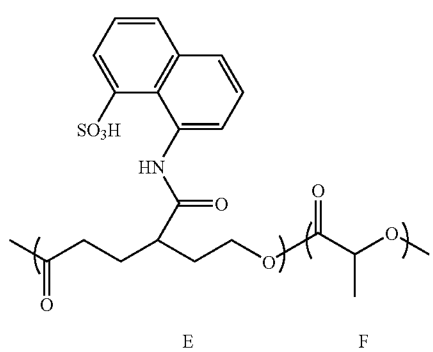

It was also confirmed that the polyhydroxyalkanoate was a copolymer in which an E unit accounted for 8 mol % of the unit of the polyhydroxyalkanoate represented by the chemical formula (92) and an F unit accounted for 92 mol % thereof.

The resultant polymer was evaluated for average molecular weight in the same manner as in Preparation Example A-3. As a result, the resultant polymer was found to have a number average molecular weight Mn of 8,200 and a weight average molecular weight Mw of 12,400.

Preparation Example S-4

Esterification reaction of polyhydroxyalkanoate composed of unit represented by chemical formula (92) synthesized in Preparation Example S-3

(92)

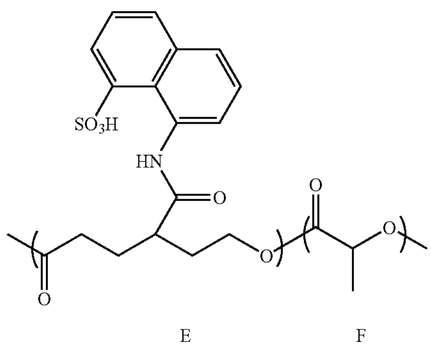

0.30 g of the polyhydroxyalkanoate copolymer composed of the unit represented by the chemical formula (92) synthesized in Preparation Example S-3 (E: 8 mol %, F: 92 mol %) was added to a round-bottomed flask. Then, 21.0 ml of chloroform and 7.0 ml of methanol were added to dissolve the polymer, and the solution was cooled to 0° C. 1.34 ml of a 2-mol/L trimethylsilyldiazomethane-hexane solution (manufactured by Aldrich) were added to the solution, and the whole was stirred for 4 hours. After the completion of the reaction, 0.30 g of a polymer was prepared in the same manner as in Preparation Example A-4.

The structure of the resultant polymer was determined through analysis in the same manner as in Preparation Example A-4. $^1$H-NMR confirmed that the resultant polymer was a polyhydroxyalkanoate containing a unit represented by the following chemical formula (93) as a monomer unit because a peak derived from methyl sulfonate was observed at 3 to 4 ppm.

(93)

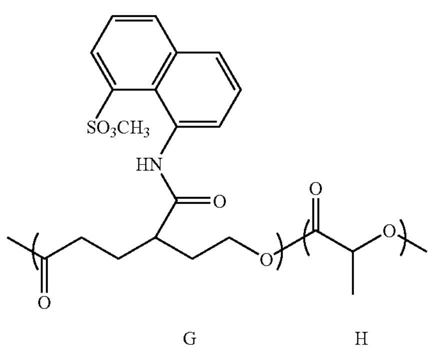

It was also confirmed that the polyhydroxyalkanoate was a copolymer in which a G unit accounted for 8 mol % of the unit of the polyhydroxyalkanoate represented by the chemical formula (93) and an H unit accounted for 92 mol % thereof.

In addition, acid value titration using an electric potential titration device AT510 (trade name; manufactured by Kyoto Denshi) revealed that the sulfonic acid was transformed into methyl sulfonate because no peak derived from the sulfonic acid was observed.

The resultant polymer was evaluated for average molecular weight in the same manner as in Preparation Example A-3. As a result, the resultant polymer was found to have a number average molecular weight Mn of 7,500 and a weight average molecular weight Mw of 11,400. The series of preparation method was upscaled to produce the polyhydroxyalkanoate represented by the chemical formula (93) in a large amount. The compound was provided as Exemplified Compound S.

Preparation Example T-1

Synthesis of Polyester Using phenylmethyl tetrahydro-6-oxo-2H-pyrane-3-carboxylate Represented by Chemical Formula (94) and Mandelide (94)

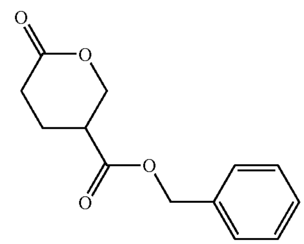

0.47 g (2.0 mmol) of phenylmethyl tetrahydro-6-oxo-2H-pyrane-3-carboxylate represented by the chemical formula (94), 2.68 g (10.0 mmol) of mandelide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 2.06 g of a polymer were prepared in the same manner as in Preparation Example A-1.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (95) as a monomer unit. The analysis also confirmed that an A unit accounted for 7 mol % of the monomer unit and a B unit accounted for 93 mol % thereof.

(95)

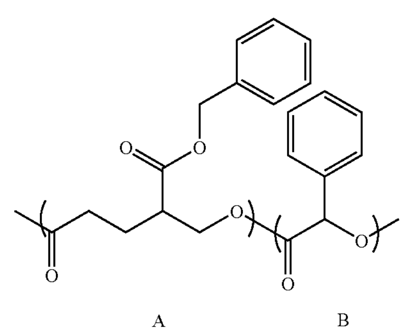

The resultant polyhydroxyalkanoate was evaluated for average molecular weight in the same manner as in Preparation Example A-1. As a result, the resultant polyhydroxyalkanoate was found to have a number average molecular weight Mn of 12,000 and a weight average molecular weight Mw of 16,000.

Preparation Example T-2

1.00 g of the polyhydroxyalkanoate copolymer represented by the chemical formula (95) synthesized in Preparation Example T-1 was dissolved into 100 ml of a mixed solvent of dioxane-ethanol (75:25), and 0.22 g of a 5% palladium/carbon catalyst was added to the solution. The inside of the reaction system was filled with hydrogen, and the whole was stirred at room temperature for 1 day. After the completion of the reaction, 0.73 g of a polymer was prepared in the same manner as in Preparation Example R-2.

NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (96) as a monomer unit. The analysis also confirmed that a C unit accounted for 7 mol % of the monomer unit and a D unit accounted for 93 mol % thereof.

(96)

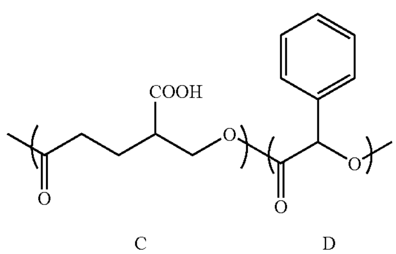

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 8,700 and a weight average molecular weight Mw of 12,900.

Preparation Example T-3

Condensation reaction between polyhydroxyalkanoate composed of unit represented by chemical formula (96) synthesized in Preparation Example T-2 and 4-methoxyaniline-2-sulfonic acid (96)

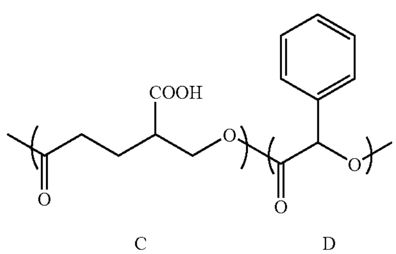

Under a nitrogen atmosphere, 0.40 g of the polyhydroxyalkanoate copolymer composed of the unit represented by the chemical formula (96) synthesized in Preparation Example T-2 (C: 7 mol %, D: 93 mol %) and 0.21 g of 4-methoxyaniline-2-sulfonic acid were placed in a 100-ml three-necked flask. 15.0 ml of pyridine were added to the flask, and the mixture was stirred. After that, 0.54 ml of triphenyl phosphite was added, and the whole was heated at 120° C. for 6 hours. After the completion of the reaction, 0.32 g of a polymer was prepared in the same manner as in Preparation Example A-3.

The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (97) as a monomer unit because a peak derived from an aromatic ring of the 4-methoxyaniline-2-sulfonic acid structure shifted.

(97)

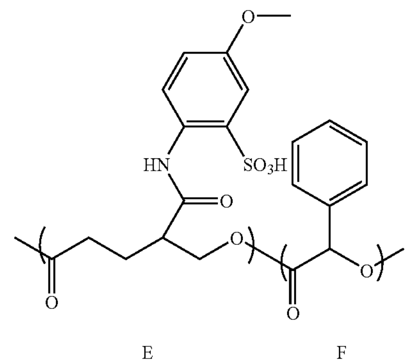

It was also confirmed that the polyhydroxyalkanoate was a copolymer in which an E unit accounted for 7 mol % of the unit of the polyhydroxyalkanoate represented by the chemical formula (97) and an F unit accounted for 93 mol % thereof.

The resultant polymer was evaluated for average molecular weight in the same manner as in Preparation Example A-1. As a result, the resultant polymer was found to have a number average molecular weight Mn of 6,900 and a weight average molecular weight Mw of 10,100. The series of preparation method was upscaled to produce the polyhydroxyalkanoate represented by the chemical formula (97) in a large amount. The compound was provided as Exemplified Compound T.

Preparation Example 2A-1

Synthesis of L-3-(2-benzyloxycarbonyl)ethyl-1,4-dioxane-2,5-dione (98)

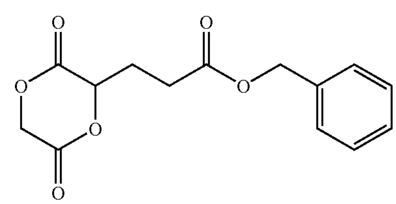

20 g of L-glutamic acid were dissolved into 200 ml of 80% sulfuric acid, and 500 g of benzyl alcohol were added and allowed to react with the solution while the temperature of the solution was kept at 70° C., thereby preparing a crude product containing a compound represented by the chemical formula

(99) in which a carboxyl group at position γ was protected. 100 g of the crude product were added to 1,400 ml of 1N sulfuric acid. While the mixture was stirred at 0 to 5° C., 100 ml of an aqueous solution containing 45.2 g of sodium sulfite were dropped over about 3 hours. Then, the resultant was continuously stirred for 30 minutes. Furthermore, 30 ml of an aqueous solution containing 9.4 g of sodium sulfite were dropped over about 30 minutes, and the resultant was left standing at room temperature overnight. The resultant was extracted with ether. The extract was dried with sodium sulfate and concentrated, and the remaining crude crystal was purified by means of silica gel column chromatography and recrystallization to prepare a compound represented by the chemical formula (100). 20 g of the compound and 17.4 g of bromoacetylchloride were dissolved into 300 ml of ether, the solution was cooled to 5° C. or lower, and 50 ml of an ether solution containing 9.5 g of 1.1 times mole of triethylamine were dropped over 30 minutes. The reaction mixture was stirred at room temperature for an additional 6 hours and filtered, and 50 ml of water were added to the filtrate, followed by stirring for 30 minutes. Liquid separation was performed by adding water several times, and sodium sulfate was added to the ether layer for drying, followed by concentration. As a result, 28.3 g of a compound represented by the chemical formula (101) were prepared in 94% yield.

A solution of 10 g of the compound represented by the chemical formula (101) in 50 ml of DMF was dropped into a solution of 3.6 g of sodium hydrogen carbonate in 950 ml of DMF (heterogeneous solution) over about 8 hours at room temperature. Furthermore, the resultant was allowed to react at the same temperature for 12 hours, the resultant was filtered, DMF was concentrated, and the residue was washed with 50 ml of isopropanol. After the filtration, the resultant white powder was dissolved into 200 ml of acetone, insoluble matter was filtered out, and the filtrate was concentrated. The residue was washed with a small amount of isopropanol, filtered, and sufficiently dried. The white powder was sublimated and recrystallized with 400 ml of isopropanol to prepare 1.9 g of L-3-(2-benzyloxycarbonyl)ethyl-1,4-dioxane-2,5-dione represented by the chemical formula (98) (24% yield).

(99)

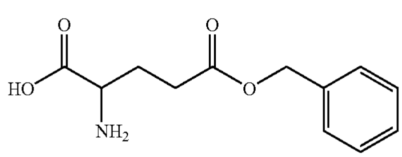

(100)

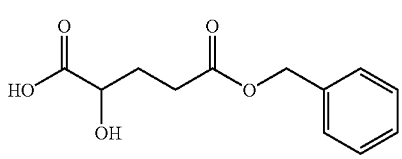

(101)

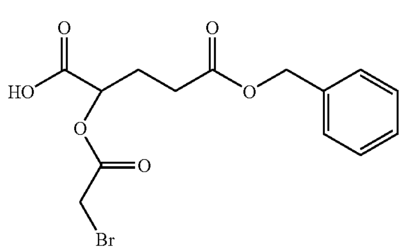

Preparation Example 2A-2

Synthesis of Polyester Using L-3-(2-benzyloxycarbonyl)ethyl-1,4-dioxane-2,5-dione Represented by Chemical Formula (98) and phenyl lactide(3,6-bis (phenylmethyl)-1,4-dioxane-2,5-dione)

0.56 g (2.0 mmol) of L-3-(2-benzyloxycarbonyl)ethyl-1,4-dioxane-2,5-dione represented by the chemical formula (98) synthesized in Preparation Example 2A-1, 2.96 g (10.0 mmol) of phenyl lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 180° C. to perform ring-opening polymerization. 2 hours after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 2.98 g of a polymer. NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (102) as a monomer unit. The analysis also confirmed that an A unit accounted for 12 mol % of the monomer unit and a B unit accounted for 88 mol % thereof.

(102)

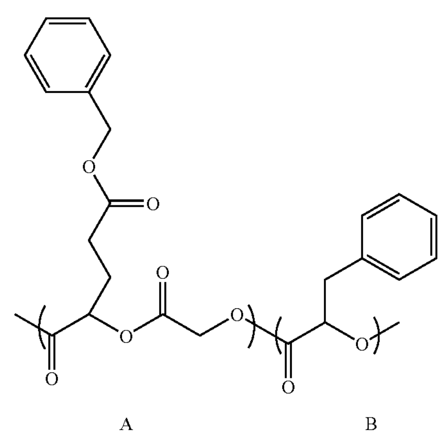

The resultant polyhydroxyalkanoate was evaluated for average molecular weight in the same manner as in Preparation Example A-1. As a result, the resultant polyhydroxyalkanoate was found to have a number average molecular weight Mn of 37,500 and a weight average molecular weight Mw of 53,300. 1.00 g of the polyhydroxyalkanoate copolymer represented by the chemical formula (102) synthesized here was dissolved into 100 ml of a mixed solvent of dioxane-ethanol (75:25), and 0.22 g of a 5% palladium/carbon catalyst was added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 0.75 g of a polymer. NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (103) as a monomer unit. The analysis also confirmed that a C unit accounted for 12 mol % of the monomer unit and a D unit accounted for 88 mol % thereof.

(103)

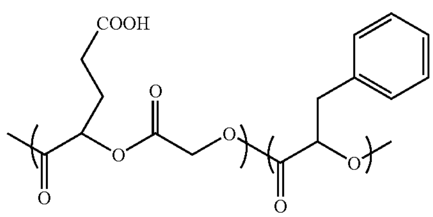

C D

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 31,200 and a weight average molecular weight Mw of 46,800.

Preparation Example 2A-3

Condensation Reaction Between Polyhydroxyalkanoate Composed of Unit Represented by Chemical Formula (103) Synthesized in Preparation Example 2A-2 and 2-aminobenzenesulfonic acid (103)

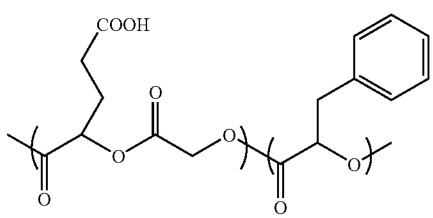

C D

Under a nitrogen atmosphere, 0.40 g of the polymer synthesized by using the polyhydroxyalkanoate copolymer composed of the unit represented by the chemical formula (103) synthesized in Preparation Example 2A-2 (C: 8 mol %, D: 92 mol %) and 0.27 g of 2-aminobenzenesulfonic acid were placed in a 100-ml three-necked flask. 15.0 ml of pyridine were added to the flask, and the mixture was stirred. After that, 0.82 ml of triphenyl phosphite was added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.36 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature) or Fourier transformation-infrared absorption (FT-IR) spectrum (Nicolet AVATAR 360FT-IR). As a result of IR measurement, a peak at 1,695 $cm^{-1}$ derived from a carboxylic acid reduced, and a peak derived from an amide group was newly observed at 1,658 $cm^{-1}$.

$^1$H-NMR confirmed that the resultant polymer was a polyhydroxyalkanoate containing a unit represented by the following chemical formula (104) as a monomer unit because a peak derived from an aromatic ring of the 2-aminobenzenesulfonic acid structure shifted.

(104)

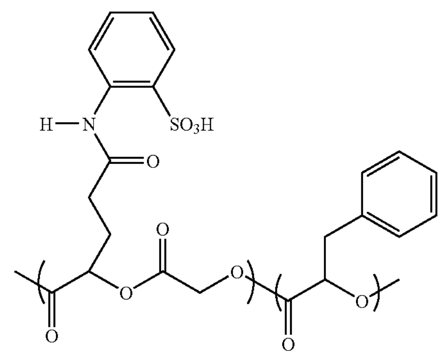

E F

It was also confirmed that the polyhydroxyalkanoate was a copolymer in which an E unit accounted for 11 mol % of the unit of the polyhydroxyalkanoate represented by the chemical formula (104) and an F unit accounted for 89 mol % thereof. The resultant polymer was evaluated for average molecular weight by means of gel permeation chromatography (GPC; Tosoh Corporation HLC-8120, column; Polymer Laboratories PLgel 5µ MIXED-C, solvent; DMF/LiBr 0.1% (w/v), in terms of polystyrene). As a result, the resultant polymer was found to have a number average molecular weight Mn of 26,800 and a weight average molecular weight Mw of 42,900. The series of preparation method was upscaled to produce the polyhydroxyalkanoate represented by the chemical formula (104) in a large amount. The compound was provided as Exemplified Compound 2A.

Preparation Example 2B-1

Synthesis of Polyester Using tetrahydro-3-(2-propenyl)-2H-pyrane-2-one and phenyl lactide(3,6-bis (phenylmethyl)-1,4-dioxane-2,5-dione)

0.28 g (2.0 mmol) of tetrahydro-3-(2-propenyl)-2H-pyrane-2-one, 2.96 g (10.0 mmol) of phenyl lactide, 4.8 ml of a solution of 0.01 M of tin octylate(tin 2-ethylhexanoate) in toluene, and 4.8 ml of a solution of 0.01 M of p-tert-butylbenzyl alcohol in toluene were placed in a polymerization ampule. After that, 2.06 g of a polymer were prepared in the same manner as in Preparation Example A-1. NMR analysis was performed under the same conditions as those of Preparation Example A-1 to determine the structure of the resultant polymer. The analysis confirmed that the polymer was a polyhydroxyalkanoate copolymer containing a unit represented by the following chemical formula (105) as a monomer unit. The analysis also confirmed that an A unit accounted for 13 mol % of the monomer unit and a B unit accounted for 87 mol % thereof.

(105)

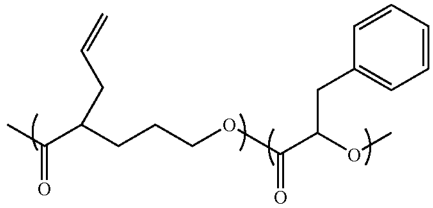

A B

The resultant polyhydroxyalkanoate was evaluated for average molecular weight in the same manner as in Preparation Example A-1. As a result, the resultant polyhydroxyalkanoate was found to have a number average molecular weight Mn of 32,000 and a weight average molecular weight Mw of 56,000.

Preparation Example 2B-2

Oxidation Reaction of Polyhydroxyalkanoate Composed of Unit Represented by Chemical Formula (105) Synthesized in Preparation Example 2B-1

(105)

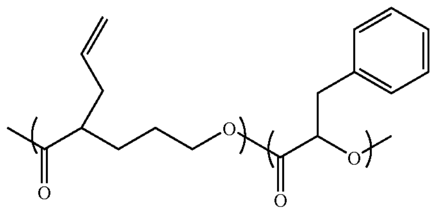

A B 0.50 g of the polyhydroxyalkanoate copolymer composed of the unit represented by the chemical formula (105) synthesized in Preparation Example 2B-1 (A: 13 mol %, B: 87 mol %) was placed in a round-bottomed flask, and 30 ml of acetone were added to dissolve this. The flask was placed in an ice bath, 5 ml of acetic acid and 0.35 g of 18-crown-6-ether were added, and the whole was stirred. Next, 0.28 g of potassium permanganate was gradually added to the flask in the ice bath, and the whole was stirred in the ice bath for 2 hours and stirred at room temperature for an additional 18 hours. After the completion of the reaction, 0.45 g of a polymer was prepared in the same manner as in Preparation Example A-2. NMR analysis was performed under the same conditions as those of Preparation Example A-1 to determine the structure of the resultant polymer. The analysis confirmed that the polymer was a polyhydroxyalkanoate containing a unit represented by the following chemical formula (106) as a monomer unit.

(106)

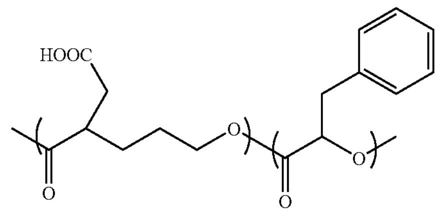

C D

The resultant polyhydroxyalkanoate was evaluated for average molecular weight in the same manner as in Preparation Example A-1. As a result, the resultant polyhydroxyalkanoate was found to have a number average molecular weight Mn of 30,100 and a weight average molecular weight Mw of 54,200.

Furthermore, in order to calculate the unit of the resultant polyhydroxyalkanoate, 29 mg of the polyhydroxyalkanoate prepared in the same manner as in Preparation Example A-2 were subjected to NMR analysis in the same manner as in Preparation Example A-1. The analysis confirmed that the polyhydroxyalkanoate was a copolymer in which a C unit accounted for 12 mol % of the unit of the polyhydroxyalkanoate represented by the chemical formula (106) and a D unit accounted for 88 mol % thereof.

Preparation Example 2B-3

Condensation Reaction Between Polyhydroxyalkanoate Composed of Unit Represented by Chemical Formula (106) Synthesized in Preparation Example 2B-2 and 4-methoxyaniline-2-sulfonic acid (106)

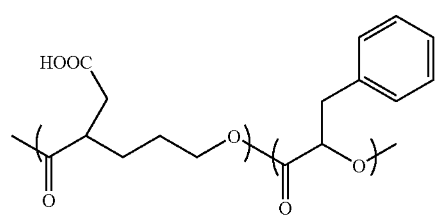

C D

Under a nitrogen atmosphere, 0.40 g of the polymer synthesized by using the polyhydroxyalkanoate copolymer composed of the unit represented by the chemical formula (106) synthesized in Preparation Example 2B-2 (C: 12 mol %, D: 88 mol %) and 0.33 g of 4-methoxyaniline-2-sulfonic acid were placed in a 100-ml three-necked flask. 15.0 ml of pyridine were added to the flask, and the mixture was stirred. After that, 0.84 ml of triphenyl phosphite was added, and the whole was heated at 120° C. for 6 hours. After the completion of the reaction, 0.33 g of a polymer was prepared in the same manner as in Preparation Example A-3. The structure of the resultant polymer was determined through analysis in the same manner as in Preparation Example A-3. As a result of IR measurement, a peak at 1,695 $cm^{-1}$ derived from a carboxylic acid reduced, and a peak derived from an amide group was newly observed at 1,658 $cm^{-1}$. $^1$H-NMR confirmed that the resultant polymer was a polyhydroxyalkanoate containing a unit represented by the following chemical formula (107) as a monomer unit because a peak derived from an aromatic ring of the 4-methoxyaniline-2-sulfonic acid structure shifted.

(107)

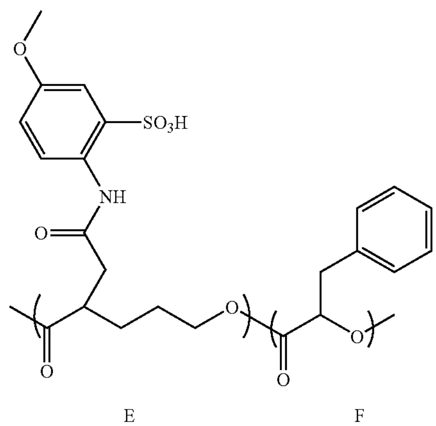

It was also confirmed that the polyhydroxyalkanoate was a copolymer in which an E unit accounted for 11 mol % of the unit of the polyhydroxyalkanoate represented by the chemical formula (107) and an F unit accounted for 89 mol % thereof. The resultant polymer was evaluated for average molecular weight in the same manner as in Preparation Example A-3. As a result, the resultant polymer was found to have a number average molecular weight Mn of 29,500 and a weight average molecular weight Mw of 53,700. The series of preparation method was upscaled to produce the polyhydroxyalkanoate represented by the chemical formula (107) in a large amount. The compound was provided as Exemplified Compound 2B.

Preparation Example 2C-1

Synthesis of Polyester Using Phenyl Lactide 29.63 g (100.0 mmol) of phenyl lactide, 4.0 ml of a solution of 0.1 M of tin octylate(tin 2-ethylhexanoate) in toluene, and 4.0 ml of a solution of 0.1 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 180° C. to perform ring-opening polymerization. 10 hours after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 24.00 g of a polymer. NMR analysis was performed under the following conditions to determine the structure of the resultant polymer.

<Measuring equipment> FT-NMR: Bruker DPX 400

Resonance frequency: $^1H$=400 MHz

<Measurement conditions> Measured nuclear species: $^1H$

Solvent used: TMS/$CDCl_3$

Measurement temperature: room temperature

The analysis confirmed that the resultant compound was a polyhydroxyalkanoate containing a unit represented by the following chemical formula (108) as a monomer unit.

(108)

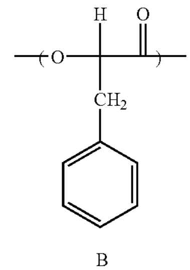

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 35,000 and a weight average molecular weight Mw of 49,000.

Preparation Example 2C-2

10.00 g of the polyhydroxyalkanoate composed of the unit represented by the chemical formula (108) synthesized in Preparation Example 2C-1 were placed in a round-bottomed flask, and 500 ml of THF were added to dissolve this. The flask was placed under a nitrogen atmosphere, and the solution was stirred at −78° C. Next, 33.75 ml (67.5 mmol) of a solution of 2 M of lithium diisopropylamide in THF were gradually added to the flask, and the whole was stirred at −78° C. for 30 minutes. Next, 11.58 g (130.5 mmol) of benzyl chloroformate were added to the flask, and the whole was stirred at room temperature for 30 minutes. After the completion of the reaction, the reaction solution was poured into 1,000 ml of an aqueous solution of ammonium chloride, and 500 ml of dichloromethane were added to extract the organic layer. The extracted organic layer was washed with 250 ml of water 3 times. After the organic layer had been collected, the solvent was distilled off to collect a crude polymer. Next, the polymer was dissolved into 60 ml of THF, then dissolved into THF, and reprecipitated in methanol in an amount 50 times that of THF necessary for the dissolution. The precipitate was collected and dried under reduced pressure to prepare 8.03 g of a polymer. NMR analysis was performed under the same conditions as those of Preparation Example 2C-1 to determine the structure of the resultant polymer. The analysis confirmed that the polymer was a polyhydroxyalkanoate containing a unit represented by the following chemical formula (109) as a monomer unit. The analysis also confirmed that an A unit accounted for 11 mol % of the monomer unit and a B unit accounted for 89 mol % thereof.

(109)

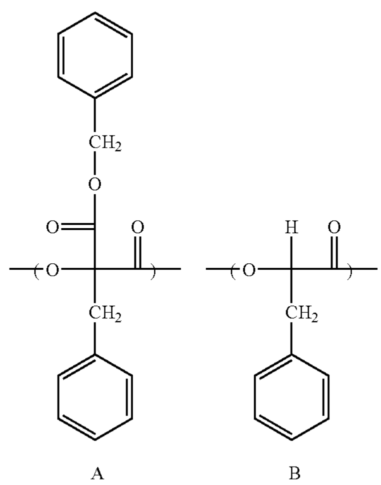

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 28,500 and a weight average molecular weight Mw of 41,000.

5.00 g of the polyhydroxyalkanoate copolymer represented by the chemical formula (109) synthesized here were dissolved into 500 ml of a mixed solvent of dioxane-ethanol (75:25), and 1.10 g of a 5% palladium/carbon catalyst were added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 3.66 g of a polymer. NMR analysis was performed under the same conditions as those of Preparation Example 2C-1 to determine the structure of the resultant polymer. The analysis confirmed that the polymer was a polyhydroxyalkanoate copolymer containing a unit represented by the following chemical formula (110) as a monomer unit. The analysis also confirmed that a C unit accounted for 11 mol % of the monomer unit and a D unit accounted for 89 mol % thereof.

(110)

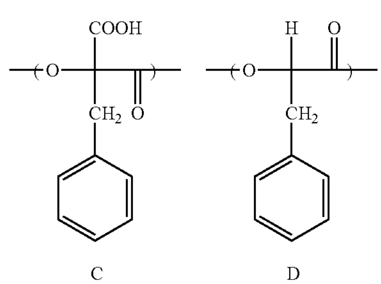

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 22,500 and a weight average molecular weight Mw of 33,800.

30 mg of the polyhydroxyalkanoate synthesized here were placed in a 100-ml round-bottomed flask. Then, 2.1 ml of chloroform and 0.7 ml of methanol were added to dissolve the polyhydroxyalkanoate. 0.5 ml of a 2-mol/L trimethylsilyldiazomethane-hexane solution was added to the solution, and the whole was stirred at room temperature for 1 hour. After the completion of the reaction, the solvent was distilled off, and then a polymer was collected. This polymer was washed with 50 ml of methanol and collected. The polymer was dried under reduced pressure to prepare 29 mg of a polyhydroxyalkanoate.

The resultant polyhydroxyalkanoate was subjected to NMR analysis in the same manner as in Preparation Example 2C-1. The analysis confirmed that a carboxyl group of the C unit was transformed into methyl carboxylate, and that the resultant polymer can be esterified again.

Preparation Example 2C-3

Under a nitrogen atmosphere, 0.40 g of the polyhydroxyalkanoate copolymer composed of the unit represented by the chemical formula (110) synthesized in Preparation Example 2C-2 (C: 11 mol %, D: 89 mol %) and 0.25 g (1.4 mmol) of 2-aminobenzenesulfonic acid were placed in a 100-ml three-necked flask. 15.0 ml of pyridine were added to the flask, and the mixture was stirred. After that, 0.75 ml (2.8 mmol) of triphenyl phosphite was added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.35 g of a polymer. The structure of the resultant polymer was determined through analysis according to $^{1}H$-NMR (FT-NMR: Bruker DPX 400; resonance frequency: 400 MHz; measured nuclear species: $^{1}H$; solvent used: heavy DMSO; measurement temperature: room temperature) or Fourier transformation-infrared absorption (FT-IR) spectrum (Nicolet AVATAR 360FT-IR). As a result of IR measurement, a peak at 1,695 $cm^{-1}$ derived from a carboxylic acid reduced, and a peak derived from an amide group was newly observed at 1,658 $cm^{-1}$.

$^{1}H$-NMR confirmed that the resultant polymer was a polyhydroxyalkanoate containing a unit represented by the following chemical formula (111) as a monomer unit because a peak derived from an aromatic ring of the 2-aminobenzenesulfonic acid structure shifted.

(111)

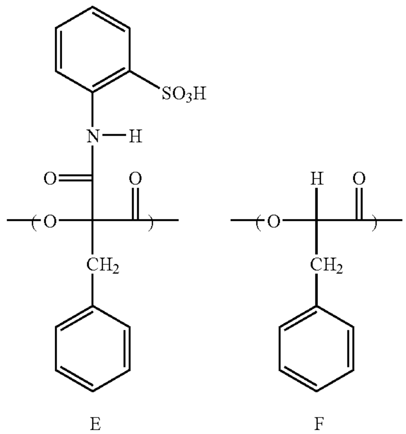

It was also confirmed that the polyhydroxyalkanoate was a copolymer in which an E unit accounted for 11 mol % of the unit of the polyhydroxyalkanoate represented by the chemical formula (111). The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), in terms of polystyrene). As a result, the resultant polymer was found to have a number average molecular weight Mn of 20,500 and a weight average molecular weight Mw of 30,800.

Preparation Example 2C-4

0.30 g of the polyhydroxyalkanoate copolymer composed of the unit represented by the chemical formula (111) synthesized in Preparation Example 2C-3 was added to a round-bottomed flask. Then, 21.0 ml of chloroform and 7.0 ml of methanol were added to dissolve the polymer, and the solution was cooled to 0° C. 0.78 ml of a 2-mol/L trimethylsilyldiazomethane-hexane solution (manufactured by Aldrich) was added to the solution, and the whole was stirred for 4 hours. After the completion of the reaction, the solvent was distilled off by using an evaporator, and then the polymer was collected. Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature). $^1$H-NMR confirmed that the resultant polymer was a polyhydroxyalkanoate containing a unit represented by the following chemical formula (112) as a monomer unit because a peak derived from methyl sulfonate was observed at 3 to 4 ppm.

(112)

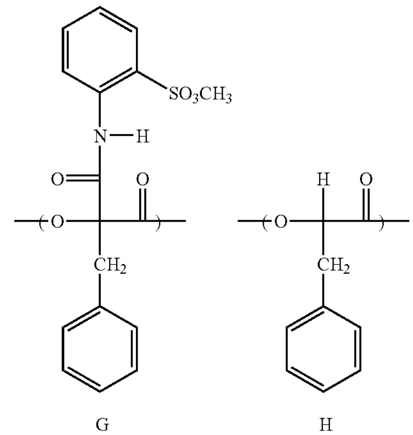

It was also confirmed that a G unit accounted for 11 mol % of the unit of the polyhydroxyalkanoate represented by the chemical formula (112). In addition, acid value titration using an electric potential titration device AT510 (manufactured by Kyoto Denshi) revealed that the sulfonic acid was transformed into methyl sulfonate because no peak derived from the sulfonic acid was observed. The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1 (w/v), in terms of polystyrene). As a result, the resultant polymer was found to have a number average molecular weight Mn of 20,000 and a weight average molecular weight Mw of 30,400. The series of preparation method was upscaled to produce the polyhydroxyalkanoate represented by the chemical formula (112) in a large amount. The compound was provided as Exemplified Compound 2C.

Preparation Example 2D-1

8.02 g of a polymer were prepared by using the polyhydroxyalkanoate composed of the unit represented by the chemical formula (108) synthesized in Preparation Example 2C-1 in the same manner as in Preparation Example 2C-2 except that 14.41 g (130.5 mmol) of ethyl 5-bromo valerate were used instead of benzyl chloroformate. The resultant polymer was subjected to NMR analysis under the same conditions as those of Preparation Example 2C-1. The analysis confirmed that the polymer was a polyhydroxyalkanoate containing a unit represented by the following chemical formula (113). The analysis also confirmed that an A unit accounted for 8 mol % of the monomer unit and a B unit accounted for 92 mol % thereof.

(113)

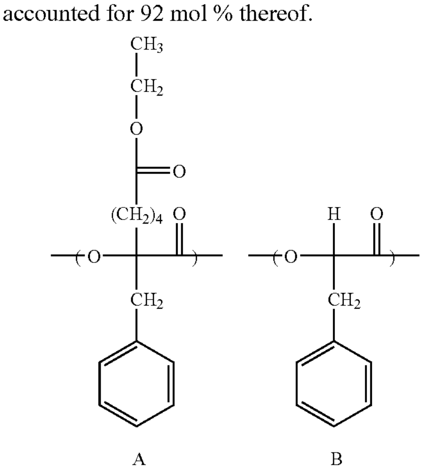

The average molecular weight of the resultant polyhydroxyalkanoate was measured under the same conditions as those of Preparation Example 2C-1. As a result, the resultant polyhydroxyalkanoate was found to have a number average molecular weight Mn of 28,500 and a weight average molecular weight Mw of 39,600.

The above polymer was subjected to hydrogenolysis in the same manner as in Preparation Example 2C-2 to prepare 3.94 g of a polymer. The resultant polymer was subjected to NMR analysis under the same conditions as those of Preparation Example 2C-1. The analysis confirmed that the polymer was a polyhydroxyalkanoate copolymer containing a unit represented by the following chemical formula (114) as a monomer unit. The analysis also confirmed that a C unit accounted for 8 mol % of the monomer unit and a D unit accounted for 92 mol % thereof.

(114)

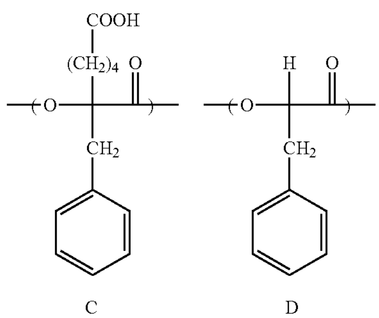

The average molecular weight of the resultant polyhydroxyalkanoate was measured under the same conditions as those of Preparation Example 2C-1. As a result, the resultant polyhydroxyalkanoate was found to have a number average molecular weight Mn of 24,900 and a weight average molecular weight Mw of 35,400.

Preparation Example 2D-2

Under a nitrogen atmosphere, 0.40 g of the polyhydroxyalkanoate copolymer composed of the unit represented by the chemical formula (114) synthesized in Preparation Example 2D-1 (C: 8 mol %, D: 92 mol %) and 0.13 g (1.0 mmol) of taurine were placed in a 100-ml three-necked flask. 15.0 ml of pyridine were added to the flask, and the mixture was stirred. After that, 0.53 ml (1.0 mmol) of triphenyl phosphite was added. After that, 0.31 g of a polymer was prepared in the same manner as in Preparation Example A-3. The resultant polymer was subjected to NMR analysis and Fourier transformation-infrared absorption spectral analysis under the same conditions as those of Preparation Example A-3. As a result, it was confirmed that the resultant polymer was a polyhydroxyalkanoate containing a unit represented by the following chemical formula (115), and that the polyhydroxyalkanoate was a copolymer in which an E unit accounted for 6 mol % of the unit.

(115)

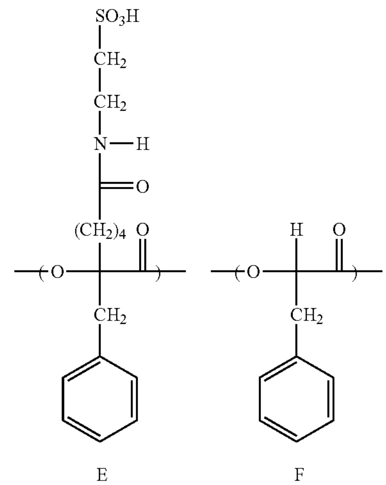

The average molecular weight of the resultant polymer was measured under the same conditions as those of Preparation Example A-3. As a result, the resultant polymer was found to have a number average molecular weight Mn of 19,800 and a weight average molecular weight Mw of 31,700. The series of preparation method was upscaled to produce the polyhydroxyalkanoate represented by the chemical formula (115) in a large amount. The compound was provided as Exemplified Compound 2D.

Preparation Example 2E-1

Synthesis of Polyester Using L-lactide 14.41 g (100.0 mmol) of L-lactide, 4.0 ml of a solution of 0.1 M of tin octylate(tin 2-ethylhexanoate) in toluene, and 4.0 ml of a solution of 0.1 M of p-tert-butylbenzyl alcohol in toluene were placed in a polymerization ampule, and the whole was dried under reduced pressure for 1 hour and replaced with nitrogen. After that, the ampule was heat-sealed under reduced pressure and heated to 160° C. to perform ring-opening polymerization. 10 hours after that, the reaction was terminated, and the ampule was cooled. The resultant polymer was dissolved into chloroform, and reprecipitated in methanol in an amount 10 times that of chloroform necessary for the dissolution. The precipitate was collected and dried under reduced pressure to prepare 12.68 g of a polymer. NMR analysis was performed under the same conditions as those of Preparation Example 2C-1 to determine the structure of the resultant compound. The analysis confirmed that the compound was a polyhydroxyalkanoate containing a unit represented by the following chemical formula (116).

(116)

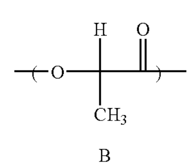

The average molecular weight of the resultant polyhydroxyalkanoate was measured under the same conditions as those of Preparation Example 2C-1. As a result, the resultant polyhydroxyalkanoate was found to have a number average molecular weight Mn of 42,800 and a weight average molecular weight Mw of 59,100.

Preparation Example 2E-2

10.00 g of the polyhydroxyalkanoate composed of the unit represented by the chemical formula (116) synthesized in Preparation Example 2E-1 were placed in a round-bottomed flask, and 500 ml of THF were added to dissolve this. The flask was placed under a nitrogen atmosphere, and the solution was stirred at −78° C. Next, 69.38 ml (138.8 mmol) of a solution of 2 M of lithium diisopropylamide in THF were gradually added to the flask, and the whole was stirred at −78° C. for 30 minutes. Next, 23.81 g (277.5 mmol) of benzyl chloroformate were added to the flask. After that, 9.55 g of a polymer were prepared in the same manner as in Preparation Example 2C-2. The resultant polymer was subjected to NMR analysis under the same conditions as those of Preparation Example 2C-1. The analysis confirmed that the polymer was a polyhydroxyalkanoate containing a unit represented by the following chemical formula (117). The analysis also confirmed that an A unit accounted for 12 mol % of the monomer unit and a B unit accounted for 88 mol % thereof.

(117)

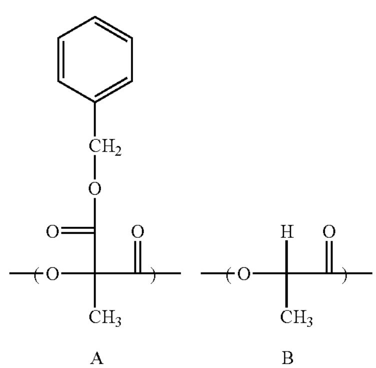

The average molecular weight of the resultant polyhydroxyalkanoate was measured under the same conditions as those of Preparation Example 2C-1. As a result, the resultant polyhydroxyalkanoate was found to have a number average molecular weight Mn of 32,100 and a weight average molecular weight Mw of 46,500.

The above polymer was subjected to hydrogenolysis in the same manner as in Preparation Example 2C-2 to prepare 3.47 g of a polymer. The resultant polymer was subjected to NMR analysis under the same conditions as those of Preparation Example 2C-1. The analysis confirmed that the polymer was a polyhydroxyalkanoate copolymer containing a unit represented by the following chemical formula (118) as a monomer unit. The analysis also confirmed that a C unit accounted for 12 mol % of the monomer unit and a D unit accounted for 88 mol % thereof.

(118)

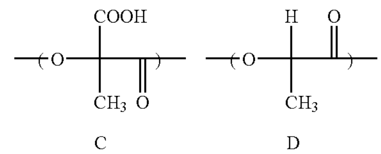

The average molecular weight of the resultant polyhydroxyalkanoate was measured under the same conditions as those of Preparation Example 2C-1. As a result, the resultant polyhydroxyalkanoate was found to have a number average molecular weight Mn of 30,100 and a weight average molecular weight Mw of 45,200.

Preparation Example 2E-3

Under a nitrogen atmosphere, 0.40 g of the polyhydroxyalkanoate copolymer composed of the unit represented by the chemical formula (118) synthesized in Preparation Example 2E-2 (C: 12 mol %, D: 88 mol %) and 0.69 g (3.1 mmol) of 2-amino-1-naphthalenesulfonic acid were placed in a 100-ml three-necked flask. 15.0 ml of pyridine were added to the flask, and the mixture was stirred. After that, 1.62 ml (6.2 mmol) of triphenyl phosphite were added. After that, 0.37 g of a polymer was prepared in the same manner as in Preparation Example 2C-3. The resultant polymer was subjected to NMR analysis and Fourier transformation-infrared absorption spectral analysis under the same conditions as those of Preparation Example 2C-3. As a result, it was confirmed that the resultant polymer was a polyhydroxyalkanoate containing a unit represented by the following chemical formula (119), and that the polyhydroxyalkanoate was a copolymer in which an E unit accounted for 8 mol % of the unit.

(119)

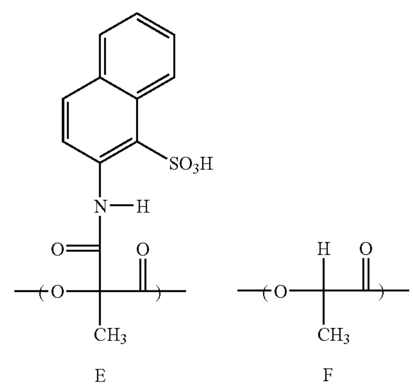

The average molecular weight of the resultant polymer was measured under the same conditions as those of Preparation Example 2C-3. As a result, the resultant polymer was found to have a number average molecular weight Mn of 27,200 and a weight average molecular weight Mw of 43,000.

Preparation Example 2E-4

0.30 g of the polyhydroxyalkanoate copolymer composed of the unit represented by the chemical formula (119) synthesized in Preparation Example 2E-3 was added to a round-bottomed flask. Then, 21.0 ml of chloroform and 7.0 ml of methanol were added to dissolve the polymer, and the solution was cooled to 0° C. 0.90 ml of a 2-mol/L trimethylsilyl-diazomethane-hexane solution (manufactured by Aldrich) was added to the solution, and the whole was stirred for 4 hours. After the completion of the reaction, the solvent was distilled off by using an evaporator, and then the polymer was collected. Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature). $^1$H-NMR confirmed that the resultant polymer was a polyhydroxyalkanoate containing a unit represented by the following chemical formula (120) as a monomer unit because a peak derived from methyl sulfonate was observed at 3 to 4 ppm.

(120)

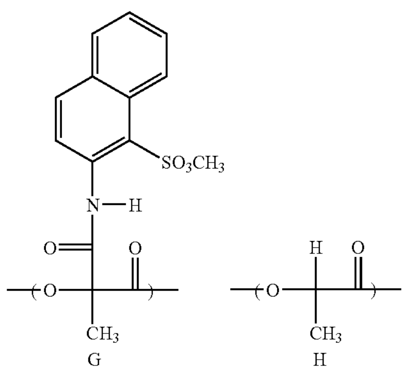

It was also confirmed that a G unit accounted for 8 mol % of the unit of the polyhydroxyalkanoate represented by the chemical formula (120). In addition, acid value titration using an electric potential titration device AT510 (manufactured by Kyoto Denshi) revealed that the sulfonic acid was transformed into methyl sulfonate because no peak derived from the sulfonic acid was observed. The resultant polymer was evaluated for average molecular weight by means of the same measuring conditions as those in Preparation Example 2C-4. As a result, the resultant polymer was found to have a number average molecular weight Mn of 27,000 and a weight average molecular weight Mw of 43,700. The series of preparation method was upscaled to produce the polyhydroxyalkanoate represented by the chemical formula (120) in a large amount. The compound was provided as Exemplified Compound 2E.

Preparation Example 2F-1

8.63 g of a polymer were prepared in the same manner as in Preparation Example 2E-2 except that 34.85 g (277.5 mmol) of ethyl 8-bromooctanoate were used instead of benzyl chloroformate. The resultant polymer was subjected to NMR analysis under the same conditions as those of Preparation Example 2C-1. The analysis confirmed that the polymer was a polyhydroxyalkanoate containing a unit represented by the following chemical formula (121). The analysis also confirmed that an A unit accounted for 7 mol % of the monomer unit and a B unit accounted for 93 mol % thereof.

(121)

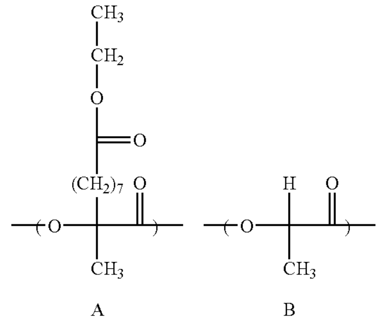

The average molecular weight of the resultant polyhydroxyalkanoate was measured under the same conditions as those of Preparation Example 2C-1. As a result, the resultant polyhydroxyalkanoate was found to have a number average molecular weight Mn of 35,500 and a weight average molecular weight Mw of 52,500.

The above polymer was subjected to hydrogenolysis in the same manner as in Preparation Example 2C-2 to prepare 4.10 g of a polymer. The resultant polymer was subjected to NMR analysis under the same conditions as those of Preparation Example 2C-1. The analysis confirmed that the polymer was a polyhydroxyalkanoate copolymer containing a unit represented by the following chemical formula (122) as a monomer unit. The analysis also confirmed that a C unit accounted for 10 mol % of the monomer unit and a D unit accounted for 90 mol % thereof.

(122)

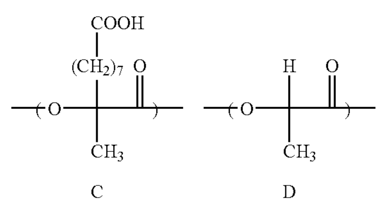

The average molecular weight of the resultant polyhydroxyalkanoate was measured under the same conditions as those of Preparation Example 2C-1. As a result, the resultant polyhydroxyalkanoate was found to have a number average molecular weight Mn of 31,000 and a weight average molecular weight Mw of 48,100.

Preparation Example 2F-2

Under a nitrogen atmosphere, 0.40 g of the polyhydroxyalkanoate copolymer composed of the unit represented by the chemical formula (122) synthesized in Preparation Example 2F-1 (C: 7 mol %, D: 93 mol %) and 0.43 g (1.7 mmol) of phenyl 2-aminobenzene sulfonate were placed in a 100-ml three-necked flask. 15.0 ml of pyridine were added to the flask, and the mixture was stirred. After that, 0.89 ml (3.4 mmol) of triphenyl phosphite was added. After that, 0.39 g of a polymer was prepared in the same manner as in Preparation Example 2C-3. The resultant polymer was subjected to NMR analysis and Fourier transformation-infrared absorption spectral analysis under the same conditions as those of Preparation Example 2C-3. As a result, it was confirmed that the resultant polymer was a polyhydroxyalkanoate containing a unit represented by the following chemical formula (123), and that the polyhydroxyalkanoate was a copolymer in which an E unit accounted for 7 mol % of the unit.

(123)

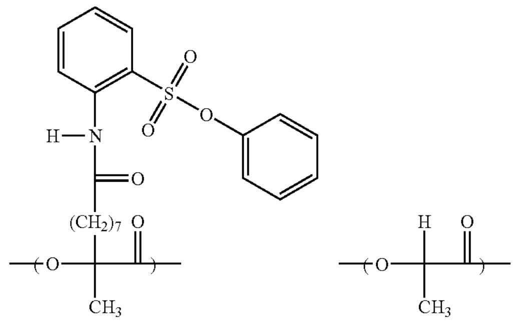

E F

The average molecular weight of the resultant polymer was measured under the same conditions as those of Preparation Example 2C-3. As a result, the resultant polymer was found to have a number average molecular weight Mn of 27,500 and a weight average molecular weight Mw of 44,600. The series of preparation method was upscaled to produce the polyhydroxyalkanoate represented by the chemical formula (123) in a large amount. The compound was provided as Exemplified Compound 2F.

Preparation Example 2G-1

Synthesis of Polyester Using diisopropyl glycolide(3,6-diisopropyl-1,4-dioxane-2,5-dione)

14.15 g of a polymer were prepared in the same manner as in Preparation Example 2E-1 except that 22.83 g (100.0 mmol) of diisopropyl glycolide were used instead of L-lactide. The resultant polymer was subjected to NMR analysis under the same conditions as those of Preparation Example 2C-1. The analysis confirmed that the polymer was a polyhydroxyalkanoate containing a unit represented by the following chemical formula (124).

(124)

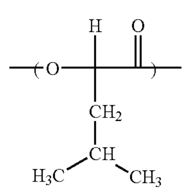

B

The average molecular weight of the resultant polyhydroxyalkanoate was measured under the same conditions as those of Preparation Example 2C-1. As a result, the resultant polyhydroxyalkanoate was found to have a number average molecular weight Mn of 32,800 and a weight average molecular weight Mw of 48,500.

Preparation Example 2G-2

10.00 g of the polyhydroxyalkanoate composed of the unit represented by the chemical formula (124) synthesized in Preparation Example 2G-1 were placed in a round-bottomed flask, and 500 ml of THF were added to dissolve this. The flask was placed under a nitrogen atmosphere, and the solution was stirred at −78° C. Next, 43.81 ml (87.6 mmol) of a solution of 2 M of lithium diisopropylamide in THF were gradually added to the flask, and the whole was stirred at −78° C. for 30 minutes. Next, 18.32 g (175.2 mmol) of ethyl 5-bromovalerate were added to the flask. After that, 7.64 g of a polymer were prepared in the same manner as in Preparation Example 2C-2. The resultant polymer was subjected to NMR analysis under the same conditions as those of Preparation Example 2C-1. The analysis confirmed that the polymer was a polyhydroxyalkanoate containing a unit represented by the following chemical formula (125). The analysis also confirmed that an A unit accounted for 8 mol % of the monomer unit and a B unit accounted for 92 mol % thereof.

(125)

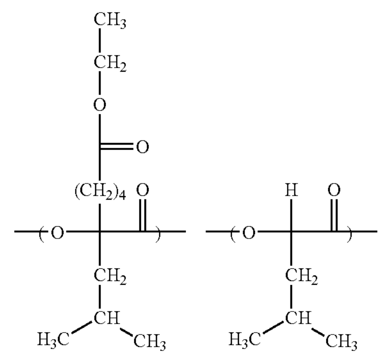

A B

The average molecular weight of the resultant polyhydroxyalkanoate was measured under the same conditions as those of Preparation Example 2C-1. As a result, the resultant polyhydroxyalkanoate was found to have a number average molecular weight Mn of 26,500 and a weight average molecular weight Mw of 41,100.

The above polymer was subjected to hydrogenolysis in the same manner as in Preparation Example 2C-2 to prepare 4.05 g of a polymer. The resultant polymer was subjected to NMR analysis under the same conditions as those of Preparation Example 2C-1. The analysis confirmed that the polymer was a polyhydroxyalkanoate copolymer containing a unit represented by the following chemical formula (126) as a monomer unit. The analysis also confirmed that a C unit accounted for 11 mol % of the monomer unit and a D unit accounted for 89 mol % thereof.

(126)

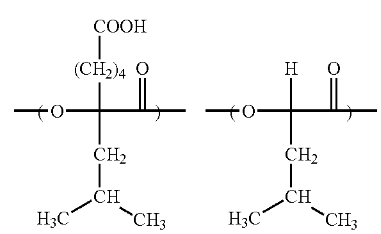

C D

The average molecular weight of the resultant polyhydroxyalkanoate was measured under the same conditions as those of Preparation Example 2C-1. As a result, the resultant polyhydroxyalkanoate was found to have a number average molecular weight Mn of 22,200 and a weight average molecular weight Mw of 33,700.

Preparation Example 2G-3

Under a nitrogen atmosphere, 0.40 g of the polyhydroxyalkanoate copolymer composed of the unit represented by the chemical formula (126) synthesized in Preparation Example 2G-2 (C: 11 mol %, D: 89 mol %) and 0.27 g (1.8 mmol) of 2-amino-2-methylpropanesulfonic acid were placed in a 100-ml three-necked flask. 15.0 ml of pyridine were added to the flask, and the mixture was stirred. After that, 0.92 ml (3.5 mmol) of triphenyl phosphite was added. After that, 0.33 g of a polymer was prepared in the same manner as in Preparation Example 2C-3. The resultant polymer was subjected to NMR analysis and Fourier transformation-infrared absorption spectral analysis under the same conditions as those of Preparation Example 2C-3. As a result, it was confirmed that the resultant polymer was a polyhydroxyalkanoate containing a unit represented by the following chemical formula (127), and that the polyhydroxyalkanoate was a copolymer in which an E unit accounted for 9 mol % of the unit.

(127)

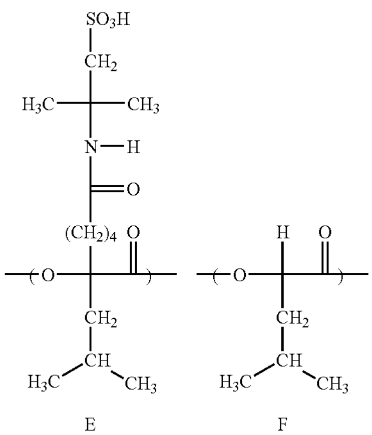

The average molecular weight of the resultant polymer was measured under the same conditions as those of Preparation Example 2C-3. As a result, the resultant polymer was found to have a number average molecular weight Mn of 20,900 and a weight average molecular weight Mw of 35,500.

Preparation Example 2G-4

0.29 g of a polymer was prepared in the same manner as in Preparation Example 2C-4 except that: the polyhydroxyalkanoate represented by the chemical formula (127) synthesized in Preparation Example 2G-3 was used instead of the polyhydroxyalkanoate represented by the chemical formula (111) synthesized in Preparation Example 2C-4; and 0.70 ml of a 2-mol/L trimethylsilyldiazomethane-hexane solution (manufactured by Aldrich) was used. The resultant polymer was subjected to NMR analysis under the same conditions as those of Preparation Example 2C-4. The analysis confirmed that the resultant polymer was a polyhydroxyalkanoate containing a unit represented by the following chemical formula (128), and that the polyhydroxyalkanoate was a copolymer in which a G unit accounted for 9 mol % of the unit.

In addition, acid value titration in the same manner as in Preparation Example 2C-4 revealed that the sulfonic acid was transformed into methyl sulfonate because no peak derived from the sulfonic acid was observed.

(128)

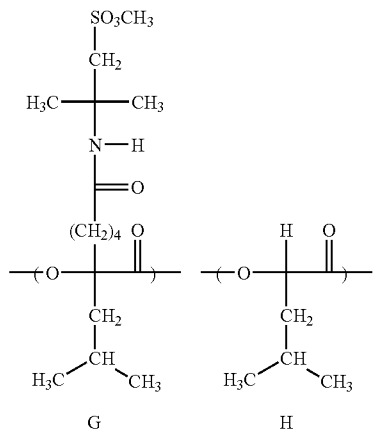

The average molecular weight of the resultant polymer was measured under the same conditions as those of Preparation Example 2C-4. As a result, the resultant polymer was found to have a number average molecular weight Mn of 19,500 and a weight average molecular weight Mw of 33,200. The series of preparation method was upscaled to produce the polyhydroxyalkanoate represented by the chemical formula (128) in a large amount. The compound was provided as Exemplified Compound 2G.

Preparation Example 2H-1

Synthesis of Polyester Using hexyl glycolide(3,6-dihexyl-1,4-dioxane-2,5-dione)

16.66 g of a polymer were prepared in the same manner as in Preparation Example 2E-1 except that 25.63 g (100.0 mmol) of hexyl glycolide were used instead of L-lactide. The resultant polymer was subjected to NMR analysis under the same conditions as those of Preparation Example 2C-1. The analysis confirmed that the polymer was a polyhydroxyalkanoate containing a unit represented by the following chemical formula (129).

(129)

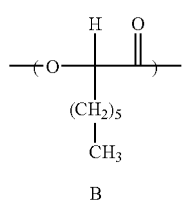

The average molecular weight of the resultant polyhydroxyalkanoate was measured under the same conditions as those of Preparation Example 2C-1. As a result, the resultant polyhydroxyalkanoate was found to have a number average molecular weight Mn of 28,900 and a weight average molecular weight Mw of 42,200.

Preparation Example 2H-2

10.00 g of the polyhydroxyalkanoate composed of the unit represented by the chemical formula (129) synthesized in Preparation Example 2H-1 were placed in a round-bottomed flask, and 500 ml of THF were added to dissolve this. The flask was placed under a nitrogen atmosphere, and the solution was stirred at −78° C. Next, 39.01 ml (78.0 mmol) of a solution of 2 M of lithium diisopropylamide in THF were gradually added to the flask, and the whole was stirred at −78° C. for 30 minutes. Next, 17.95 g (156.0 mmol) of benzyl bromoacetate were added to the flask. After that, 8.40 g of a polymer were prepared in the same manner as in Preparation Example 2C-2. The resultant polymer was subjected to NMR analysis under the same conditions as those of Preparation Example 2C-1. The analysis confirmed that the polymer was a polyhydroxyalkanoate containing a unit represented by the following chemical formula (130). The analysis also confirmed that an A unit accounted for 9 mol % of the monomer unit and a B unit accounted for 91 mol % thereof.

(130)

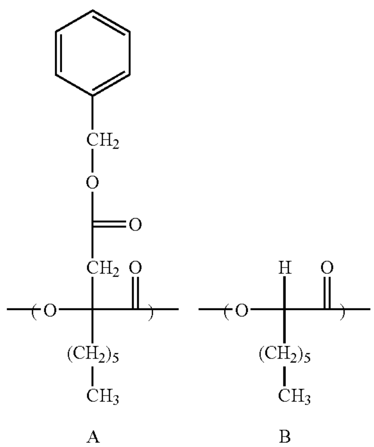

The average molecular weight of the resultant polyhydroxyalkanoate was measured under the same conditions as those of Preparation Example 2C-1. As a result, the resultant polyhydroxyalkanoate was found to have a number average molecular weight Mn of 23,000 and a weight average molecular weight Mw of 34,500.

The above polymer was subjected to hydrogenolysis in the same manner as in Preparation Example 2C-2 to prepare 3.68 g of a polymer. The resultant polymer was subjected to NMR analysis under the same conditions as those of Preparation Example 2C-1. The analysis confirmed that the polymer was a polyhydroxyalkanoate copolymer containing a unit represented by the following chemical formula (131) as a monomer unit. The analysis also confirmed that a C unit accounted for 9 mol % of the monomer unit and a D unit accounted for 91 mol % thereof.

(131)

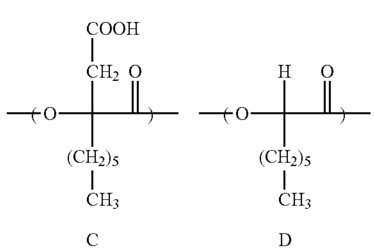

The average molecular weight of the resultant polyhydroxyalkanoate was measured under the same conditions as those of Preparation Example 2C-1. As a result, the resultant polyhydroxyalkanoate was found to have a number average molecular weight Mn of 19,800 and a weight average molecular weight Mw of 30,900.

Preparation Example 2H-3

Under a nitrogen atmosphere, 0.40 g of the polyhydroxyalkanoate copolymer composed of the unit represented by the chemical formula (131) synthesized in Preparation Example 2H-2 (C: 9 mol %, D: 91 mol %) and 0.23 g (1.3 mmol) of 2-aminobenzenesulfonic acid were placed in a 100-ml three-necked flask. 15.0 ml of pyridine were added to the flask, and the mixture was stirred. After that, 0.70 ml (1.3 mmol) of triphenyl phosphite was added. After that, 0.35 g of a polymer was prepared in the same manner as in Preparation Example 2C-3. The resultant polymer was subjected to NMR analysis and Fourier transformation-infrared absorption spectral analysis under the same conditions as those of Preparation Example 2C-3. As a result, it was confirmed that the resultant polymer was a polyhydroxyalkanoate containing a unit represented by the following chemical formula (132), and that the polyhydroxyalkanoate was a copolymer in which an E unit accounted for 8 mol % of the unit.

(132)

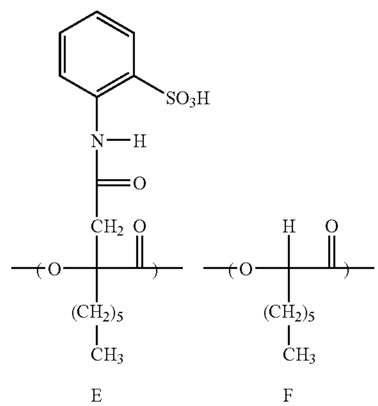

The average molecular weight of the resultant polymer was measured under the same conditions as those of Preparation Example 2C-3. As a result, the resultant polymer was found to have a number average molecular weight Mn of 18,900 and a weight average molecular weight Mw of 30,400. The series of preparation method was upscaled to produce the polyhydroxyalkanoate represented by the chemical formula (132) in a large amount. The compound was provided as Exemplified Compound 2H.

Preparation Example 2I-1

2.00 g of the polyhydroxyalkanoate composed of the unit represented by the chemical formula (108) synthesized in Preparation Example 2C-1 were placed in a round-bottomed flask, and 100 ml of THF were added to dissolve this. The flask was placed under a nitrogen atmosphere, and the solution was stirred at −78° C. Next, 18.9 ml of a solution of 2 M of lithium diisopropylamide in THF were gradually added to the flask, and the whole was stirred at −78° C. for 30 minutes. Next, 5.91 g of methyl 2-acrylamide-2-methylpropane sulfonate were added to the flask, and the whole was stirred at room temperature for 30 minutes. After the completion of the reaction, the reaction solution was poured into 400 ml of an aqueous solution of ammonium chloride, and 200 ml of dichloromethane were added to extract the organic layer. The extracted organic layer was washed with 100 ml of water 3 times. After the organic layer had been collected, the solvent was distilled off to collect a crude polymer. Next, the polymer was dissolved into 12 ml of THF, then dissolved into THF, and reprecipitated in methanol in an amount 50 times that of THF necessary for the dissolution. The precipitate was collected and dried under reduced pressure to prepare 1.22 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature). The analysis confirmed that the polymer was a polyhydroxyalkanoate containing a unit represented by the following chemical formula (133) as a monomer unit. The analysis also confirmed that an E unit accounted for 7 mol % of the monomer unit and an F unit accounted for 93 mol % thereof.

(133)

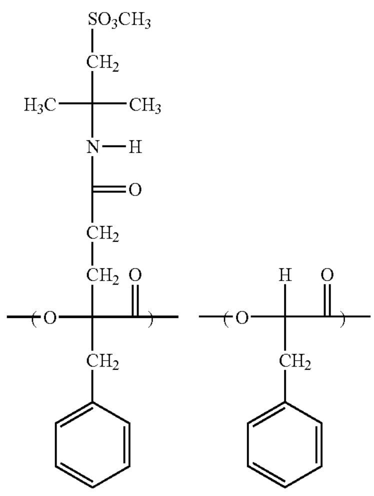

E F

The resultant polyhydroxyalkanoate was evaluated for average molecular weight by means of the same measuring conditions as those in Preparation Example 2C-4. As a result, the resultant polyhydroxyalkanoate was found to have a number average molecular weight Mn of 25,500 and a weight average molecular weight Mw of 38,200. The series of preparation method was upscaled to produce the polyhydroxyalkanoate represented by the chemical formula (133) in a large amount. The compound was provided as Exemplified Compound 2I.

Preparation Example 2J-1

In this preparation example, a microorganism is used to prepare a polyhydroxyalkanoate. The microorganism used in this preparation example is a Ralstoniaeutropha TB64 strain (disclosed in Japanese Patent Application Laid-Open No. 2000-166587). The microorganism is deposited in the International Patent Organism Depositary of the National Institute of Advanced Industrial Science and Technology.

The mineral salt medium (M9 medium) used in this preparation example has the following composition.

| M9 medium composition (in 1 L) | |
|---|---|
| $Na_2HPO_4$ | 6.2 g |
| $KH_2PO_4$ | 3.0 g |
| NaCl | 0.5 g |
| $NH_4Cl$ | 1.0 g |
| Water | Balance |

(pH 7.0)

For better proliferation of a microorganism and better production of a polyhydroxyalkanoate at the time of culture, the above mineral salt is added with about 0.3w (v/v) of a trace component solution shown below.

(Trace Component Solution Composition: Unit g/L)

Nitrilotriacetic acid: 1.5; $MgSO_4$: 3.0; $MnSO_4$: 0.5; NaCl: 1.0; $FeSO_4$: 0.1; $CaCl_2$: 0.1; $COCl_2$: 0.1; $ZnSO_4$: 0.1; $CuSO_4$: 0.1; $AlK(SO_4)_2$: 0.1; $H_3BO_3$: 0.1; $Na_2MoO_4$: 0.1; $NiCl_2$: 0.1

Synthesis of poly3-hydroxybutyric acid Represented by Chemical Formula (134)

(134)

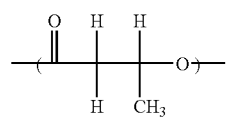

B

Poly3-hydroxybutyric acid represented by the chemical formula (134) was synthesized by means of the method disclosed in Example 1 of Japanese Patent Application Laid-Open No. 2002-306190.

A colony of a TB 64 strain on an M9 agar medium containing 0.1% of sodium malate was inoculated in 50 ml of an M9 medium containing 0.5% of sodium malate in a 500-mL shaking flask, and the whole was shake cultured at 30° C. 24 hours after that, 5 ml of the culture solution were added to 1 L of a production medium prepared by incorporating 0.5% of sodium malate into an M9 medium with the concentration of $NH_4Cl$ as a nitrogen source reduced to 1/10, and the whole was shaken in the same manner to accumulate PHB in a fungus body. 48 hours after that, the PHB-accumulated fungus body was harvested by means of centrifugation, centrifuged, washed with methanol, and then freeze-dried. After the dried fungus body had been weighed, chloroform was added, and the whole was stirred at 60° C. for 24 hours to extract a polymer. Chloroform from which the polymer had been extracted was filtered and concentrated by means of an evaporator. After that, a portion precipitated and solidified with cold methanol was collected and dried under reduced pressure to prepare 1.83 g of a polymer per L of the production medium. NMR analysis was performed under the following conditions to determine the structure of the resultant polymer.

<Measuring equipment> FT-NMR: Bruker DPX 400

Resonance frequency: $^1$H=400 MHz

<Measurement conditions> Measured nuclear species: $^1$H

Solvent used: TMS/$CDCl_3$

Measurement temperature: room temperature

The analysis confirmed that the resultant polymer was a polyhydroxyalkanoate containing a unit of 3-hydroxybutyric acid represented by the chemical formula (134). The resultant polyhydroxyalkanoate was evaluated for average molecular weight by means of gel permeation chromatography (GPC;

HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 549,500 and a weight average molecular weight Mw of 1,263,900.

45.6 g of the polyhydroxyalkanoate to be used for any subsequent preparation example were prepared from 50 L of the production medium by means of the above method.

Preparation Example 2J-2

10.00 g of the polyhydroxyalkanoate composed of the unit represented by the chemical formula (134) synthesized in Preparation Example 2J-1 were placed in a round-bottomed flask, and 500 ml of THF were added to dissolve this. The flask was placed under a nitrogen atmosphere, and the solution was stirred at −78° C. Next, 58.08 ml (116.2 mmol) of a solution of 2 M of lithium diisopropylamide in THF were gradually added to the flask, and the whole was stirred at −78° C. for 30 minutes. Next, 19.82 g (232.3 mmol) of benzyl chloroformate were added to the flask, and the whole was stirred at room temperature for 30 minutes. After the completion of the reaction, the reaction solution was poured into 1,000 ml of an aqueous solution of ammonium chloride, and 500 ml of dichloromethane were added to extract the organic layer. The extracted organic layer was washed with 250 ml of water 3 times. After the organic layer had been collected, the solvent was distilled off to collect a crude polymer. Next, the polymer was dissolved into 60 ml of THF, then dissolved into THF, and reprecipitated in methanol in an amount 50 times that of THF necessary for the dissolution. The precipitate was collected and dried under reduced pressure to prepare 8.44 g of a polymer. NMR analysis was performed under the same conditions as those of Preparation Example 2J-1 to determine the structure of the resultant polymer. The analysis confirmed that the polymer was a polyhydroxyalkanoate containing a unit represented by the following chemical formula (135) as a monomer unit. The analysis also confirmed that an A unit accounted for 10 mol % of the monomer unit and a B unit accounted for 90 mol % thereof.

(135)

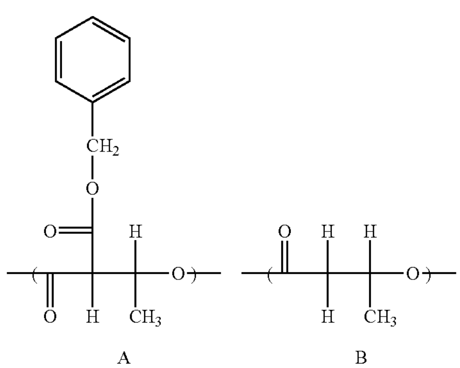

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 325,400 and a weight average molecular weight Mw of 764,700.

5.00 g of the polyhydroxyalkanoate copolymer represented by the chemical formula (135) synthesized here were dissolved into 500 ml of a mixed solvent of dioxane-ethanol (75:25), and 1.10 g of a 5% palladium/carbon catalyst were added to the solution. The inside of the reaction system was filled with hydrogen, and the whole was stirred at room temperature for 1 day. After the completion of the reaction, in order to remove the catalyst, the resultant was filtered through a 0.25-μm membrane filter to collect a reaction solution. After the solution had been concentrated, the concentrate was dissolved into chloroform, and reprecipitated in methanol in an amount 10 times that of chloroform. The resultant polymer was collected and dried under reduced pressure to prepare 3.59 g of a polymer. NMR analysis was performed under the same conditions as those of Preparation Example 2J-1 to determine the structure of the resultant polymer. The analysis confirmed that the polymer was a polyhydroxyalkanoate copolymer containing a unit represented by the following chemical formula (136) as a monomer unit. The analysis also confirmed that a C unit accounted for 10 mol % of the monomer unit and a D unit accounted for 90 mol % thereof.

(136)

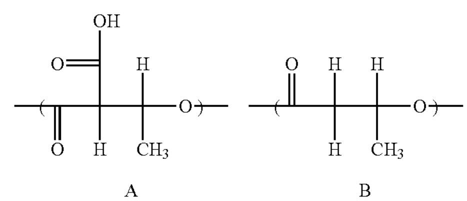

The resultant polyhydroxyalkanoate was evaluated for average molecular weight by means of gel permeation chromatography (GPC; HLC-8220 manufactured by Tosoh Corporation, column; TSK-GEL Super HM-H manufactured by Tosoh Corporation, solvent; chloroform, in terms of polystyrene). As a result, the resultant polyhydroxyalkanoate was found to have a number average molecular weight Mn of 298,000 and a weight average molecular weight Mw of 715,200.

30 mg of the polyhydroxyalkanoate synthesized here were placed in a 100-ml round-bottomed flask. Then, 2.1 ml of chloroform and 0.7 ml of methanol were added to dissolve the polyhydroxyalkanoate. 0.5 ml of a 2-mol/L trimethylsilyldiazomethane-hexane solution was added to the solution, and the whole was stirred at room temperature for 1 hour. After the completion of the reaction, the solvent was distilled off, and then a polymer was collected. This polymer was washed with 50 ml of methanol and collected. The polymer was dried under reduced pressure to prepare 29 mg of a polyhydroxyalkanoate.

The resultant polyhydroxyalkanoate was subjected to NMR analysis in the same manner as in Preparation Example 2J-1. The analysis confirmed that a carboxyl group of the C unit was transformed into methyl carboxylate, and that the resultant polymer can be esterified again.

Preparation Example 2J-3

Under a nitrogen atmosphere, 0.40 g of the polyhydroxyalkanoate copolymer composed of the unit represented by the chemical formula (136) synthesized in Preparation Example 2J-3 (C: 10 mol %, D: 90 mol %) and 0.24 g (1.4 mmol) of 2-aminobenzenesulfonic acid were placed in a 100-ml three-necked flask. 15.0 ml of pyridine were added to the flask, and the mixture was stirred. After that, 0.71 ml (2.7 mmol) of triphenyl phosphite was added, and the whole was heated at 120° C. for 6 hours. After the completion of the reaction, the resultant was reprecipitated in 150 ml of ethanol, followed by collection. The resultant polymer was washed with 1N hydrochloric acid for 1 day, stirred in water for 1 day to wash the polymer, and dried under reduced pressure to prepare 0.35 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature) and Fourier transformation-infrared absorption (FT-IR) spectrum (Nicolet AVATAR 360FT-IR). As a result of IR measurement, a peak at 1,695 cm$^{-1}$ derived from a carboxylic acid reduced, and a peak derived from an amide group was newly observed at 1,658 cm$^{-1}$.

$^1$H-NMR confirmed that the resultant polymer was a polyhydroxyalkanoate containing a unit represented by the following chemical formula (137) as a monomer unit because a peak derived from an aromatic ring of the 2-aminobenzenesulfonic acid structure shifted.

(137)

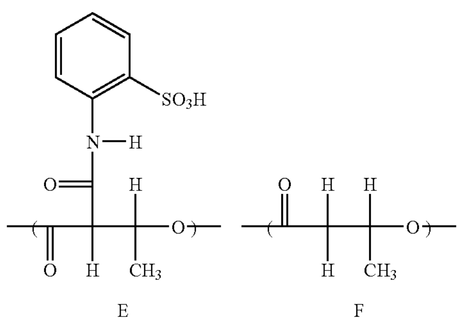

It was also confirmed that the polyhydroxyalkanoate was a copolymer in which an E unit accounted for 10 mol % of the unit of the polyhydroxyalkanoate represented by the chemical formula (137). The resultant polymer was evaluated for average molecular weight by means of gel permeation chromatography (GPC; Tosoh Corporation HLC-1820, column; Polymer Laboratories PLgel 5μ MIXED-C, solvent; DMF/LiBr 0.1% (w/v), in terms of polystyrene). As a result, the resultant polymer was found to have a number average molecular weight Mn of 226,000 and a weight average molecular weight Mw of 497,200.

Preparation Example 2J-4

0.30 g of the polyhydroxyalkanoate copolymer composed of the unit represented by the chemical formula (137) synthesized in Preparation Example 2J-3 was added to a round-bottomed flask. Then, 21.0 ml of chloroform and 7.0 ml of methanol were added to dissolve the polymer, and the solution was cooled to 0° C. 0.93 ml of a 2-mol/L trimethylsilyldiazomethane-hexane solution (manufactured by Aldrich) was added to the solution, and the whole was stirred for 4 hours. After the completion of the reaction, the solvent was distilled off by using an evaporator, and then the polymer was collected. Furthermore, 21.0 ml of chloroform and 7.0 ml of methanol were added to dissolve the polymer again. Then, the solvent was distilled off by using an evaporator. This operation was repeated 3 times. The collected polymer was dried under reduced pressure to prepare 0.30 g of a polymer. The structure of the resultant polymer was determined through analysis according to $^1$H-NMR (FT-NMR: Bruker DPX 400; resonance frequency: 400 MHz; measured nuclear species: $^1$H; solvent used: heavy DMSO; measurement temperature: room temperature). $^1$H-NMR confirmed that the resultant polymer was a polyhydroxyalkanoate containing a unit represented by the following chemical formula (138) as a monomer unit because a peak derived from methyl sulfonate was observed at 3 to 4 ppm.

(138)

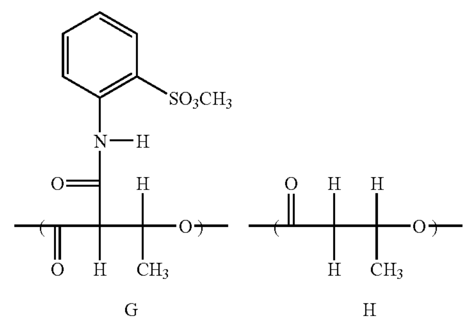

It was also confirmed that a G unit accounted for 10 mol % of the unit of the polyhydroxyalkanoate represented by the chemical formula (138). In addition, acid value titration using an electric potential titration device AT510 (manufactured by Kyoto Denshi) revealed that the sulfonic acid was transformed into methyl sulfonate because no peak derived from the sulfonic acid was observed. The resultant polymer was evaluated for average molecular weight by means of gel permeation chromatography (GPC; Tosoh Corporation HLC-8120, column; Polymer Laboratories PLgel 5μ MIXED-C, solvent; DMF/LiBr 0.1% (w/v), in terms of polystyrene). As a result, the resultant polymer was found to have a number average molecular weight Mn of 228,000 and a weight average molecular weight Mw of 513,000. The series of preparation method was upscaled to produce the polyhydroxyalkanoate represented by the chemical formula (138) in a large amount. The compound was provided as Exemplified Compound 2J.

Preparation Example 2K-1

9.40 g of a polymer were prepared in the same manner as in Preparation Example 2J-2 except that 26.61 g (232.3 mmol) of benzyl bromoacetate were used instead of benzyl chloroformate. The resultant polymer was subjected to NMR analysis under the same conditions as those of Preparation Example 2J-1. The analysis confirmed that the polymer was a polyhydroxyalkanoate containing a unit represented by the following chemical formula (139). The analysis also confirmed that an A unit accounted for 11 mol % of the monomer unit and a B unit accounted for 89 mol % thereof.

(139)

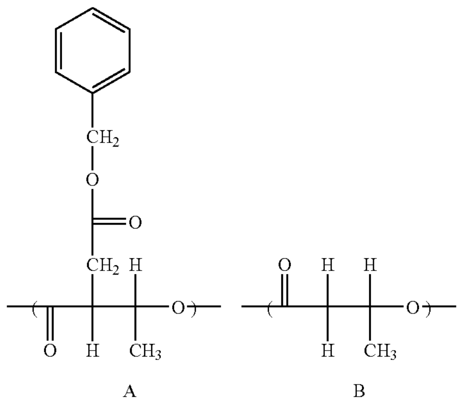

The average molecular weight of the resultant polyhydroxyalkanoate was measured under the same conditions as those of Preparation Example 2J-1. As a result, the resultant polyhydroxyalkanoate was found to have a number average molecular weight Mn of 300,300 and a weight average molecular weight Mw of 723,700.

The above polymer was subjected to hydrogenolysis in the same manner as in Preparation Example 2J-2 to prepare 3.66 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (140) as a monomer unit. The analysis also confirmed that a C unit accounted for 11 mol % of the monomer unit and a D unit accounted for 89 mol % thereof.

(140)

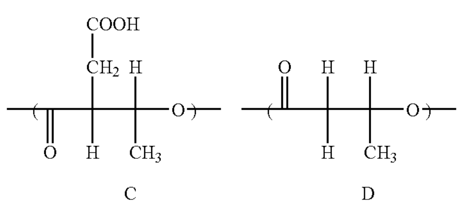

The average molecular weight of the resultant polyhydroxyalkanoate was measured under the same conditions as those of Preparation Example 2J-1. As a result, the resultant polyhydroxyalkanoate was found to have a number average molecular weight Mn of 286,000 and a weight average molecular weight Mw of 700,700.

Preparation Example 2K-2

Under a nitrogen atmosphere, 0.40 g of the polyhydroxyalkanoate copolymer composed of the unit represented by the chemical formula (140) synthesized in Preparation Example 2K-1 (C: 11 mol %, D: 89 mol %) and 0.23 g (1.5 mmol) of 2-amino-2-methylpropanesulfonic acid were placed in a 100-ml three-necked flask. 15.0 ml of pyridine were added to the flask, and the mixture was stirred. After that, 0.78 ml (3.0 mmol) of triphenyl phosphite was added. After that, 0.31 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (141), and that the polyhydroxyalkanoate was a copolymer in which an E unit accounted for 9 mol % of the unit.

(141)

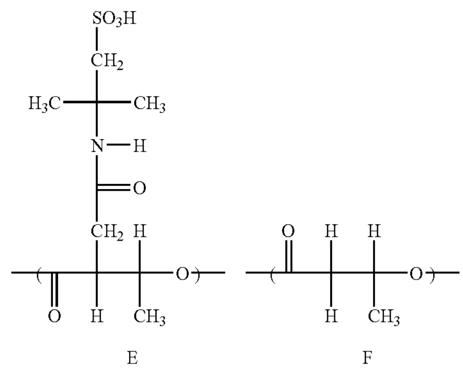

The average molecular weight of the resultant polymer was measured under the same conditions as those of Preparation Example 2J-3. As a result, the resultant polymer was found to have a number average molecular weight Mn of 225,000 and a weight average molecular weight Mw of 540,000.

Preparation Example 2K-3

0.29 g of a polymer was prepared in the same manner as in Preparation Example 2J-4 except that: the polyhydroxyalkanoate represented by the chemical formula (141) synthesized in Preparation Example 2K-2 was used instead of the polyhydroxyalkanoate represented by the chemical formula (137) synthesized in Preparation Example 2J-4; and 0.83 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (142), and that the polyhydroxyalkanoate was a copolymer in which a G unit accounted for 9 mol % of the unit.

In addition, acid value titration in the same manner as in Preparation Example 2J-4 revealed that the sulfonic acid was transformed into methyl sulfonate because no peak derived from the sulfonic acid was observed.

(142)

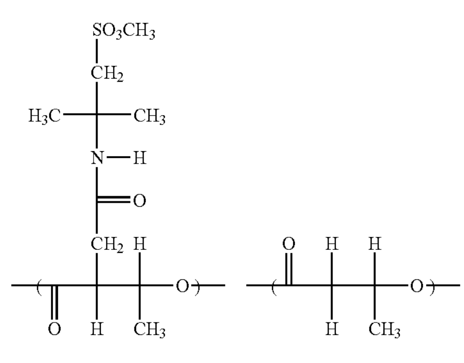

The average molecular weight of the resultant polymer was measured under the same conditions as those of Preparation Example 2J-4. As a result, the resultant polymer was found to have a number average molecular weight Mn of 228,500 and a weight average molecular weight Mw of 548,400. The series of preparation method was upscaled to produce the polyhydroxyalkanoate represented by the chemical formula (142) in a large amount. The compound was provided as Exemplified Compound 2K.

Preparation Example 2L-1

8.83 g of a polymer were prepared in the same manner as in Preparation Example 2J-2 except that 29.17 g (232.3 mmol) of ethyl 8-bromooctanoate were used instead of benzyl chloroformate. The resultant polymer was subjected to NMR analysis under the same conditions as those of Preparation Example 2J-1. The analysis confirmed that the polymer was a polyhydroxyalkanoate containing a unit represented by the following chemical formula (143). The analysis also confirmed that an A unit accounted for 9 mol % of the monomer unit and a B unit accounted for 91 mol % thereof.

(143)

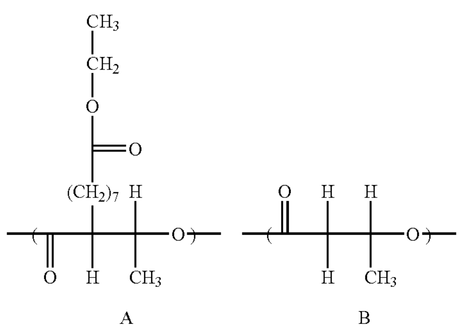

The average molecular weight of the resultant polyhydroxyalkanoate was measured under the same conditions as those of Preparation Example 2J-1. As a result, the resultant polyhydroxyalkanoate was found to have a number average molecular weight Mn of 321,000 and a weight average molecular weight Mw of 776,800.

The above polymer was subjected to hydrogenolysis in the same manner as in Preparation Example 2J-2 to prepare 3.85 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (144) as a monomer unit. The analysis also confirmed that a C unit accounted for 9 mol % of the monomer unit and a D unit accounted for 91 mol % thereof.

(144)

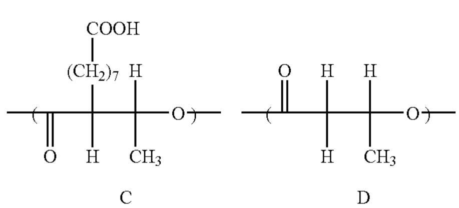

The average molecular weight of the resultant polyhydroxyalkanoate was measured under the same conditions as those of Preparation Example 2J-1. As a result, the resultant polyhydroxyalkanoate was found to have a number average molecular weight Mn of 298,100 and a weight average molecular weight Mw of 715,400.

Preparation Example 2L-2

Under a nitrogen atmosphere, 0.40 g of the polyhydroxyalkanoate copolymer composed of the unit represented by the chemical formula (144) synthesized in Preparation Example 2L-1 (C: 9 mol %, D: 91 mol %) and 0.22 g (1.2 mmol) of p-toluidine-2-sulfonic acid were placed in a 100-ml three-necked flask. 15.0 ml of pyridine were added to the flask, and the mixture was stirred. After that, 0.60 ml (2.3 mmol) of triphenyl phosphite was added. After that, 0.32 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (145), and that the polyhydroxyalkanoate was a copolymer in which an E unit accounted for 8 mol % of the unit.

(145)

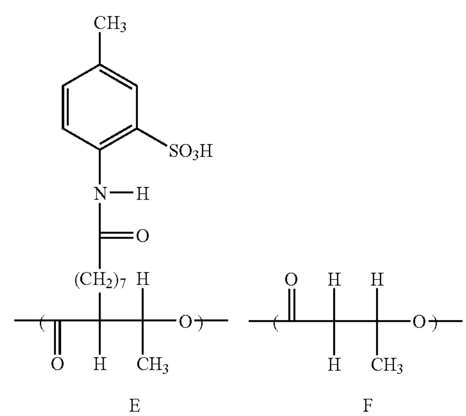

The average molecular weight of the resultant polymer was measured under the same conditions as those of Preparation Example 2J-3. As a result, the resultant polymer was found to have a number average molecular weight Mn of 215,500 and a weight average molecular weight Mw of 538,800.

Preparation Example 2L-3

0.30 g of a polymer was prepared in the same manner as in Preparation Example 2J-4 except that: the polyhydroxyalkanoate represented by the chemical formula (145) synthesized in Preparation Example 2L-2 was used instead of the polyhydroxyalkanoate represented by the chemical formula (137) synthesized in Preparation Example 2J-4; and 0.71 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (146), and that the polyhydroxyalkanoate was a copolymer in which a G unit accounted for 8 mol % of the unit.

In addition, acid value titration in the same manner as in Preparation Example 2J-4 revealed that the sulfonic acid was transformed into methyl sulfonate because no peak derived from the sulfonic acid was observed.

(146)

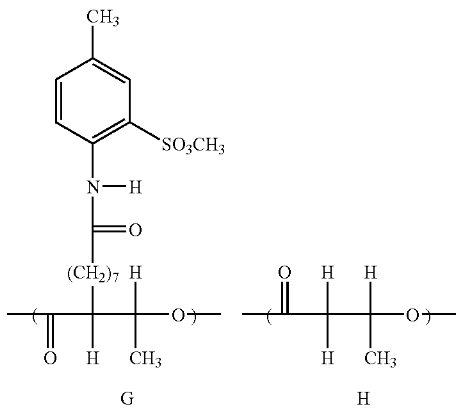

The average molecular weight of the resultant polymer was measured under the same conditions as those of Preparation Example 2J-4. As a result, the resultant polymer was found to have a number average molecular weight Mn of 218,000 and a weight average molecular weight Mw of 555,900. The series of preparation method was upscaled to produce the polyhydroxyalkanoate represented by the chemical formula (146) in a large amount. The compound was provided as Exemplified Compound 2L.

Preparation Example 2M-1

In this preparation example, a microorganism is used to prepare a polyhydroxyalkanoate. The microorganism used in this preparation example is a *Pseudomonas cichorii* YN2 strain (FERM BP-7375, disclosed in Japanese Patent Application Laid-Open No. 2001-288256). The microorganism is deposited in the International Patent Organism Depositary of the National Institute of Advanced Industrial Science and Technology.

The mineral salt medium (M9 medium) and the trace component solution used in this preparation example have the same compositions as those used in Preparation Example 2J-1.

Synthesis of poly3-hydroxy-5-phenylvaleric acid Represented by Chemical Formula (147)

(147)

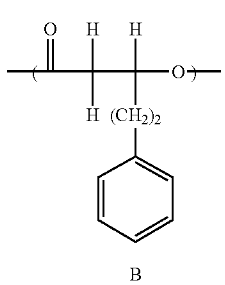

Poly3-hydroxy-5-phenylvaleric acid represented by the chemical formula (147) was synthesized by means of the method disclosed in Example 1 of Japanese Patent Application Laid-Open No. 2003-319792.

200 mL of an M9 medium containing 0.5% (weight/volume (w/v)) of polypeptone (Wako Pure Chemical Industries, Ltd.) and 0.1% (w/v) of 5-phenylvaleric acid were prepared as a production medium. 1 mL of a culture solution prepared in advance by shake culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 24 hours. After the culture, a fungus body was harvested by means of centrifugation, washed with methanol, and then freeze-dried. After the dried fungus body had been weighed, chloroform was added, and the whole was stirred at 50° C. for 24 hours to extract a polymer. Chloroform from which the polymer had been extracted was filtered and concentrated by means of an evaporator. After that, a portion precipitated and solidified with cold methanol was collected and dried under reduced pressure to prepare 0.60 g of a polymer per L of the production medium. NMR analysis was performed under the same conditions as those of Preparation Example 2J-1 to determine the structure of the resultant polymer. The analysis confirmed that the resultant polymer was substantially a homopolymer of a unit of poly3-hydroxy-5-phenylvaleric acid represented by the chemical formula (147) as a monomer unit. The average molecular weight of the resultant polyhydroxyalkanoate was measured under the same conditions as those of Preparation Example 2J-1. As a result, the resultant polyhydroxyalkanoate was found to have a number average molecular weight Mn of 91,000 and a weight average molecular weight Mw of 172,900.

60.1 g of the polyhydroxyalkanoate to be used for any subsequent preparation example were prepared from 100 L of the production medium by means of the above method.

Preparation Example 2M-2

8.51 g of a polymer were prepared in the same manner as in Preparation Example 2J-2 except that 10.00 g of the polyhydroxyalkanoate composed of the unit represented by the chemical formula (147) synthesized in Preparation Example 2M-2, 28.38 ml (56.8 mmol) of a solution of 2 M of lithium diisopropylamide in THF, and 9.68 g (113.5 mmol) of benzyl chloroformate were used instead of the polyhydroxyalkanoate composed of the unit represented by the chemical formula (134) synthesized in Preparation Example 2J-2. The resultant polymer was subjected to NMR analysis under the same conditions as those of Preparation Example 2J-1. The analysis confirmed that the polymer was a polyhydroxyalkanoate containing a unit represented by the following chemical formula (148). The analysis also confirmed that an A unit accounted for 12 mol % of the monomer unit and a B unit accounted for 88 mol % thereof.

(148)

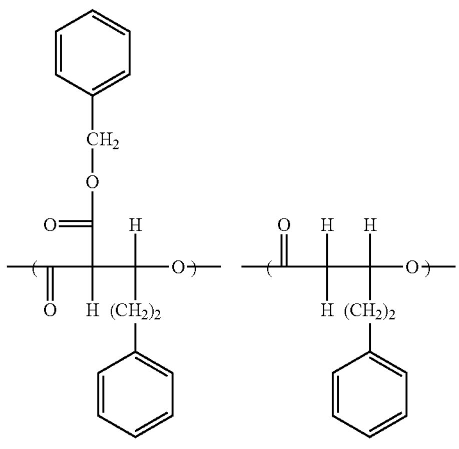

The average molecular weight of the resultant polyhydroxyalkanoate was measured under the same conditions as those of Preparation Example 2J-1. As a result, the resultant polyhydroxyalkanoate was found to have a number average molecular weight Mn of 72,500 and a weight average molecular weight Mw of 141,400.

The above polymer was subjected to hydrogenolysis in the same manner as in Preparation Example 2J-2 to prepare 3.72 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (149) as a monomer unit. The analysis also confirmed that a C unit accounted for 12 mol % of the monomer unit and a D unit accounted for 88 mol % thereof.

(149)

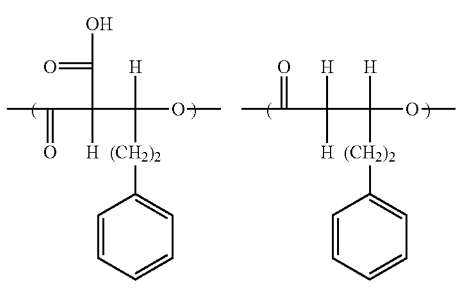

The average molecular weight of the resultant polyhydroxyalkanoate was measured under the same conditions as those of Preparation Example 2J-1. As a result, the resultant polyhydroxyalkanoate was found to have a number average molecular weight Mn of 69,500 and a weight average molecular weight Mw of 139,700.

Preparation Example 2M-3

Under a nitrogen atmosphere, 0.40 g of the polyhydroxyalkanoate copolymer composed of the unit represented by the chemical formula (149) synthesized in Preparation Example 2M-2 (C: 12 mol %, D: 88 mol %) and 0.23 g (1.3 mmol) of 2-aminobenzenesulfonic acid were placed in a 100-ml three-necked flask. 15.0 ml of pyridine were added to the flask, and the mixture was stirred. After that, 0.69 ml (2.6 mmol) of triphenyl phosphite was added. After that, 0.33 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (150), and that the polyhydroxyalkanoate was a copolymer in which an E unit accounted for 11 mol % of the unit.

(150)

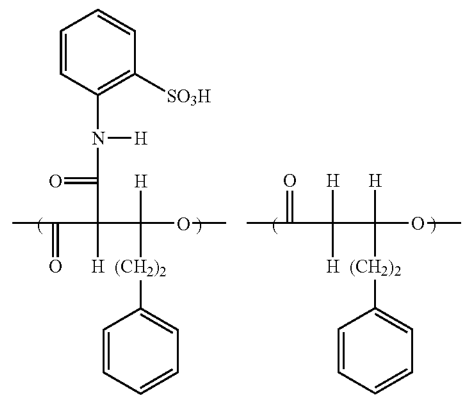

The average molecular weight of the resultant polymer was measured under the same conditions as those of Preparation Example 2J-3. As a result, the resultant polymer was found to have a number average molecular weight Mn of 55,300 and a weight average molecular weight Mw of 113,400.

Preparation Example 2M-4

0.29 g of a polymer was prepared in the same manner as in Preparation Example 2J-4 except that: the polyhydroxyalkanoate represented by the chemical formula (150) synthesized in Preparation Example 2M-3 was used instead of the polyhydroxyalkanoate represented by the chemical formula (137) synthesized in Preparation Example 2J-4; and 0.83 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (151), and that the polyhydroxyalkanoate was a copolymer in which a G unit accounted for 11 mol % of the unit.

In addition, acid value titration in the same manner as in Preparation Example 2J-4 revealed that the sulfonic acid was transformed into methyl sulfonate because no peak derived from the sulfonic acid was observed.

(151)

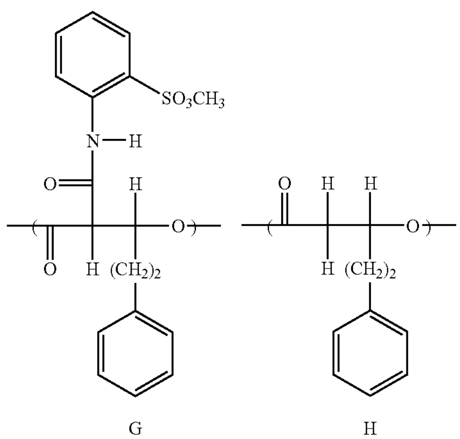

The average molecular weight of the resultant polymer was measured under the same conditions as those of Preparation Example 2J-4. As a result, the resultant polymer was found to have a number average molecular weight Mn of 54,500 and a weight average molecular weight Mw of 114,500. The series of preparation method was upscaled to produce the polyhydroxyalkanoate represented by the chemical formula (151) in a large amount. The compound was provided as Exemplified Compound 2M.

Preparation Example 2N-1

7.87 g of a polymer were prepared in the same manner as in Preparation Example 2M-2 except that 12.86 g (113.5 mmol) of ethyl 6-bromohexanoate were used instead of benzyl chloroformate. The resultant polymer was subjected to NMR analysis under the same conditions as those of Preparation Example 2J-1. The analysis confirmed that the polymer was a polyhydroxyalkanoate containing a unit represented by the following chemical formula (152). The analysis also confirmed that an A unit accounted for 8 mol % of the monomer unit and a B unit accounted for 92 mol % thereof.

(152)

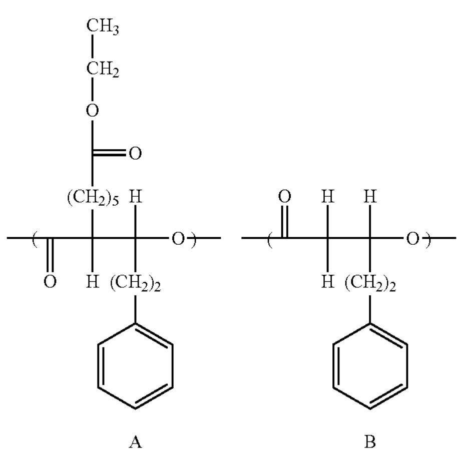

The average molecular weight of the resultant polyhydroxyalkanoate was measured under the same conditions as those of Preparation Example 2J-1. As a result, the resultant polyhydroxyalkanoate was found to have a number average molecular weight Mn of 71,000 and a weight average molecular weight Mw of 134,900.

The above polymer was subjected to hydrogenolysis in the same manner as in Preparation Example 2J-2 to prepare 3.95 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (153) as a monomer unit. The analysis also confirmed that a C unit accounted for 8 mol % of the monomer unit and a D unit accounted for 92 mol % thereof.

(153)

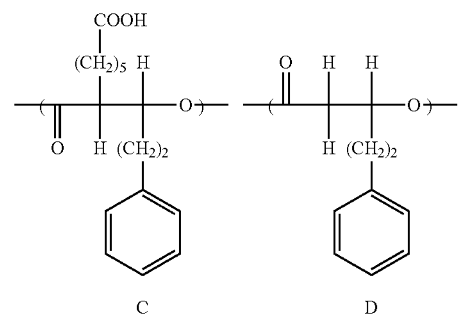

The average molecular weight of the resultant polyhydroxyalkanoate was measured under the same conditions as those of Preparation Example 2J-1. As a result, the resultant polyhydroxyalkanoate was found to have a number average molecular weight Mn of 68,500 and a weight average molecular weight Mw of 133,600.

Preparation Example 2N-2

Under a nitrogen atmosphere, 0.40 g of the polyhydroxyalkanoate copolymer composed of the unit represented by the chemical formula (153) synthesized in Preparation Example 2N-1 (C: 8 mol %, D: 92 mol %) and 0.15 g (0.9 mmol) of 2-aminobenzenesulfonic acid were placed in a 100-ml three-necked flask. 15.0 ml of pyridine were added to the flask, and the mixture was stirred. After that, 0.45 ml (1.7 mmol) of triphenyl phosphite was added. After that, 0.34 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (154), and that the polyhydroxyalkanoate was a copolymer in which an E unit accounted for 7 mol % of the unit.

(154)

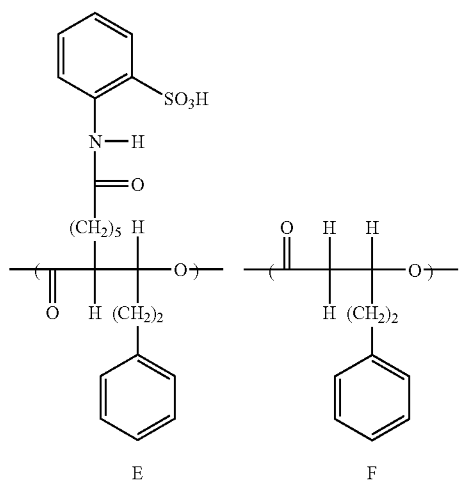

The average molecular weight of the resultant polymer was measured under the same conditions as those of Preparation Example 2J-3. As a result, the resultant polymer was found to have a number average molecular weight Mn of 54,200 and a weight average molecular weight Mw of 108,400.

Preparation Example 2N-3

0.30 g of a polymer was prepared in the same manner as in Preparation Example 2J-4 except that: the polyhydroxyalkanoate represented by the chemical formula (154) synthesized in Preparation Example 2N-2 was used instead of the polyhydroxyalkanoate represented by the chemical formula (137) in Preparation Example 2J-4; and 0.54 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (155), and that the polyhydroxyalkanoate was a copolymer in which a G unit accounted for 7 mol % of the unit.

In addition, acid value titration in the same manner as in Preparation Example 2J-4 revealed that the sulfonic acid was transformed into methyl sulfonate because no peak derived from the sulfonic acid was observed.

(155)

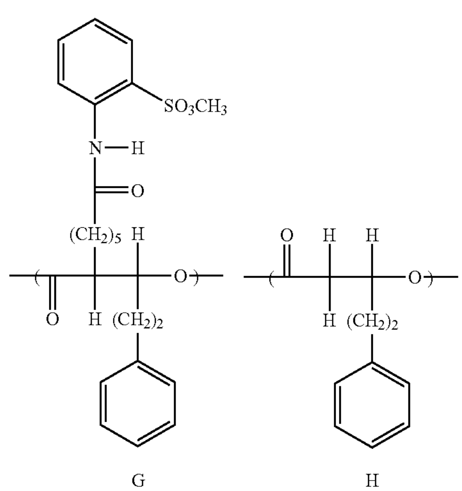

The average molecular weight of the resultant polymer was measured under the same conditions as those of Preparation Example 2J-4. As a result, the resultant polymer was found to have a number average molecular weight Mn of 52,500 and a weight average molecular weight Mw of 110,300. The series of preparation method was upscaled to produce the polyhydroxyalkanoate represented by the chemical formula (155) in a large amount. The compound was provided as Exemplified Compound 2N.

Preparation Example 2O-1

Synthesis of poly3-hydroxy-5-phenoxyvaleric acid Represented by Chemical Formula (156)

(156)

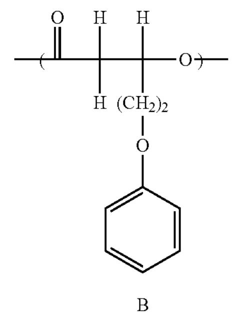

Poly3-hydroxy-5-phenoxyvaleric acid represented by the chemical formula (156) was synthesized by means of the method disclosed in Example 4 of Japanese Patent Application Laid-Open No. 2003-319792.

200 mL of an M9 medium containing 0.5% (w/v) of polypeptone and 0.1% (w/v) of 5-phenoxyvaleric acid were prepared as a production medium. 1 mL of a culture solution prepared in advance by shake culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 45 hours. After the culture, a fungus body was harvested by means of centrifugation, washed with methanol, and then freeze-dried. After the dried fungus body had been weighed, chloroform was added, and the whole was stirred at 50° C. for 24 hours to extract a polymer. Chloroform from which the polymer had been extracted was filtered and concentrated by means of an evaporator. After that, a portion precipitated and solidified with cold methanol was collected and dried under reduced pressure to prepare 0.36 g of a polymer per L of the production medium. NMR analysis was performed under the same conditions as those of Example 1 to determine the structure of the resultant polymer. The analysis confirmed that the resultant polymer was substantially a homopolymer of poly3-hydroxy-5-phenoxyvaleric acid represented by the chemical formula (156) as a monomer unit. The average molecular weight of the resultant polyhydroxyalkanoate was measured under the same conditions as those of Preparation Example 2J-1. As a result, the resultant polyhydroxyalkanoate was found to have a number average molecular weight Mn of 201,000 and a weight average molecular weight Mw of 422,100.

44.8 g of the polyhydroxyalkanoate to be used for any subsequent preparation example were prepared from 125 L of the production medium by means of the above method.

Preparation Example 2O-2

8.29 g of a polymer were prepared in the same manner as in Preparation Example 2J-2 except that 10.00 g of the polyhydroxyalkanoate composed of the unit represented by the chemical formula (156) synthesized in Preparation Example 2O-1, 26.01 ml (52.0 mmol) of a solution of 2 M of lithium diisopropylamide in THF, and 8.88 g (104.1 mmol) of benzyl chloroformate were used instead of the polyhydroxyalkanoate composed of the unit represented by the chemical formula (134) in Preparation Example 2J-2. The resultant polymer was subjected to NMR analysis under the same conditions as those of Preparation Example 2J-1. The analysis confirmed that the polymer was a polyhydroxyalkanoate containing a unit represented by the following chemical formula (157). The analysis also confirmed that an A unit accounted for 11 mol % of the monomer unit and a B unit accounted for 89 mol % thereof.

(157)

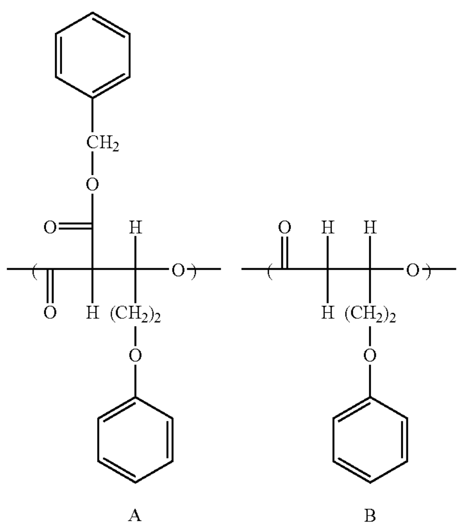

The average molecular weight of the resultant polyhydroxyalkanoate was measured under the same conditions as those of Preparation Example 2J-1. As a result, the resultant polyhydroxyalkanoate was found to have a number average molecular weight Mn of 131,500 and a weight average molecular weight Mw of 282,700.

The above polymer was subjected to hydrogenolysis in the same manner as in Preparation Example 2J-2 to prepare 3.75 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (158) as a monomer unit. The analysis also confirmed that a C unit accounted for 11 mol % of the monomer unit and a D unit accounted for 89 mol % thereof.

(158)

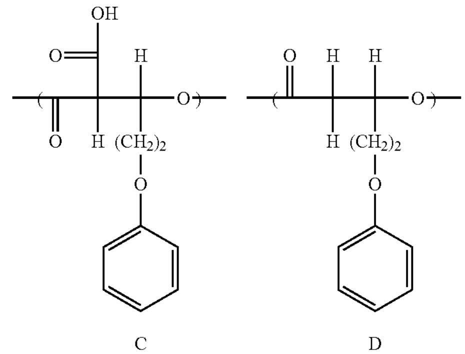

The average molecular weight of the resultant polyhydroxyalkanoate was measured under the same conditions as those of Preparation Example 2J-1. As a result, the resultant polyhydroxyalkanoate was found to have a number average molecular weight Mn of 121,000 and a weight average molecular weight Mw of 260,200.

Preparation Example 2O-3

Under a nitrogen atmosphere, 0.40 g of the polyhydroxyalkanoate copolymer composed of the unit represented by the chemical formula (158) synthesized in Preparation Example 2O-2 (C: 11 mol %, D: 89 mol %) and 0.19 g (1.1 mmol) of 2-aminobenzenesulfonic acid were placed in a 100-ml three-necked flask. 15.0 ml of pyridine were added to the flask, and the mixture was stirred. After that, 0.58 ml (2.2 mmol) of triphenyl phosphite was added. After that, 0.33 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (159), and that the polyhydroxyalkanoate was a copolymer in which an E unit accounted for 10 mol % of the unit.

(159)

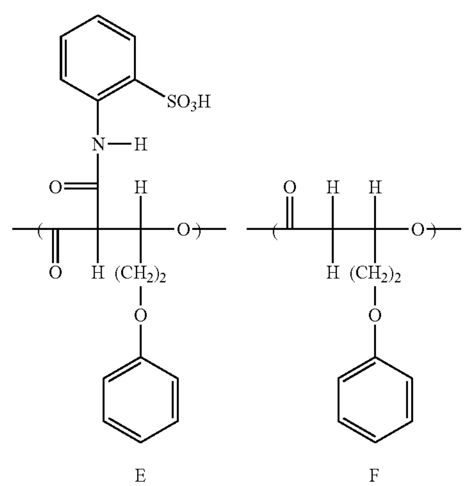

The average molecular weight of the resultant polymer was measured under the same conditions as those of Preparation Example 2J-3. As a result, the resultant polymer was found to have a number average molecular weight Mn of 100,500 and a weight average molecular weight Mw of 221,100.

Preparation Example 2O-4

0.30 g of a polymer was prepared in the same manner as in Preparation Example 2J-4 except that: the polyhydroxyalkanoate represented by the chemical formula (159) synthesized in Preparation Example 2O-3 was used instead of the polyhydroxyalkanoate represented by the chemical formula (137) in Preparation Example 2J-4; and 0.71 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (160), and that the polyhydroxyalkanoate was a copolymer in which a G unit accounted for 10 mol % of the unit.

In addition, acid value titration in the same manner as in Preparation Example 2J-4 revealed that the sulfonic acid was transformed into methyl sulfonate because no peak derived from the sulfonic acid was observed.

(160)

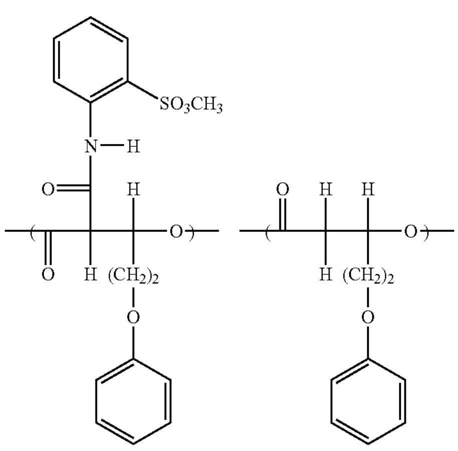

The average molecular weight of the resultant polymer was measured under the same conditions as those of Preparation Example 2J-4. As a result, the resultant polymer was found to have a number average molecular weight Mn of 101,000 and a weight average molecular weight Mw of 227,300. The series of preparation method was upscaled to produce the polyhydroxyalkanoate represented by the chemical formula (160) in a large amount. The compound was provided as Exemplified Compound 2O.

Preparation Example 2P-1

Synthesis of poly3-hydroxy-4-cyclohexylbutyric acid Represented by Chemical Formula (161)

(161)

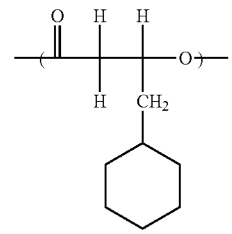

Poly3-hydroxy-4-cyclohexylbutyric acid represented by the chemical formula (161) was synthesized by means of the method disclosed in Example 9 of Japanese Patent Application Laid-Open No. 2003-319792.

200 mL of an M9 medium containing 0.5% (w/v) of polypeptone and 0.1% (w/v) of 4-cyclohexylbutyric acid were prepared as a production medium. 1 mL of a culture solution prepared in advance by culturing a *Pseudomonas cichorii* YN2 strain in an M9 medium containing 0.5% of polypeptone at 30° C. for 8 hours was added to the production medium, and the whole was cultured in a 500-mL shaking flask at 30° C. for 48 hours. After the culture, a fungus body was harvested by means of centrifugation, washed with methanol, and then freeze-dried. After the dried fungus body had been weighed, chloroform was added, and the whole was stirred at 50° C. for 24 hours to extract a polymer. Chloroform from which the polymer had been extracted was filtered and concentrated by means of an evaporator. After that, a portion precipitated and solidified with cold methanol was collected and dried under reduced pressure to prepare 0.48 g of a polymer per L of the production medium. NMR analysis was performed under the same conditions as those of Preparation Example 2J-1 to determine the structure of the resultant polymer. The analysis confirmed that the resultant polymer was substantially a homopolymer of poly3-hydroxy-4-cyclohexylbutyric acid represented by the chemical formula (161) as a monomer unit. The average molecular weight of the resultant polyhydroxyalkanoate was measured under the same conditions as those of Preparation Example 2J-1. As a result, the resultant polyhydroxyalkanoate was found to have a number average molecular weight Mn of 70,500 and a weight average molecular weight Mw of 155,100.

47.9 g of the polyhydroxyalkanoate to be used for any subsequent preparation example were prepared from 100 L of the production medium by means of the above method.

Preparation Example 2P-2

7.66 g of a polymer were prepared in the same manner as in Preparation Example 2J-2 except that 10.00 g of the polyhydroxyalkanoate composed of the unit represented by the chemical formula (161) synthesized in Preparation Example 2P-1, 29.72 ml (59.4 mmol) of a solution of 2 M of lithium diisopropylamide in THF, and 10.14 g (118.9 mmol) of benzyl chloroformate were used instead of the polyhydroxyalkanoate composed of the unit represented by the chemical formula (134) in Preparation Example 2J-2. The resultant polymer was subjected to NMR analysis under the same conditions as those of Preparation Example 2J-1. The analysis confirmed that the polymer was a polyhydroxyalkanoate containing a unit represented by the following chemical formula (162). The analysis also confirmed that an A unit accounted for 10 mol % of the monomer unit and a B unit accounted for 90 mol % thereof.

(162)

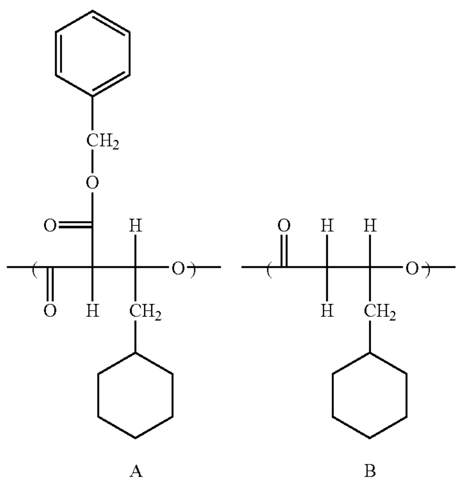

The average molecular weight of the resultant polyhydroxyalkanoate was measured under the same conditions as those of Preparation Example 2J-1. As a result, the resultant polyhydroxyalkanoate was found to have a number average molecular weight Mn of 54,400 and a weight average molecular weight Mw of 11,700.

The above polymer was subjected to hydrogenolysis in the same manner as in Preparation Example 2J-2 to prepare 3.85 g of a polymer. The resultant polymer was subjected to NMR analysis under the same conditions as those of Preparation Example 2J-1. The analysis confirmed that the polymer was a polyhydroxyalkanoate copolymer containing a unit represented by the following chemical formula (163) as a monomer unit. The analysis also confirmed that a C unit accounted for 10 mol % of the monomer unit and a D unit accounted for 90 mol % thereof.

(163)

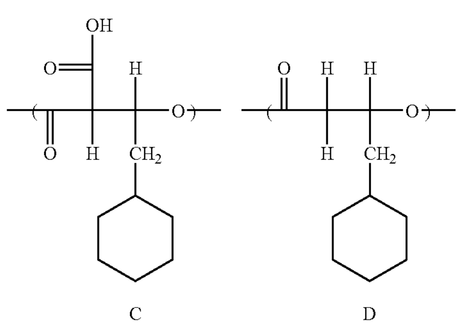

The average molecular weight of the resultant polyhydroxyalkanoate was measured under the same conditions as those of Preparation Example 2J-1. As a result, the resultant polyhydroxyalkanoate was found to have a number average molecular weight Mn of 47,500 and a weight average molecular weight Mw of 103,600.

Preparation Example 2P-3

Under a nitrogen atmosphere, 0.40 g of the polyhydroxyalkanoate copolymer composed of the unit represented by the chemical formula (163) synthesized in Preparation Example 2P-2 (C: 10 mol %, D: 90 mol %) and 0.26 g (1.2 mmol) of 2-amino-1-naphthalenesulfonic acid were placed in a 100-ml three-necked flask. 15.0 ml of pyridine were added to the flask, and the mixture was stirred. After that, 0.60 ml (2.3 mmol) of triphenyl phosphite was added. After that, 0.36 g of a polymer was prepared in the same manner as in Preparation Example 2J-3. The resultant polymer was subjected to NMR analysis and Fourier transformation-infrared absorption spectral analysis under the same conditions as those of Preparation Example 2J-3. As a result, it was confirmed that the resultant polymer was a polyhydroxyalkanoate containing a unit represented by the following chemical formula (164), and that the polyhydroxyalkanoate was a copolymer in which an E unit accounted for 9 mol % of the unit.

(164)

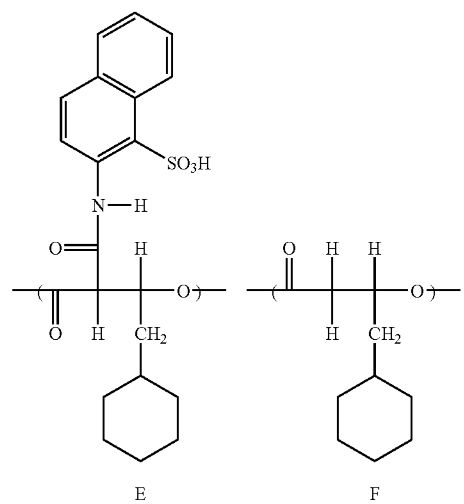

The average molecular weight of the resultant polymer was measured under the same conditions as those of Preparation Example 2J-3. As a result, the resultant polymer was found to have a number average molecular weight Mn of 30,500 and a weight average molecular weight Mw of 65,600.

Preparation Example 2P-4

0.28 g of a polymer was prepared in the same manner as in Preparation Example 2J-4 except that: the polyhydroxyalkanoate represented by the chemical formula (164) synthesized in Preparation Example 2P-3 was used instead of the polyhydroxyalkanoate represented by the chemical formula (137) in Preparation Example 2J-4; and 0.71 ml of a 2-mol/L trimethylsilyldiazomethane-hexane solution (manufactured by Aldrich) was used. The resultant polymer was subjected to NMR analysis under the same conditions as those of Preparation Example 2J-4. The analysis confirmed that the resultant polymer was a polyhydroxyalkanoate containing a unit represented by the following chemical formula (165), and that the polyhydroxyalkanoate was a copolymer in which a G unit accounted for 9 mol % of the unit.

In addition, acid value titration in the same manner as in Preparation Example 2J-4 revealed that the sulfonic acid was transformed into methyl sulfonate because no peak derived from the sulfonic acid was observed.

(165)

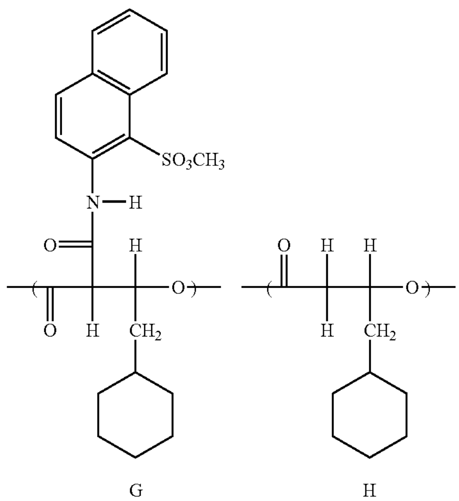

The average molecular weight of the resultant polymer was measured under the same conditions as those of Preparation Example 2J-4. As a result, the resultant polymer was found to have a number average molecular weight Mn of 31,000 and a weight average molecular weight Mw of 68,200. The series of preparation method was upscaled to produce the polyhydroxyalkanoate represented by the chemical formula (165) in a large amount. The compound was provided as Exemplified Compound 2P.

Preparation Example 2Z-1

Synthesis of 3,6-di(3-butenyl)-1,4-dioxane-2,5-dione Represented by Chemical Formula (166) in which m=2 from 2-hydroxy-5-hexenoic acid (166)

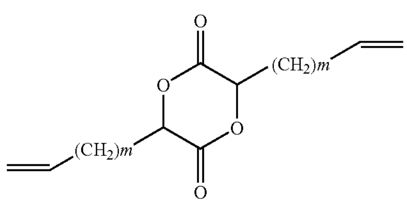

(m represents an integer selected from 2 to 8.)

3,6-di(3-butenyl)-1,4-dioxane-2,5-dione used in Preparation Example A-1 is synthesized as follows.

3.0 g of 2-hydroxy-5-hexenoic acid, 400 ml of toluene, and 30 mg of p-toluenesulfonic acid were placed in a 1-L flask equipped with a reflux condenser and a Dean-Stark trap, and the whole was refluxed under a nitrogen atmosphere. Water accumulating in the trap was removed from time to time. After 72 hours of reflux, the flask was cooled. The resultant was washed with 10 ml of a saturated aqueous solution of sodium hydrogen carbonate twice, and then the resultant crude product was distilled under reduced pressure in the presence of zinc oxide to prepare 1.06 g of 3,6-di(ω'-butenyl)-1,4-dioxane-2,5-dione of interest (41% yield).

NMR analysis was performed under the following conditions to determine the structure of the resultant compound.

<Measuring equipment> FT-NMR: Bruker DPX 400
Resonance frequency: $^1H$=400 MHz
<Measurement conditions> Measured nuclear species: $^1H$
Solvent used: DMSO-$d_6$
Measurement temperature: room temperature The analysis confirmed that the resultant compound was 3,6-di(3-butenyl)-1,4-dioxane-2,5-dione of interest.

Preparation Example 2Z-2

Synthesis of 3,6-di(6-heptenyl)-1,4-dioxane-2,5-dione Represented by Chemical Formula (166) in which m=4 from 2-hydroxy-8-nonenoic acid (166)

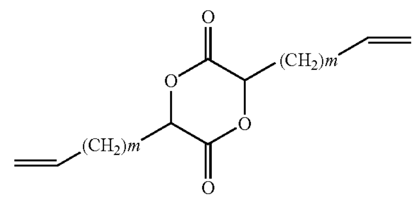

(m represents an integer selected from 2 to 8.)

3,6-di(6-heptenyl)-1,4-dioxane-2,5-dione used in Preparation Example B-1 is synthesized as follows.

1.07 g of 3,6-di(6-heptenyl)-1,4-dioxane-2,5-dione was prepared (40% yield) in the same manner in Preparation Example 2Z-1 except that 2-hydroxy-8-nonenoic acid was used instead of 2-hydroxy-5-hexenoic acid. NMR analysis was performed under the same conditions as those of Preparation Example 2Z-1 to determine the structure of the resultant compound. The analysis confirmed that the resultant compound was 3,6-di(6-heptenyl)-1,4-dioxane-2,5-dione of interest.

Preparation Example 2Z-3

Synthesis of 3,6-di(2-propenyl)-1,4-dioxane-2,5-dione Represented by Chemical Formula (166) in which m=1 from 2-hydroxy-4-pentenoic acid (166)

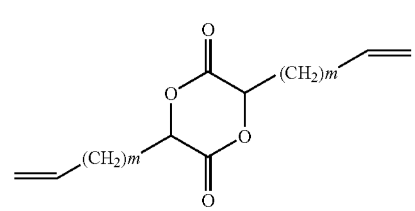

(m represents an integer selected from 2 to 8.)

3,6-di(2-propenyl)-1,4-dioxane-2,5-dione used in Preparation Example C-1 is synthesized as follows.

1.09 g of 3,6-di(2-propenyl)-1,4-dioxane-2,5-dione was prepared (43% yield) in the same manner in Preparation Example 2Z-1 except that 2-hydroxy-4-pentenoic acid was used instead of 2-hydroxy-5-hexenoic acid. NMR analysis was performed under the same conditions as those of Preparation Example 2Z-1 to determine the structure of the resultant compound. The analysis confirmed that the resultant compound was 3,6-di(2-propenyl)-1,4-dioxane-2,5-dione of interest.

Preparation Example 2Z-4

7-(3-butenyl)-2-oxepanone used in Preparation Example H-1 was prepared with reference to the method described in Japanese Patent Application Laid-Open No. H05-310721. To be specific, 7-(3-butenyl)-2-oxepanone was prepared by using 2-(3-butenyl)cyclohexanone instead of 2-allylcyclohexanone as a raw material described in Example 43 of the patent document.

Preparation Example 2Z-5

Synthesis of 3-(2-propenyl)-2-oxetanone Described in each of Preparation Examples I-1, J-1, and K-1

3-(2-propenyl)-2-oxetanone can be synthesized by using β-propiolactone instead of γ-butyrolactone in the synthesis of dihydro-3-(2-propenyl)furan-2(3H)-one described in Journal of American Chemical Society 1995, 117, 3705-3716 (the compound (6a) in the document).

To be specific, 7.20 g (100.0 mmol) of β-propiolactone were placed in a round-bottomed flask, and 55 ml of THF were added to dissolve this. The flask was placed under a nitrogen atmosphere, and the solution was stirred at −78° C. Next, 55 ml of a solution of 2 M of lithium diisopropylamide in THF were gradually added to the flask, and the whole was stirred at −78° C. for 20 minutes. Next, 14.52 g (110.0 mmol) of allyl bromide dissolved into 38 ml of hexamethylphosphoramide (HMPA) were added to the flask, and the whole was stirred at −30° C. for 3 hours. After the completion of the reaction, the reaction solution was poured into an aqueous solution of ammonium chloride, and dichloromethane was added to extract the organic layer. The extracted organic layer was washed with water 3 times. After that, the organic layer was collected and dried with anhydrous sodium sulfate. After sodium sulfate had been removed, the solvent was distilled off to collect crude 3-(2-propenyl)-2-oxetanone. Next, the crude product was purified by means of silica gel column chromatography, and the purified product was distilled under reduced pressure to prepare 9.42 g of 3-(2-propenyl)-2-oxetanone of interest. NMR analysis was performed under the following conditions to determine the structure of the resultant compound.

<Measuring equipment> FT-NMR: Bruker DPX 400
Resonance frequency: 1H=400 MHz
<Measurement conditions> Measured nuclear species: $^1H$
Solvent used: $CDCl_3$
Measurement temperature: room temperature The analysis confirmed that the resultant compound was 3-(2-propenyl)-2-oxetanone of interest.

Preparation Example 2Z-6

Synthesis of 3-(9-decenyl)-2-oxetanone Described in Preparation Example L-1

15.14 g of 3-(9-decenyl)-2-oxetanone of interest were prepared in the same manner as in Preparation Example 2Z-5 except that 26.30 g (110.0 mmol) of 10-bromo-1-decene were used instead of allyl bromide described in Preparation Example 2Z-5.

Preparation Example 2Z-7

Synthesis of 3-(2-propenyl)dihydro-2(3H)-furanone Described in Preparation Example M-1

10.72 g of 3-(2-propenyl)dihydro-2(3H)-furanone of interest were prepared in the same manner as in Preparation Example 2Z-5 except that 8.61 g (100.0 mmol) of γ-butyrolactone were used instead of β-propiolactone described in Preparation Example 2Z-5.

Preparation Example 2Z-8

Synthesis of tetrahydro-3-(2-propenyl)-2H-pyrane-2-one Described in each of Preparation Examples N-1

9.81 g of tetrahydro-3-(2-propenyl)-2H-pyrane-2-one of interest were prepared in the same manner as in Preparation Example 2Z-5 except that 10.01 g (100.0 mmol) of δ-valerolactone were used instead of β-propiolactone described in Preparation Example 2Z-5.

Preparation Example 2Z-9

Synthesis of 3-(2-propenyl)-2-oxepanone Described in Preparation Example O-1

10.02 g of 3-(2-propenyl)-2-oxepanone of interest were prepared in the same manner as in Preparation Example 2Z-5 except that 11.41 g (100.0 mmol) of ϵ-caprolactone were used instead of β-propiolactone described in Preparation Example 2Z-5.

Preparation Example 2Z-10

Synthesis of phenylmethyl 7-oxo-3-oxepanone carboxylate Described in Preparation Example R-1

Phenylmethyl 7-oxo-3-oxepanone carboxylate described in Preparation Example R-1 can be prepared by means of the method described in Macromolecules, 2000, 33, 4622 (the compound (12) described in the document).

17.3 g (101.3 mmol) of benzyl bromide were added at room temperature to an acetone solution containing 12.0 g (84.4 mmol) of 3-ketocyclohexanecarboxylic acid and 4.7 g (33.8 mmol) of potassium carbonate. Next, the mixture was stirred at 60° C. for 3 hours. After the completion of the reaction, potassium carbonate was removed through filtration, and acetone was distilled off to prepare a crude product. The crude product was purified by means of silica gel column chromatography to prepare 16.5 g of phenylmethyl 3-ketocyclohexane carboxylate.

A chloroform solution containing metachloroperbenzoic acid was added at room temperature to a chloroform solution containing 16.5 g (71.0 mmol) of phenylmethyl 3-ketocyclohexane carboxylate. Next, the mixture was stirred at 65° C. for 2 hours. After the completion of the reaction, filtration was performed by using Celite, and liquid separation was performed by adding an aqueous solution of sodium hydrogen carbonate. The organic layer was collected and dried with sodium sulfate. After the solvent had been distilled off, the remainder was purified by means of silica gel column chromatography, and the purified product was distilled under reduced pressure to prepare 6.0 g of phenylmethyl 7-oxo-3-oxepane carboxylate of interest. NMR analysis was performed under the following conditions to determine the structure of the resultant compound.

<Measuring equipment> FT-NMR: Bruker DPX 400

Resonance frequency: $^{1}H$=400 MHz

<Measurement conditions> Measured nuclear species: $^{1}H$

Solvent used: $CDCl_3$

Measurement temperature: room temperature

The analysis confirmed that the resultant compound was 7-oxo-3-oxepane phenyl methyl carboxylate of interest.

Preparation Example 2Z-11

Synthesis of phenylmethyl tetrahydro-6-oxo-2H-pyrane-3-carboxylate Described in Preparation Example T-1

Phenylmethyl tetrahydro-6-oxo-2H-pyrane-3-carboxylate described in Preparation Example T-1 can be produced by means of the method described in Preparation Example 2Z-10. To be specific, the target product can be prepared by using 3-ketocyclopentanecarboxylic acid instead of 3-ketocyclohexanecarboxylic acid in Preparation Example 2Z-10.

4.5 g of phenylmethyl tetrahydro-6-oxo-2H-pyrane-3-carboxylate of interest were prepared in the same manner as in Preparation Example 2Z-10 except that 10.8 g (84.4 mmol) of 3-ketocyclopentanecarboxylic acid were used instead of 3-ketocyclohexanecarboxylic acid in Preparation Example 2Z-10.

Next, various toners were produced by using a charge control agent produced by means of a method selected from the methods of the present invention, and were evaluated (Examples 1 to 60).

Example 1

First, an aqueous solution of $Na_3PO_4$ was added to a 2-L four-necked flask equipped with a high-speed stirring device TK Homomixer. The number of revolutions was adjusted to 10,000 rpm, and the solution was heated to 60° C. An aqueous solution of $CaCl_2$ was gradually added to the solution to prepare an aqueous dispersion medium containing a minute and hardly water-soluble dispersant $Ca_3(PO_4)_2$.

Meanwhile, the following compositions were dispersed for 3 hours by using a ball mill. Then, 10 parts by weight of a releasing agent (ester wax) and 10 parts by weight of 2,2'-azobis(2,4-dimethylvaleronitrile) as a polymerization initiator were added to prepare a polymerizable monomer composition.

| | |
|---|---|
| Styrene monomer | 82 parts by weight |
| Ethylhexyl acrylate monomer | 18 parts by weight |
| Divinylbenzene monomer | 0.1 part by weight |
| Cyan colorant (C.I. Pigment Blue 15) | 6 parts by weight |
| Polyethylene oxide resin (having a molecular weight of 3,200 and an acid value of 8) | 5 parts by weight |
| Exemplified Compound A | 2 parts by weight |

Next, the polymerizable monomer composition thus obtained was charged into the aqueous dispersion medium prepared in advance, and the whole was granulated while the number of revolutions was kept at 10,000 rpm. After that, the resultant was allowed to react at 65° C. for 3 hours while being stirred with a paddle stirring blade. Then, the resultant was polymerized at 80° C. for 6 hours to complete the polymerization reaction. After the completion of the reaction, the suspension was cooled, and an acid was added to dissolve the hardly water-soluble dispersant $Ca_3(PO_4)_2$. Then, the resultant was filtered, washed with water, and dried to yield blue polymerized particles (1). The particle size of the resultant blue polymerized particles (1) was measured by means of a Coulter Counter Multisizer (manufactured by Coulter). The particles had a weight average particle diameter of 6.5 μm and a fine powder amount (an abundance ratio of particles each having a particle diameter of 3.17 μm or less in a number distribution) of 5.0 number %.

1.3 parts by weight of hydrophobic silica fine powder treated with hexamethyldisilazane (BET: 270 $m^2/g$) as a fluidity improver were dry-mixed with and externally added to 100 parts by weight of the blue polymerized particles (1) thus prepared by using a Henschel mixer, to thereby produce a blue toner (1) of this example. Furthermore, 7 parts by weight of the blue toner (1) and 93 parts by weight of a resin-coated magnetic ferrite carrier (average particle diameter: 45 μm) were mixed to prepare a two-component blue developer (1) for magnetic brush development.

Examples 2 to 4

Each of blue toners (2) to (4) of Examples 2 to 4 was produced in the same manner as in Example 1 except that Exemplified Compound A was changed to any one of Exemplified Compounds B, C-8, and C-4. The properties of the toners were measured in the same manner as in Example 1. Table 1 shows the results. In addition, the toners were used to prepare two-component blue developers (2) to (4) of Examples 2 to 4 in the same manner as in Example 1.

Comparative Example 1

A blue toner (5) of Comparative Example 1 was produced in the same manner as in Example 1 except that no exemplified compound was used. The properties of the toner were measured in the same manner as in Example 1. Table 1 shows the results. In addition, the toner was used to prepare a two-component blue developer (5) of Comparative Example 1 in the same manner as in Example 1.

<Evaluation>

Toner charge amounts of the two-component blue developers (1) to (4) prepared in Examples 1 to 4 and the two-component blue developer (5) prepared in Comparative Example 1 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

◎: Very good (−20 μC/g or less)

○: Good (−19.9 to −10.0 μC/g)

Δ: Practicable (−9.9 to −5.0 μC/g)

x: Not practicable (−4.9 μC/g or more)

Examples 5 to 8

Each of yellow toners (1) to (4) of Examples 5 to 8 was produced in the same manner as in Example 1 except that: 2.0 parts by weight of each of Exemplified Compounds C-5, C-9, C-10, and E were used; and a yellow colorant (Hansa yellow G) was used instead of the cyan colorant. The properties of the toners were measured in the same manner as in Example 1. Table 1 shows the results. In addition, the toners were used to prepare two-component yellow developers (1) to (4) in the same manner as in Example 1.

Comparative Example 2

A yellow toner (5) of Comparative Example 2 was produced in the same manner as in Example 1 except that: no exemplified compound was used; and a yellow colorant (Hansa yellow G) was used instead of the cyan colorant. The properties of the toner were measured in the same manner as in Example 1. Table 1 shows the results. In addition, the toner was used to prepare a two-component yellow developer (5) of Comparative Example 2 in the same manner as in Example 1.

<Evaluation>

Toner charge amounts of the two-component yellow developers (1) to (4) prepared in Examples 5 to 8 and the two-component yellow developer (5) prepared in Comparative Example 2 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

⊚: Very good (−20 μC/g or less)

○: Good (−19.9 to −10.0 μC/g)

Δ: Practicable (−9.9 to −5.0 μC/g)

x: Not practicable (−4.9 μC/g or more)

Examples 9 to 12

Each of black toners (1) to (4) of Examples 9 to 12 was produced in the same manner as in Example 1 except that: 2.0 parts by weight of each of Exemplified Compounds G, H, I, and J were used; and carbon black (DBP oil absorption 110 mL/100 g) was used instead of the cyan colorant. The properties of the toners were measured in the same manner as in Example 1. Table 1 shows the results. In addition, the toners were used to prepare two-component black developers (1) to (4) in the same manner as in Example 1.

Comparative Example 3

A black toner (5) of Comparative Example 3 was produced in the same manner as in Example 1 except that: no exemplified compound was used; and carbon black (DBP oil absorption 110 mL/100 g) was used instead of the cyan colorant. The properties of the toner were measured in the same manner as in Example 1. Table 1 shows the results. In addition, the toner was used to prepare a two-component black developer (5) of Comparative Example 3 in the same manner as in Example 1.

<Evaluation>

Toner charge amounts of the two-component black developers (1) to (4) prepared in Examples 9 to 12 and the two-component black developer (5) prepared in Comparative Example 3 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

⊚: very good (−20 μC/g or less)

○: Good (−19.9 to −10.0 μC/g)

Δ: Practicable (−9.9 to −5.0 μC/g)

x: Not practicable (−4.9 μC/g or more)

Example 13

| | |
|---|---|
| Styrene-butyl acrylate copolymer resin (having a glass transition temperature of 70° C.) | 100 parts by weight |
| Magenta pigment (C.I. Pigment Red 114): | 5 parts by weight |
| Exemplified Compound F | 2 parts by weight |

The above compositions were mixed, and the mixture was melted and kneaded by means of a biaxial extruder (L/D=30). The kneaded product was cooled, roughly pulverized by means of a hammer mill, and finely pulverized by means of a jet mill. After that, the finely pulverized product was classified to yield magenta colored particles (1) by means of a pulverization method. The particle size of the magenta colored particles (1) was measured. The particles had a weight average particle diameter of 7.0 μm and a fine powder amount of 5.6 number %.

1.5 parts by weight of hydrophobic silica fine powder treated with hexamethyldisilazane (BET: 250 $m^2$/g) as a fluidity improver were dry-mixed with 100 parts by weight of the magenta colored particles (1) by using a Henschel mixer, to thereby produce a magenta (red) toner (1) of this example. Furthermore, 7 parts by weight of the resultant magenta (red) toner (1) and 93 parts by weight of a resin-coated magnetic ferrite carrier (average particle diameter: 45 μm) were mixed to prepare a two-component magenta (red) developer (1) for magnetic brush development.

Examples 14 to 16

Each of magenta (red) toners (2) to (4) of Examples 14 to 16 was produced in the same manner as in Example 13 except that Exemplified Compound F was changed to any one of Exemplified Compounds K, L, and M. The properties of the toners were measured in the same manner as in Example 1. Table 1 shows the results. In addition, the toners were used to prepare two-component magenta (red) developers (2) to (4) of Examples 14 to 16 in the same manner as in Example 13.

Comparative Example 4

A magenta toner (5) of Comparative Example 4 was produced in the same manner as in Example 13 except that no exemplified compound was used. The properties of the toner were measured in the same manner as in Example 1. Table 1 shows the results. In addition, the toner was used to prepare a two-component magenta (red) developer (5) of Comparative Example 4 in the same manner as in Example 13.

<Evaluation>

Toner charge amounts of the two-component magenta (red) developers (1) to (4) prepared in Examples 13 to 16 and the two-component magenta (red) developer (5) prepared in Comparative Example 4 10 sec and 300 sec after stirring in a normal-temperature-and-normal-humidity (25° C., 60% RH)

environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

⊚: Very good (−20 μC/g or less)

○: Good (−19.9 to −10.0 μC/g)

Δ: Practicable (−9.9 to −5.0 μC/g)

x: Not practicable (−4.9 μC/g or more)

Examples 17 to 20

Each of black toners (6) to (9) of Examples 17 to 20 was produced in the same manner as in Example 13 except that: 2.0 parts by weight of each of Exemplified Compounds D, N, O, and P were used; and carbon black (DBP oil absorption 110 mL/100 g) was used instead of the magenta pigment. The properties of the toners were measured in the same manner as in Example 1. Table 1 shows the results. In addition, the toners were used to prepare two-component black developers (6) to (9) in the same manner as in Example 13.

Comparative Example 5

A black toner (10) of Comparative Example 5 was produced in the same manner as in Example 13 except that: no exemplified compound was used; and carbon black (DBP oil absorption 110 mL/100 g) was used instead of the magenta pigment. The properties of the toner were measured in the same manner as in Example 1. Table 1 shows the results. In addition, the toner was used to prepare a two-component black developer (10) of Comparative Example 5 in the same manner as in Example 13.

<Evaluation>

Toner charge amounts of the two-component black developers (6) to (9) prepared in Examples 17 to 20 and the two-component black developer (10) prepared in Comparative Example 5 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

⊚: Very good (−20 μC/g or less)

○: Good (−19.9 to −10.0 μC/g)

Δ: Practicable (−9.9 to −5.0 μC/g)

x: Not practicable (−4.9 μC/g or more)

Example 21

| | |
|---|---|
| Polyester resin | 100 parts by weight |
| Carbon black (DBP oil absorption 110 mL/100 g) | 5 parts by weight |
| Exemplified Compound Q | 2 parts by weight |

The polyester resin was synthesized as follows. 751 parts of bisphenol A propylene oxide 2 mole adduct, 104 parts of terephthalic acid, and 167 parts of trimellitic anhydride were subjected to polycondensation by using 2 parts of dibutyltin oxide as a catalyst to produce the polyester resin having a softening point of 125° C.

The above compositions were mixed, and the mixture was melted and kneaded by means of a biaxial extruder (L/D=30). The kneaded product was cooled, roughly pulverized by means of a hammer mill, and finely pulverized by means of a jet mill. After that, the finely pulverized product was classified to yield black colored particles (11) by means of a pulverization method. The particle size of the black colored particles (11) was measured. The particles had a weight average particle diameter of 7.0 μm and a fine powder amount of 4.9 number %.

1.5 parts by weight of hydrophobic silica fine powder treated with hexamethyldisilazane (BET: 250 $m^2/g$) as a fluidity improver were dry-mixed with 100 parts by weight of the black colored particles (11) by using a Henschel mixer, to thereby produce a black toner (11) of this example. Furthermore, 7 parts by weight of the resultant black toner (11) and 93 parts by weight of a resin-coated magnetic ferrite carrier (average particle diameter: 45 μm) were mixed to prepare a two-component black developer (11) for magnetic brush development.

Examples 22 to 24

Each of black toners (11) to (14) of Examples 22 to 24 was produced in the same manner as in Example 21 except that Exemplified Compound Q was changed to any one of Exemplified Compounds R, S, and T. The properties of the toners were measured in the same manner as in Example 1. Table 1 shows the results. In addition, the toners were used to prepare two-component black developers (11) to (14) of Examples 22 to 24 in the same manner as in Example 21.

Comparative Example 6

A black toner (15) of Comparative Example 6 was produced in the same manner as in Example 21 except that no exemplified compound was used. The properties of the toner were measured in the same manner as in Example 1. Table 1 shows the results. In addition, the toner was used to prepare a two-component black developer (15) of Comparative Example 6 in the same manner as in Example 21.

<Evaluation>

Toner charge amounts of the two-component black developers (11) to (14) prepared in Examples 21 to 24 and the two-component black developer (15) prepared in Comparative Example 6 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 1 summarizes the results.

[Chargeability]

⊚: Very good (−20 μC/g or less)

○: Good (−19.9 to −10.0 μC/g)

Δ: Practicable (−9.9 to −5.0 μC/g)

x: Not practicable (−4.9 μC/g or more)

TABLE 1

| Example | Exemplified Compound No. | Toner No. | Particle size distribution: Average particle diameter (μm) | Particle size distribution: Fine powder amount (%) | Chargeability: Normal temperature and normal humidity (Q/M) 10 Sec | Chargeability: Normal temperature and normal humidity (Q/M) 300 Sec | Chargeability: High temperature and high humidity (Q/M) 10 Sec | Chargeability: High temperature and high humidity (Q/M) 300 Sec |
|---|---|---|---|---|---|---|---|---|
| 1 | A | Blue 1 | 6.5 | 5.0 | ◎ | ◎ | ◎ | ◎ |
| 2 | B | Blue 2 | 7.2 | 5.1 | ◎ | ◎ | ○ | ◎ |
| 3 | C-8 | Blue 3 | 7.0 | 4.9 | ◎ | ◎ | ◎ | ◎ |
| 4 | C-4 | Blue 4 | 6.9 | 5.3 | ◎ | ◎ | ◎ | ◎ |
| 5 | C-5 | Yellow 1 | 7.1 | 5.2 | ◎ | ◎ | ◎ | ◎ |
| 6 | C-9 | Yellow 2 | 7.0 | 5.3 | ◎ | ◎ | ◎ | ◎ |
| 7 | C-10 | Yellow 3 | 7.3 | 5.3 | ◎ | ◎ | ◎ | ◎ |
| 8 | E | Yellow 4 | 7.6 | 4.9 | ○ | ○ | ○ | ○ |
| 9 | G | Black 1 | 7.5 | 4.8 | ○ | ◎ | ○ | ◎ |
| 10 | H | Black 2 | 7.2 | 5.3 | ◎ | ◎ | ○ | ◎ |
| 11 | I | Black 3 | 7.0 | 5.2 | ◎ | ◎ | ◎ | ◎ |
| 12 | J | Black 4 | 6.9 | 5.3 | ◎ | ◎ | ◎ | ◎ |
| 13 | F | Red 1 | 7.0 | 5.6 | ○ | ◎ | ○ | ◎ |
| 14 | K | Red 2 | 7.3 | 5.2 | ◎ | ◎ | ○ | ◎ |
| 15 | L | Red 3 | 7.1 | 5.0 | ○ | ◎ | ○ | ◎ |
| 16 | M | Red 4 | 7.6 | 5.3 | ◎ | ◎ | ◎ | ◎ |
| 17 | D | Black 6 | 7.5 | 5.4 | ◎ | ◎ | ◎ | ◎ |
| 18 | N | Black 7 | 7.5 | 5.6 | ◎ | ◎ | ◎ | ◎ |
| 19 | O | Black 8 | 7.3 | 5.2 | ◎ | ◎ | ○ | ◎ |
| 20 | P | Black 9 | 7.4 | 5.3 | ○ | ◎ | ○ | ◎ |
| 21 | Q | Black 11 | 7.0 | 4.9 | ◎ | ◎ | ◎ | ◎ |
| 22 | R | Black 12 | 7.1 | 5.2 | ◎ | ◎ | ○ | ○ |
| 23 | S | Black 13 | 7.5 | 4.7 | ◎ | ◎ | ◎ | ◎ |
| 24 | T | Black 14 | 7.6 | 4.9 | ◎ | ◎ | ◎ | ◎ |
| Comparative Example 1 | — | Blue 5 | 7.1 | 5.2 | X | X | X | X |
| 2 | — | Yellow 5 | 7.3 | 5.4 | X | X | X | X |
| 3 | — | Black 5 | 7.1 | 5.1 | X | Δ | X | Δ |
| 4 | — | Red 5 | 7.5 | 5.6 | X | Δ | X | Δ |
| 5 | — | Black 10 | 7.6 | 5.7 | X | Δ | X | X |
| 6 | — | Black 15 | 7.6 | 4.9 | X | Δ | X | Δ |

(For convenience, magenta is referred to as red)

Examples 25 to 30 and Comparative Examples 7 to 12

First, an image forming apparatus used for an image forming method of each of Examples 25 to 30 and Comparative Examples 7 to 12 will be described. FIG. 1 is a schematic sectional view for explaining an image forming apparatus for performing an image forming method of each of examples and comparative examples of the present invention. A photosensitive drum 1 shown in FIG. 1 has a photosensitive layer 1*a* having an organic photosemiconductor on a substrate 1*b*, and is structured to rotate in a direction indicated by an arrow. The surface of the photosensitive drum 1 is charged to a surface potential of about −600 V by a charging roller 2 serving as a charging member which is opposed to the photosensitive drum 1 and rotates while being in contact with the drum. As shown in FIG. 1, the charging roller 2 is structured by coating a mandrel 2*b* with a conductive elastic layer 2*a*.

Figure 2:
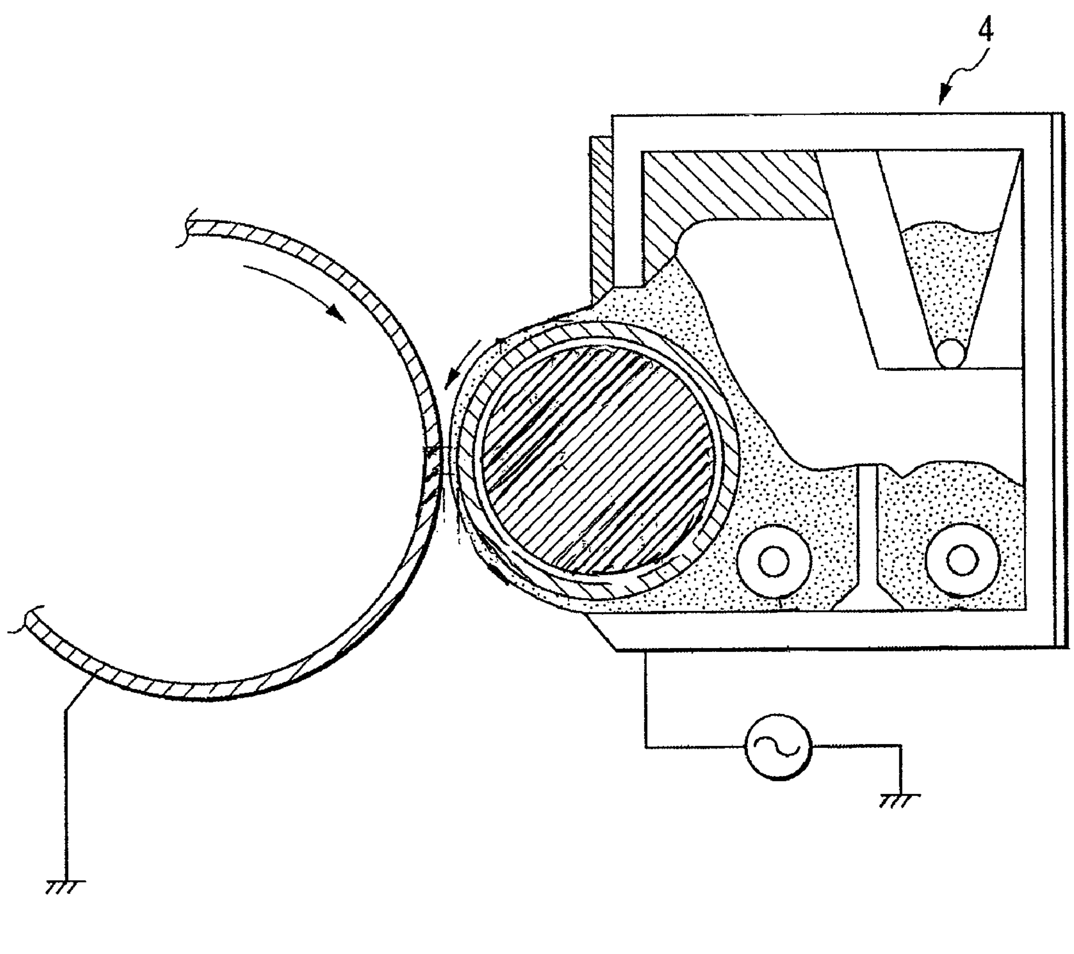
FIG. 2 is a sectional view of a main part of a developing device for a two-component developer used in each of Examples 25 to 30 and Comparative Examples 7 to 12.

Next, the photosensitive drum 1 having a charged surface is exposed to light 3. At that time, an electrostatic charge image having an exposed-area potential of −100 V and a dark-area potential of −600 V is formed on the photosensitive member by turning on/off the exposure in accordance with digital image information using a polygon mirror. Subsequently, the electrostatic charge image on the photosensitive drum 1 is subjected to reversal development by using multiple developing devices 4-1, 4-2, 4-3, and 4-4 for visualization. As a result, a toner image is formed on the photosensitive drum 1. At that time, each of the two-component developers prepared in Examples 2, 6, 9, 16, 20, and 24 and Comparative Examples 1 to 6 is used as a developer. Thus, a toner image is formed by means of a yellow toner, a magenta toner, a cyan toner, or a black toner. FIG. 2 is an enlarged sectional view of a main part of each developing device 4 for a two-component developer used at that time.

Next, the toner image on the photosensitive drum 1 is transferred onto an intermediate transfer member 5 rotating while being in contact with the photosensitive drum 1. As a result, a visualized image having 4 colors overlapping one another is formed on the intermediate transfer member 5. The transfer residual toner that remains on the photosensitive drum 1 without being transferred is collected in a residual toner container 9 by a cleaner member 8.

As shown in FIG. 1, the intermediate transfer member 5 is composed of a mandrel 5*b* as a support and an elastic layer 5*a* laminated on the mandrel 5*b*. Used in this example was the intermediate transfer member 5 obtained by coating the pipe-shaped mandrel 5*b* with the elastic layer 5*a* obtained by sufficiently dispersing carbon black as a conductivity imparting material into nitrile-butadiene rubber (NBR). The hardness of the elastic layer 5*a* measured in accordance with "JIS K-6301" was 30 degrees, and the elastic layer had a volume resistivity of $10^9$ Ω·cm. A transfer current necessary for transfer from the photosensitive drum 1 onto the intermediate transfer member 5 was about 5 μA, which was obtained by applying +500 V from a power source to the mandrel 5*b*.

The visualized image having 4 toner colors overlapping one another formed on the intermediate transfer member 5 is transferred onto an image-receiving material such as paper by a transfer roller 7, and is then fixed by a heat-fixing device H.

The transfer roller 7 has a mandrel 7*b* having an outer diameter of 10 mm coated with an elastic layer 7*a* obtained by sufficiently dispersing carbon as a conductivity imparting material into a foam of an ethylene-propylene-diene-based tertiary copolymer (EPDM). The elastic layer had a volume specific resistivity of $10^6$ Ω·cm and a hardness measured in accordance with "JIS K-6301" of 35 degrees. A transfer current of 15 μA was allowed to flow by applying a voltage to the transfer roller 7.

In the apparatus shown in FIG. 1, a heat-roll fixing device having no oil application mechanism was used as the heat-fixing device H. At this time, a roller having a surface layer made of a fluorine-based resin was used for each of an upper roller and a lower roller. In addition, each roller had a diameter of 60 mm. A fixing temperature at the time of fixing was set to 160° C., while a nip width was set to 7 mm. The transfer residual toner on the photosensitive drum 1 collected by cleaning was conveyed to a developing unit by a reuse mechanism for recycle.

<Evaluation>

Under the above conditions, a print out test was performed in a monochrome intermittent mode (that is, a mode in which a developing unit is suspended for 10 sec each time one sheet is printed out, and deterioration of toner is accelerated by a preliminary operation at the time of restart) in a normal-temperature-and-normal-humidity (25° C., 60% RH) environment and a high-temperature-and-high-humidity (30° C., 80% RH) environment at a print out rate of 8 sheets (A4 size)/min using each of the two-component developers prepared by using the toners of Examples 2, 6, 9, 16, 20, and 24 and the two-component developers prepared by using the toners of Comparative Examples 1 to 6 while sequentially supplying the developer. The resultant printed-out image was evaluated for the following items. Table 2 summarizes the results of the evaluation.

[Printed-Out Image Evaluation]

1. Image Density

A predetermined number of sheets of ordinary plain paper for a copying machine (75 g/m$^2$) were printed out. An image density was evaluated according to the degree to which an image maintained its image density at the time of completion of printing as compared to an initial image. The relative density of a white portion having an original density of 0.00 with respect to a printed-out image was measured by using a Macbeth reflection densitometer (manufactured by Macbeth), and was used for evaluation.

⊚: Excellent (An image density at the time of completion is 1.40 or more.)
⊚: Good (An image density at the time of completion is 1.35 or more and less than 1.40.)
Δ: Acceptable (An image density at the time of completion is 1.00 or more and less than 1.35.)
x: Not acceptable (An image density at the time of completion is less than 1.00.)

2. Image Fogging

A predetermined number of sheets of ordinary plain paper for a copying machine (75 g/m$^2$) were printed out. A solid white image at the time of completion of printing was evaluated for image fogging. To be specific, the image was evaluated for image fogging by means of the following method. The worst value of a white portion reflection density after printing and an average reflection density of paper before printing measured by using a reflection densitometer (manufactured by TOKYO DENSHOKU CO., LTD, REFLECTOMETER ODEL TC-6DS) were denoted by Ds and Dr, respectively, and (Ds-Dr) was determined from these values. The resultant value was used defined as a fogging amount, and was evaluated according to the following criteria.

⊚: Very good (A fogging amount is 0% or more and less than 1.5%.)
○: Good (A fogging amount is 1.5% or more and less than 3.0%.)
Δ: Practicable (A fogging amount is 3.0% or more and less than 5.0%.)
x: Not practicable (A fogging amount is 5.0% or more.)

3. Transferability

Solid black images were printed out on a predetermined number of sheets of ordinary plain paper for a copying machine (75 g/m$^2$). The blank area amount of an image at the time of completion of printing was visually observed, and was evaluated according to the following criteria.

⊚: Very good (Nearly no blank area occurs)
○: Good (Blank area slightly occurs)
Δ: Practicable
x: Not practicable In addition, in each of Examples 25 to 30 and Comparative Examples 7 to 12, the states of occurrence of: scratches on the surfaces of the photosensitive drum and the intermediate transfer member; and adherence of residual toner to the surfaces, and influences of the scratches and the residual toner on a printed-out image (matching with an image forming apparatus) when 5,000 images were output were visually evaluated. In a system using each of the two-component developers of Examples 25 to 30, neither scratch on the surfaces of the photosensitive drum and the intermediate transfer member nor adherence of residual toner to the surfaces was observed, so matching with the image forming apparatus was very good. On the other hand, in a system using each of the two-component developers of Comparative Examples 7 to 12, adherence of the toner to the surface of the photosensitive drum was observed. Furthermore, in the system using each of the two-component developers of Comparative Examples 7 to 12, adherence of the toner to the surface of the intermediate transfer member and a scratch on the surface were observed. A problem in matching with the image forming apparatus such as the occurrence of a vertical stripe-like image defect on an image arose.

TABLE 2

| | | Normal temperature and normal humidity | | | High temperature and high humidity | | |
|---|---|---|---|---|---|---|---|
| Example | Two-component developer | Image density | Image fogging | Transferability | Image density | Image fogging | Transferability |
| 25 | Blue 2 | ⊚ | ⊚ | ⊚ | ⊚ | ⊚ | ⊚ |
| 26 | Yellow 2 | ⊚ | ⊚ | ⊚ | ⊚ | ⊚ | ⊚ |
| 27 | Black 1 | ○ | ⊚ | ⊚ | ○ | ○ | ⊚ |
| 28 | Red 4 | ⊚ | ⊚ | ⊚ | ⊚ | ⊚ | ⊚ |
| 29 | Black 9 | ○ | ⊚ | ○ | ○ | ○ | ○ |

TABLE 2-continued

| Example | Two-component developer | Normal temperature and normal humidity: Image density | Image fogging | Transferability | High temperature and high humidity: Image density | Image fogging | Transferability |
|---|---|---|---|---|---|---|---|
| 30 | Black 14 | ◎ | ◎ | ◎ | ◎ | ◎ | ◎ |
| Comparative Example 7 | Blue 5 | X | X | X | X | X | X |
| 8 | Yellow 5 | X | X | X | X | X | X |
| 9 | Black 5 | Δ | Δ | X | Δ | X | X |
| 10 | Red 5 | Δ | Δ | X | Δ | X | X |
| 11 | Black 10 | Δ | Δ | X | X | X | X |
| 12 | Black 15 | Δ | Δ | X | Δ | X | X |

Examples 31 to 33 and Comparative Examples 13 to 15

Figure 3:
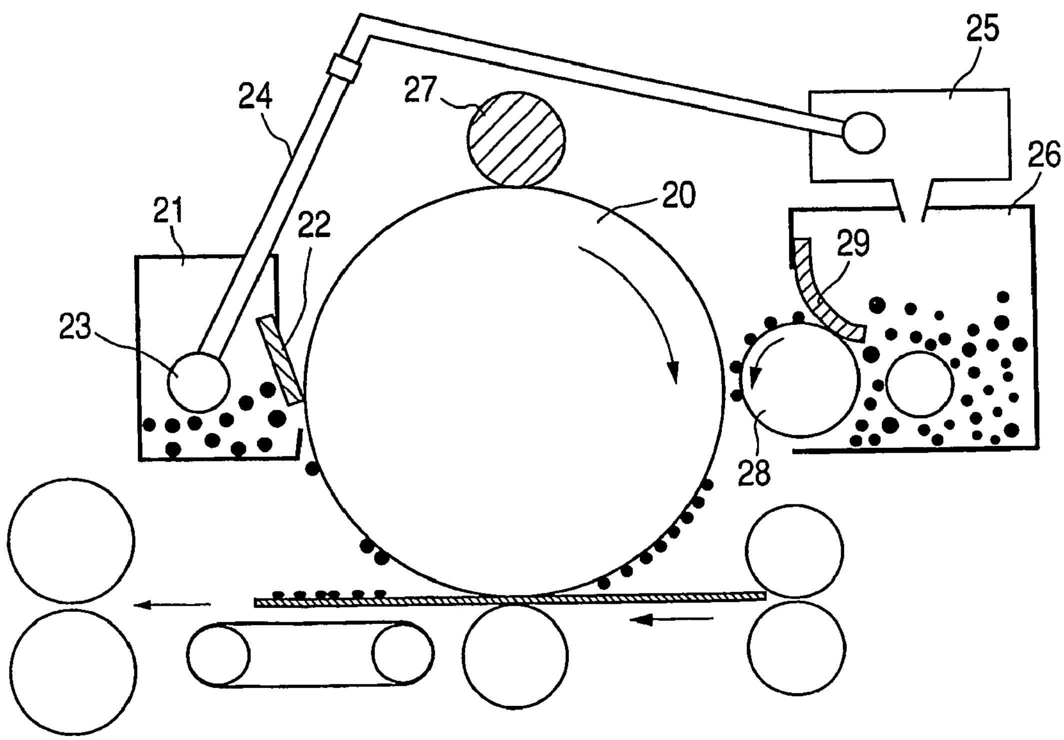
FIG. 3 is a schematic view for explaining an image forming apparatus having a toner reuse mechanism used in each of Examples 31 to 34 and Comparative Examples 13 to 15.

In performing an image forming method of each of Examples 31 to 33 and Comparative Examples 13 to 15, each of the toners produced in Examples 2, 6, and 9 and Comparative Examples 1 to 3 was used as a developer. Used as means for forming an image was an image forming apparatus reconstructed and reset by providing a reuse mechanism for a commercially available laser beam printer LBP-EX (manufactured by Canon Inc.) as shown in FIG. 3. That is, the image forming apparatus shown in FIG. 3 is provided with a system which performs: scraping untransferred toner remaining on a photosensitive drum 20 after transfer by using an elastic blade 22 of a cleaner 21 brought into abutment with the photosensitive drum 20; sending the scraped toner to the inside of the cleaner 21 by using a cleaner roller; returning the toner to a developing unit 26 by using a supply pipe 24 provided with a conveyance screw through a cleaner reuse 23 and a hopper 25; and recycling the collected toner.

In the image forming apparatus shown in FIG. 3, the surface of the photosensitive drum 20 is charged by a primary charging roller 27. A rubber roller into which conductive carbon coated with a nylon resin was dispersed (having a diameter of 12 mm and an abutment pressure of 50 gf/cm) was used as the primary charging roller 27. An electrostatic latent image having a dark-area potential VD of −700 V and a light-area potential VL of −200 V was formed on the electrostatic latent image-bearing member (the photosensitive member 20) through laser exposure (600 dpi, not shown). Used as a toner carrier was a developing sleeve 28 having a surface roughness Ra of 1.1 the surface of which was coated with a resin into which carbon black was dispersed.

Figure 4:
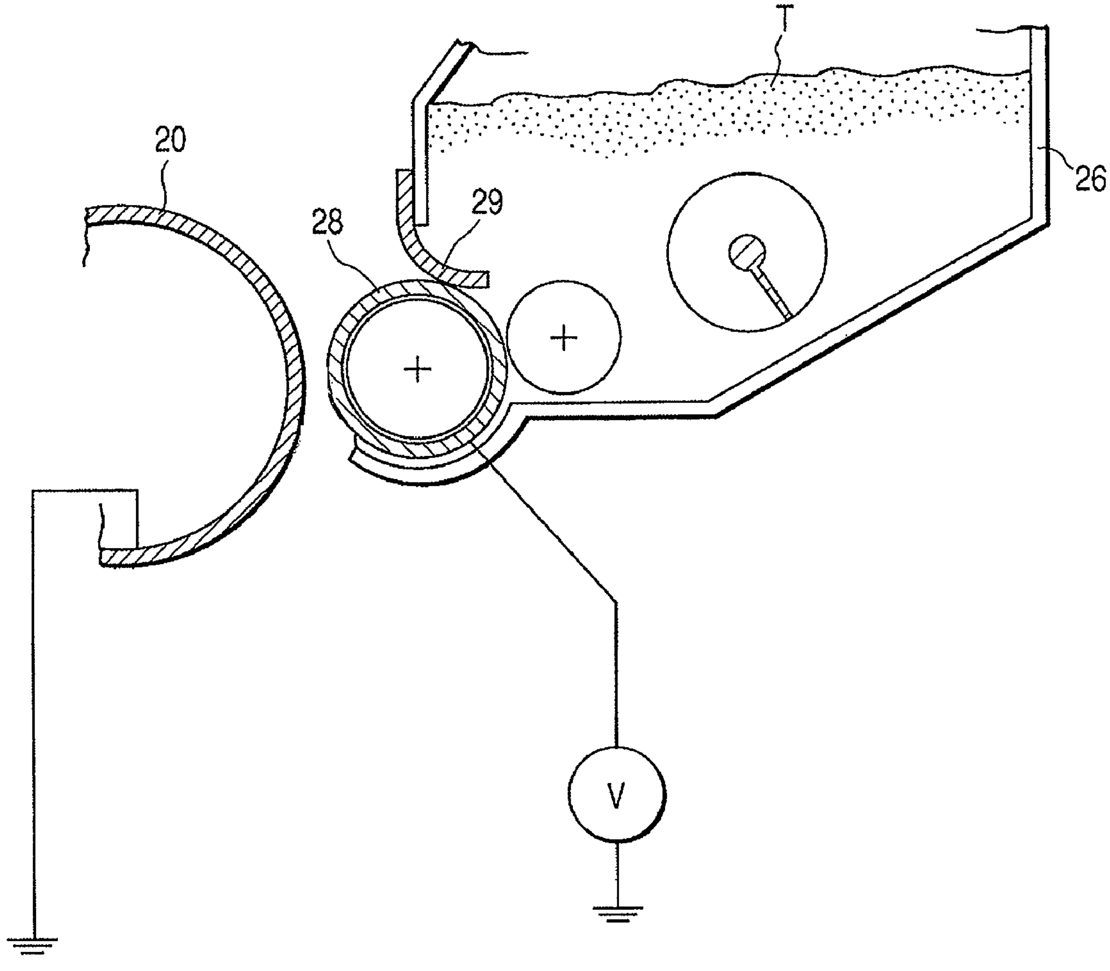
FIG. 4 is a sectional view of a main part of a developing device for a one-component developer used in each of Examples 31 to 34 and Comparative Examples 13 to 15.

FIG. 4 shows an enlarged sectional view of a main part of a developing device for a one-component developer used in each of Examples 31 to 33 and Comparative Examples 13 to 15. Conditions for developing an electrostatic latent image included: setting the speed of the developing sleeve 28 to be 1.1 times as high as the travelling speed of the opposing surface of the photosensitive drum 20; and setting an interval between the photosensitive drum 20 and the developing sleeve 28 (between S-D) to 270 m. A blade 29 made of urethane rubber was used as a member for regulating the thickness of a layer of toner by bringing the blade into abutment with the developing sleeve. The temperature of a heat-fixing device for fixing a toner image was set to 160° C.

Under the above conditions, up to 30,000 sheets were printed out in a continuous mode (that is, a mode in which consumption of toner is accelerated without the suspension of a developing unit) in a normal-temperature-and-normal-humidity (25° C., 60% RH) environment at a print out rate of 8 sheets (A4 size)/min while toner was sequentially supplied. The image density of the resultant printed-out image was measured, and the image was evaluated for durability according to the following criteria. In addition, a 10,000th image was observed and evaluated for image fogging according to the following criteria. At the same time, the state of each device constituting an image forming apparatus after the duration test was observed to evaluate matching between each device and each of the above toners. Table 3 summarizes the results of the evaluation.

[Transition of Image Density at the Time of Duration]

A predetermined number of sheets of ordinary plain paper for a copying machine (75 g/m$^2$) were printed out. An image density was evaluated according to the degree to which an image maintained its image density at the time of completion of printing as compared to an initial image. The relative density of a white portion having an original density of 0.00 with respect to a printed-out image was measured by using a Macbeth reflection densitometer (manufactured by Macbeth), and was used for evaluation.

◎: Excellent (An image density at the time of completion is 1.40 or more.)
○: Good (An image density at the time of completion is 1.35 or more and less than 1.40.)
Δ: Acceptable (An image density at the time of completion is 1.00 or more and less than 1.35.)
x: Not acceptable (An image density at the time of completion is less than 1.00.)

[Image Fogging]

A predetermined number of sheets of ordinary plain paper for a copying machine (75 g/m$^2$) were printed out. A solid white image at the time of completion of printing was evaluated for image fogging. To be specific, the image was evaluated for image fogging by means of the following method. The worst value of a white portion reflection density after printing and an average reflection density of paper before printing measured by using a reflection densitometer (manufactured by TOKYO DENSHOKU CO., LTD, REFLECTOMETER ODEL TC-6DS) were denoted by Ds and Dr, respectively, and (Ds-Dr) was determined from these values. The resultant value was used defined as a fogging amount, and was evaluated according to the following criteria.

◎: Very good (A fogging amount is 0% or more and less than 1.5%.)
○: Good (A fogging amount is 1.5% or more and less than 3.0%.)
Δ: Practicable (A fogging amount is 3.0% or more and less than 5.0%.)
x: Not practicable (A fogging amount is 5.0% or more.)

[Image Forming Apparatus Matching Evaluation]

1. Matching with Developing Sleeve

After the completion of the print out test, the state where residual toner adhered to the surface of a developing sleeve and an influence of the residual toner on a printed-out image were visually evaluated.

◎: Very good (No adherence occurs.)
○: Good (Nearly no adherence occurs.)
Δ: Practicable (Adherence occurs, but affects an image little.)
x: Not practicable (Adherence is remarkable, and causes image unevenness.)

2. Matching with Photosensitive Drum

The states of occurrence of: a scratch on the surface of a photosensitive drum; and adherence of residual toner to the surface, and influences of the scratch and the residual toner on a printed-out image were visually evaluated.

◎: Very good (Neither scratch nor adherence occurs)
○: Good (A slight scratch occurs, but does not affect an image.)
Δ: Practicable (Adherence and a scratch occur, but affect an image little.)
x: Not practicable (Adherence is remarkable, and causes a vertical stripe-like image defect.)

3. Matching with Fixing Device

The state of the surface of a fixation film was observed, and results of surface property and the state of adherence of residual toner were generally averaged to evaluate the surface for durability.

(1) Surface Property

The state of occurrence of a scratch or shaving on the surface of a fixation film after the completion of the print out test was visually observed and evaluated.

◎: Very good (No occurrence)
○: Good (Nearly no occurrence)
Δ: Practicable
x: Not practicable (2) State of Adherence of Residual Toner The state of adherence of residual toner on the surface of a fixation film after the completion of the print out test was visually observed and evaluated.

◎: Very good (No occurrence)
○: Good (Nearly no occurrence)
Δ: Practicable
x: Not practicable

TABLE 3

| | | Printed-out image evaluation | | | | | Evaluation of matching with each device | | | |
|---|---|---|---|---|---|---|---|---|---|---|
| | | Transition of image density at the time of duration | | | | Image fogging | | | Fixing device | |
| Example | Toner | Initial | 1,000 sheets | 10,000 sheets | 30,000 sheets | 10,000 sheets | Developing sleeve | Photo-sensitive drum | Surface property | Toner adherence |
| 31 | Blue 2 | ◎ | ◎ | ◎ | ◎ | ◎ | ◎ | ◎ | ◎ | ◎ |
| 32 | Yellow 2 | ◎ | ◎ | ◎ | ◎ | ◎ | ◎ | ◎ | ◎ | ◎ |
| 33 | Black 1 | ○ | ○ | ○ | ○ | ○ | ○ | ◎ | ◎ | ○ |
| Comparative Example 13 | Blue 5 | Δ | X | X | X | X | X | X | X | X |
| 14 | Yellow 5 | Δ | X | X | X | X | X | X | X | X |
| 15 | Black 5 | ○ | Δ | X | X | X | X | X | X | X |

Example 34

A print out test was performed in a continuous mode (that is, a mode in which consumption of toner is accelerated without the suspension of a developing unit) while the yellow toner (2) of Example 6 was sequentially supplied in the same manner as in Example 31 except that: the toner reuse mechanism of the image forming apparatus shown in FIG. 3 was removed; and the print out rate was changed to 16 sheets (A4 size)/min. The resultant printed-out image and matching with an image evaluation apparatus were evaluated for the same items as those of Examples 31 to 33 and Comparative Examples 13 to 15. As a result, good results were obtained for all of the items.

Examples 35 to 38

Each of blue toners (6) to (9) of Examples 35 to 38 was produced in the same manner as in Example 1 except that Exemplified Compound A was changed to any one of Exemplified Compounds 2A, 2B, 2C, and 2D. The properties of the toners were measured in the same manner as in Example 1. Table 4 shows the results. In addition, the toners were used to prepare two-component blue developers (6) to (9) of Examples 35 to 38 in the same manner as in Example 1.

<Evaluation>

Toner charge amounts of the two-component blue developers (6) to (9) prepared in Examples 35 to 38 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 4 summarizes the results.

[Chargeability]

◎: Very good (−20 μC/g or less)
○: Good (−19.9 to −10.0 μC/g)
Δ: Practicable (−9.9 to −5.0 μC/g)
x: Not practicable (−4.9 μC/g or more)

Examples 39 to 42

Each of yellow toners (6) to (9) of Examples 39 to 42 was produced in the same manner as in Example 1 except that: 2.0 parts by weight of each of Exemplified Compounds 2E, 2F, 2G, and 2H were used; and a yellow colorant (Hansa yellow G) was used instead of the cyan colorant. The properties of the toners were measured in the same manner as in Example 1. Table 4 shows the results. In addition, the toners were used to prepare two-component yellow developers (6) to (9) in the same manner as in Example 1.

<Evaluation>

Toner charge amounts of the two-component yellow developers (6) to (9) prepared in Examples 39 to 42 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 4 summarizes the results.

[Chargeability]

◎: Very good (−20 μC/g or less)

○: Good (−19.9 to −10.0 μC/g)

Δ: Practicable (−9.9 to −5.0 μC/g)

x: Not practicable (−4.9 μC/g or more)

Examples 43 to 46

Each of black toners (16) to (19) of Examples 43 to 46 was produced in the same manner as in Example 1 except that: 2.0 parts by weight of each of Exemplified Compounds 2I, 2J, 2K, and 2L were used; and carbon black (DBP oil absorption 110 mL/100 g) was used instead of the cyan colorant. The properties of the toners were measured in the same manner as in Example 1. Table 4 shows the results. In addition, the toners were used to prepare two-component black developers (16) to (19) in the same manner as in Example 1.

<Evaluation>

Toner charge amounts of the two-component black developers (16) to (19) prepared in Examples 43 to 46 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 4 summarizes the results.

[Chargeability]

◎: Very good (−20 μC/g or less)

○: Good (−19.9 to −10.0 μC/g)

Δ: Practicable (−9.9 to −5.0 μC/g)

x: Not practicable (−4.9 μC/g or more)

Examples 47 to 50

Each of magenta (red) toners (6) to (9) of Examples 47 to 50 was produced in the same manner as in Example 13 except that Exemplified Compound F was changed to any one of Exemplified Compounds 2M, 2N, 2O, and 2P. The properties of the toners were measured in the same manner as in Example 1. Table 4 shows the results. In addition, the toners were used to prepare two-component magenta (red) developers (6) to (9) of Examples 47 to 50 in the same manner as in Example 13.

<Evaluation>

Toner charge amounts of the two-component magenta (red) developers (6) to (9) prepared in Examples 47 to 50 10 sec and 300 sec after stirring in a normal-temperature-and-normal-humidity (25° C., 60% RH) environment and a high-temperature-and-high-humidity (30° C., 80% RH) environment were measured by means of the method of measuring a charge amount described above. Then, the measured value of a two-component blow-off charge amount was rounded to one decimal place, and the resultant value was evaluated according to the following criteria. Table 4 summarizes the results.

[Chargeability]

◎: very good (−20 μC/g or less)

○: Good (−19.9 to −10.0 μC/g)

Δ: Practicable (−9.9 to −5.0 μC/g)

x: Not practicable (−4.9 μC/g or more)

TABLE 4

| | | | Particle size distribution | | Chargeability | | | |
|---|---|---|---|---|---|---|---|---|
| | | | | | Normal temperature and normal humidity (Q/M) | | High temperature and high humidity (Q/M) | |
| Example | Exemplified Compound No. | Toner No. | Average particle size (μm) | Fine powder amount (%) | 10 Sec | 300 Sec | 10 Sec | 300 Sec |
| 35 | 2A | Blue 6 | 7.3 | 4.6 | ◎ | ◎ | ◎ | ◎ |
| 36 | 2B | Blue 7 | 7.2 | 4.8 | ◎ | ◎ | ◎ | ◎ |
| 37 | 2C | Blue 8 | 6.9 | 5.0 | ◎ | ◎ | ◎ | ◎ |
| 38 | 2D | Blue 9 | 7.5 | 5.4 | ○ | ◎ | ○ | ○ |
| 39 | 2E | Yellow 6 | 6.7 | 5.0 | ◎ | ◎ | ◎ | ◎ |
| 40 | 2F | Yellow 7 | 6.8 | 5.1 | ◎ | ◎ | ◎ | ◎ |
| 41 | 2G | Yellow 8 | 7.1 | 4.9 | ◎ | ◎ | ○ | ◎ |
| 42 | 2H | Yellow 9 | 7.3 | 5.2 | ◎ | ◎ | ◎ | ◎ |
| 43 | 2I | Black 16 | 7.1 | 4.8 | ◎ | ◎ | ○ | ◎ |
| 44 | 2J | Black 17 | 6.8 | 4.9 | ◎ | ◎ | ◎ | ◎ |
| 45 | 2K | Black 18 | 7.5 | 5.5 | ○ | ◎ | ○ | ○ |
| 46 | 2L | Black 19 | 6.7 | 4.7 | ◎ | ◎ | ◎ | ◎ |
| 47 | 2M | Red 6 | 6.9 | 4.8 | ◎ | ◎ | ◎ | ◎ |
| 48 | 2N | Red 7 | 7.0 | 5.0 | ◎ | ◎ | ◎ | ◎ |
| 49 | 2O | Red 8 | 6.9 | 5.0 | ◎ | ◎ | ◎ | ◎ |
| 50 | 2P | Red 9 | 7.1 | 4.9 | ◎ | ◎ | ◎ | ◎ |

Examples 51 to 54

Image formation was performed in the same manner as in Example 25. Each of the two-component developers prepared in Examples 36, 41, 44, and 50 was used, and a toner image was formed by using a blue toner, a yellow toner, a black toner, or a red toner.

<Evaluation>

Under the same conditions as those of Example 25, a print out test was performed in a monochrome intermittent mode (that is, a mode in which a developing unit is suspended for 10 sec each time one sheet is printed out, and deterioration of toner is accelerated by a preliminary operation at the time of restart) in a normal-temperature-and-normal-humidity (25°

C., 60% RH) environment and a high-temperature-and-high-humidity (30° C., 80% RH) environment at a print out rate of 8 sheets (A4 size)/min using each of the two-component developers prepared by using the toners of Examples 36, 41, 44, and 50 while sequentially supplying the developer. The resultant printed-out image was evaluated for the following items. Table 5 summarizes the results of the evaluation.

[Printed-Out Image Evaluation]

1. Image Density

A predetermined number of sheets of ordinary plain paper for a copying machine (75 g/m$^2$) were printed out. An image density was evaluated according to the degree to which an image maintained its image density at the time of completion of printing as compared to an initial image. The relative density of a white portion having an original density of 0.00 with respect to a printed-out image was measured by using a Macbeth reflection densitometer (manufactured by Macbeth), and was used for evaluation.

◎: Excellent (An image density at the time of completion is 1.40 or more.)

○: Good (An image density at the time of completion is 1.35 or more and less than 1.40.)

Δ: Acceptable (An image density at the time of completion is 1.00 or more and less than 1.35.)

x: Not acceptable (An image density at the time of completion is less than 1.00.)

2. Image Fogging

A predetermined number of sheets of ordinary plain paper for a copying machine (75 g/m$^2$) were printed out. A solid white image at the time of completion of printing was evaluated for image fogging. To be specific, the image was evaluated for image fogging by means of the following method. The worst value of a white portion reflection density after printing and an average reflection density of paper before printing measured by using a reflection densitometer (manufactured by TOKYO DENSHOKU CO., LTD, REFLECTOMETER ODEL TC-6DS) were denoted by Ds and Dr, respectively, and (Ds-Dr) was determined from these values. The resultant value was used defined as a fogging amount, and was evaluated according to the following criteria.

◎: Very good (A fogging amount is 0% or more and less than 1.5%.)

○: Good (A fogging amount is 1.5% or more and less than 3.0%.)

Δ: Practicable (A fogging amount is 3.0% or more and less than 5.0%.)

x: Not practicable (A fogging amount is 5.0% or more.)

3. Transferability

Solid black images were printed out on a predetermined number of sheets of ordinary plain paper for a copying machine (75 g/m$^2$). The blank area amount of an image at the time of completion of printing was visually observed, and was evaluated according to the following criteria.

◎: Very good (Nearly no blank area occurs)

○: Good (Blank area slightly occurs)

Δ: Practicable x: Not practicable

In addition, in each of Examples 51 to 54, the states of occurrence of: scratchs on the surfaces of the photosensitive drum and the intermediate transfer member; and adherence of residual toner to the surfaces, and influences of the scratches and the residual toner on a printed-out image (matching with an image forming apparatus) when 5,000 images were output were visually evaluated. In a system using each of the two-component developers of Examples 51 to 54, neither scratch on the surfaces of the photosensitive drum and the intermediate transfer member nor adherence of residual toner to the surfaces was observed, so matching with the image forming apparatus was very good.

TABLE 5

| Example | Two-component developer | Normal temperature and normal humidity: Image density | Image fogging | Transferability | High temperature and high humidity: Image density | Image fogging | Transferability |
|---|---|---|---|---|---|---|---|
| 51 | Blue 7 | ◎ | ◎ | ◎ | ◎ | ◎ | ◎ |
| 52 | Yellow 8 | ○ | ◎ | ◎ | ○ | ○ | ◎ |
| 53 | Black 17 | ◎ | ◎ | ◎ | ◎ | ◎ | ◎ |
| 54 | Red 9 | ◎ | ◎ | ◎ | ◎ | ◎ | ◎ |

Examples 55 to 58

Image formation was performed in the same manner as in Example 31. Each of the toners prepared in Examples 36, 41, 44, and 50 was used, and a toner image was formed by using a blue toner, a yellow toner, a black toner, or a red toner.

<Evaluation>

In the same manner as in Example 31, up to 30,000 sheets were printed out in a continuous mode (that is, a mode in which consumption of toner is accelerated without the suspension of a developing unit) in a normal-temperature-and-normal-humidity (25° C., 60% RH) environment at a print out rate of 8 sheets (A4 size)/min while toner was sequentially supplied. The image density of the resultant printed-out image was measured, and the image was evaluated for durability according to the following criteria. In addition, a 10,000th image was observed and evaluated for image fogging according to the following criteria. At the same time, the state of each device constituting an image forming apparatus after the duration test was observed to evaluate matching between each device and each of the above toners. Table 6 summarizes the results of the evaluation.

[Transition of Image Density at the Time of Duration]

A predetermined number of sheets of ordinary plain paper for a copying machine (75 g/m$^2$) were printed out. An image density was evaluated according to the degree to which an image maintained its image density at the time of completion of printing as compared to an initial image. The relative density of a white portion having an original density of 0.00 with respect to a printed-out image was measured by using a Macbeth reflection densitometer (manufactured by Macbeth), and was used for evaluation.

◎: Excellent (An image density at the time of completion is 1.40 or more.)

○: Good (An image density at the time of completion is 1.35 or more and less than 1.40.)

Δ: Acceptable (An image density at the time of completion is 1.00 or more and less than 1.35.)

x: Not acceptable (An image density at the time of completion is less than 1.00.)

[Image Fogging]

A predetermined number of sheets of ordinary plain paper for a copying machine (75 g/$m^2$) were printed out. A solid white image at the time of completion of printing was evaluated for image fogging. To be specific, the image was evaluated for image fogging by means of the following method. The worst value of a white portion reflection density after printing and an average reflection density of paper before printing measured by using a reflection densitometer (manufactured by TOKYO DENSHOKU CO., LTD, REFLECTOMETER ODEL TC-6DS) were denoted by Ds and Dr, respectively, and (Ds-Dr) was determined from these values. The resultant value was used defined as a fogging amount, and was evaluated according to the following criteria.

⊚: Very good (A fogging amount is 0% or more and less than 1.5%.)

○: Good (A fogging amount is 1.5% or more and less than 3.0%.)

Δ: Practicable (A fogging amount is 3.0% or more and less than 5.0%.)

x: Not practicable (A fogging amount is 5.0% or more.)

[Image Forming Apparatus Matching Evaluation]

1. Matching with Developing Sleeve

After the completion of the print out test, the state where residual toner adhered to the surface of a developing sleeve and an influence of the residual toner on a printed-out image were visually evaluated.

⊚: Very good (No adherence occurs.)

○: Good (Nearly no adherence occurs.)

Δ: Practicable (Adherence occurs, but affects an image little.)

x: Not practicable (Adherence is remarkable, and causes image unevenness.)

2. Matching with Photosensitive Drum

The states of occurrence of: a scratch on the surface of a photosensitive drum; and adherence of residual toner to the surface, and influences of the scratch and the residual toner on a printed-out image were visually evaluated.

⊚: Very good (Neither scratch nor adherence occurs)

○: Good (A slight scratch occurs, but does not affect an image.)

Δ: Practicable (Adherence and a scratch occur, but affect an image little.)

x: Not practicable (Adherence is remarkable, and causes a vertical stripe-like image defect.)

3. Matching with Fixing Device

The state of the surface of a fixation film was observed, and results of surface property and the state of adherence of residual toner were generally averaged to evaluate the surface for durability.

(1) Surface Property

The state of occurrence of a scratch or shaving on the surface of a fixation film after the completion of the print out test was visually observed and evaluated.

⊚: Very good (No occurrence)

○: Good (Nearly no occurrence)

Δ: Practicable x: Not practicable (2) State of Adherence of Residual Toner

The state of adherence of residual toner on the surface of a fixation film after the completion of the print out test was visually observed and evaluated.

⊚: Very good (No occurrence)

○: Good (Nearly no occurrence)

Δ: Practicable x: Not practicable

TABLE 6

| | | Printed-out image evaluation | | | | | Evaluation of matching with each device | | | |
|---|---|---|---|---|---|---|---|---|---|---|
| | | Transition of image density at the time of duration | | | | Image fogging | | Photo- | Fixing device | |
| Example | Toner | Initial | 1,000 sheets | 10,000 sheets | 30,000 sheets | 10,000 sheets | Developing sleeve | sensitive drum | Surface property | Toner adherence |
| 55 | Blue 7 | ⊚ | ⊚ | ⊚ | ⊚ | ⊚ | ⊚ | ⊚ | ⊚ | ⊚ |
| 56 | Yellow 8 | ⊚ | ⊚ | ○ | ○ | ○ | ○ | ○ | ○ | ○ |
| 57 | Black 17 | ⊚ | ⊚ | ⊚ | ⊚ | ⊚ | ⊚ | ⊚ | ⊚ | ⊚ |
| 58 | Red 9 | ⊚ | ⊚ | ⊚ | ⊚ | ⊚ | ⊚ | ⊚ | ⊚ | ⊚ |

Examples 59 and 60

A print out test was performed in a continuous mode (that is, a mode in which consumption of toner is accelerated without the suspension of a developing unit) while the blue toner (7) of Example 36 or the red toner (9) of Example 50 was sequentially supplied in the same manner as in Example 34. The resultant printed-out image and matching with an image evaluation apparatus were evaluated for the same items as those of Example 55. As a result, good results were obtained for all of the items.

INDUSTRIAL APPLICABILITY

The present invention can be used as a constituent of toner for developing an electrostatic charge image.

This application claims priority from Japanese Patent Application No. 2004-174789 filed on Jun. 11, 2004, which is hereby incorporated by reference herein.

The invention claimed is:

1. A charge control agent for controlling a charged state of powder, comprising one or more units each represented by the following chemical formula (1) in a molecule:

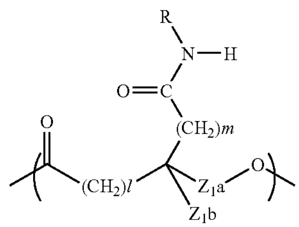

(in the formula:

R represents $-A_1-SO_2R_1$;

$R_1$ represents OH, a halogen atom, ONa, OK, or $OR_{1a}$;

$R_{1a}$ and $A_1$ each independently represent a group having a substituted or unsubstituted aliphatic hydrocarbon structure, a substituted or unsubstituted aromatic ring structure, or a substituted or unsubstituted heterocyclic structure; and wherein l is an integer selected from 0 to 4;

in addition, with regard to l, m, $Z_{1a}$, and $Z_{1b}$ in the formula:

when l represents an integer selected from 2 to 4, $Z_{1a}$ represents nothing or a linear alkylene chain having 1 to 4 carbon atoms, $Z_{1b}$ represents a hydrogen atom, and m represents an integer selected from 0 to 8;

when l represents 1 and $Z_{1a}$ represents a linear alkylene chain having 1 to 4 carbon atoms, $Z_{1b}$ represents a hydrogen atom and m represents an integer selected from 0 to 8;

when l represents 1 and $Z_{1a}$ represents nothing, $Z_{1b}$ represents a hydrogen atom and m represents 0;

when l represents 0 and $Z_{1a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{1b}$ represents a hydrogen atom, or a linear or branched alkyl group, aryl group, or aralkyl group which may be substituted by an aryl group, and m represents an integer selected from 0 to 8; and when l represents 0 and $Z_{1a}$ represents nothing, $Z_{1b}$ represents a hydrogen atom, or a linear or branched alkyl group, aryl group, or aralkyl group which may be substituted by an aryl group, and m represents an integer selected from 0 to 8;

in addition, when multiple units exist, R, $R_1$, $R_{1a}$, $A_1$, $Z_{1a}$, $Z_{1b}$, l, and m each independently have the above meaning for each unit.)

2. A charge control agent according to claim 1, wherein the one or more units each represented by the chemical formula (1) are each represented by the following chemical formula (2):

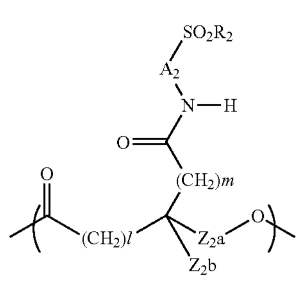

(in the formula:

$R_2$ represents OH, a halogen atom, ONa, OK, or $OR_{2a}$; and $R_{2a}$ represents a linear or branched alkyl group having 1 to 8 carbon atoms, or a substituted or unsubstituted phenyl group, and $A_2$ represents a linear or branched alkylene group having 1 to 8 carbon atoms;

in addition, with regard to l, m, $Z_{2a}$, and $Z_{2b}$ in the formula:

when l represents an integer selected from 2 to 4, $Z_{2a}$ represents nothing or a linear alkylene chain having 1 to 4 carbon atoms, $Z_{2b}$ represents a hydrogen atom, and m represents an integer selected from 0 to 8;

when l represents 1 and $Z_{2a}$ represents a linear alkylene chain having 1 to 4 carbon atoms, $Z_{2b}$ represents a hydrogen atom and m represents an integer selected from 0 to 8;

when l represents 1 and $Z_{2a}$ represents nothing, $Z_{2b}$ represents a hydrogen atom and m represents 0;

when l represents 0 and $Z_{2a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{2b}$ represents a hydrogen atom, or a linear or branched alkyl group, aryl group, or aralkyl group which may be substituted by an aryl group, and m represents an integer selected from 0 to 8; and when l represents 0 and $Z_{2a}$ represents nothing, $Z_{2b}$ represents a hydrogen atom, or a linear or branched alkyl group, aryl group, or aralkyl group which may be substituted by an aryl group, and m represents an integer selected from 0 to 8;

in addition, when multiple units exist, $R_2$, $R_{2a}$, $A_2$, $Z_{2a}$, $Z_{2b}$, l, and m each independently have the above meaning for each unit.)

3. A charge control agent according to claim 1, wherein the one or more units each represented by the chemical formula (1) are each represented by the following chemical formula (3):

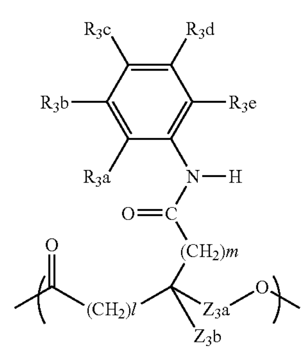

(in the formula, at least one of $R_{3a}$, $R_{3b}$, $R_{3c}$, $R_{3d}$, and $R_{3e}$ represents $SO_2R_{3f}$ ($R_{3f}$ represents OH, a halogen atom, ONa, OK, or $OR_{3f1}$, $R_{3f1}$ represents a linear or branched alkyl group having 1 to 8 carbon atoms, or a substituted or unsubstituted phenyl group), and the others each independently represent a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{3g}$ ($R_{3g}$ represents an H atom, an Na atom, or a K atom), an acetamide group, an OPh group, an NHPh group, a $CF_3$ group, a $C_2F_5$ group, or a $C_3F_7$ group;

in addition, with regard to l, m, $Z_{3a}$, and $Z_{3b}$ in the formula:

when l represents an integer selected from 2 to 4, $Z_{3a}$ represents nothing or a linear alkylene chain having 1 to 4 carbon atoms, $Z_{3b}$ represents a hydrogen atom, and m represents an integer selected from 0 to 8;

when l represents 1 and $Z_{3a}$ represents a linear alkylene chain having 1 to 4 carbon atoms, $Z_{3b}$ represents a hydrogen atom and m represents an integer selected from 0 to 8;

when l represents 1 and $Z_{3a}$ represents nothing, $Z_{3b}$ represents a hydrogen atom and m represents 0;

when l represents 0 and $Z_{3a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{3b}$ represents a hydrogen atom, or a linear or branched alkyl group, aryl group, or aralkyl group which may be substituted by an aryl group, and m represents an integer selected from 0 to 8; and when l represents 0 and $Z_{3a}$ represents nothing, $Z_{3b}$ represents a hydrogen atom, or a linear or branched alkyl group, aryl group, or aralkyl group which may be substituted by an aryl group, and m represents an integer selected from 0 to 8;

in addition, when multiple units exist, $R_{3a}$, $R_{3b}$, $R_{3c}$, $R_{3d}$, $R_{3e}$, $R_{3f}$, $R_{3f1}$, $R_{3g}$, $Z_{3a}$, $Z_{3b}$, l, and m each independently have the above meaning for each unit.)

4. A charge control agent according to claim 1, wherein the one or more units each represented by the chemical formula (1) are each represented by the following chemical formula (4A) or (4B):

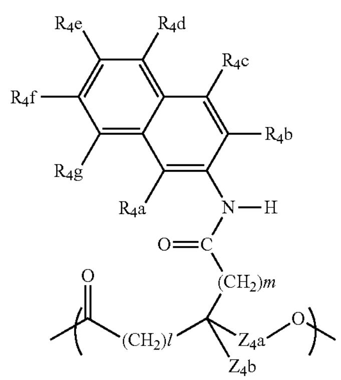

(in the formula, at least one of $R_{4a}$, $R_{4b}$, $R_{4c}$, $R_{4d}$, $R_{4e}$, $R_{4f}$, and $R_{4g}$ represents $SO_2R_{4o}$ ($R_{4o}$ represents OH, a halogen atom, ONa, OK, or $OR_{4o1}$, $R_{4o1}$ represents a linear or branched alkyl group having 1 to 8 carbon atoms, or a substituted or unsubstituted phenyl group), and the others each independently represent a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom), an acetamide group, an OPh group, an NHPh group, a $CF_3$ group, a $C_2F_5$ group, or a $C_3F_7$ group;

in addition, with regard to l, m, $Z_{4a}$, and $Z_{4b}$ in the formula:

when l represents an integer selected from 2 to 4, $Z_{4a}$ represents nothing or a linear alkylene chain having 1 to 4 carbon atoms, $Z_{4b}$ represents a hydrogen atom, and m represents an integer selected from 0 to 8;

when l represents 1 and $Z_{4a}$ represents a linear alkylene chain having 1 to 4 carbon atoms, $Z_{4b}$ represents a hydrogen atom and m represents an integer selected from 0 to 8;

when l represents 1 and $Z_{4a}$ represents nothing, $Z_{4b}$ represents a hydrogen atom and m represents 0;

when l represents 0 and $Z_{4a}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{4b}$ represents a hydrogen atom, or a linear or branched alkyl group, aryl group, or aralkyl group which may be substituted by an aryl group, and m represents an integer selected from 0 to 8; and when l represents 0 and $Z_{4a}$ represents nothing, $Z_{4b}$ represents a hydrogen atom, or a linear or branched alkyl group, aryl group, or aralkyl group which may be substituted by an aryl group, and m represents an integer selected from 0 to 8;

in addition, when multiple units exist, $R_{4a}$, $R_{4b}$, $R_{4c}$, $R_{4d}$, $R_{4e}$, $R_{4f}$, $R_{4g}$, $R_{4o}$, $OR_{4o1}$, $R_{4p}$, $Z_{4a}$, $Z_{4b}$, l, and m each independently have the above meaning for each unit)

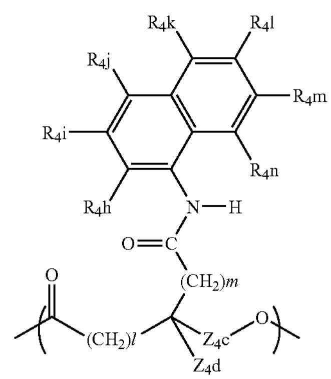

(in the formula, at least one of $R_{4h}$, $R_{4i}$, $R_{4j}$, $R_{4k}$, $R_{4l}$, $R_{4m}$, and $R_{4n}$ represents $SO_2R_{4o}$ ($R_{4o}$ represents OH, a halogen atom, ONa, OK, or $OR_{4o1}$, $R_{4o1}$ represents a linear or branched alkyl group having 1 to 8 carbon atoms, or a substituted or unsubstituted phenyl group), and the others each independently represent a hydrogen atom, a halogen atom, an alkyl group having 1 to 20 carbon atoms, an alkoxy group having 1 to 20 carbon atoms, an OH group, an $NH_2$ group, an $NO_2$ group, $COOR_{4p}$ ($R_{4p}$ represents an H atom, an Na atom, or a K atom), an acetamide group, an OPh group, an NHPh group, a $CF_3$ group, a $C_2F_5$ group, or a $C_3F_7$ group;

in addition, with regard to l, m, $Z_4$, and $Z_{4d}$ in the formula:

when l represents an integer selected from 2 to 4, $Z_{4c}$ represents nothing or a linear alkylene chain having 1 to 4 carbon atoms, $Z_{4d}$ represents a hydrogen atom, and m represents an integer selected from 0 to 8;

when l represents 1 and $Z_{4c}$ represents a linear alkylene chain having 1 to 4 carbon atoms, $Z_{4d}$ represents a hydrogen atom and m represents an integer selected from 0 to 8;

when l represents 1 and $Z_{4c}$ represents nothing, $Z_{4d}$ represents a hydrogen atom and m represents 0;

when l represents 0 and $Z_{4c}$ represents a linear alkylene chain having 1 to 4 carbon atoms, the linear alkylene chain may be substituted by a linear or branched alkyl group, or an alkyl group containing a residue having any one of a phenyl structure, a thienyl structure, and a cyclohexyl structure at a terminal thereof, $Z_{4d}$ represents a hydrogen atom, or a linear or branched alkyl group, aryl group, or aralkyl group which may be substituted by an aryl group, and m represents an integer selected from 0 to 8; and when l represents 0 and $Z_{4c}$ represents nothing, $Z_{4d}$ represents a hydrogen atom, or a linear or branched alkyl group, aryl group, or aralkyl group which may be substituted by an aryl group, and m represents an integer selected from 0 to 8;

in addition, when multiple units exist, $R_{4h}$, $R_{4i}$, $R_{4j}$, $R_{4k}$, $R_{4l}$, $R_{4m}$, $R_{4n}$, $R_{4o}$, $OR_{4o1}$, $R_{4p}$, $Z_{4c}$, $Z_{4d}$, l, and m each independently have the above meaning for each unit.)

5. A charge control agent according to claim 1, further comprising a unit represented by the following chemical formula (7) in a molecule:

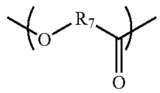

(7)

(in the formula, $R_7$ represents a linear or branched alkylene group having 1 to 11 carbon atoms, an alkyleneoxyalkylene group each alkylene of which has 1 to 2 carbon atoms, or an alkylidene group having 1 to 5 carbon atoms which may be substituted by aryl as desired;

in addition, when multiple units exist, $R_7$ independently has the above meaning for each unit.)

6. A charge control agent according to claim 1, wherein the powder comprises toner for developing an electrostatic charge image.

7. A toner for developing an electrostatic charge image, comprising at least:

a binder resin;

a colorant; and the charge control agent according to claim 1.

8. An image forming method, comprising at least the steps of:

applying a voltage from an outside to a charging member to charge an electrostatic latent image-bearing member;

forming an electrostatic charge image on the charged electrostatic latent image-bearing member;

developing the electrostatic charge image with the toner of claim 7 for developing an electrostatic charge image to form a toner image on the electrostatic latent image-bearing member;

transferring the toner image on the electrostatic latent image-bearing member onto a recording material; and fixing the toner image on the recording material under heating.

9. An image forming apparatus, comprising at least:

means for applying a voltage from an outside to a charging member to charge an electrostatic latent image-bearing member;

means for forming an electrostatic charge image on the charged electrostatic latent image-bearing member;

means for developing the electrostatic charge image with the toner of claim 7 for developing an electrostatic charge image to form a toner image on the electrostatic latent image-bearing member;

means for transferring the toner image on the electrostatic latent image-bearing member onto a recording material; and means for fixing the toner image on the recording material under heating.

* * * * *